US011178360B1

(12) United States Patent
Goetzinger

(10) Patent No.: US 11,178,360 B1
(45) Date of Patent: Nov. 16, 2021

(54) SYSTEMS AND METHODS FOR IMPLEMENTING AUGMENTED REALITY AND/OR VIRTUAL REALITY

(71) Applicant: Steelcase Inc., Grand Rapids, MI (US)

(72) Inventor: Stephen E. Goetzinger, Byron Center, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 16/811,747

(22) Filed: Mar. 6, 2020

Related U.S. Application Data

(63) Continuation of application No. 16/205,683, filed on Nov. 30, 2018, now Pat. No. 10,659,733, which is a
(Continued)

(51) Int. Cl.
*H04N 7/15* (2006.01)
*H04N 7/14* (2006.01)
(Continued)

(52) U.S. Cl.
CPC ........... *H04N 7/157* (2013.01); *H04L 65/403* (2013.01); *H04N 7/142* (2013.01); *H04N 7/15* (2013.01);
(Continued)

(58) Field of Classification Search
CPC ...... H04L 65/403; H04N 7/142; H04N 7/157; H04N 13/0484; H04N 13/0497; H04N 13/383; H04N 13/398
(Continued)

(56) References Cited

U.S. PATENT DOCUMENTS 5,111,392 A 5/1992 Malin
5,293,479 A 3/1994 Quintero et al.
(Continued)

FOREIGN PATENT DOCUMENTS

EP 1189174 A3 11/2002
WO 9631047 A2 10/1996
(Continued)

OTHER PUBLICATIONS

Tang, et al., Display and Presence Disparity in Mixed Presence Groupware, In Proceedings of the Fifth Conference on Australasian User Interface, vol. 28, pp. 73-82, Australian Computer Society, Inc., 2004.
(Continued)

*Primary Examiner* — Khai N. Nguyen
(74) *Attorney, Agent, or Firm* — Quarles & Brady LLP

(57) ABSTRACT

A conferencing system for conferencing between multiple local conferees within a first conference space and at least a first remote conferee located remotely from the first conference space includes an emissive surface located within the first conference space for generating at least first and second video representations of the remote conferee and at least a first processor for driving the emissive surface to simultaneously present at least the first and second video representations on the emissive surface. The first video representation shows the remote conferee from a first perspective and the second video representation shows the remote conferee from a second, different perspective. The first video representation is observable from within a first viewing zone and not within a second viewing zone within the conference space, and the second video representation is observable from within the second viewing zone and not within the first viewing zone.

30 Claims, 58 Drawing Sheets

Related U.S. Application Data continuation of application No. 15/840,703, filed on Dec. 13, 2017, now Pat. No. 10,182,210.

(60) Provisional application No. 62/434,749, filed on Dec. 15, 2016.

(51) Int. Cl.
 *H04N 13/383* (2018.01)
 *H04N 13/398* (2018.01)
 *H04L 29/06* (2006.01)

(52) U.S. Cl.
 CPC ......... *H04N 13/383* (2018.05); *H04N 13/398* (2018.05)

(58) Field of Classification Search
 USPC ....................................................... 348/14.07
 See application file for complete search history.

(56) References Cited

U.S. PATENT DOCUMENTS

| | | | |
|---|---|---|---|
| 5,396,583 A | 3/1995 | Chen et al. | |
| 5,442,733 A | 8/1995 | Kaufman et al. | |
| 5,847,971 A | 12/1998 | Ladner et al. | |
| 5,850,352 A | 12/1998 | Moezzi et al. | |
| 5,929,861 A | 7/1999 | Small | |
| 6,002,855 A | 12/1999 | Ladner et al. | |
| 6,052,669 A | 4/2000 | Smith et al. | |
| 6,198,852 B1 | 3/2001 | Anandan et al. | |
| 6,271,842 B1 | 8/2001 | Bardon et al. | |
| 6,522,312 B2* | 2/2003 | Ohshima | A63F 13/00 345/8 |
| 6,545,700 B1* | 4/2003 | Monroe | H04M 3/567 348/14.07 |
| 6,813,610 B1 | 11/2004 | Bienias | |
| 6,879,946 B2 | 4/2005 | Rong et al. | |
| 7,062,722 B1 | 6/2006 | Carlin et al. | |
| 7,080,096 B1 | 7/2006 | Imamura | |
| 7,246,044 B2 | 7/2007 | Imamura et al. | |
| 7,249,005 B2 | 7/2007 | Loberg | |
| 7,277,572 B2 | 10/2007 | MacInnes et al. | |
| 7,277,830 B2 | 10/2007 | Loberg | |
| 7,301,547 B2 | 11/2007 | Martins et al. | |
| 7,523,411 B2 | 4/2009 | Carlin | |
| 7,567,844 B2 | 7/2009 | Thomas et al. | |
| 7,680,694 B2 | 3/2010 | Glazer et al. | |
| 7,886,980 B2 | 2/2011 | Nishimura et al. | |
| 7,908,296 B2 | 3/2011 | Loberg | |
| 8,065,623 B2 | 11/2011 | Bohlman | |
| 8,069,095 B2 | 11/2011 | Glazer et al. | |
| 8,321,797 B2 | 11/2012 | Perkins | |
| 8,326,704 B2 | 12/2012 | Glazer et al. | |
| 8,339,364 B2 | 12/2012 | Takeda et al. | |
| 8,400,490 B2* | 3/2013 | Apostolopoulos | H04N 7/142 348/14.08 |
| 8,493,386 B2 | 7/2013 | Burch et al. | |
| 8,510,672 B2 | 8/2013 | Loberg | |
| 8,522,330 B2 | 8/2013 | Shuster et al. | |
| 8,611,594 B2 | 12/2013 | Devine et al. | |
| 8,654,120 B2 | 2/2014 | Beaver, III et al. | |
| 8,671,142 B2 | 3/2014 | Shuster et al. | |
| 8,751,950 B2 | 6/2014 | Loberg | |
| 8,762,877 B2 | 6/2014 | Loberg et al. | |
| 8,762,941 B2 | 6/2014 | Loberg | |
| 8,797,327 B2 | 8/2014 | Finn et al. | |
| 8,947,427 B2 | 2/2015 | Shuster et al. | |
| 9,047,698 B2* | 6/2015 | Maciocci | G06F 3/167 |
| 9,053,196 B2 | 6/2015 | Ratzlaff et al. | |
| 9,087,399 B2 | 7/2015 | Shuster et al. | |
| 9,110,512 B2 | 8/2015 | Exner | |
| 9,142,062 B2* | 9/2015 | Maciocci | G06T 15/503 |
| 9,189,571 B2 | 11/2015 | Loberg | |
| 9,245,064 B2 | 1/2016 | Loberg | |
| 9,245,381 B2 | 1/2016 | Howell | |
| 9,384,594 B2* | 7/2016 | Maciocci | H04N 9/3173 |
| 9,615,054 B1* | 4/2017 | McNelley | G09G 3/002 |
| 9,720,241 B2* | 8/2017 | Osterhout | G02B 27/0179 |
| 9,819,907 B2* | 11/2017 | McNelley | H04N 7/144 |
| 9,852,388 B1* | 12/2017 | Swieter | H04Q 9/00 |
| 9,911,232 B2 | 3/2018 | Shapira et al. | |
| 9,955,318 B1* | 4/2018 | Scheper | G06Q 10/063114 |
| 9,983,684 B2 | 5/2018 | Wang et al. | |
| 10,182,210 B1* | 1/2019 | Goetzinger, Jr. | H04N 7/142 |
| 2002/0065635 A1 | 5/2002 | Lei et al. | |
| 2003/0067536 A1* | 4/2003 | Boulanger | H04N 13/243 348/14.08 |
| 2004/0113945 A1 | 6/2004 | Park et al. | |
| 2004/0259554 A1 | 12/2004 | Rappaport et al. | |
| 2005/0253840 A1 | 11/2005 | Kwon | |
| 2006/0210045 A1 | 9/2006 | Valliath et al. | |
| 2007/0118420 A1 | 5/2007 | Jung et al. | |
| 2007/0156540 A1 | 7/2007 | Koren et al. | |
| 2007/0190496 A1 | 8/2007 | Lamb | |
| 2008/0231926 A1 | 9/2008 | Klug et al. | |
| 2008/0263446 A1 | 10/2008 | Altberg et al. | |
| 2009/0049081 A1 | 2/2009 | Loberg | |
| 2009/0161963 A1* | 6/2009 | Uusitalo | G06F 16/748 382/203 |
| 2010/0205043 A1* | 8/2010 | Edwards | G06F 3/04842 705/7.29 |
| 2010/0268513 A1 | 10/2010 | Loberg | |
| 2010/0306681 A1 | 12/2010 | Loberg et al. | |
| 2011/0191706 A1 | 8/2011 | Loberg | |
| 2011/0285704 A1* | 11/2011 | Takeda | A63F 13/26 345/419 |
| 2012/0046768 A1* | 2/2012 | Raoufi | H04N 7/15 700/94 |
| 2012/0089488 A1* | 4/2012 | Letchford | G06Q 30/02 705/27.2 |
| 2012/0249591 A1* | 10/2012 | Maciocci | G06T 19/006 345/633 |
| 2012/0268463 A1 | 10/2012 | Loberg | |
| 2013/0083173 A1* | 4/2013 | Geisner | G09G 3/003 348/51 |
| 2013/0297409 A1* | 11/2013 | Jones | H04L 12/1827 705/14.45 |
| 2013/0307842 A1 | 11/2013 | Grinberg et al. | |
| 2013/0339074 A1 | 12/2013 | Nagy et al. | |
| 2014/0132595 A1* | 5/2014 | Boulanger | G06T 13/60 345/419 |
| 2014/0214368 A1 | 7/2014 | Loberg | |
| 2014/0222916 A1 | 8/2014 | Foley et al. | |
| 2014/0223334 A1 | 8/2014 | Jensen et al. | |
| 2014/0267411 A1 | 9/2014 | Fein et al. | |
| 2014/0362075 A1 | 12/2014 | Howell | |
| 2015/0062122 A1 | 3/2015 | Takeda et al. | |
| 2015/0113581 A1 | 4/2015 | McArdle et al. | |
| 2015/0170256 A1 | 6/2015 | Pettyjohn et al. | |
| 2015/0242179 A1 | 8/2015 | Benson et al. | |
| 2015/0247962 A1* | 9/2015 | Mead | G02B 5/30 348/360 |
| 2015/0302116 A1 | 10/2015 | Howell | |
| 2015/0309705 A1 | 10/2015 | Keeler et al. | |
| 2015/0317410 A1 | 11/2015 | Blodgett | |
| 2015/0325035 A1 | 11/2015 | Howell | |
| 2015/0332496 A1 | 11/2015 | Howell | |
| 2015/0356774 A1 | 12/2015 | Gal et al. | |
| 2015/0356778 A1* | 12/2015 | Osterhout | H04L 51/24 345/633 |
| 2016/0026253 A1* | 1/2016 | Bradski | H04N 13/344 345/8 |
| 2016/0110916 A1 | 4/2016 | Eikhoff | |
| 2016/0140930 A1 | 5/2016 | Pusch et al. | |
| 2016/0180602 A1 | 6/2016 | Fuchs | |
| 2016/0217323 A1* | 7/2016 | Takeuchi | A63F 13/428 |
| 2016/0291922 A1 | 10/2016 | Montgomerie et al. | |
| 2016/0292925 A1 | 10/2016 | Montgomerie et al. | |
| 2017/0223312 A1* | 8/2017 | McNelley | H04N 7/15 |
| 2018/0060041 A1* | 3/2018 | Williams | G06Q 30/0631 |

(56) References Cited

U.S. PATENT DOCUMENTS

FOREIGN PATENT DOCUMENTS

| | | | |
|---|---|---|---|
| WO | 0131397 | A1 | 5/2001 |
| WO | 03026299 | A1 | 3/2003 |
| WO | 2004062257 | A2 | 7/2004 |
| WO | 2007093060 | A1 | 8/2007 |
| WO | 2009100538 | A1 | 8/2009 |
| WO | 2009100542 | A1 | 8/2009 |
| WO | 2009111885 | A1 | 9/2009 |
| WO | 2011066452 | A2 | 6/2011 |
| WO | 2012109368 | A1 | 8/2012 |
| WO | 2014191828 | A1 | 12/2014 |
| WO | 2014193415 | A1 | 12/2014 |
| WO | 2015075705 | A2 | 5/2015 |
| WO | 2015191112 | A1 | 12/2015 |
| WO | 2016165016 | A1 | 10/2016 |

OTHER PUBLICATIONS

Windows Mixed Reality Cliff House—YouTube, https://www.youtube.com/watch?v=TDc_ObWkK3g, 2017.
Holoportation: Virtual 3D Teleportation in Real-Time (Microsoft Research), YouTube, https://www.youtube.com/watch?v=7d59O6cfaM0, 2016.
Facebook Spaces Beta—Oculus, https://www.oculus.com/experiences/rift/1036793313023466/, Copyright 2018 Oculus VR, LLC.
Virtualitics, Explore the Power of AI + VR, https://www.virtualitics.com, Copyright 2018 Virtualities, Inc.
VRGO—The VR Chair, http://www.vrgochair.com/, Copyright VRGO 2018.
Russell, Why Virtual Reality Will Be the Most Social Computing Platform Yet, https://a16z.com/2016/06/20/social-vr/, Jun. 2016, 10 pages.
ALTSPACEVR Inc., Be There, Together, https://altvr.com/, Copyright 2018 Microsoft.

\* cited by examiner

SYSTEMS AND METHODS FOR IMPLEMENTING AUGMENTED REALITY AND/OR VIRTUAL REALITY

CROSS-REFERENCE TO RELATED APPLICATIONS

This application is a continuation of U.S. patent application Ser. No. 16/205,683, filed on Nov. 30, 2018, now U.S. Pat. No. 10,659,733, which is a continuation of U.S. patent application Ser. No. 15/840,703, filed on Dec. 13, 2017, and issued as U.S. Pat. No. 10,182,210 on Jan. 15, 2019, which claims priority to U.S. provisional patent application Ser. No. 62/434,749, filed on Dec. 15, 2016, each of which is incorporated herein by reference in its entirety.

STATEMENT REGARDING FEDERALLY SPONSORED RESEARCH

N/A

BACKGROUND

The present invention relates to conference systems and more specifically various methods and systems for using augmented and virtual reality to enhance conferencing activities including communication and content sharing.

Hereinafter, unless indicated otherwise, the term "meeting" will be used to refer to any gathering or linkage between two or more people in which the people communicate with each other including but not limited to conferences, gatherings, etc., regardless of whether or not all of the people that participate are collocated or not (e.g., one or more of the people in a meeting may be remotely located and linked into the meeting via a phone, video conference system, or other communication device). In addition, the term "attendee" will be used to refer to any person that communicates with another person or persons in a meeting.

Years ago there was a strong belief, and in some cases the belief still persists today, that the best way for one person to communicate with another or with a group of other people is via an in person face-to-face meeting. In addition to enabling meeting attendees to develop personal relationships, there are several other advantages associated with face-to-face meetings. First, face-to-face meetings enabled all attendees to use both hearing and sight senses to discern what other attendees are attempting to communicate. To this end, as well known, in many cases a person's actions, posture, facial expressions, etc., that can be visually observed by others, belie their words or at least provide a deeper meaning to those words such that true or better informed communication requires both visual as well as voice communication.

Second, the natural feedback afforded by both audio and visual senses allows an attendee, if he is paying attention, to ascertain the effects of his own communications on other attendees. Thus, for instance, after a first attendee makes a statement about something, the first attendee can visually and sometimes audibly sense reactions by other attendees to determine (i) if and which other attendees are paying attention to the statement, (2) if and which of the other attendees are in agreement or not in agreement with what was said, and (3) if and which other attendees understand or fail to understand what was said. Here, the visual feedback in many cases is multifaceted and may include a sense of where other attendees focus their attention, facial expressions and even body language, along with audible communications including words as well as non-language audible utterances (e.g., a grunt, a sigh, etc.).

Third, a person's simple presence at a meeting has the effect of demanding attention. In this regard, think of the different sense of presence one has when sitting in a room with another person as opposed to talking to that person via a voice phone call. When a person is present, other attendees are more respectful of their time and give greater attention and less divided attention to their communications.

Fourth, where a person is communicating with multiple attendees at the same time as in a multi-attendee team meeting, there is a dynamic between attendees that can only be sensed as a whole by sensing how all or subsets of attendees are acting and interacting during a meeting, even in the case of attendees that are not currently primarily active (e.g., attendees that are simply listening to others voice communications. Thus, for instance, while in a meeting there may be a sense from overall activity and non-verbal communications that most if not all attendees are in agreement, disagreement, a state of confusion, etc., that cannot be discerned without an overall sense of what is happening in the conference space.

Fifth, where attendees are sharing content in some tangible form such as documents or even content on digital electronic or emissive surfaces, which content attendees are paying attention to is an important form of communication. For instance, assume three large common content sharing emissive surfaces are located in a conference space. At a first time during a meeting assume all of six local attendees are looking at content on a first of the emissive surfaces even though different content is presented on all three surface. At a second time, assume that only one of the attendees is looking at content of the first emissive surface, two attendees are looking at content on the third surface and the fourth and fifth attendees are looking at the sixth attendee while the sixth attendee is looking toward content on a document in her hand. Clearly, simply sensing what and whom attendees are looking at is extremely informative about what is going on in a conference space and makes collocation particularly valuable.

While face-to-face collocated communications are still considered extremely important in many instances, two developments have occurred which have substantially reduced the percentage of total person-to-person communications where attendees are collocated. First, many companies are extremely large and employ people in many different and geographically disparate locations so that communications which used to be with a colleague down the hall or in an adjacent building on an employer's campus are now between employees in different states, counties and even continents. Disparate employee locations have made face-to-face communications cost prohibitive in many cases.

Second, technology has been developed that operates as a "substitute" for in-person meetings. Here, the term "substitute" is in quotations as, in reality, existing technology is a poor substitute for in person collocated meetings in many cases for several reasons.

The first real breakthrough in communication technology that had a substantial impact on the prevalence of collocated meetings was in phone communication systems where audible phone calls and conferencing computers and software enabled remote meeting attendees to have an audio presence for hearing spoken words as well as for voicing their own communications to one or several local phone conference attendees. Phone conferencing hardware and software has become ubiquitous in many offices and other employment facilities and especially in conference spaces fitted out to support multiple local employees as well as in private offices.

While voice phone systems have been useful and have reduced person-to-person communication costs appreciably, phone systems have several shortcomings. First, in phone systems, all the benefits of visual feedback during communication are absent. Instead of relying on visual feedback to assess meaning, attention level, level of understanding, group thinking, etc., a phone-linked meeting attendee has to rely solely on audio output. Inability to perceive meaning, attention level, understanding and other telltale signs of communication success are exacerbated in cases where there are several (e.g., 8-12) local attendees and even other remote attendees on a phone call where attendees may have difficulty discerning who is talking, when it is appropriate to talk (e.g., during a lull in a conversation, etc.

Second, in many cases audio for a remote is provided by a single speaker or a small number of speakers (e.g., 2 on a laptop) where there is little if any ability to generate any type of directional sound (e.g., sound coming from any one of several different directions toward a remote attendee). Thus, here, any time any of 12 local attendees makes a comment, the remote attendee hears the comment from the one speaker or non-directional speakers at her location and is not able to rely on the direction of the sound to discern who is currently speaking or to distinguish one voice from others.

In part to address the shortcomings associated with phone systems, a second technological development in communications aimed at reducing the need for collocated meetings has been the addition of video to audio conferencing systems. Here, the idea is that remotely located meeting attendees use cameras to obtain video of themselves which is transmitted to and presented to other differently located attendees along with audio or voice signals so that employees can, in effect, see and hear each other during a meeting. In some cases video conferences may be set up between only two disparately located attendees and, in these cases, cameras are typically positioned along an edge (e.g., a top edge) of a video conferencing display or emissive surface at each attendee's station and are aimed from that edge location directly toward the attendee at the station. The video at each station is transmitted to the other remote attendee's station and presented on the emissive surface display screen adjacent the edge located camera at the receiving station.

In other cases several local attendees may be collocated in a conference room and a remote attendee linked in via video conferencing, may be located alone at a personal workstation. Here, in most cases, an emissive surface or display screen is presented in the local conference space for presenting a video representation of the remote attendee and a camera is arranged adjacent an edge (e.g., a top edge) of the emissive surface that presents the video of the remote attendee, the camera directed toward the local area to obtain video of all of the local attendees in that area. Thus, the remote attendee has one perspective view of all local attendees in the local area from a location along the edge of the surface on which the representation of the remote attendee is presented. The local attendees see a view of the remote attendee from the perspective of the camera located along the edge of the remote attendee's emissive surface.

Hereinafter, unless indicated otherwise, a remote attendee's large field of view of a local conference space or area will be referred to as a "local area view" while a view of a remote attendee from the camera located along the edge of an emissive surface at the remote attendee's station will be referred to as a "station view". Here, a "station view" may be had by a second remote attendee viewing a first remote attendee or via local attendees at a local conferencing area viewing a remote attendee.

Thus, in each of the station view and the local area view, because the cameras are offset along the edges of the emissive surfaces where those views are presented, attendee's in those views appear to stare off into space as opposed to looking directly at other attendees observing those views. Thus, for instance, where first and second remote attendees are videoconferencing, as the first remote attendee looks at the representation of the second attendee on his station's emissive surface, the image of the first remote attendee that is presented to the second shows the first remote attendee with a ST that is misaligned with the camera at her station and her image at the second attendee's station is therefore misaligned with the ST of the second attendee. Similarly, as the second remote attendee looks at the representation of the first attendee on his station's emissive surface, the image of the second remote attendee that is presented to the first shows the second remote attendee with a ST that is misaligned with the camera at his station and his image at the first attendee's station is therefore misaligned with the ST of the first attendee. Unless indicated otherwise, this phenomenon where attendee sight trajectories are misaligned when obtained with edge positioned cameras will be referred to herein as "the misaligned view effect".

Video conferencing systems, like voice conferencing systems, have several shortcomings that are often a function of which end of a conference an attendee is linked to, a remote single attendee end or a multi-attendee local conference area end. From the perspective of a remote attendee linked to a multi-attendee conference space, there are at least four shortcomings.

First, for various reasons, remote attendees have a very difficult time discerning whom or what other attendees that participate in a meeting, both local and other remote attendees, are looking at or paying attention to. For instance, while a remote attendee's local area view often times enables the remote attendee to determine the general sight trajectories (e.g., the direction in which an attendee is looking) of local attendees, in known cases, it is difficult at best for a remote attendee to understand exactly whom or what a remote attendee is looking at (e.g., cannot discern local attendee's sight trajectories). Thus, for instance, if first and second local attendees are adjacent each other along a right edge of a tabletop in a local conference space and a third local attendee is across from the first and second local attendees on the left edge of the tabletop as presented in the remote attendee's local area view, the remote attendee may have difficulty determining which of the first and second attendees the third attendee is looking at. This inability to discern local attendee sight trajectories is further complicated where the number of local attendees increases. As another instance, if a first local attendee is looking at a second local attendee that resides behind a third local attendee, the first attendee's sight trajectory is difficult at best to discern in a remote attendee's local area view.

As another example, in many cases other information like, for example, a station view of a second remote attendee at his workstation is presented immediately adjacent or near the station view of a first remote attendee's station in a local conference space and therefore it is difficult at best for a remote attendee to determine, based on the remote attendee's local area view, whether or not any local attendee is looking directly at the remote attendee or looking at some other adjacent information (e.g., the second remote attendee). Here, a remote attendee may mistakenly have a sense that a local attendee is looking directly at the remote attendee when in fact she is looking at other information posted adjacent the emissive surface that presents the view of the remote attendee. The inability to discern whether or not local attendees are looking directly at a remote attendee is exacerbated by the misaligned view effect which causes video of attendees to show them looking off into space generally as opposed to at a viewer of the video.

As yet one of other instance, where at least first and second remote attendees link into a single local conference, no known system enables the first remote attendee to detect whom or what the second remote attendee is looking at. Here, in known configurations, the first remote attendee may have a head on view of the second remote attendee with a misaligned view effect and the second remote attendee may have a head on view of the first remote attendee with a misaligned view effect, but neither of those views enables either the first or second remote attendee to discern what the other is viewing. For instance, the second remote attendee may be viewing a local area view of a conference space that is adjacent z station view of the first remote attendee and, in that case, the first remote attendee would have difficulty discerning if the second remote attendee is looking at the local area view or the view of the first remote attendee that is presented to the second remote attendee.

Second, while the camera that generates the remote attendee's local area view is purposefully placed at a local conference room location at which video generated thereby should pick up representations of all local attendees, often times and, in great part because of local attendee preferences on where to arrange their chairs in the local space and where to fix their sight trajectories, the remote attendee cannot view all local attendees much of the time or, at most, has a skewed and imperfect view of many of the local attendees. Thus, for instance, where a first local attendee pushes her chair back 2 feet from an edge of a conference table while a second local attendee is up against the conference table edge and located between the camera and the first local attendee, the view of the first attendee in the remote attendee's conference area may be completely or at least partially blocked. Many other scenarios may result in one or more local attendees being hidden in the remote attendee's local area view.

Third, in many cases the quality of video generated for the remote attendee's local area view is too poor for a remote attendee to perceive or comprehend many non-verbal communication queues. For instance, where a local area view from an end of a conference table includes 12 local employees arranged about the table, the video is often too poor or representations of each employee are too small for the remote attendee to discern facial expressions or even body language. Inability to fully perceive communication like a local attendee places the remote attendee at a distinct communications disadvantage. While a local attendee can sense if there is general agreement on a point in the local space, for instance, the remote attendee often cannot. While a local attendee can sense if other attendees understand a position or an argument, the remote attendee often cannot. Here, the remote attendee may appear to be somewhat tone deaf when compared to local attendees that have the ability to be more empathetic and sensitive.

Fourth, while some systems enable a remote attendee to adjust her local area view at least somewhat, the process required to adjust the view is typically manual and burdensome (e.g., manipulation of a joystick or several directional buttons and zoom buttons, etc.). For this reason, in most cases, remote attendees simply accept the problems associated with the wide angle local area view and forego making any changes thereto during a meeting or, at most, may make one or two changes to zoom in on specific local speakers where those speakers talk for extended periods.

From the perspective of local attendees at the local conference space, a primary problem with existing system is that local attendee views of remote attendees are such that the local attendees have no ability to discern whom or what remote attendees are looking at. In this regard, because the remote attendee's local area view often comprises the entire local area and includes several local attendees, the representations of the local attendees are relatively small in the local area view and therefore when the remote attendee shifts her eyes from one local attendee to another, the shift is difficult to detect in the station view presented to the local attendees. The misaligned view effect exacerbates the problem of detecting a remote attendee's sight trajectory.

Second, where a second remote attendee is linked to a session and video of the send attendee is presented adjacent the local area view, there is no way for local attendees to visually determine when a first remote attendee is looking at the second remote attendee.

Third, station views of remote attendees are often better than real life views of local attendees which can lead to disparate ability to present ideas and content. To this end, in many cases remote attendee representations in local conference areas are on centrally located emissive surfaces optimized for viewing from all locations in the local space. The central presentation of a remote attendee is typically better viewed by most local attendees than are local attendees which results in presence disparity.

A third technological development in communications aimed at reducing the need for face-to-face meetings has been software and systems that enable storage and sharing of digital content in local conference spaces and, in particular, with remotely linked meeting attendees. Thus, for instance, WebEx software and other software packages akin thereto have been developed to enable content and application sharing on multiple display screens for content presentation and development purposes. In many cases content sharing software has been combined with video conferencing systems so that remote and local conferees can share and develop content at the same time that they visually and audibly communicate.

While digital content sharing is invaluable in many cases, such sharing often exacerbates many of the problems described above with respect to video conferencing and presence disparity. To this end, content shared on large common display screens in a local conferencing space present additional targets for local attendee sight trajectories and make for more complex environments where presence disparity between local and remote attendees is exacerbated. For instance, all local attendees have the ability to determine which of three large common emissive surfaces and even which sections and hence which content subsets on which emissive surfaces each of the other local attendees is looking at. In known systems a remote attendee has no way of discerning which common surface, much less which content subset on a common surface that local attendees are instantaneously looking at. Similarly, where representations of one or all of the locally shared content is presented to a remote employee, in known cases there is no way for local attendees to discern what remote attendees are looking at (e.g., which content, a representation of another attendee, etc.).

In addition to the problems with video conferencing and content sharing described above, there are other shortcomings with known systems. First, in most cases a remote attendee is limited in her ability to select views into a local conference space. For example, in most cases video of remote attendees is placed on a stationary emissive surface at one location in the space where a camera is located along the edge of the emissive surface so that the remote attendee's view into the space is limited to the camera location. Depending on where local attendees locate in the conference space and which local attendees locate where in the space, the remote attendee's view may be very good or poor or anywhere in between. Thus, for instance, if a primary presenter locates directly across from the camera that obtains the video provided to the remote attendee, the view may be very good but if the camera is directed at a side of the presenter, the view may be poor. Here, while local attendees can select and assume a best position option for viewing in the local space, in most cases remote attendees do not have that option.

Second, in most cases, local attendees have no ability to move the video representation of a remote attendee to some optimal location. Again, in most cases, the emissive surface that presents the remote attendee representation is stationary and therefore there is no option for repositioning the remote attendee representation.

Third, known systems provide only minimal ability to augment attendee video representations. For instance, in some cases the location of a remote attendee or the remote attendee's name may be presented below, above, etc., the video representation of the attendee so that others viewing the video can identify the attendee or the attendee's location. Location and identity represent minimal attendee associated content.

Fourth, in many cases attendees are associated with a large amount of "additional information" which can be used to add value to a meeting. A simple example of "additional information" is an attendee's name and title at a company or the attendee's current location. More complex additional information may include names and descriptions of projects an attendee is currently associated with or was associated with in the past, documents (e.g., text, graphical, images) the attendee is associated with (e.g., authored, previously presented, is mentioned in, etc.), multimedia materials the attendee is associated with, an attendee's resume or list of experiences, an attendee profile, an attendee's past, current or future schedule, an attendee's contact information, etc. Similarly, content shared among attendees may also have a set of related "additional information" which may add value in a meeting such as, for instance, the name(s) of an author or a person that generated the content, a history of the content or content development, links to other documents or content related to the content, etc. Where additional information is associated with attendees or with shared content, that information could be used to add value in meetings in many different ways which simply are not contemplated by known meeting and content sharing systems.

Thus, there is a need for a substantially better meeting and content sharing system that limits or even eliminates the presence disparity between local and remote meeting attendees in known systems. It would also be advantageous if the system could go beyond eliminating presence disparity to enable even better communication capabilities than those associated with collocated face-to-face meetings.

BRIEF SUMMARY

It has been recognized that surround video data sets of conference attendees can be obtained where each surround video data sets includes data useable to generate one or more directional videos of an associated attendee, effectively presenting different substantially real time perspective views of the attendee during an ongoing session. Once directional videos for each session attendee can be generated, augmented and virtual representations of remotely located attendees can be generated where attendee representations can be provided with apparent sight trajectories (STs) that indicate substantially instantaneously what attendees at their own locations or in their own AR or VR instances are looking at. Here, because any directional video of any attendee can be generated, regardless of how an attendee arranges other attendees in her enhanced reality instance, true STs that show each attendee representation looking at his or her instantaneous target of interest ("TOI", what the attendee is currently looking at) can be presented.

This disclosure also contemplates many different augmenting features for adding additional content as well as helpful hints about session state and what attendees are paying attention to are presented. This disclosure also contemplates automated movement of content fields, attendee representation and other TOIs within a VR ad AR instances based on various types of sensed session activities.

The disclosure further contemplates a commissioning system and commission method or process whereby attendee specific conversion data sets can be generated that are useful for converting video or images from a relatively small set of system cameras into required directional videos to drive attendee representations at other stations.

The disclosure further includes eye tracking sensors or devices for determining attendee STs which are then used to determine directional video vantage points or associated angles.

In at least some embodiment mechanical surfaces or other devices at a user's workstation or in a conference space may align with virtual interface tools presented either in an AR environment or in a VR environment so that the mechanical devices can be used to offer haptic feedback or at least contactable surfaces useful to confirm through touch that a surface of virtual control button has been selected.

In many cases it is contemplate that each session attendee will be able to arrange TOIs including content fields and other attendee representations per their personal preferences and irrespective of how other attendees arranged their AR or VR instances and that the system should be able to generate directional videos to support all required perspectives.

In some cases a VR headset may include a see through section or window enabling an attendee to see a real world keyboard, mouse or other interface device and to better interact with those devices.

In some cases VR or AR or MR instances are presented via head worn goggles or headsets, in other cases those instances may be presented via large emissive surfaces at workstations or even in multi-user conference spaces.

Many other concepts and aspects are contemplated by the present disclosure.

DETAILED DESCRIPTION

Figure 1:
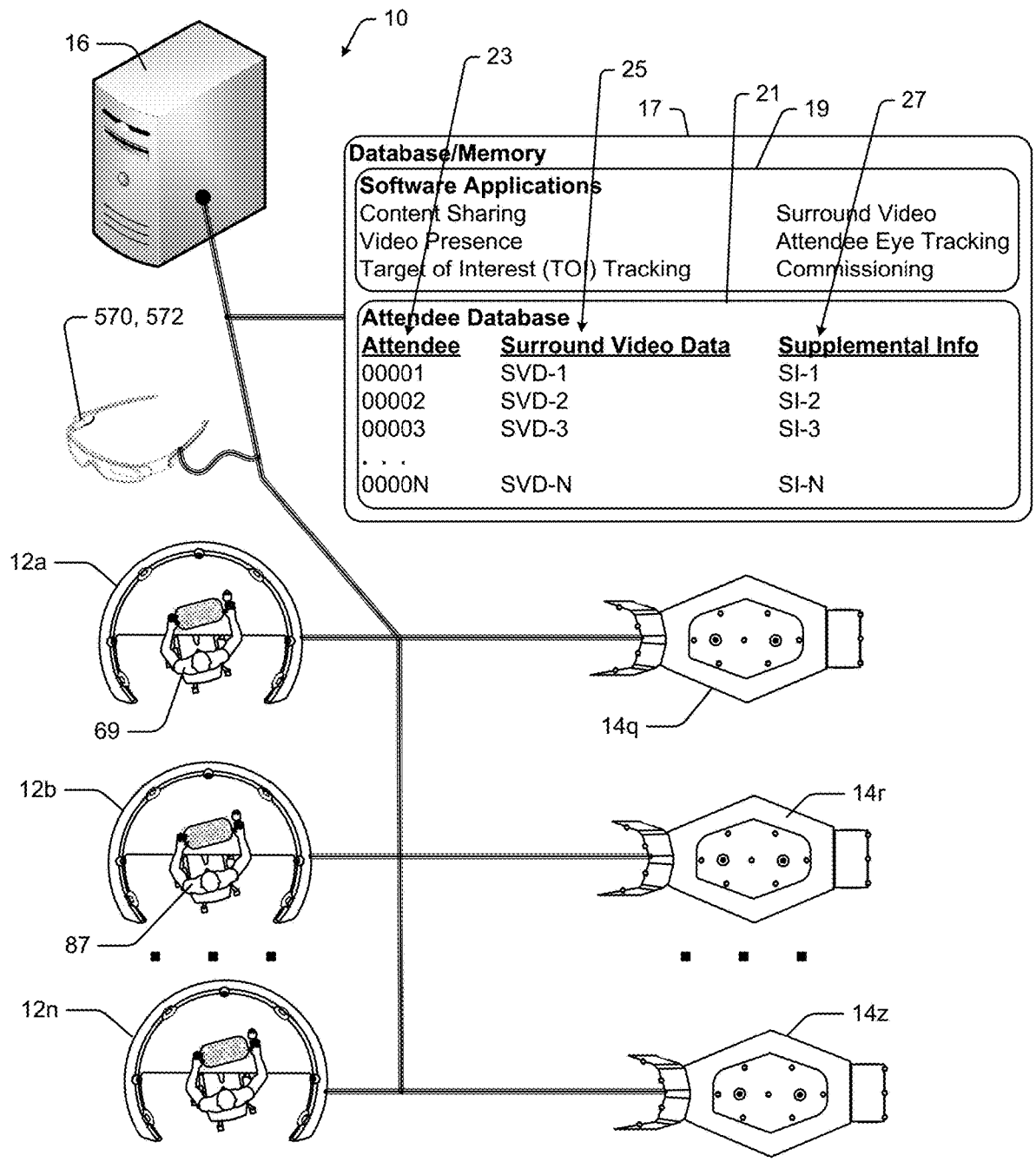
FIG. 1 is a schematic view of an augmented reality system for use in an office space that is consistent with at least some aspects of the present disclosure.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

Hereinafter, unless indicated otherwise, the acronym "AR" will be used to refer to augmented reality and the acronym "VR" will be used to refer to virtual reality. In this disclosure, AR will include any case where content is added to a view of a real world, either in real time as the real world view is occurring (e.g., content added to glasses that an attendee looks through to augment the attendee's view) or thereafter in a case where content is added to a stored real world view (e.g., augmenting content is added to a stored video of a real world view). In addition, AR will also include a case where content is added to a real time video representation of the real world (e.g., added to a remote attendee's local area view of a local conference space). The term AR will also be used to refer to mixed reality ("MR") cases where virtual representations are integrated into real world views. For instance, where a video image of a remote attendee is placed at the edge of a real world tabletop, that MR view will also be considered an AR representation unless indicated otherwise, as the attendee representation is used to augment the real world view.

In this disclosure, VR will include any case where any content is presented in an artificial visual world, either in a real time virtual view or thereafter in the case of a stored or recorded VR experience.

In this disclosure the acronym "ER" will be used to refer to an enhanced reality system including any of an AR system, an MR system and a VR system or any combination of AR, MR and VR systems where some visual and in at least some cases audio aspect of reality is altered or enhanced.

The acronym "RW" will be used to refer to the real world. The real world is the world as experienced through the un-augmented view of an attendee's eyes in real time.

As used herein, the acronym "VW" will be used to refer to virtual world. The virtual world is the virtual space in which virtual reality is experienced, such as the experience of using virtual reality goggles.

As used herein, the abbreviation "AW" refers to augmented world. The augmented world is the world as experienced through an augmented view of an attendee's eye and is a combination of the real world and some augmenting features, such as the experience of using augmented reality goggles.

It should be appreciated that many of the concepts described herein will be and indeed are intended to be applicable in other industries such as, for instance, the medical industry, in education, in hoteling, and others. Nevertheless, in the interest of simplifying this explanation, unless indicated otherwise, the concepts will be described in the context of an employer's office facilities and in office space that includes conference rooms where local conferees gather in conference rooms and where one or more remotely located attendees can link into those conference rooms to attend meetings.

A. Augmented and Mixed Reality Systems

Referring to FIG. 1, one exemplary implementation of an server 16 is shown in schematic form which includes a set of remote-attendee workstations 12*a*, 12*b*, . . . 12*n*, a set of multiple-attendee local conference workspaces 14*q*, 14*r*, . . . 14*z*, a processor device 16 and a database 17. Hereinafter, unless indicated otherwise, each remote-attendee workstation 12*a*, 12*b*, etc., will be referred to as a "workstation" or an "attendee workstation" and each multiple-attendee local conference workspace will be referred to as a "group configuration" or a "group workspace", in the interest of simplifying this explanation.

In some embodiments AR/MR headsets 570, 572 may also be included in the system 10 or may be included in the system instead of the stations 12*a*, 12*b*, etc. and workspaces 14*q*, 14*r*, etc.

Referring still to FIG. 1, in at least some embodiments, processor 16 will include a server that may be located in a facility that includes one or more of the workstations 12*a*, 12*b*, etc. and one or more of the group workspaces 14*q*, 14*r*, etc., or may be remotely located from the stations and workspaces and linked to those affordance configurations via any type of communication network including but not limited to the Internet, a local area network, a wide area network, a wired or wireless network, etc. While shown as a single device, processor 16 may include two or more linked processors or servers collocated or at different locations and linked via a communication network. In at least some cases, processor 16 may also be collocated with one or more of the workstations 12a, 12b, etc. and/or one or more of the group workspaces 14q, 14r, etc. In this regard, see the exemplary processor devices 16' and 16" shown integrated into exemplary workstation 12a and exemplary group workspace 14q in FIGS. 3 and 7, respectively. Hereinafter, unless indicated otherwise, processor 16 will be referred to generally as a server 16 regardless of how many separate devices perform processor programs described in this disclosure and regardless of where the processors are located within the overall system 10.

Figure 8:
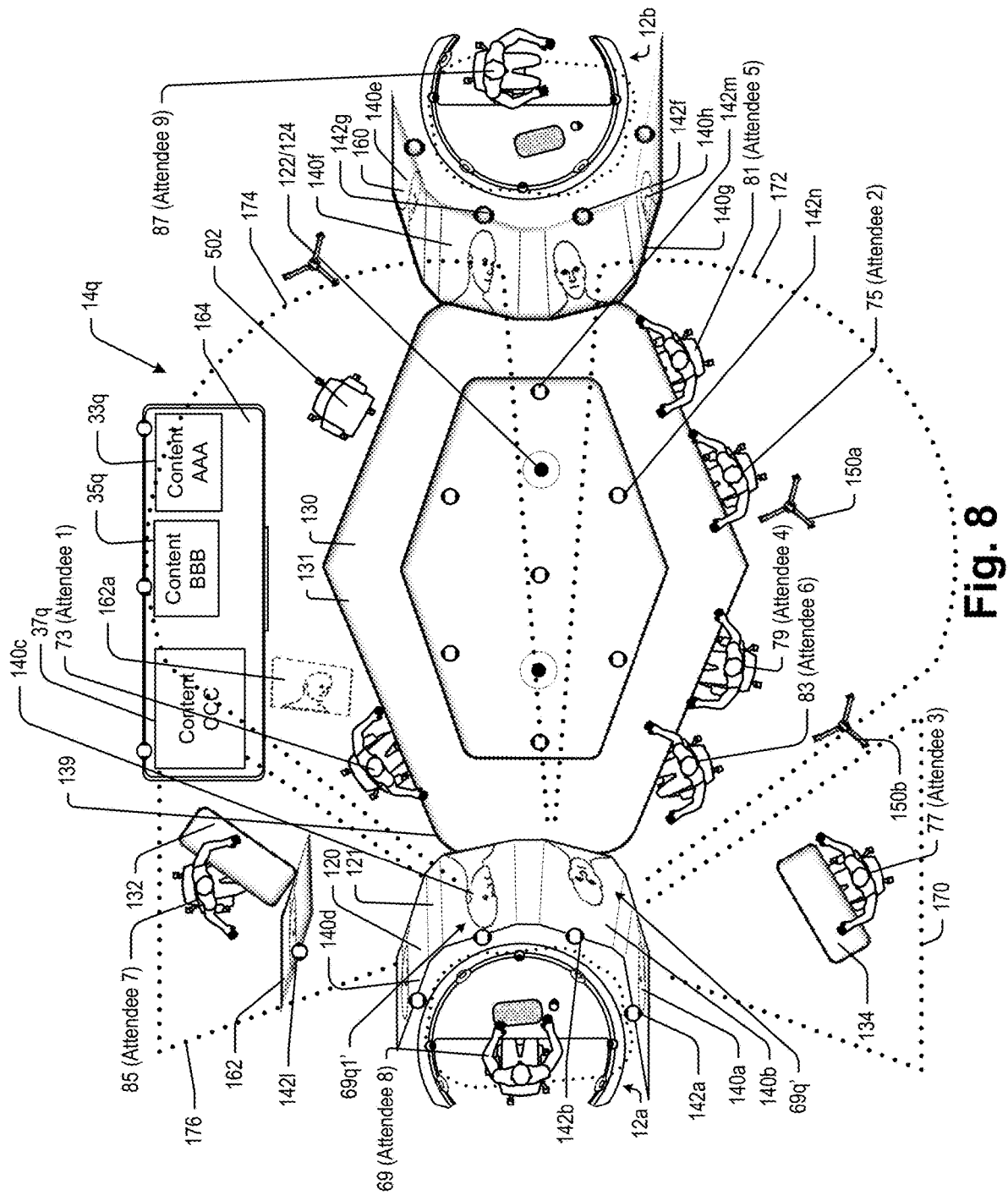
FIG. 8 is similar to FIG. 7, albeit showing a conference session occurring in the illustrated space.

Unless indicated otherwise, the present disclosure will be described in the context of a system that includes at least first and second personal workstations 12a and 12b and a single multi-attendee conference workspace configuration 14q where first through seventh attendees 73, 75, 77, 79, 81, 83 and 85 are located in the conference workspace and eighth and ninth attendees 69 and 87, respectively, are located at the first and second workstations 12a and 12b, respectively, as shown in FIG. 8. Video representations of attendees will be indicated by the attendee number followed by a prime. For instance, in FIG. 6, a representation of the ninth attendee 87 (see again FIG. 8) is labelled 87'.

Where there are multiple representations of a single attendee, each representation will be further qualified by a lowercase letter to indicate presentation at a specific one of the workstations 12a or 12b or at the workspace configuration 14q. For instance, see FIG. 11 where emissive surface at workstations 12a and 12b are shown in a flat laid out view and where all attendee representations at station 12a are qualified with a lowercase "a" and all attendee representations at station 12b are qualified with a lowercase "b". FIG. 12 shows a state of station 12a similar to the top portion of FIG. 11, albeit where the emissive surface 101a is shown in a fanned out view. Representations at station 14q will be qualified with a lowercase "q". Similarly, where different instances of the same content are presented at different workstations or different workspaces, the number that labels the content will be qualified with a lowercase letter (e.g., "a" for station 12a, "b" for station 12b and "q" for workspace 14q) unless indicated otherwise. For example, see the qualified content windows 33a, 35a, 37a and 33b, 35b and 37b in FIG. 11.

While FIG. 8 shows the workstations 12a and 12b in a single view along with conference workspace 14q, it should be appreciated that stations 12a and 12b are located remotely from workspace 14q and that stations 12a and 12b are only shown in FIG. 8 in the interest of simplifying this explanation.

In addition to being linked to the attendee workstations and group workspaces, server 16 is also linked via a communication network to database/memory 17 which may be collocated with server 16 or may be remote there from. Database 17 stores application programs run by server 16 as well as data and information that is generated by the application programs and that is needed to drive various aspects of those programs. As in the case of server 16, the database 17 may include a single database or a plurality of databases linked by a communication network or where each database is separately linked to server 16 and where the database includes several storage devices or systems, those separate devices or systems may be collocated or disparately located. In some cases some or all of the database functionality may be provided by data storage devices or memory devices located at one or more of the attendee workstations 12, 12b, etc., or located at one or more of the group workspaces 14q, 14r, etc. In this regard, see databases 17' and 17" shown integrated into the exemplary workstation 12a and group workspace 14q in FIGS. 3 and 7, respectively.

Referring again to FIG. 1, exemplary application programs 19 stored in database 17 and run by server 16 include a content sharing application, a video presence application, a target of interest tracking application, a surround video application, an attendee eye tracking application and a commissioning application. Each of these application programs will be described in greater detail here after. Database 17 may also store other application programs such as, for instance, content generating applications like work processors, drawing/CAD/CAM programs, spreadsheet programs, presentation control programs, annotation programs, etc., as well as one or more programs designed to integrate other applications within the system 10.

Referring again to FIG. 1, database 17 also stores an attendee database 21 that stores a subset of data for each of the attendees that may possibly attend a meeting using the system 10. For instance, it is envisioned that if an employer employs 1000 employees, database 21 would store separate data for each of the 1000 employees. In FIG. 1, exemplary database 21 is shown in table form in the interest of simplifying this explanation. It should be recognized that other and more complex databases 21 are contemplated. Exemplary database 21 includes an attendee column 23, a surround video column 25 and a supplemental information column 27.

Attendee column 23 lists all possible attendees and in the present example where the employer has 1000 employees, would list each of the 1000 employees as attendee 00001, attendee 00002, etc.

Surround Video Data column 25 includes a set of real time surround video data for each employee listed in column 23. In at least some embodiments the surround video data will include two different datasets including raw data obtained from system cameras that generate video of the attendee as well as directional videos of the attendee. Here, the phrase "direction video" is used to refer to a video representation of an attendee that shows the attendee looking in a direction that can be discerned from the directional video. For instance, a first directional video of an attendee may show a first attendee looking head-on directly into a camera field of view so that if a second attendee is located directly in front of the representation, that second attendee would have the sense that the first attendee in the video is looking directly at the second attendee. A second and simultaneous directional video of the first attendee may show the first attendee looking to the left so that a third attendee located directly in front of the second directional video representation would have a sense that the first attendee in the video is looking at something to the left of the second video representation. Similarly, a third directional video of the first attendee may show the first attendee looking to the right so that a fourth attendee located directly in front of the third representation has a sense that the first attendee in the video is looking at something to the right of the third video representation. Many other directional video representations where the first attendee is shown looking along other angles sight trajectories are contemplated.

In some cases the perspective required for a directional video will substantially align with one of the video cameras in a system and therefore the directional video will include one of the raw data videos generated by the aligned system camera such that essentially no processing is required to convert the raw video data into a directional video. In most cases, however, a directional video will have to be created by server 16 using raw video data from two or more cameras to generate the directional video from a perspective about an attendee that is required to drive a representation of the attendee at some other linked workstation or in a linked workspace. Thus, for example, in a simple case real time video from two cameras aimed at an attendee from first and second different angles may be combined to generate a third directional video of the attendee from a third angle between the first and second angles.

The number of directional videos required in an attendee's dataset will vary in most cases depending on the number of attendees linked to a meeting and where the attendees are located. For example, if a first attendee located at a personal workstation links to only a second attendee located at a second personal workstation and the first attendee only has two targets of interest (TOIs; e.g., datasets presented for viewing, may include attendee representations, a document or other content, etc.) to view on an emissive surface at her station including a video representation of the second attendee and a content window in which the attendees share content, the surround video required to give the second attendee a sense of what the first attendee is looking at (e.g., is the first attendee looking at the second attendee or at the shared content window) may only require a single directional video at any one time, albeit where the perspective of the directional video changes as the first attendee looks back and forth between the content window and the second attendee representation.

In the above example, at times when the first attendee looks at the second attendee representation at the first attendee's station, the directional video of the first attendee at the second attendee's station should be head on so that when presented to the second attendee, the first attendee appears to be staring directly at the second attendee but, when the first attendee looks at the content window, the directional video of the first attendee should show the first attendee looking in some direction that aligns with the location of the content window at the second attendee's workstation so that the second attendee has a clear sense of what the first attendee is viewing. Here, only one changing perspective directional video of the first attendee is required to drive the representation at the second attendee's station. In this example, if the second attendee moves the content window at her station to another location on the emissive surface, even if the content window remains stationary at the first attendee's station, when the first attendee looks at the content window at her station, the representation of the first attendee at the second attendee's station should again show the first attendee looking at the newly positioned content window, albeit showing the first attendee from a different perspective.

In a different case where a first attendee is linked to second and third attendees at second and third workstations and the three attendees share a content window, the surround video data for the first attendee would have to include two simultaneous directional videos from two different perspectives at least most of the time, a first directional video to be presented to the second attendee and a second directional video to be presented to the third attendee, as each of those attendees would usually have a different perspective view of the first attendee. For instance, when the first attendee looks at the second attendee's representation at the first attendee's workstation, the first attendee's representations at the second and third attendee's stations would have to show the first attendee staring straight on at the second attendee's workstation and looking toward the second attendee's representation at the third attendee's workstation, respectively. Here, if the first attendee changes her sight trajectory to look at the third attendee's representation at the first attendee's workstation, the first attendee's representations at the second and third attendee's stations would have to show the first attendee looking toward the third attendee and staring straight on at the third attendee, respectively. In each of these cases, the surround video set would include only two simultaneous directional videos from first and second different perspectives where the two perspectives change as the first attendee changes her sight trajectory between the second and third attendee representations at her station.

The surround video data set gets somewhat more complicated as more attendees link into the system during a meeting. Thus, for instance, if eight attendees link to a meeting from separate workstations and each of the second through seventh attendees is shown in a video representation at the first attendee's workstation, seven different and changing simultaneous directional videos would be generated to show the first attendee to all of the other attendees at their stations from different perspectives. Thus, the surround video data may include one, two ten or, in effect, all possible directional videos and, in many cases, the number of directional videos in an attendee's surround video data set will increase and decrease depending on the number of attendees with different perspectives linked to a meeting.

In some cases where two or more attendees are at the same location such as in a multi-attendee workspace 14q, the number of distinct perspective video sets required may be less than the total number of attendees that link to a meeting. To this end, some collocated attendees may be positioned to view the same video representation of a remote attendee and, in that case, only one perspective view of the remote attendee would be required to drive the representation for the collocated attendees.

Here, even within a single perspective view directional video of an attendee that is meant to be viewed by several attendees in the same general area, there may be subtleties to the directional video chosen so that the attendees in the viewing area have a more informed senses of where the attendee in the directional video is looking. For instance, assume first, second and third local attendees are arranged to the left, center and to the right in an area in front of a local emissive surface where a directional video of a remote attendee is presented, when the remote attendee is looking at a representation of the second (e.g., centrally located) attendee at her remote station, the representation of the remote attendee on the local emissive surface may be shown staring directly ahead and therefore at the second attendee. If, however, the remote attendee redirects her sight trajectory to view a representation of the first attendee at the remote station, the representation of the remote attendee on the local emissive surface may be shown skewed to the left slightly and generally in the direction of the first attendee at the local station. Thus, while the first attendee would not have optimal eye-to-eye contact with the remote attendee, here, each of the first, second and third attendees would have a clear sense that the remote attendee is looking toward the first attendee as opposed to the second and third. In this case, the skewing of the directional video trajectory should only be slight (e.g., 5-15 degrees) so that there is no confusion about the remote attendee looking at something other than the first local attendee.

In addition to including raw video data from the system cameras and derived or raw real time directional videos required to drive representations of an associated employee at system workstations and in system workspaces, the surround video data in column 25 may also include, for each attendee, attendee specific video conversion data generated by the commissioning application (see again 19 in FIG. 1) for use in converting the raw video data into required directional videos. To this end, in at least some cases it is contemplated that attendees may participate once or, in some cases, periodically if their appearance substantially changes, in a commissioning procedure designed to generate video conversion data useable subsequently during normal system operation to convert a relatively small set of raw video data (e.g., data from three cameras) into a required set of directional videos. Here, the idea is to provide a system where limited real time video data is required to drive the system in an effort to reduce costs and limit any latency in real time data processing, data transmission, etc. An exemplary commissioning procedure will be described hereafter in more detail.

While not necessary in at least some embodiments, in other embodiments it is contemplated that server 16 may be programmed to, in effect, generate all possible directional videos or at least a dataset that can be used to generate all possible directional videos for each or at least a subset of attendees to a meeting and then may only use required directional videos in real time to drive meeting representations. Here, the full surround dataset or full set of possible directional videos may be stored persistently to drive other applications or services like, for instance, a historical review of a meeting so that any view of at least some attendees may be generated.

Referring still to FIG. 1, supplemental information column 27 includes a set of supplemental information SI-1, SI-2, etc., for each of the attendees listed in column 23. Here, supplemental information may include simple information like an attendee's name, title, and identities of teams the attendee is a member of (e.g., innovation team 1, product development team 12, etc.), etc. In some cases the supplemental information may also include content or materials that are associated with the attendee such as, for instance, documents, videos, audio clips, images, drawings, etc. Here, the supplemental information may include information that is automatically used to augment information presented on system emissive surfaces (e.g., display screens) in various ways as well as simple content that is accessible top view, share and/or modify by the associated attendee in column 23. Exemplary supplemental information and how it may be used are described hereafter in some detail.

Referring yet again to FIG. 1, server 16 is modular in that it can include any combinations of workstations 12a, 12b, etc., and group workspaces that are practical for a given application or to support a set of attendees given locations and numbers. For example, server 16 can include one or more workstations 12a, 12b, etc., and one or more group workspaces 14q, 14r, etc., or two or more workstations 12a, 12b, etc., and zero group workspaces 14q, or two or more group workspaces 14q, 14r, etc. and zero workstations 12a. In the interest of simplifying this explanation, unless indicated otherwise, system 10 will be described in the context of a single exemplary workstation 12a and a single exemplary group workspace 14q.

Figure 2:
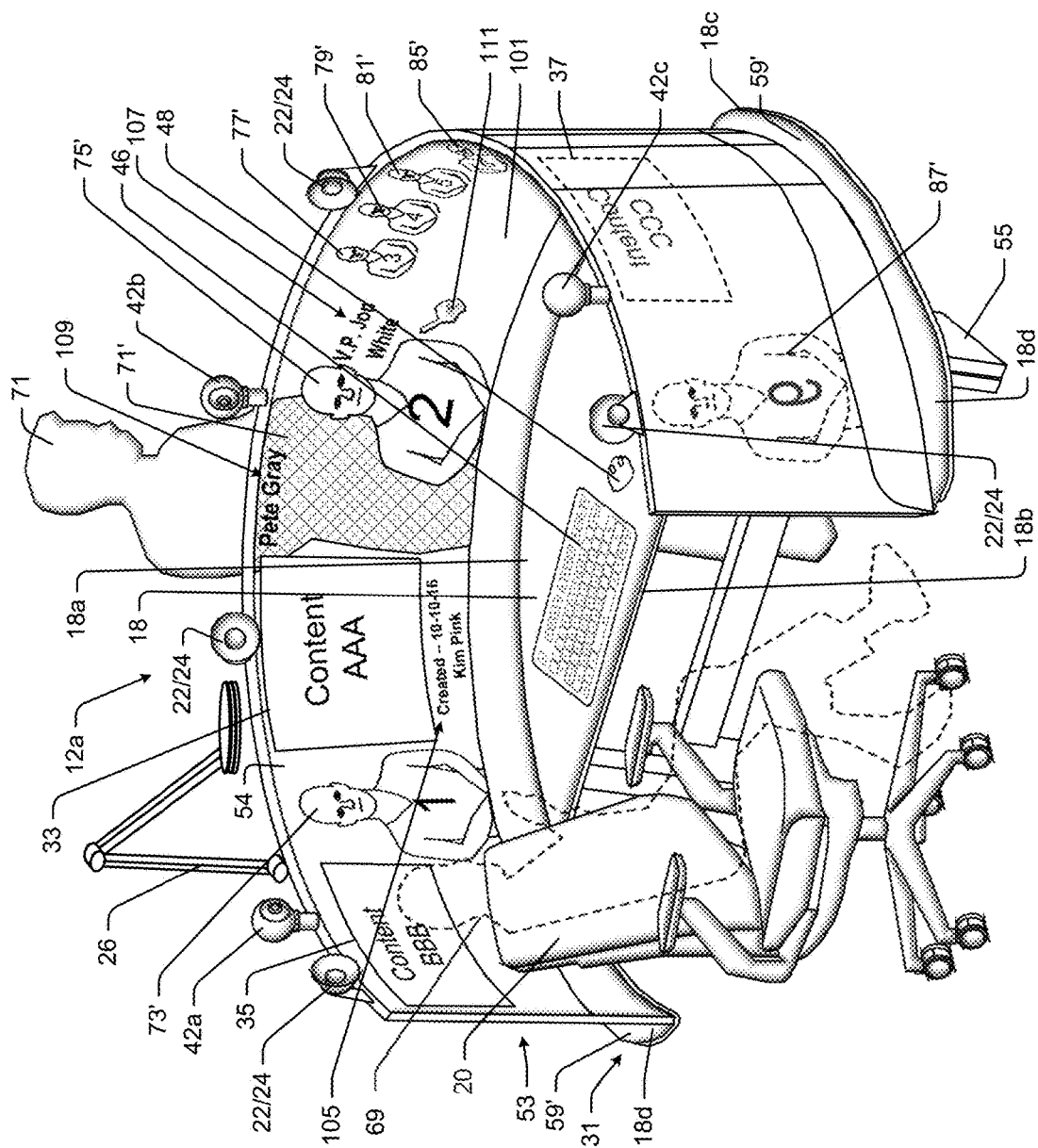
FIG. 2 is a perspective view of one of the personal workstations shown in FIG. 1 for presenting an augmented reality view or instance to conference attendee that is consistent with at least some aspects of the present disclosure.

In the present disclosure it will be assumed that first through seventh attendees 73, 75, 77, 79, 81, 83 and 85 (see FIG. 8) are located at group workspace 14q (see FIG. 8), an eighth attendee 69 is located at attendee workstation 12a as shown in phantom in FIG. 2 and also in FIG. 1 and a ninth attendee 87 is located at a second attendee workstation 12b as shown in FIG. 1.

Referring now to FIG. 2, it is envisioned that exemplary attendee workstation 12a may be used for many different purposes including as a personal workstation to perform work activities independent of other employees. In addition, consistent with the present disclosure, workstation 12a may also be used to participate in a conference or meeting with other attendees that are remotely located from workstation 12a. More specifically, station 12a may use AR to provide an enhanced sense of collocation to attendee 69 and the remotely located attendees 73, 75, 77, 79, 81, 83 and 85 present at workspace 14q in FIG. 8. In this regard, attendee 69 may be represented at workspace 14q in AR while other attendees at workstation 14q are represented in AR at workstation 12a in ways to be described hereafter. Moreover, workstation 12a and workspace 14q may be used by attendees to share and develop various types of content, documents, materials, etc., together at station 12a and in space 14q.

Figure 3:
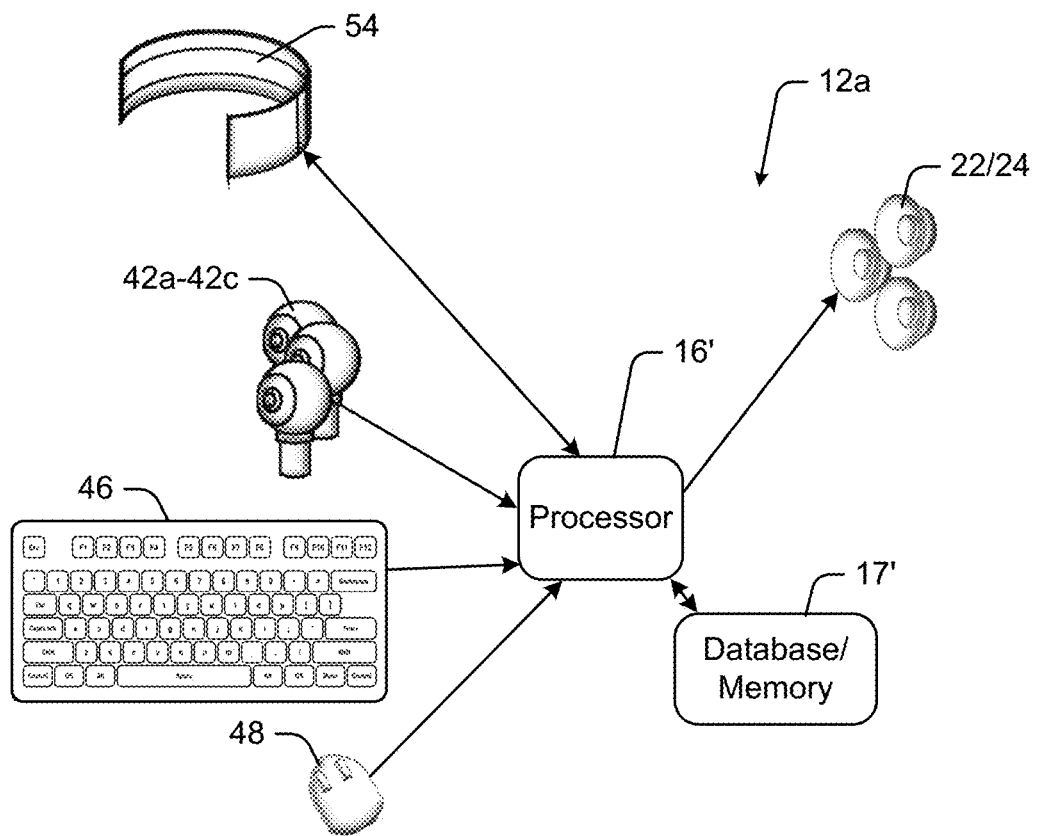
FIG. 3 is a schematic view of several components included in the exemplary workstation shown in FIG. 2.
Figure 4:
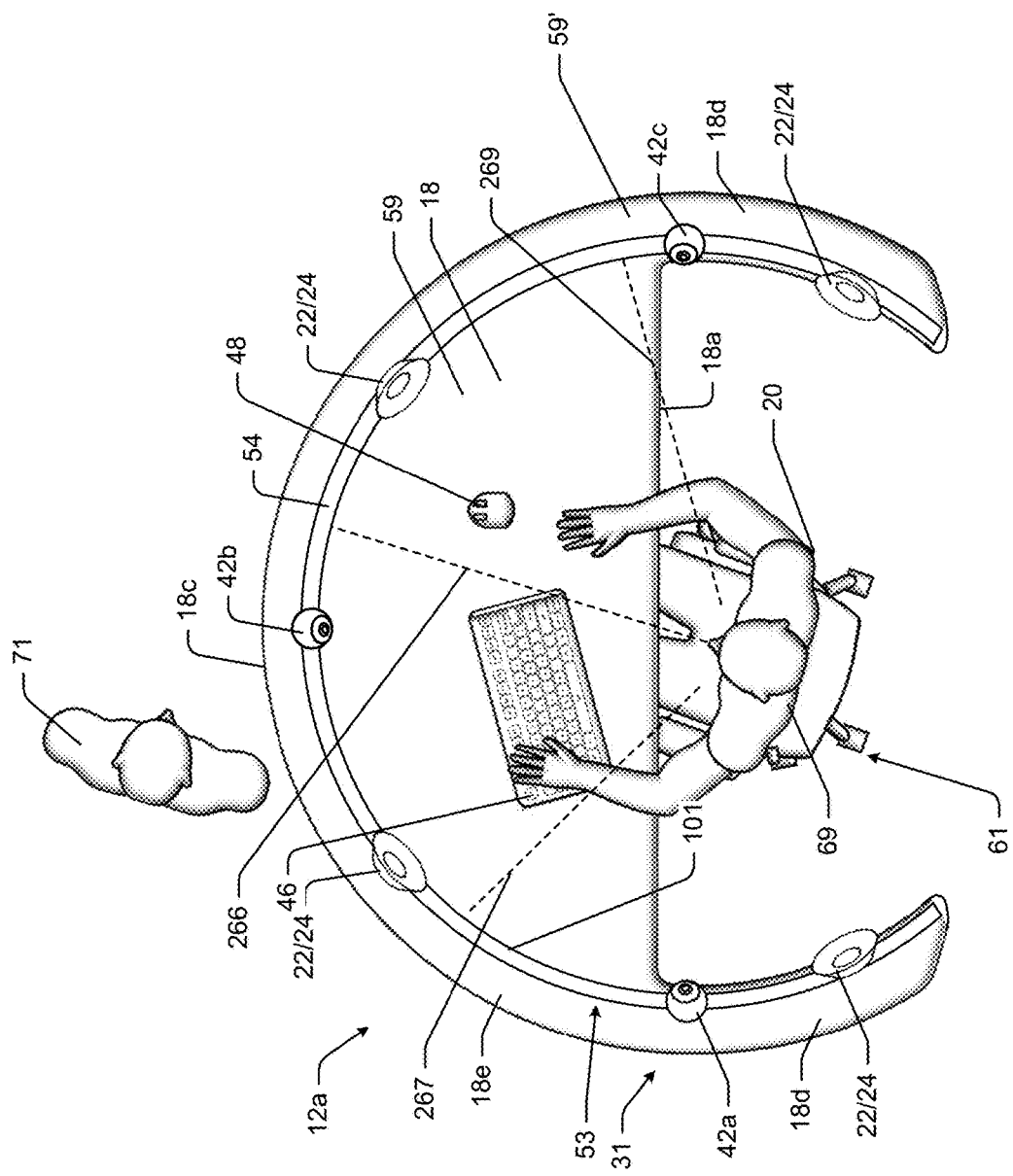
FIG. 4 is a top plan view of the workstation shown in FIG. 2.

Referring again to FIG. 2 and also to FIGS. 3 through 6, exemplary attendee workstation 12a includes a table assembly 31, an input/output (I/O) configuration 53 and a task chair 20. Table assembly 31 includes a height adjustable leg structure 55 and a tabletop 18 that is mounted to the top end of the leg structure 55. Leg structure 55 include telescoping members so that the height of tabletop member 18 can be raised and lowered. Tabletop member 18 forms a substantially horizontal flat worksurface 59. As best seen in FIG. 4, tabletop member 18 includes a main semi-circular portion 18a that includes a generally straight front edge 18b and a round semi-circular rear edge 18c when viewed in top plan view. Tabletop member 18 also includes first and second arm portions 18d that extend the semi-circular rear edge forward generally in the same direction so that the curved and extended rear edge extends through an approximately 270 degree arc about a central station cavity at 61. Tabletop member 18 includes a circumferential edge section at 59' that includes the outermost six to twelve inches of the worksurface 59.

Referring again to FIGS. 2 through 6, I/O configuration 53 includes an emissive surface structure or member 54, a plurality of speaker/microphone devices 22/24, a plurality of camera devices 42a-42c, one or more light devices 26 attendee input devices including a keyboard 46 and a mouse 48 and both a processor 16' and a database 17' mentioned briefly above. In other cases a microphone may be provided as another input device where voice commands may replace or supplement mouse device and/or keyboard commands. Station processor 16' is wired to or wirelessly linked to each of the emissive surface member 54, cameras 42a-42c, microphone/speaker devices 22/24, database 17' and the input devices 46 and 48 as seen in FIG. 3. Other input devices may include a trackball, a touchpad, a gesture-recognizing device (such as the aforementioned cameras 42a-42c coupled operationally with gesture recognition software—an example of such a device is the Kinect sensor assembly by Microsoft), a voice recognition device (such as the aforementioned microphones 22 coupled operationally with voice recognition software), a touch-sensitive display such as, for instance, a portion or all of the emissive surface member 54, etc.

Figure 6:
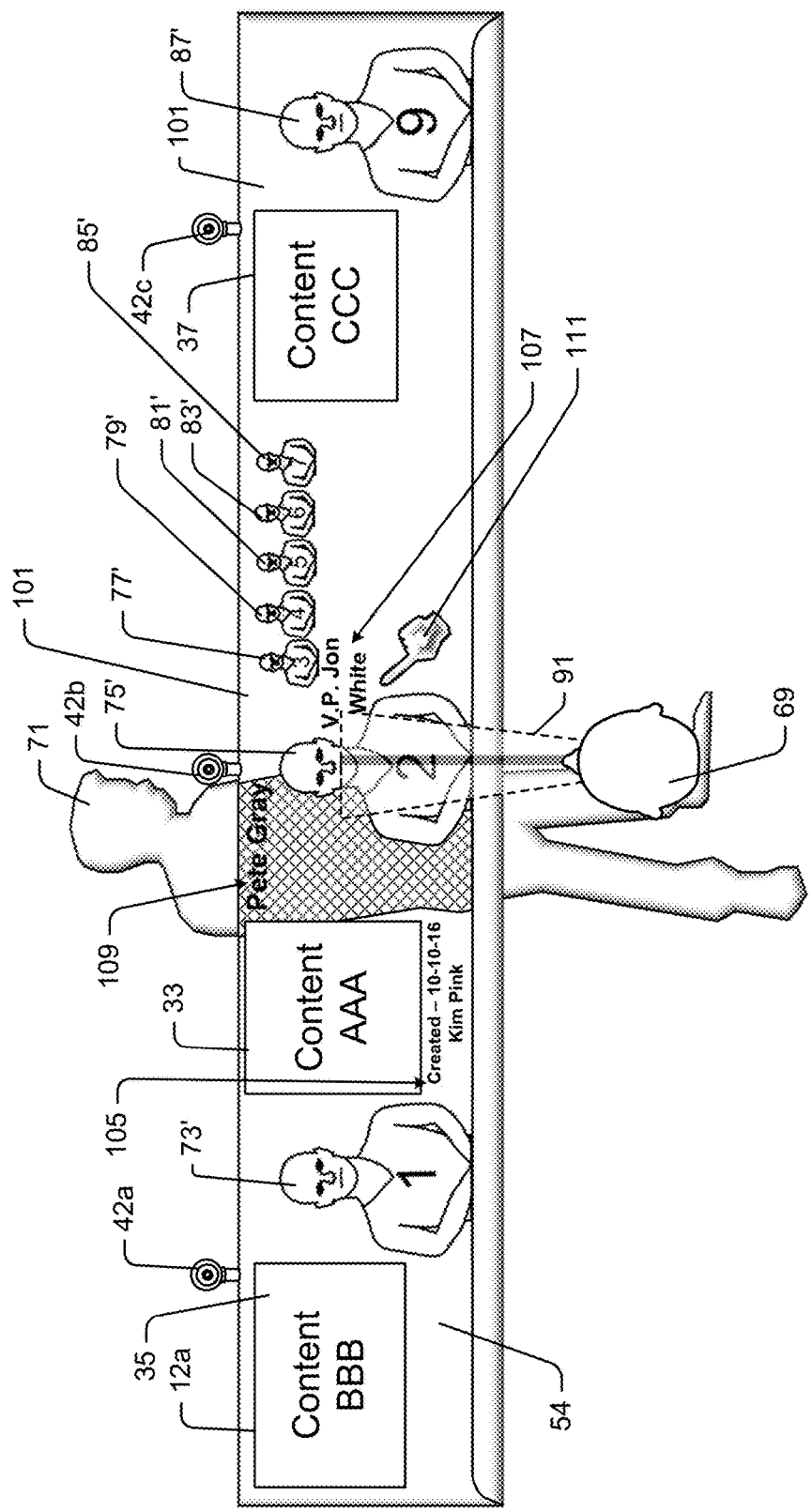
FIG. 6 is a laid out side plan view of the emissive surface portion of the station shown in FIG. 2.

Referring still to FIGS. 2 and 6, a selection icon or cursor in the shape of a pointing hand is shown on surface 101 at 111. Here, it is contemplated that mouse 48 or some other interface device may be used to control icon 111 to move the icon to any location on surface 101 and to use the icon to select any selectable items presented on surface 101 or, in some cases, to even select any item in in the RW that appears through surface member 54 (e.g., person 71 located behind and viewable through member 54). Here, selection may include clicking or double clicking of a mouse button or some other affirmative action. In addition to pointing and clicking, icon 111 may also be used in at least some embodiments to move selected items to different locations on surface 101. Thus, for instance, an attendee may be able to select content window 33 and move that window to a different location on surface 101. As another instance, the attendee may be able to select video representation 75' of a remote attendee and move that representation to a different surface 101 location.

While processor 16' may perform several or most in not all of the processes and functions described herein, in some embodiments where the system server 16 (see again FIG. 1) performs most processes, processor 16' nevertheless will run applications to receive content from the I/O configuration and to drive output devices like the speakers 24, the emissive surface member 54, and other configuration devices.

Referring still to FIGS. 2 through 6, emissive surface member 54 is, in the illustrated embodiment, a rigid, curved, see-through display device where its shape substantially mirrors the shape of the rear edge 18c of tabletop 18 and its dimensions are less than the dimensions defined by rear edge 18c. Surface member 54 forms an internal display surface 101 on which content (e.g., documents, video of remote attendees, augmented content related to other displayed information or attendees, etc.) may be presented. In at least some embodiments surface member 54 is formed of a glass substrate with substantially transparent electronics so that when content is not presented on surface 101, attendee 69 can see through member 54 to other objects or people there behind. In this regard, see in FIGS. 2, 4 and 5 that a person 71 is shown standing behind surface member 54 and that the portion of person 71 shown in double diagonal cross hatch is observable through surface member 54 in locations where other content is not presented on surface 101.

Figure 5:
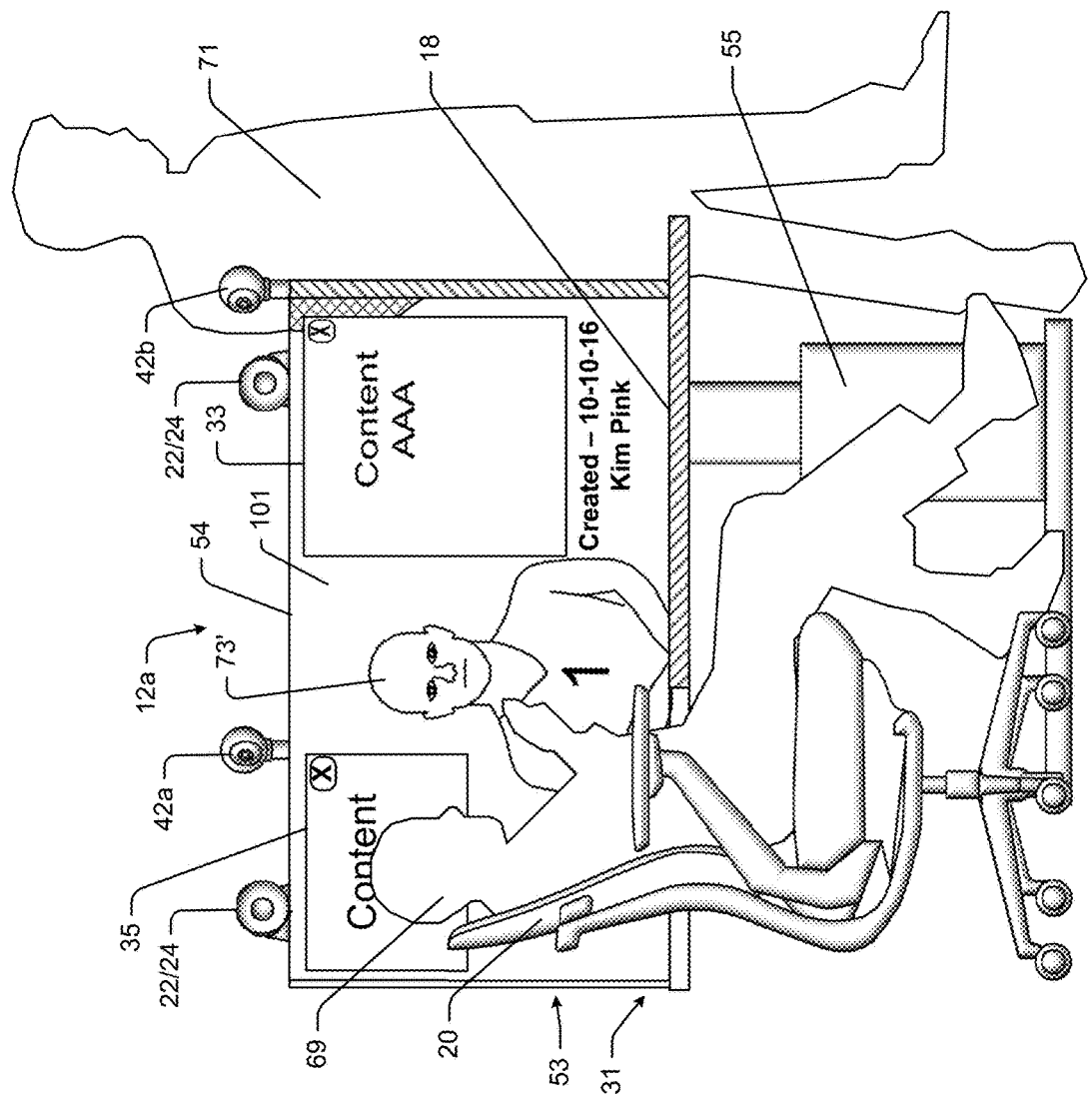
FIG. 5 is a partial side plan view of the station in FIG. 2.

Referring specifically to FIGS. 2, 4 and 5, surface member 54 is mounted to or adjacent the top surface 59 of tabletop 18 and is recessed inward from the rear curved edge 18c of top member 18 so that the circumferential edge section 59' is exposed upwardly and, generally outside a rear surface of the emissive surface structure 54. The clear portion of surface member 54 extends substantially all the way down to top surface 59 and therefore circumferential edge section 59' can be seen through surface member 54 from a typical attendee location adjacent front edge 18a at station 12a when not occluded by content on surface member 54.

Referring again to FIGS. 2 through 6, workstation 12a includes three wide angle cameras 42a, 42b and 42c that are mounted at different locations along a top edge of emissive surface member 54 including one camera 42b generally centrally mounted along a top edge of surface member 54 and second and third cameras 42a and 42c mounted proximate left and right ends of the top edge of surface member 54. Each camera is aligned along an imaging trajectory that passes through a location at which an attendee 69 is typically located when using station 12a so that all of the cameras can obtain simultaneous video of the attendee during a meeting. While three cameras 42a, 42b and 42c are shown, in other embodiments it is contemplated that station 12a may include more or even less camera devices, depending on data requirements to generate all views of an attendee at station 12a for a particular system 10. Other exemplary camera arrangements and configurations are described hereafter.

Workstation 12a is shown to include four microphone/speaker devices 22/24 mounted along the upper edge of surface member 54 in a generally equi-spaced arrangement with two device 22/24 near the first and second ends of the upper edge and two other devices 22/24 spaced apart on opposite sides of the central camera 42. Stations with many more or fewer microphone/speaker devices are contemplated and other device arrangements are also contemplated including arrangements where the speakers and microphones are separate devices, where some speakers or microphones are integrated into top surface 18 or into task chair 20, etc.

Light device 26 includes a lamp mounted to a distal end of an adjustment arm structure that is in turn mounted to the upper edge of surface member 54. In at least some cases light device 26 may be controllable by the station attendee or by server 16 to generate optimal light for obtaining video of station attendee 69 for driving an AR representation of attendee 69 at other locations (e.g., at workplace 14q in the present example).

Referring yet again to FIGS. 2 and 6, exemplary surface member 54 forms a single rectangular continuous emissive display surface 101 on which server 16 may present many different information types. For instance, see in the illustrations that substantially life size video representations of the first, second, and ninth remote attendees 73, 75 and 87 in FIG. 8 are shown at 73', 75' and 87', respectively. Here, the attendee representations 73', 75' and 77' are an example of mixed reality where the representations are integrated into the RW view that the attendee has through surface member 54 so that the attendees are presented about the circumferential edge portion 59' of surface 59 and appear to be present at station 12a.

In addition, smaller video representations of the fourth through seventh attendees 79, 81, 83 and 85 in FIG. 8 are shown at 79', 81', 83' and 85', respectively. Here, because representations 79', 81', 83' and 85' are shown smaller and at locations that are not integrated with the surrounding RW seen through surface member 54, those representations are examples of AR as opposed to MR. In at least some embodiments, it is contemplated that each of the video representations may be a real time live feed showing the attendees during a meeting. In other cases the smaller representations (e.g., 79'. 81', etc.) may simply be images or still shots that are periodically updated (e.g., every 10 seconds).

Referring still to FIGS. 2 and 6, other supplemental visual element types presented include content AAA in window 33, content BBB in window 35 and content CCC in window 37. Here, the content windows 33, 35 and 37 are exemplary and may include any type of digital content including images, documents, application software output (e.g., an active video output showing a video clip), etc. In some cases the content in windows 33, 35, 37 may be completely disassociated with other information presented on surface 101. Thus, for instance, an attendee may post a document in window 33 for consideration by other attendees where the document simply stands alone from other shared or presented content.

In other cases, supplemental visual element may be linked to or associated with any other content or information presented on surface 101. To this end, for instance, when document Content AAA is posted in window 33, server 16 may access supplemental information associated with that document in database 21 and may add a document creation date and author information 105 to surface 101 in a location spatially associated with the document in window 33 to augment that document with other interesting information. As another example, names and titles of attendees (see 107 in FIGS. 2 and 6) shown in video representations on surface 101 may be added to surface 101 in locations spatially associated with the video representations.

In still other cases, where server 16 tracks locations of all employees or people in a workspace facility, where a person walks behind surface member 54 and can be seen therethrough, server 16 may obtain and present identifying or other augmented information on surface 101 at a location that is spatially associated with the person seen through surface 101 as, for instance, shown at 109. In this case, as the person 71 moves about behind member 54, the identifying name information may move therewith to continue to be spatially associated. Many other augmented and mixed information types are contemplated in this disclosure and several others are described hereafter.

Hereinafter, unless indicated otherwise, the phrase "main visual element" will be used to refer to any visual item, be it real, virtual or augmented, in an attendee's view, other than supplemental visual elements where the phrase "supplemental visual element" will be used to refer to any information that is automatically presented by server 16 to supplement a main visual element. Thus, for instance, in FIG. 6, attendee representation 75' is a main visual element as the representation is not provided to supplement any other element while the title and name information 107 is a supplemental visual element added to supplement the main visual element 75'. Similarly, content at 33 is a main visual element while the date and author information at 105 is a supplemental visual element that supplements main visual element 33.

In cases where supplemental visual elements are automatically added to surface 101, in some embodiments that information may persist on surface 101 while an associated main visual element persists. In other cases the supplemental visual elements may only be presented for a short duration after an associated main visual element is first presented on surface 101 and then may automatically disappear (e.g., fade away after being presented for 7 seconds). In still other cases, whenever a main visual element is changed, moved, etc., the supplemental visual element(s) associated therewith may be presented for a short duration and then fade away.

In still other cases where server 16 is programmed to track attendee sight trajectory (ST) at workstation 12*a*, supplemental visual elements may be presented any time ab attendee at station 12*a* looks in the direction of associated main visual elements and may only persist for a short period of time. Thus, for instance, in FIG. 6, supplemental visual element 105 may be presented below window 33 the first time window 33 is opened up and then may fade away after 7 seconds. Then, at a later time, when server 16 determines that the attendee's ST subtends window 33, supplemental visual element 105 may again be presented for a 7 second duration prior to fading away. Here, the idea of supplementing main visual elements with supplemental visual elements when an attendee looks at a main visual element is a sort of visual hover-over feature where additional or supplemental information is presented when the attendee's ST subtends a main visual element.

In still other cases it is contemplated that supplemental visual elements may not be provided within a central portion of surface 101 (e.g., the middle one third) but may be presented for main visual elements on the peripheral section of surface 101 (e.g., the outer one third of surface 101 on either side). Here, the idea is that most attendees at a station 12*a* will align to face the central portion of surface 101 most of the time and therefore will naturally move most important main visual elements into the central area of surface 101 with less important main visual elements moved to the peripheral areas. Here, in many cases an attendee will not want supplemental or superfluous information in their main field of view but may still want supplemental information provided when they look at other less important main visual elements in their peripheral views.

In certain cases, supplemental visual elements may include augmented personal data, such as an attendee's calendar, an attendee's email inbox, an attendee's work chat software, and the like.

In certain cases, the supplemental visual elements can provide augmentation that is culturally relevant. For example, if two cultures have significantly different norms in terms of interpersonal conduct, and two meeting attendees are part of those two different cultures, the supplemental visual element can inform each attendee of important cultural information. In one exemplary aspect, if it is polite to bow when introducing oneself in a first culture, and the server 16 is monitoring the behavior of an attendee of a second culture and providing augmented information about a first attendee of the first culture, then server 16 can indicate to the second attendee that bowing might be appropriate during introductions.

In certain cases, the supplemental visual element can be factual information, such as a different attendee's birthdate, a different attendee's family information, and the like.

In an aspect, the ways in which a remote attendee 56 is displayed in an AR representation can be variable based on sensed data. In one case, server 16 can sense when a given attendee has begun talking or when a given attendee is talking. In these cases, server 16 can provide additional augmentation to the AR representation of the given attendee. For example, an AR representation of a speaking attendee can be further augmented to be increased in size relative to other AR representations of non-speaking attendees. As another example, an AR representation of an attendee that has just begun to speak can flash for a short period of time (such as 3 seconds, 10 seconds, or the like) to draw the attention of attendees to the newly-speaking attendee.

If the server 16 senses, using the sensors, that an attendee is in a given state, then the server 16 can increase or decrease the amount of supplemental visual elements or types of elements provided to the attendee, or the server 16 can be configured to keep the supplemental visual element substantially the same when the supplemental visual element would otherwise be expected to change. For example, the server 16 can determine when an attendee is in a highly-productive flow state by monitoring various vital signs of the attendee. When the attendee is determined to be in a flow state, the server 16 may stop presenting supplemental visual element altogether. Alternately, when the attendee is determined to be in a flow state, the server 16 may increase the amount and frequency of supplemental visual element provided to the attendee.

In another aspect, the ways in which a remote attendee 56 is displayed in an AR representation can be variable based on programmed data, such as scheduled data, stored data, or the like. In one case, the server 16 can further augment an AR representation of a given attendee based on the digital calendar or digital schedule of the given attendee. For example, if a group of attendees has a meeting at 11:00 AM, then the AR system can highlight that group of attendees at 10:55 AM with some indication that other attendees can identify as relating to an attendee having to leave in 5 minutes (e.g., a tooltip associated with the given attendee saying "Has to leave in 5 minutes.").

In yet another aspect, when server 16 is being used in a context where content is shared, server 16 can highlight various attendees and/or content in ways that enhance the content sharing. In some cases, the content itself can be augmented by the server 16. The content to be modified can be RW content or digital content. For example, if a piece of content is modified as part of a collaborative meeting, that piece of content can be highlighted and identified in some fashion as changed (for example, an asterisk near a piece of content can indicate that the content has changed from the previous time an attendee viewed the content). If RW content is modified, but the location of the RW content is outside a field of view of a remote attendee, server 16 can provide a notification to an attendee suggesting that the attendee change their field of view in order to be able to view the RW content. As an example, server 16 can provide the remote attendee with a button that, when clicked (or otherwise selected using an attendee input), automatically adjusts a remote attendee's view to a view where the RW content is viewable. The button can have a statement indicating that the automatic adjustment will occur (for example, "Click Here to Automatically Adjust View to Newly-Modified Local Content.").

In another case, an attendee associated with the content can be augmented by the server 16. For example, in cases where content is being shared under some content sharing protocol (for example, only one attendee at a time can change the content), the server 16 may highlight an attendee having a given status under the content sharing protocol. If an attendee is able to modify the content, then the attendee can be highlighted.

In certain contexts, where server 16 automatically places remote attendee representations, the placement of the AR representations can be automatically adjusted based on some sensed or preprogrammed data. As described elsewhere, server 16 can present a plurality of remote attendees at various positions around a RW or AW worksurface. In some cases, the positioning can be adjusted based on sensed data (for example, sensing who is speaking). For instance, if the worksurface has a shape that affords a given location a particular prominence (e.g., the head of a table), then the server 16 can automatically move whomever it senses to be the primary speaker to the given location. Alternately, the server 16 can merely suggest this change to attendees and require a confirmation in order to execute the change. When the AR representations are rearranged for a given attendee, this does not necessarily impact other attendees. As described elsewhere, server 16 may be programmed to maintain consistent focus of the AR representations of attendees, despite their being moved about an AW space. In this case, if a first attendee accepts the suggestion to move another speaking attendee to the head of the table, but a second attendee does not accept the suggestion, and if all attendees are looking toward the person speaking, then all attendees will be looking toward the head of the table in the AW of the first attendee and all attendees will be looking toward whichever position the speaker is occupying at the table.

The various features of the preceding paragraphs can alternatively be described as a context aware server 16. The context aware AR system can be programmed with sets of rules to allow the server 16 to decide when it is appropriate to adjust various parameters.

In certain cases, the supplemental visual element can be project driven. For example, if the server 16 has been programmed to understand that two attendees work on a given project, the server 16 can be configured to automatically provide access to project-specific content when the two attendees use the server 16 with one another.

In certain cases, the supplemental visual element can be provided with a tooltip that allows the supplemental visual element to be further interrogated ("drill down" content, where more information can be acquired by interaction, for example), modified in some fashion, or the like. In certain cases, the tooltip can inform the attendee that more information can be provided if the supplemental visual element is interacted with by the attendee. For example, when the supplemental visual element is factual information about a remote AR attendee, the supplemental visual element can first be provided in the form of the attendee's name with a tooltip stating "Interact with name for more information." Then, if the local AR attendee interacts with the name (such as by gesturing toward it, clicking on it, touching it on a touchscreen, or any other attendee inputs described herein or known to those having ordinary skill in the art), then the supplemental visual element can provide additional factual information about the attendee, such as any of the factual information described above.

The additional factual information can in some cases occupy the same space as the initial supplemental visual element. The additional factual information can take up a large enough space so as to obscure the remote AR attendee. In this cases, the server 16 can be programmed with a local attendee's preferences for how to handle situations where the remote attendee's image is obscured by supplemental visual element. The local attendee can choose from a variety of settings, such as a "don't notify remote attendee" setting where the remote attendee will not be provided any indication that their image has been obscured from view by supplemental visual element on the local attendee's end, or a "notify remote attendee" setting where the remote attendee will receive some indication that their video feed is no longer viewable by the local attendee.

In some aspects, the supplemental visual element can include an "augmented tag" that is displayed as hovering over or near a remote attendee in the AW. If the local attendee selects the augmented tag, then additional supplemental visual element can be accessed. The supplemental visual element and/or augmented tag can be configured to be color coded to indicate what type of additional information is available (e.g., red for personal information, blue for work-related information, yellow for favorite sports teams, etc.). Some augmented tags can be multiple colors, thus indicating multiple types of information. In addition to color, various other means of identifying the types of information available via tags are contemplated, such as an alphanumeric code system, and the like.

Supplemental visual element can be manipulated by an attendee to occupy a selected location in the AW. Using any of the selection or input aspects described herein, an attendee can select a piece of supplemental visual element and unlock that content by issuing a command (e.g., a verbal command "unlock content"). Once unlocked, the content can be manipulated in a "click and drag" fashion or by highlighting the content and identifying a new preferred location for the content. This manipulation of supplemental visual element is applicable to real-time AR (e.g., a meeting being conducted via AR) or to recorded AR (e.g., review of a previously-recorded collaboration session).

When a virtual table is generated in the AW, around which an AR meeting is held, the virtual table can be configured to fit the number of remote attendees that are present in the AR meeting. For example, with 4 remote attendees and 1 local attendee, the virtual table can be a pentagonal shape, where the worksurface 18 of the attendee workstation 12 makes up one side of the pentagonal shape and the virtual table contains the other four sides of the pentagonal shape. If a remote attendee leaves the meeting, so that there are now 3 remote attendees and 1 local attendee, the virtual table can be automatically adjusted from a pentagonal shape to a rectangular shape to account for the one less attendee. Similarly, if a new remote attendee joins the meeting, so that there are now 5 remote attendees and 1 local attendee, the virtual table can be automatically adjusted from a pentagonal shape to a hexagonal shape to account for the one more attendee. The server 16 can automatically select where the new attendee is to be added or can prompt the local attendee for a selection.

Content provided on traditional analog and digital presentation modes (e.g., whiteboards, projectors, computer screens, etc.) can also be augmented by supplemental visual elements. For example, in a similar fashion to the facial recognition aspects described above, if a picture of a specific person is identified in the RW space, the server 16 can be configured to identify the specific person and provide supplemental visual element based on that specific person's identity.

In some cases, where an attendee's augmented field of view moves along with the attendee (such as in the case of AR glasses), the content can follow the attendee's field of view and remain in the same location relative to the attendee. For example, if an attendee has a small representation of their personal calendar in the upper left corner of their augmented field of view, then the calendar can remain in the location in the upper left corner of the augmented field of view.

In other cases, where an attendee's augmented field of view moves along with the attendee, the content can remain in a fixed location relative to a RW point of reference and remain there when an attendee's moves their augmented field of view. For example, if a flat panel virtual display is placed in supplemental visual element on an attendee's desk, the attendee can anchor the flat panel virtual display to remain on the desk. If the attendee turns around to look at another location within the room, the flat panel virtual display will not be visible to the attendee, but when the attendee returns their focus to the desk, the flat panel virtual display will become visible again. Similarly, the orientation of supplemental visual element can be locked or can move based on the attendee's relative position. Using the example of the flat panel virtual display, if the orientation is locked, then the attendee see's the view of the flat panel virtual display from the relative perspective of where the attendee is standing relative to the original positioning of the flat panel virtual display. If the orientation is unlocked or in a "follow" mode, the flat panel virtual display can always be facing the attendee, regardless of the relative direction that the attendee is looking at the flat panel virtual display.

The degree of supplemental visual elements that are provided can be variable and selected based on attendee preference. In one example, the attendee preferences are granular and relate to an attendee's specific preferences for a given situation. An attendee can undergo a commissioning process as described elsewhere herein or can simply instruct the server based on identifying preferences during usage to provide these granular attendee preferences. The first time an attendee encounters a given circumstance, the server 16 can trigger a prompt to the attendee to identify their preferences. In another example, the attendee preferences are more global and can be delineated into varying degrees of AR augmentation. An attendee may select from "high", "medium", and "low" levels of supplemental visual element, though other breakdowns of degree are contemplated.

Server 16 can be configured to provide an attendee with the ability to restrict the access that other attendees have to their personal information, sensed data or other augmenting information. An attendee can undergo a privacy commissioning process where the attendee identifies their preferred privacy settings. For example, an attendee might be comfortable with server 16 sharing their name, but may wish to keep the names of their family members private. In the context of sensed data, an attendee may be comfortable sharing their sight trajectory data with other attendees, but might want their heart rate data to be kept private. In a similar fashion, server 16 can be configured to provide an attendee with the ability to restrict access that the system or a system administrator might have to their personal information or sensed data.

Figure 7:
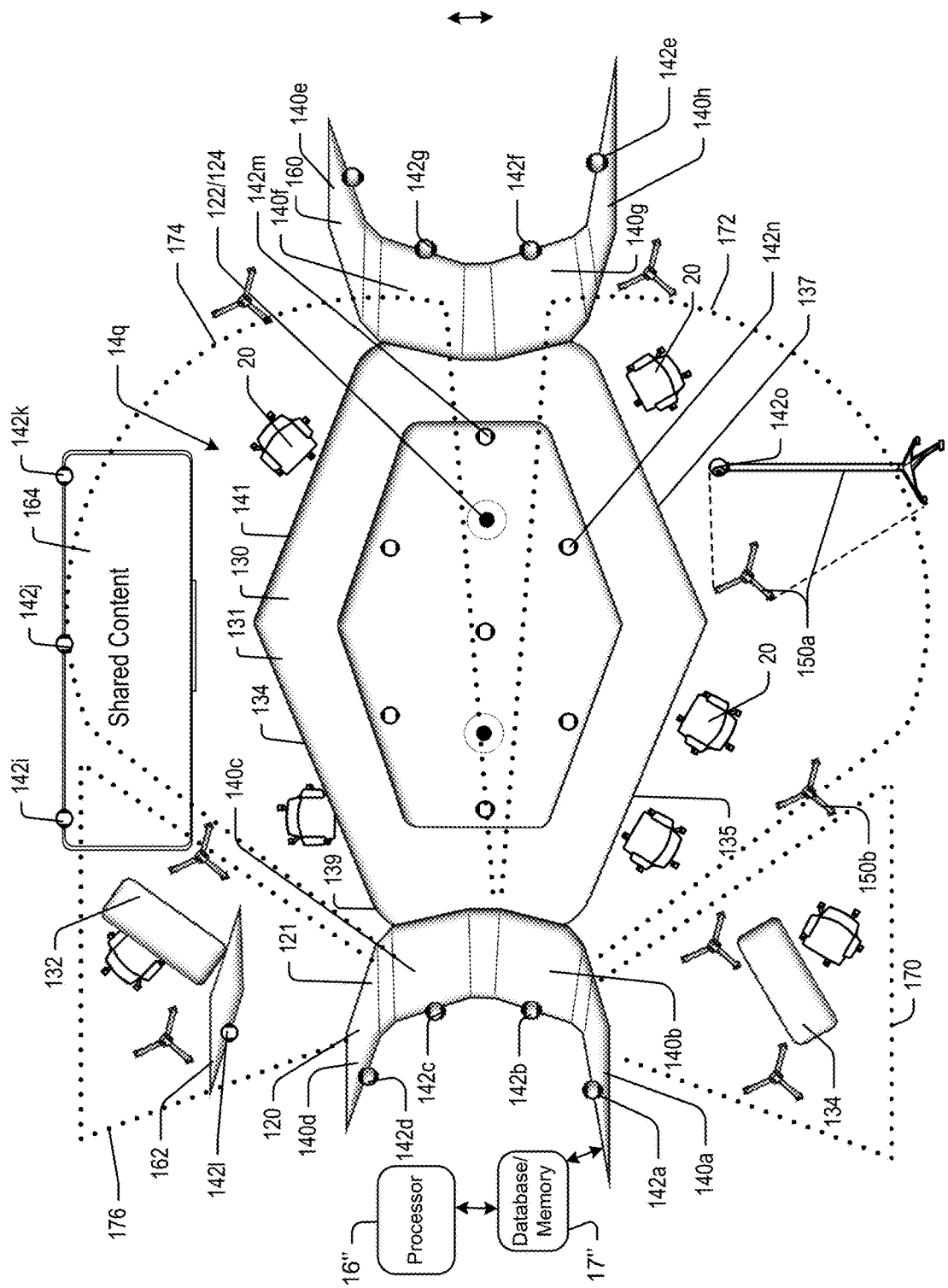
FIG. 7 is a top plan view of an exemplary multi-attendee conference space laid out to support an augmented reality session.

Referring now to FIG. 7, an exemplary multi-attendee workspace 14*q* that is consistent with at least some aspects of the present disclosure is shown and includes a table assembly 130 and chairs 20 to support attendees, two side tables 132 and 134 to support other attendees in the space, a processor 16", a database 17", a plurality of stationary cameras 142*a* through 142*o*, a plurality of microphone/speaker devices or assemblies 122/124, a plurality of camera robot assemblies, only two labelled 150*a* and 150*b*, and a plurality of emissive surfaces (e.g., electronic or other types of displays) 120, 160, 162 and 164. Processor 15" is linked to database 17" and all other electronic or controllable devices and assemblies in space 14*q* including emissive surfaces 120, 122, 124 and 125, the cameras and robots, the microphones and speakers, as well as to input devices like keyboards, mouse controllers or other types of input devices. As in the case of workstation 21*a* described above, space affordances, including the cameras, microphone and emissive surfaces may also be used as input devices for gesture, audio and touch interfacing.

Exemplary table assembly 130 includes a supporting leg structure (not shown) that supports a tabletop surface 131 in a substantially horizontal orientation. Tabletop 131 is defined by a circumferential six sided edge 134 having substantially parallel and relatively short end edges (e.g., the left and right straight edge sections as illustrated) and pairs of other straight edge sections that extend between ends of the short end edges to form a hexagon. A first pair of edge sections includes edge sections 135 and 137 where edge section 135 forms an inside angle with the adjacent short edge section that is within a range between 100 degrees and 160 degrees and in advantageous embodiments that is substantially 110 degrees. Edge section 137 forms a similar angle with the short edge section adjacent thereto and the two edge sections 135 and 137 meet and form an inside angle within a range between 110 degrees and 160 degrees. Edge sections 139 and 141 form similar angles with the adjacent short edge sections and with each other as illustrated.

An emissive surface structure 120 is located and supported at one of the short edges of tabletop 131 and a second emissive surface assembly 160 is supported at the other opposite short edge of tabletop 131. A third emissive surface assembly 164 which is shown in a laid flat view in FIG. 7 is a large flat panel emissive surface which may be mounted to a space defining wall or the like. The fourth emissive surface assembly 162 is a flat emissive surface which may either be stationary or may be mounted to a mobile battery powered robot or the like, for movement to different locations within the workspace 14*q*.

Referring still to FIG. 7, surface assembly 120 and surface assembly 160 are similar in his example and therefore, in the interest of simplifying this explanation, only assembly 120 will be described in any detail unless indicated otherwise.

Here, it should suffice to say that assembly 160 includes four emissive surface sections 140e through 140h that are generally flat and differently angled that are akin to surface sections 140a through 140d described hereafter. While surface assembly 120 includes a single continuous emissive surface 121, surface 121 has several undulations between substantially flat portions and has a generally convex shape that faces the space over tabletop 131. More specifically, the flat sections of surface 121 include first, second third and fourth flat portions 140a through 140d, respectively, where there is a curved section between sections 140a and 140b, a second curved section between sections 140b and 140c and a third curved section between flat sections 140c and 140d. An outside angle between flat sections 140a and 140b is within a range between 220 degrees and 270 degrees in some cases and, in particularly advantageous cases, may be approximately 240 degrees. The angles between adjacent flat sections 140b and 140c and between sections 140c and 140d may be similar.

Referring still to FIG. 7, in a least some cases, flat surface sections 140b and 140c are arranged to be substantially perpendicular to adjacent edge sections of tabletop 131 to be easily viewed from locations along the adjacent edge while being less viewable from the tabletop edge section on the opposite side of the tabletop 131. Thus, for instance, surface 140b is tangent to edge section 135 and therefore easily viewable by an attendee located along edge section 135 or anywhere within the viewing zone labelled 172 but is skewed with respect to edge section 139 and therefore would be less viewable within the viewing zone labeled 174.

Referring again to FIG. 7, flat surface sections 140a and 140d generally face viewing areas 170 and 176 that are adjacent and spaced away from the tabletop edge 134 and therefore are easily viewable from locations within areas 170 and 176, respectively, while being less viewable from other locations within the workspace 14q. thus, by simply arranging flat emissive surfaces 140a through 140d to face different areas of the workspace 14q and more specifically different spaces that are specifically designed to support attendees, the configuration shown and other configurations similar thereto present emissive surfaces that are optimized for viewing by attendees located at different locations in space 14q.

In at least some cases, each of surface sections 140a through 140d may be polarized or otherwise collimated so that images presented thereon are only viewable or only well viewable from within the associated viewing spaces 170, 172, 174 and 176. By occluding views of all but one of surface sections 140a through 140d, this arrangement simplifies the remote attendee viewing process and system which is described in greater detail hereafter.

Referring yet again to FIG. 7, surface assembly 160 is arranged at the second short tabletop edge section opposite arrangement 120 and is aligned in a similar fashion with central flat surface sections tangent to edge sections 137 and 141 and the end flat emissive sections facing side areas that may be occupied by other attendees during a meeting.

Referring still to FIG. 7 and also to FIG. 8, in at least some embodiments it is contemplated that different directional videos of a single remote attendee may be presented on the surface sections of assembly 120 so that, depending on where in space 14q an attendee is located, the attendee has a sense of what or whom the remote attendee is instantaneously looking at. In FIG. 8, a remote attendee workstation 12a is shown centrally located within the assembly 120 arrangement. In reality, station 12a would not be present as shown in FIG. 8, station 12a is simply shown to simplify this explanation. In FIG. 8, the eighth attendee 69 is shown at station 12a where attendee 12a is looking at a representation of the second attendee 75 at station 12a and therefore is shown on surface section 140b to be looking directly at the second attendee 75 in space 14q. Other representations on surface sections 140a, 140c and 140d show other directional videos of attendee 69 where each representation gives a sense that the eighth attendee is looking at the second attendee in space 14q. Thus, the representation on surface 140b which faces the area in which second attendee 75 resides shows a head-on directional video of the eighth attendee while the view on surface section 140c shows a side view of the eighth attendee 69, and so on. Similar directional views of the ninth attendee at station 12b (again not actually present as shown in FIG. 8) would be presented on the surface sections 140e through 140h formed by emissive surface arrangement 160 to show the ninth attendee in various directional views that visually give a sense of what the ninth attendee is looking at wherever it exists in workspace 14q. Operation of server 16 to generate and present correct directional views on surfaces 140a through 140h will be described in detail here after.

Cameras are mounted to the top edges of each emissive surface assembly 120, 160, 162 and 164 for capturing video of attendees in space 14q. As shown, in at least some cases a separate camera may be mounted along the top edge of each of the flat sections of assemblies 120 and 160 to obtain video from the perspective of the adjacent flat emissive section. Three cameras 142i through 142k are mounted to the top edge of assembly 164 at spaced apart locations so that perspectives from many different locations near assembly 164 can be obtained. Cameras are also mounted at various locations above tabletop 131 for capturing video from each of those locations.

An exemplary mobile robot 150a is shown n FIG. 7 and includes a camera 142o mounted at the top end of a pole where wheels are mounted on a base structure at the bottom end of the pole. Here, it is envisioned that a motor and robot processor may be provided within assembly 150a and that server 16 may control placement and operation of the robot 150a and associated camera 142o to obtain video from any location within workspace 14q. Here, the cameras are mounted to the top ends of thin poles so that when presented in space 14q, the cameras and supporting structure only minimally affect lines of attendee sight in the workspace. In this way, cameras may be moved within space 14q to obtain video from any location which is not blocked by another affordance and of any attendee if needed to generate raw surround video of an attendee necessary to produce a required directional video. Here, where there is some optimal position/orientation of a camera with respect to an attendee in space 14q, a robot may be automatically controlled to assume the optimal position/orientation and may obtain the required data accordingly.

Server 16 will be programmed to track locations and orientations of all system cameras in space 14q including the locations of the robot mounted cameras 150a, 150b, etc., so that server 16 can determine how raw video from two or more cameras can be combined to generate needed directional videos.

In addition to being able to track robot locations and orientations in space 14q, server 16 will also be programmed to track locations and orientations of attendees in space 14q. Here, attendee tracking may be via one, all or a subset of system cameras 142a through 142o or via some other system or method. In addition, either server 16 or some other system will be programmed to discern attendee identities either via biometrics, interrogation of attendee RF ID badges, entry of attendeename and password credentials, or in some other manner so that the system can associate each attendee with a surround video data set and supplemental information from database 25 (see again FIG. 1). The attendee ID process will be applicable in both the personal workstation 12*a* (see again FIGS. 2 through 6) as well as in the multi-attendee workspace 14*q*.

Furthermore, in particularly advantageous embodiments, server 16 will be programmed to use images from system cameras at workstations 12*a* as well as at workspaces 14*q* to track attendee sight trajectories (STs) for each attendee participating in a meeting. Cameras and processing software and subsystems for tracking sight trajectories are well known in the art and therefore will not be described here in detail.

While people are capable of turning their eyes to look sideways while their heads remain aligned in a different direction, at most times, people do not persistently look sideways and most often their eyes are aligned with their heads to look along a trajectory that is aligned with their heads. Similarly, while people can and sometimes do tilt their heads forward or backward while still looking along a substantially horizontal trajectory, in most cases, people level their heads at some comfortable orientation when looking along a horizontal trajectory and, if their heads tilt up or down for greater than some short threshold period, their eyes are likely aligned with their heads to look along trajectories that tilt up or down, respectively. For this reason, in some cases where it is difficult to discern ST directly from sensed eye movements or orientations, attendee head alignment may be used as a proxy for ST. Camera video images should be sufficient for server 16 to discern head orientations and hence STs of attendees in space.

In at least some embodiments it is envisioned that each or at least a subset of cameras 142*a* through 142*o* may be 360 degree type cameras capable of obtaining 360 degree video around their current locations so that the amount of data collected by each camera can be increased.

As described briefly above, in at least some embodiments the surround video dataset in column 25 for each attendee may include video conversion data generated during a commissioning procedure which is thereafter useable to convert a relatively small subset of raw video data from system cameras into essentially any directional video required to provide attendee representations to other attendees at other locations (e.g., at workstations, at workspaces, etc.). To this end, it has been recognized that different aspects of attendee appearance have tremendously different communicative values and that attendee appearance aspects can be processed differently based on communicative value to wring the greatest possible communicative value out of sensed data substantially in real time.

When considering attendee representation (e.g., the complete appearance of an attendee presented to another attendee at a station or a workspace) and the communicative value of various attendee representation aspects, attendee appearance aspects can be divided into three different buckets including a non-communicative bucket, a simple communicative bucket and a highly communicative bucket. Here, the non-communicative bucket includes aspects of appearance that have essentially no or extremely limited communicative value such as, for instance, what an attendee is wearing, the style of an attendee's hair, the back of an attendee's head, etc. As another instance, little movements (e.g., a twitch of an arm not intended to convey any meaning) by an attendee such as small arm or leg movements, small head movements, etc., have limited communicative value in most cases.

The simple communicative bucket includes appearance aspects that have communicative value but that are very simple to sense and represent and where more detailed representation adds little if any additional communicative value. For example, attendee posture is simple to sense and also very simple to represent. Simple communicative aspects, while conveying meaning, usually have only a small subset of distinct discernible meanings and therefore can be sensed and represented very simply. In the case of posture, viewing an attendee representation on an emissive surface, it may be that only 8 different general postures are discernable and therefore, if one of the eight possible communicative postures is generally sensed from a small set of video data (e.g., video from the three cameras 42*a* through 42*c* in FIG. 4), that simple information may be used to create an attendee representation with the same posture when viewed from essentially any direction about the attendee without requiring complicated processing. As another example, attendees typically use the same movement mannerisms consistently such as, for instance, various types of hand movements when describing a concept. For any given attendee, it may be that only four communicatively discernible hand motions are used and therefore, if one of the four possible communicative hand motions is sensed from a small video set, that simple information may be used to create an attendee representation with the same hand motions when viewed from essentially any direction about the attendee, again without requiring complicated processing.

The complex appearance related communicative bucket includes appearance aspects that are typically full of meaning and in general, will include facial expressions, eye movements, etc. When compared to simple communicative appearance aspects, the complex communicative bucket includes aspects that have much more nuanced meaning. Thus, for instance, while only eight discernible postures may be sensible in an attendee representation, literally hundreds of different meanings may be discernible in different attendee facial expressions, eye movements, etc.

In at least some embodiments it is contemplated that different amounts of sensing and processing capabilities may be assigned to attendee aspects based on which communicative bucket an aspect is ascribed to. For instance, for non-communicative aspects, at the beginning of a meeting, those aspects may be sensed once and then simply used to generate attendee representations infused with the sensed characteristics so that no sensing and only limited processing power is required after initial sensing. For example, in the case of the color or pattern of an attendee's shirt, that information communicates little meaning but can be represented simply after being sensed once at the beginning of a meeting. In other cases it may be that non-communicative appearance aspects are simply not replicated in attendee representations (e.g., a default shirt color may be used instead of a sensed color, small arm twitches may simply not be replicated, etc.).

Simple communicative aspects may be simply sensed and then represented in any directional video with minimal processing. Again referring to FIG. 4, video images from cameras 42*a* through 42*c* may be used to simply detect one of only eight discernible postures for an attendee and the one of eight postures may be used along with a detailed video conversion data set (e.g., the commissioning data) to generate attendee representations showing that posture from essentially any angle about the attendee's station.

Complex communicative aspects require complex processing in many cases so that data from a small camera subset (e.g., the three cameras 42a through 42c in FIG. 4) can be used to generate complex and communicatively meaningful images. Again, facial expressions may have literally hundreds of discernibly different meanings and therefore detailed facial representations are required in at least some cases to enable completely informed communications.

In at least some cases, it is contemplated that a relatively complex commissioning workstation that is somewhat similar to the stations shown in FIG. 2 may be provided for obtaining commissioning video conversion data. While similar to station 12a, the commissioning workstation will include many additional camera devices for collecting the conversion data for storage in the attendee database 21 (see again FIG. 1).

Figure 9:
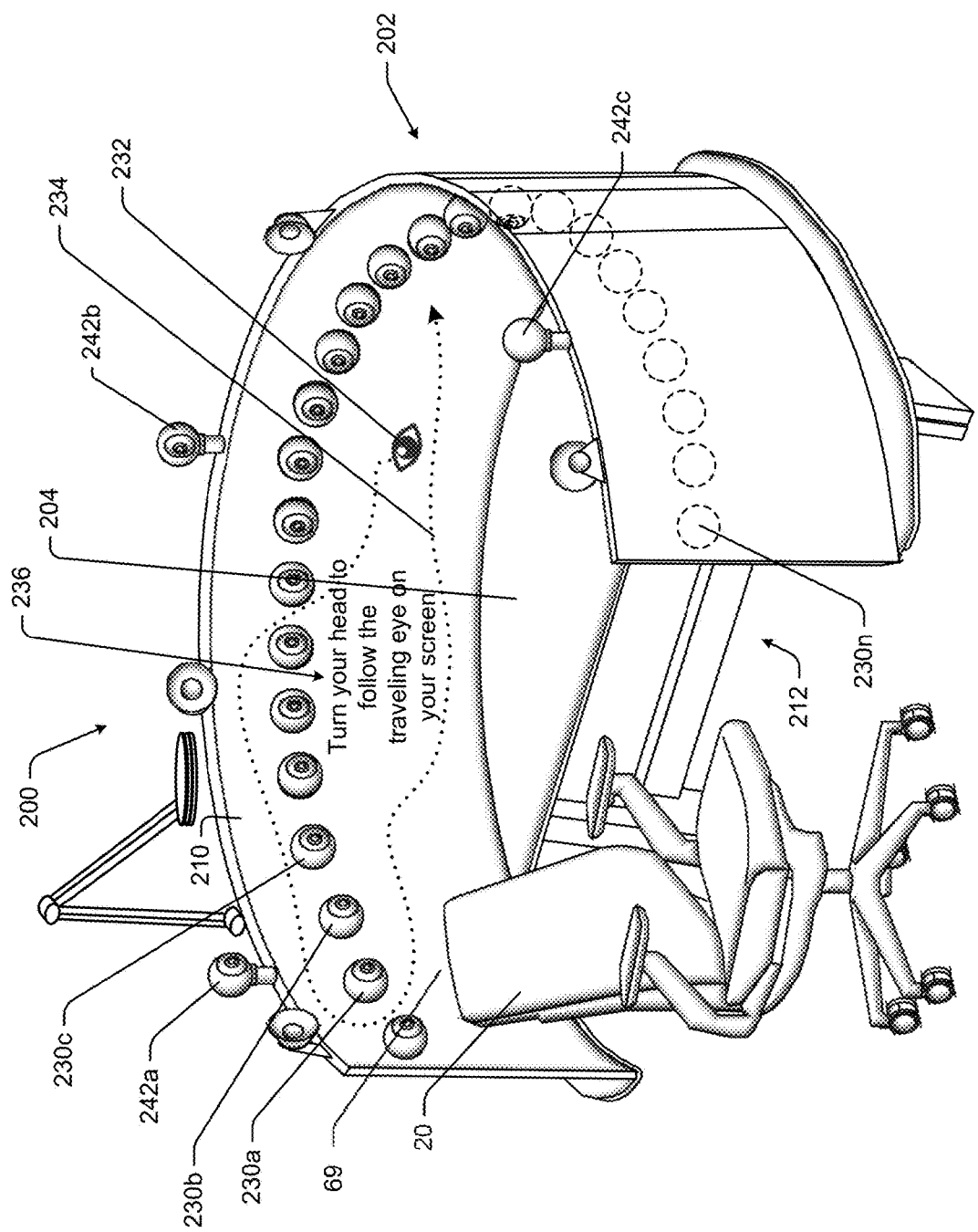
FIG. 9 is a perspective view of a commissioning workstation that is consistent with at least some aspects of the present disclosure.
Figure 10:
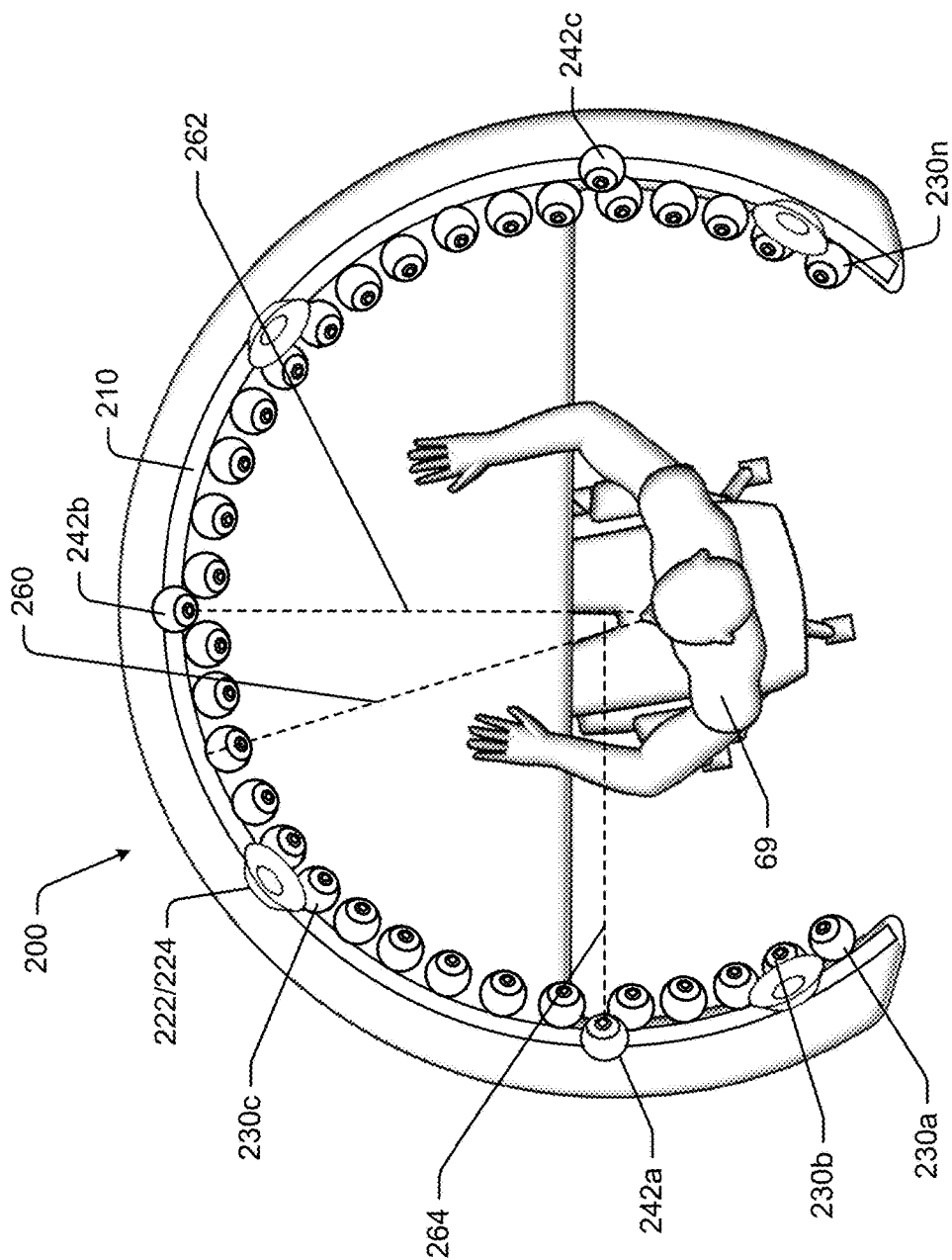
FIG. 10 is a top plan view of the station shown in FIG. 9.

Referring to FIGS. 9 and 10, an exemplary commissioning workstation 200 is illustrated which has a structure similar to the personal workstation 12a's structure shown in FIG. 2. Similar components in stations 12a and 200 will not be described here again in detail in the interest of simplifying this explanation. In general, workstation 200 includes a table assembly 202 and a task chair 20 where the table assembly includes a tabletop member 204 and a see-through emissive surface member 210 that surrounds a station alcove 212. Server 16 (see again FIG. 1) is linked to and can drive surface 210 to present information thereon. Cameras 242a, 242b and 242c that are similar to and are similarly oriented to the cameras 42a, 42b and 42c described above with respect to station 12a are integrated into station 200. Thus, cameras 242a through 242c can obtain images of an attendee at station 200 from vantage points or perspectives that mirror the perspectives of cameras 42a through 42c at a standard workstation 12a.

In addition to including the three cameras 242a through 242c, station 200 also includes a large number of additional commissioning cameras, four of which are labelled 230a, 230b, 230c and 230n, arranged generally at attendee eye height at station 200. As shown, commissioning cameras 230a through 230n form a ring about the attendee alcove with each camera arranged so that its field of view is centered on a location to be used by an attendee during a commissioning session.

Referring still to FIGS. 9 and 10, during a commissioning procedure, server 16 controls content on emissive surface member 210 to instruct an attendee to perform various activities. In some cases the commissioning activities will be limited to simple movements in the station 200 such as, for example, sitting upright, slouching, moving arms while explaining a concept, turning of the attendee's head left or right, etc. In other cases, server 16 will provide some graphic on the emissive surface and instruct the attendee to continue to turn her head to view the graphic as the graphic is moved through a sequence of known movements while both the commissioning cameras 230a through 230n and the standard station cameras 242a through 242c obtain video of the attendee. To this end, see the exemplary graphic 232, predetermined graphic path 234 and related instructions 236 in FIG. 9.

In other cases, in addition to instructing an attendee to step through physical movements at station 200, the commissioning system may also instruct the attendee to generate some voice signals by reading one or more specific text paragraphs while cameras 230a through 230n obtain video so that the system can train to how the attendee's facial expressions change during speech. In addition, the commissioning instructions may request that the attendee make certain types of facial expressions like a happy expression, a surprised expression, a focused expression, an expression of discussed, etc., while video is captured by cameras 230a through 230n and cameras 242a through 242c.

In at least some cases, server 16 will be able to relatively quickly obtain video data that can be used to discern and replicate simple communicative aspects of the attendee's appearance. The process of collecting and processing data required to discern and replicate complex communicative aspects of appearance requires substantially more data collection and processing and, in at least some cases, may require additional camera systems to obtain more detailed facial features and machinations. For instance, a Kinect camera system by Microsoft or some other similar 3D mapping hand-held or other camera set may be used to collect detailed information about an attendee's facial structure, expressions, movements, etc.

Once raw commissioning data and raw video data from cameras 242a through 242c is captured, the raw commissioning data from cameras 230a through 230n is treated as a "true" data set indicating what the attendee looks like from every angle about station 200 when the attendee looks in each direction at the station as instructed by the server 16 and, perhaps, while the attendee is in different postures. Here, in some cases, once simple communicative aspects of appearance have been captured and stored, it may be that server 16 does no further processing of data related to those aspects. In addition to reducing commissioning processing requirements, by limiting the simple aspects of appearance in this fashion, a simpler run time system results where representation of those aspects continue to have substantially complete meaning but are simpler to detect, process and replicate.

Referring again to FIG. 10, during the commissioning procedure, at one point attendee 69, following instructions, assumes a suggested posture and turns his head to look along the trajectory indicated by ST line 260. While looking along trajectory line 260, each commissioning camera 230a through 230n obtains video data of the attendee which shows what the attendee looks like generally when turned to look along line 260 and all of that video data is stored for the ST line 260. This process may be replicated with other attendee postures. Thus, the video data obtained for the attendee while facing along line 260 with distinguishable postures as illustrated would include, among many others (e.g., one per camera 230a through 230n), a head on video of the attendee from the camera aligned with line 260, a left-rear side video of the attendee from camera 230a and a right-rear side video of the attendee from camera 230n.

During commissioning, when the attendee looks in other directions at station 200, similar directional videos are obtained from each commissioning camera 230a through 230n for each ST line assumed by the attendee and the videos and trajectory line are stored for subsequent use.

Referring still to FIGS. 9 and 10, standard cameras 242a through 242c obtain attendee video during commissioning as the attendee assumes different positions, postures and sight trajectories, makes facial expressions and/or voices text paragraphs as instructed by server 16. The video and more specifically the appearances of the attendee in the videos from the standard cameras 242a through 242c are correlated with the ST lines (e.g., 260 in FIG. 10) so that an ST line for an attendee can be discerned relatively easily thereafter using only data from the three standard cameras.

Thus, for instance, in FIG. 10, standard cameras 242*b* and 242*a* obtain video of attendee 69 looking along sight line 260, along perspectives indicated by lines 262 and 264, respectively, and the two appearances of attendee 69 (e.g., the appearance of the attendee's head angled in both videos along lines 262 and 264) in the standard camera videos are correlated or associated with sight line 260 in database 21. In other words, the attendee's head appearance in standard videos from cameras 242*a* and 242*b* is used as a sort of signature indicating that the attendee is looking along sight line 260 (e.g., eh appearance signature is correlated with sight line 260). Separate body trajectory signatures may also be generated during commissioning and stored for determining body alignment separate from sight trajectory.

Other sight line and perhaps body alignment signatures are generated for each sight line assumed by the attendee during the commissioning process and those sight line signatures are correlated and stored along with the complete directional data set from all of the commissioning cameras 230*a* through 230*n* for subsequent use during normal system operation.

After commissioning is completed and during normal run time operation, assume that attendee 69 at station 12*a* in FIG. 4 looks along ST 266 which is not directly at any of the cameras 42*a* through 42*c*. Here, video from cameras 42*b* and 42*c* is obtained, the non-communicative and simple communicative aspects of attendee appearance are identified and attendee appearance in the videos is used as a signature to determine an instantaneous attendee ST (e.g., 266 in FIG. 4). In some cases images from all three cameras 42*a* through 42*c* may be used to discern the attendee's instantaneous ST 266. The directional video data set associated with the ST is accessed and, in some cases, at least one of the directional videos is used to generate a representation of the attendee, including non-communicative and simple communicative aspects as well as the complex communicative aspects at a different workstation or workspace.

In some cases, one or more attendee representations of attendee 69 at other stations may be substantially based on the pre-stored directional video information that was generated during the commissioning procedure. For instance, on one hand, in a case where attendee 69 is simply listening to another attendee speak and is sitting with an upright posture and the view of attendee 69 at another attendee's workstation is a side face view, the pre-stored directional video information may be used to show attendee 69 with little additional processing of the videos from cameras 42*a* through 42*c*.

On the other hand, if attendee 69 is currently speaking and waving her hand about to make a point while repeatedly changing facial expressions, more complex processing of real time data combined with pre-stored data may be required. Here, the non-communicative aspects can be sensed once and then used to affect all representations of the attendee 69 in a simple fashion. The simple communicative aspects can also be sensed simply and used to drive the simple communicative portions of the attendee representations based substantially or entirely on the pre-stored directional video information. The complex aspects are sensed in detail and combined with the pre-stored directional dataset to provide detailed representations of those aspects from whatever direction(s) required to present attendee 69 at other stations. Here, for instance, referring again to FIG. 4, assume that a second attendee workstation requires a view of attendee 69 along trajectory 267. In that case, server 16 may combine video from cameras 42*a* and 42*b* with pre-stored directional data corresponding to trajectory 267 when the attendee is looking along trajectory 266 to generate the attendee representation associated with trajectory 267. As another instance, assume that a third attendee workstation requires a view of attendee 69 along trajectory 269. In that case, server 16 may combine video from cameras 42*b* and 42*c* with pre-stored directional data corresponding to trajectory 269 when the attendee is looking along trajectory 266 to generate the attendee representation associated with trajectory 269.

Thus, the video conversion data generated during the commissioning procedure, in at least some embodiments, should be useable to different degrees to breathe life into smaller subsets of real time data collected during normal system operation so that all aspects of attendee communication that are experienced in real world settings can be replicated in an AR environment. In particularly advantageous embodiments each attendee to a meeting should be able to sense what or whom remote attendees are looking at as well as all physical or visual aspects (e.g., posture, facial expressions, etc.) of remote attendees that have any communicative value.

Figure 11:
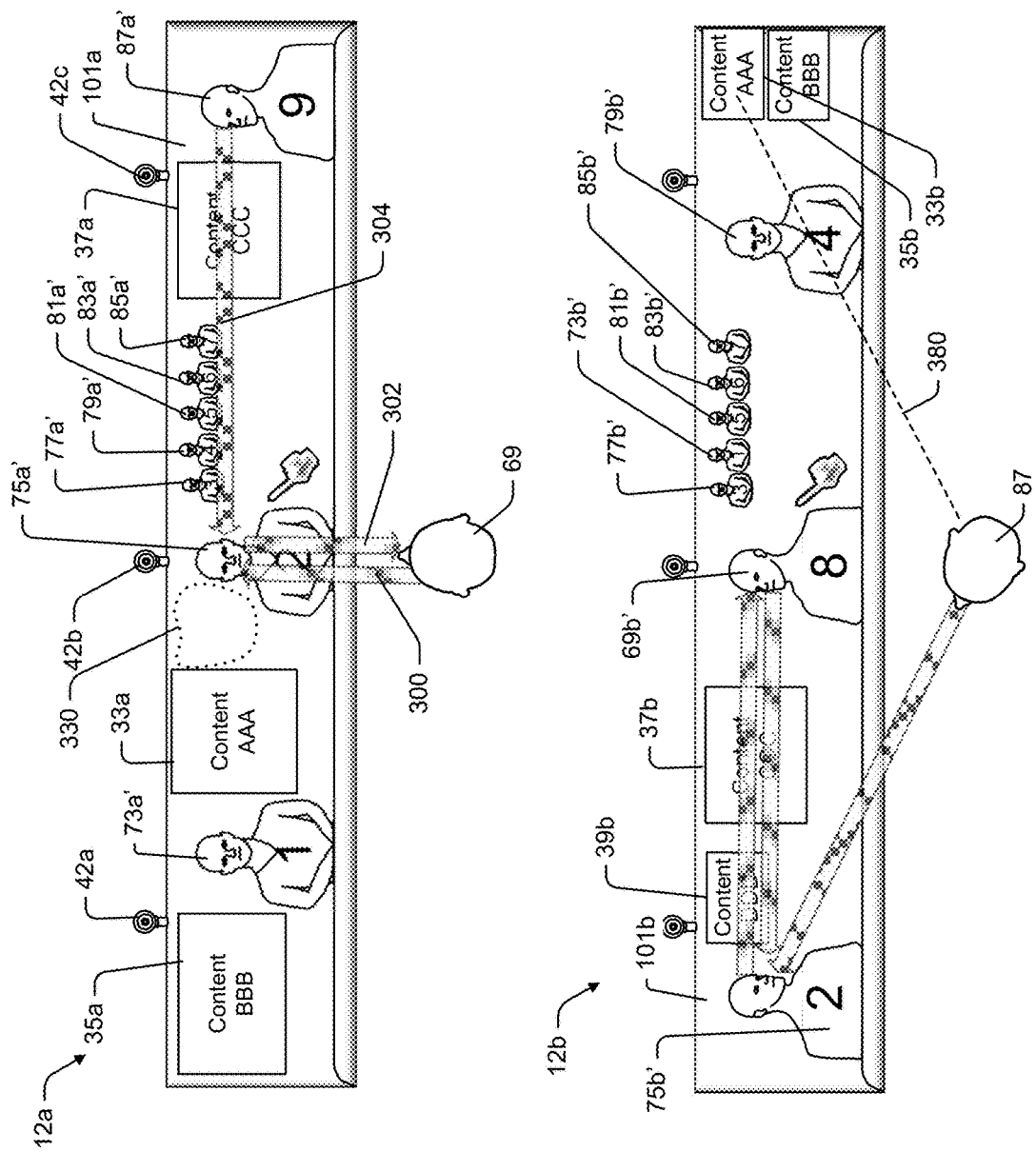
FIG. 11 shows views of two different workstation emissive surface assemblies laid out in an arrangement similar to that in FIG. 6.
Figure 12:
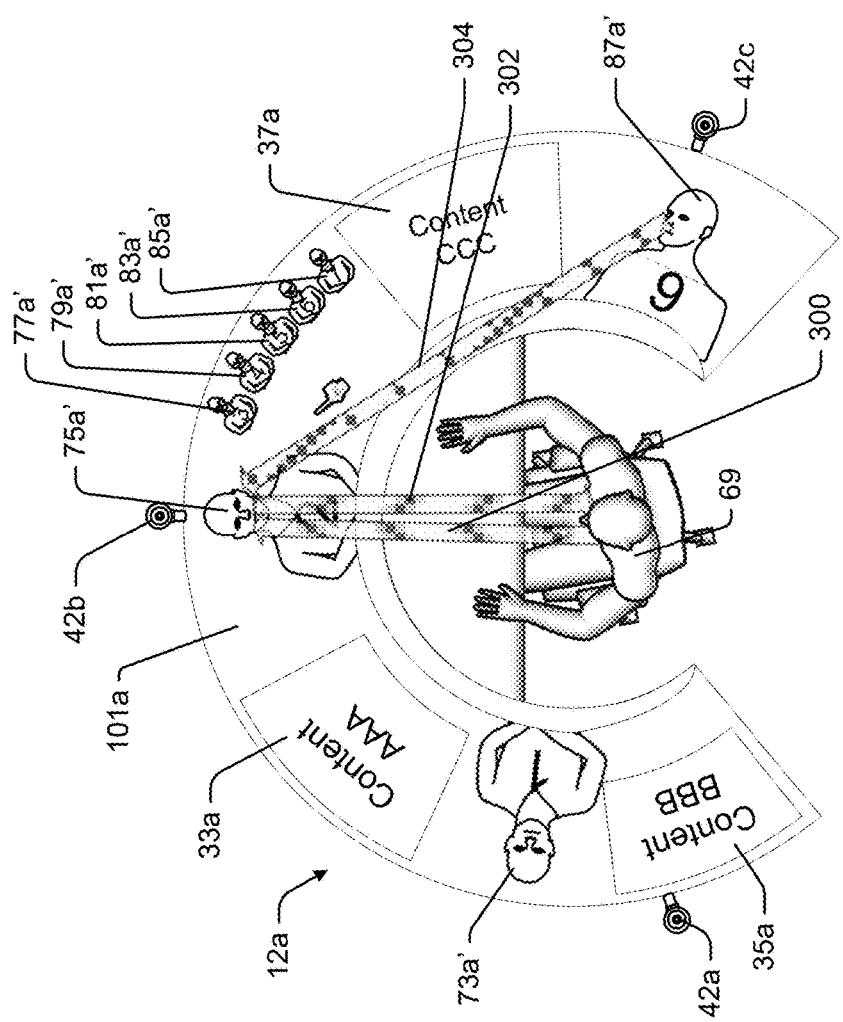
FIG. 12 is another laid out top plan view of the station shown in FIG. 2.

Referring to FIGS. 8 and 11, when eighth attendee 69 and ninth attendee 87 participate in a videoconference meeting, in addition to viewing each other via emissive surfaces at their workstations, in some embodiments the attendees may share content with each other as shown, for example, at 33, 35, 37, in FIGS. 2 and 6. Where content is shared among eighth and ninth attendees and each also has a video representation of the other attendee presented on emissive surface (s), in many cases it will be advantageous for each attendee to have full control of where content is presented on her workstation surfaces. Thus, for instance, in FIG. 6, eighth attendee 69 should be able to move content AAA in window 33 to any location on surface 101 via icon 111 selection and dragging or in any other way known in the computer interface art. Similarly, the attendee 69 should be able to move the first attendee representation 73' to any other location on surface 101.

In FIG. 6, several remote attendee representations and content windows are shown and, in advantageous systems, eighth attendee 69 should be able to move any one of the remote attendee representations 73', 75', 77', etc., or content windows, to any location on surface 101. Similarly, the first attendee represented by 73' should be able to move any content or attendee representation at her station to any location on her emissive surface assembly independent of where other attendees place stations.

Hereinafter, unless indicated otherwise, information representations on an emissive surface that may be separately distinguished for the purpose of identifying an attendee's ST will be referred to as "targets of interest" ("TOIs"). A TOI is separately distinguished if server 16 can distinguish the representation on an emissive surface from other representations on the surface. For instance, the eye of an attendee in a small scale attendee representation on an emissive surface may not be separately distinguishable from the overall attendee representation but the attendee representation in most cases would be independently distinguishable from other information representations on the surface and therefore the attendee representation as a whole would be a TOI while the eye would not. Unless indicated otherwise, in this disclosure it will be assumed that each attendee representation on an emissive surface is recognizable as a separate TOI and that content windows each is recognizable as a separate TOI. Thus, in FIG. 6, each of windows 33, 35 and 37 as well as each of the attendee representations 73', 75', 77', 79', 81', 83' and 85' constitutes a separate TOI.

Referring again to FIGS. 8 and 11, where eighth and ninth attendees 69 and 87 are linked to a meeting and each attendee arranges TOIs on her station emissive surface 101a and 101b to personal preferences, server 16 may be programmed to track TOI locations at each station 12a and 12b and to select views of the attendees 69 and 87 to present to the other attendee that give visual queues as to what or whom each attendee is instantaneously looking at. In FIG. 11, it can be seen that the eighth attendee 69 has arranged TOIs on surface 101a from left to right to include a content BBB window to the far left at 35a, then the first attendee representation 73a', then a content AAA window 33a, then the second attendee representation 75a', then the content CCC window 37a and then the ninth attendee representation 87a'. Similarly, the ninth attendee 87 has arranged TOIs on surface 101b from left to right to include the second attendee representation 75b', the content CCC window 37b, the eighth attendee representation 69b', the fourth attendee representation 79b' the content BBB window 35b and a content AAA window 33b.

In at least some embodiments, in addition to presenting visual queues as to which attendee(s) is speaking and where each attendee is instantaneously looking, server 16 will also control audio to generate directional voice signals designed to be perceived as emanating from the directions about the personal workstations and workspaces along which attendee representations lie. Thus, for instance, when the second attendee in FIG. 11 is speaking, the system speakers may generate the second attendee's voice signals at station 12a so that they are perceived as coming from a central location along the width of surface 101 so that the signals are aligned at least generally with second attendee representation 75a' at station 12a and at station 12a so that the voice signals are perceived as coming from the left side of station 12b as illustrated so that the signals are aligned at least generally with the second attendee representation 75b' at station 12b. Similar voice to attendee representation alignment would be implemented in workspace 14q.

In FIG. 11 and other figures to follow, unless indicated otherwise, arrows will be used to indicate attendee sight trajectories (STs) as well as STs associated with attendee representations on emissive surfaces, Thus, for instance, in FIG. 11, attendee 69's ST is indicated by arrow 300, the second attendee representation 7a' is presented so as to have a perceived ST indicated by arrow 302 and ninth attendee representation 87a' is presented so as to have a perceived ST indicated by arrow 304. While not shown by an arrow, the first attendee representation 73' is also presented to have a perceived ST. In addition, unless indicated otherwise, second attendee STs will be hatched left down to right, eighth attendee STs will be hatched left up to right and ninth attendee STs will be double diagonally as indicated by arrows 300, 302 and 304, respectively, in FIG. 11.

In FIG. 11, each of the eighth and ninth attendees 69 and 87 are shown looking at the second attendee representation at their stations 12a and 12b. In this case, server 16 examines video from cameras 42a through 42c at station 12a and recognizes the eighth attendee's ST and also determines that the second attendee representation 75a' is subtended by the eighth attendee's ST at station 12a. Server 16 determines the location of the eighth attendee's representation 69b' at station 12b and its relative juxtaposition to the second attendee's representation at station 12b so that server 16 can identify a directional video of the eighth attendee to present to the ninth attendee at station 12b. Here, again, because the eighth attendee is currently viewing the second attendee's representation at station 12a, the eighth attendee representation at station 12b should show the eighth attendee looking in the direction of the second attendee's representation at station 12b. Once the proper directional video of the eighth attendee for driving her representation at station 12b is identified, server 16 can generate the directional video and then present the directional video at station 12b so that ninth attendee 87 has a sense of where eighth attendee 69 is instantaneously looking.

Referring still to FIG. 11, serve 16 also examines video from cameras (shown but not labelled) at station 12b and recognizes the ninth attendee's ST and also determines that the second attendee representation 75a' is subtended by the ninth attendee's ST at station 12b. Server 16 determines the location of the ninth attendee's representation 87a' at station 12a and its relative juxtaposition to the second attendee's representation at station 12a so that server 16 can identify a directional video of the ninth attendee to present to the eighth attendee at station 12a. Here, again, because the ninth attendee is currently viewing the second attendee's representation at station 12b, the ninth attendee representation at station 12a should show the ninth attendee looking in the direction of the second attendee representation at station 12a. Once the proper directional video of the ninth attendee for driving her representation at station 12a is identified, server 16 can generate the directional video and then present the directional video at station 12a so that eighth attendee 69 has a sense of where ninth attendee 87 is instantaneously looking.

Referring still to FIG. 11, notice that the second attendee representation 75a' is shown in the station 12a view to be looking direction at eighth attendee 69 (e.g., see arrow 302). The second attendee's representation 75b' at station 12b is also shown looking directly at eighth attendee representation 69b'. Thus, here, the second attendee is shown differently to each of the eighth and ninth attendees depending on where her representation is at each station and where her TOI is located relative to her representation at each station so that each of the eighth and ninth attendees have the same overall sense of what or whom the second attendee is looking.

Figure 13:
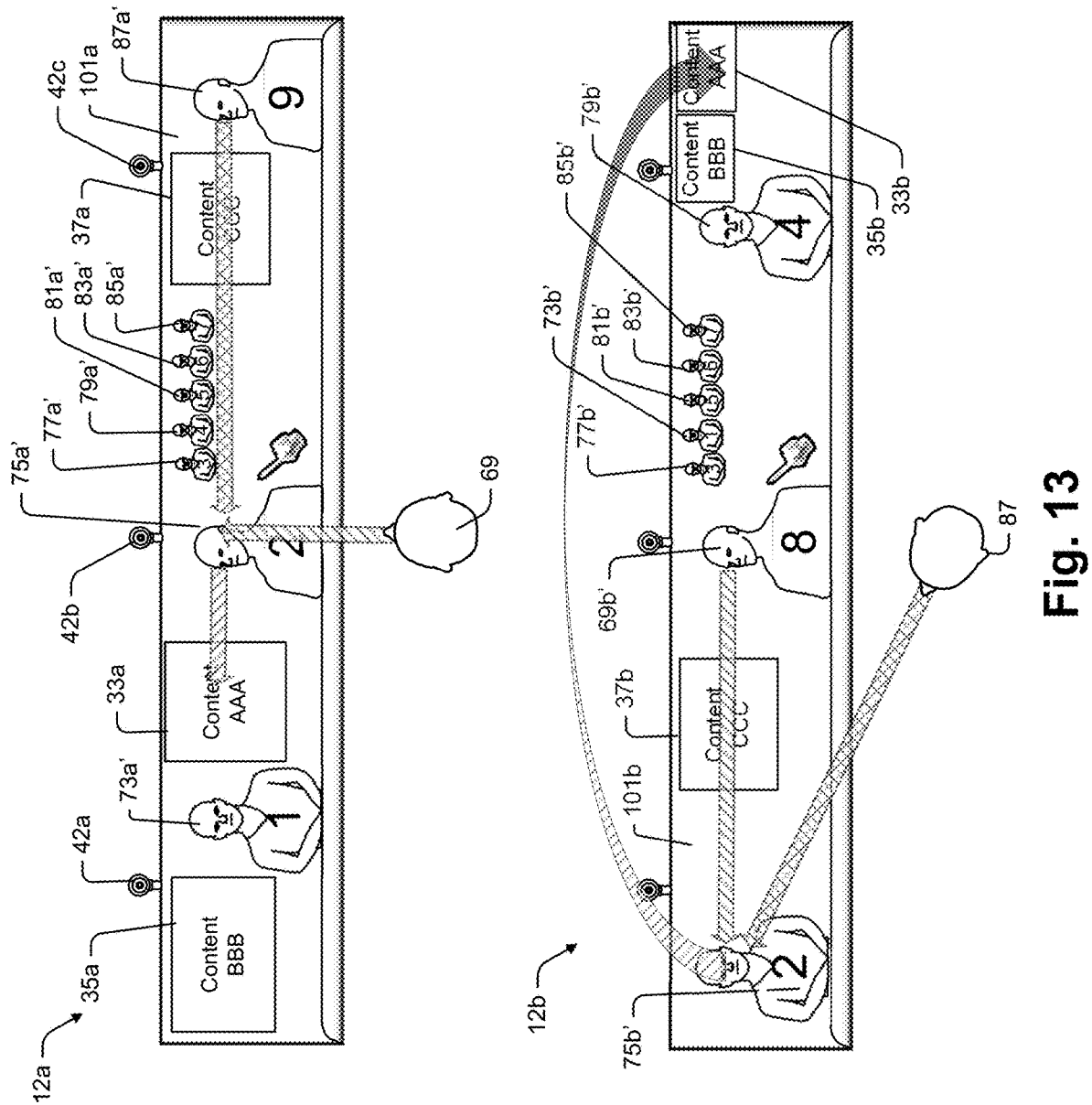
FIG. 13 is similar to FIG. 11, albeit showing a different session state during an on-going session.

Referring now to FIG. 13, views of the emissive surfaces at stations 12a and 12b that are similar to the views in FIG. 11 are shown where the only difference is that the representations of the second attendee have been changed to give visual queues to each of the eighth and ninth attendees that the second attendee is now looking at the content AAA window (e.g., at 33a and 33b at stations 12a and 12b, respectively). In the bottom half of FIG. 13 attendee representation 75b' is looking directly ahead as content AAA is generally directly across from representation 75b' as station 12b is a surround station (see again the surround station 12a in FIG. 2). Thus, in the top half of FIG. 13 that shows surface 101a, second attendee representation 75a' shows the second attendee looking to the left at content AAA window 33a while surface 101b includes second attendee representation 75b' looking across the station toward content AAA window 33b. Thus, when server 16 detects any ST change of any attendee at any station or space linked to a meeting, the ST change is reflected in updated directional videos for that attendee at all other stations and in all other spaces.

Where directional video changes are made, in at least some embodiments, any change will be presented as a morphing from one video view to the other with intermediate images between the two views presented so that the change is not abrupt which could be distracting to attendees. In some case, it is contemplated that the morphing may be delayed somewhat to build at least some level of hysteresis into the system to eliminate the possibility of rapid or continual morphing occurring. Thus, for instance, in some cases where an attendee switches her view from a first TOI to a second, while server 16 may start the process of identifying the new directional video and then generating a morphing representation, presentation of that morphing representation may be delayed for 3-4 seconds so that if the attendee looks back to the first TOI, the directional video change can be skipped.

Figure 14:
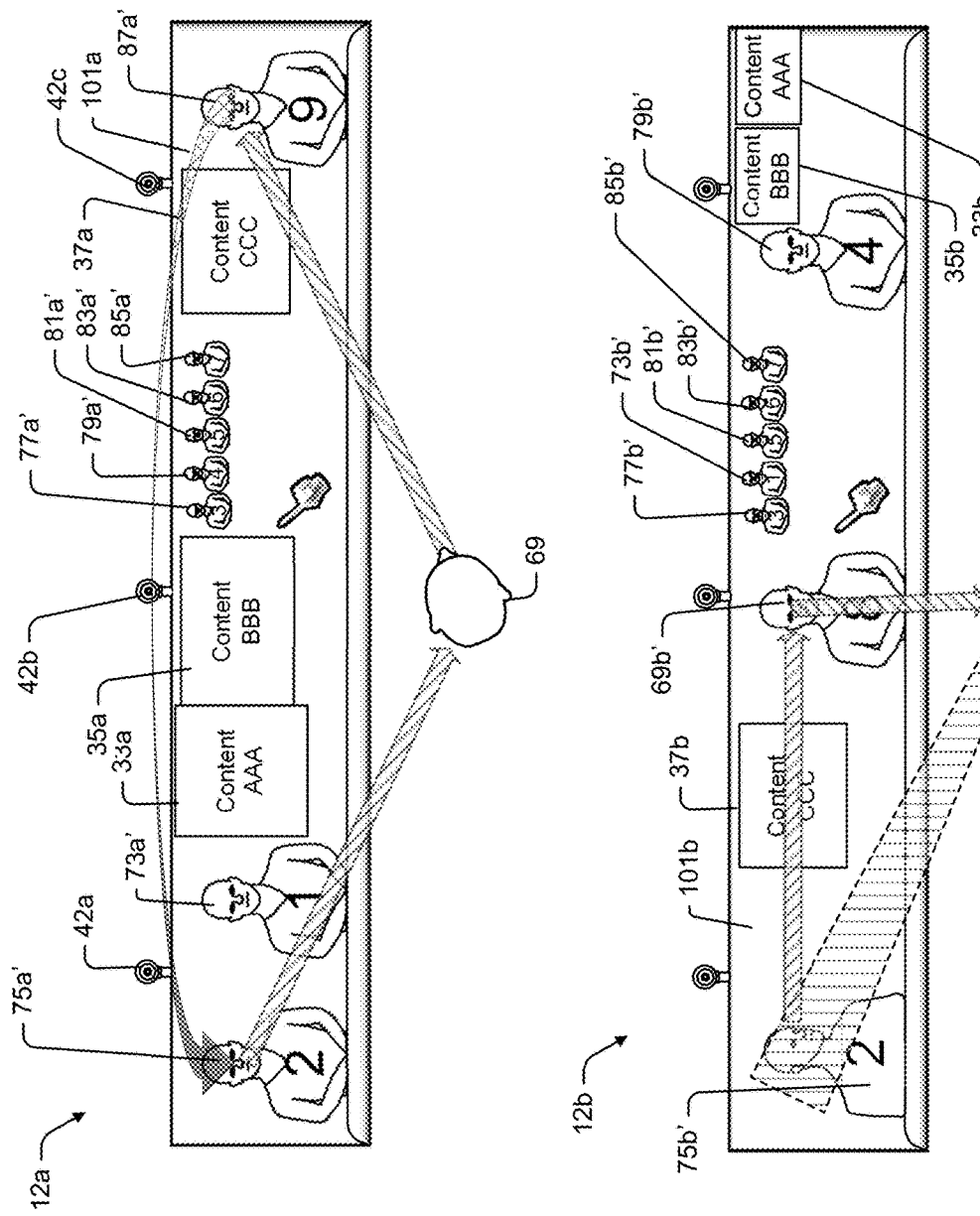
FIG. 14 is similar to FIG. 13, albeit showing a different session state during an on-going session.

Referring now to FIG. 14, views of the emissive surfaces at stations 12a and 12b that are similar to the views in FIG. 11 are shown, albeit with two differences. First, eighth attendee 69 changes her ST to look at the representation 87a' of attendee 87 at station 12a. In this case, server 16 identifies the eighth attendee's new ST, that the eighth attendee's new ST subtends the ninth attendee's representation at 87a' and therefore the eight attendee's representation at 69b' at station 12b is morphed or otherwise changed to show the eighth attendee looking at ninth attendee 87.

Second, the eighth attendee has switched the locations of the second attendee's representation 75a' and the content BBB window 35a at station 12a to suit her instantaneous preferences (see the different locations of 75a' and 35a in the top halves of FIGS. 11 and 14). Because ninth attendee 87 continues to look toward second attendee representation 75b' at station 12b, when the second attendee's representation at station 12a is changed, the directional video of the ninth attendee at station 12a is also automatically modified to show that ninth attendee 87 continues to look at second attendee 75. Thus, in FIG. 14, ninth attendee representation 87a' is shown after morphing to be looking across the station 12a to continue to view second attendee representation 75a'.

Referring again to FIGS. 8 and 11, assume that attendee 75 in FIG. 8 gets up and moves to the location of chair 502 on the opposite side of tabletop 130. In the example of FIG. 11 where station attendee 69 determines where remote attendee representations will be presented at her station, real world movement of the second attendee in space 14q should have no effect on where that attendee is represented on station surface 101a. Thus, once the second attendee 75 sits in chair 502 ad pulls up to the edge of tabletop 130, the space cameras should obtain video useable to identify the second attendee's ST, what the second attendee is looking at and then generate directional videos needed to drive representations at the other attendee stations and in other spaces.

Figure 15:
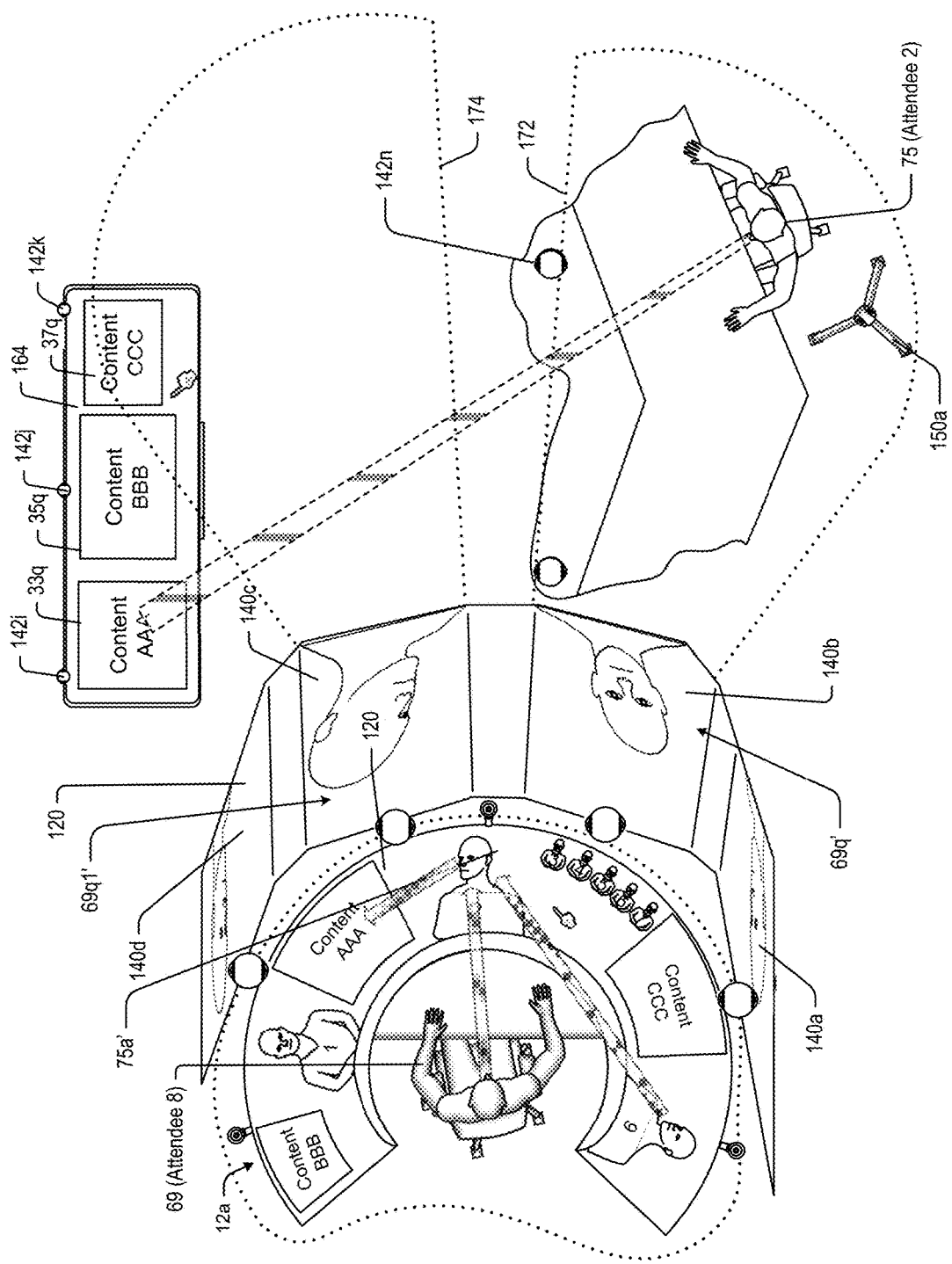
FIG. 15 is a partial top plan view of the system shown in FIG. 8, albeit showing a different session state during an on-going session.

Similar processes for identifying directional views to present to attendees based on STs and TOIs at various stations and in spaces are applicable when a workspace 14q is linked to a meeting. To this end, see FIG. 15 where content windows for content AAA, BBB and CCC are shown on large common emissive surface 164. In FIG. 15, while eighth attendee 69 and station 12a are shown, it should be understood that attendee 69 and station 12a are remote from and not collocated with station 14q and are only shown in FIG. 15 in the interest of simplifying this explanation. In FIG. 15, second attendee 75 is shown with an instantaneous ST that subtends content window 33q. Server 16 determines the second attendee's ST via videos from space 14q, identifies the TOI, if any, subtended by the second attendee's ST, determines the locations of the subtended TOI at other stations (e.g. 12a, 12b) and in other workspaces (e.g., 14r, etc.), identifies required directional videos for each other station and space needed to show the second attendee looking at the content AAA window at those stations and spaces, uses video and other data (e.g., the commissioning video data conversion set for the second attendee) to generate the required directional videos, and drives station and other space surfaces with the second attendee directional video representations.

FIG. 15 goes along with FIG. 13 where the second attendee representations at each of stations 12a and 12b show the second attendee looking at content AAA windows 33a and 33b at each of the stations. The ninth attendee is not shown in FIG. 15. The eighth attendee 69 at station 12a in FIG. 15 is shown looking at the location at station 12a at which the second attendee representation 75a' is presented as in FIG. 13 (e.g., attendee 69 looks centrally at the emissive surface at her station 12a to see the second attendee representation at statin 12a). Consistent with FIG. 13, FIG. 15 shows a representation of eighth attendee 69 at 69q' looking directly at second attendee 75 in space 14q.

Referring again to FIG. 15, emissive surface assembly 120 includes four differently angled substantially flat emissive surface sections 140a through 140d that form a generally convex structure about a central assembly location. In at least some embodiments it is contemplated that four different directional videos of a single attendee 69 may be presented on surfaces 140a through 140d, where each of the directional videos gives a sense, when observed, that the attendee presented is looking in the same direction within space 14q. Thus, for instance, as shown in FIG. 15, while the directional video 69q' on surface 140b which is optimally viewable from within area 172 shows a head-on view of eighth attendee 69 looking directly at second attendee 75 in space 14q, directional video 69q1' on surface 140c which is optimally viewed from within area 174 shows a side-front view of attendee 69 looking in the direction of attendee 75 as a side-front view of attendee 69 would be viewed from area 174 if attendee 69 were actually present at the location of assembly 120.

Other directional videos on surfaces 140a and 140d show other side views of attendee 69 at different angles that make it appear as though attendee 69 at the location of assembly 120 is looking in the direction of second attendee 75 in space 14q. In FIG. 8, third attendee 77 is located in area 170 in which surface section 140a is optimally viewed and therefore the third attendee 77 would view eighth attendee 69 on section 140a. Similarly, seventh attendee 85 is located in area 176 in which surface section 140d is optimally viewed and therefore seventh attendee 85 would view eighth attendee 69 on section 140d.

In FIG. 8, assembly 160 also includes four flat and differently angled surfaces 140e through 140h and different directional videos representing attendee 87 are shown on those surfaces where each directional video shows attendee 87 looking in the direction of a TOI in space 14q that attendee 87 is currently viewing at station 12b. In FIGS. 8 and 13, ninth attendee 87 is looking to the left end of surface 101b at station 12b toward second attendee representation 75' (e.g., second attendee representation 75b' is the ninth attendee's instantaneous TOI) and therefore, each of the different directional videos on surfaces 140e through 140h shows attendee 87 looking toward the real world second attendee 75 in space 14q.

In at least some embodiments it is contemplated that more than one emissive surface assembly in a conference space may present representations of a single attendee where the surface assemblies are independent of each other. Here, in at least some cases, similar to the way the separate surface sections of assembly 120 present different but coordinated directional videos of the presented attendee, each surface assembly may present different yet coordinated directional videos of the presented attendee. To this end, see again FIG.

8 where emissive surface assembly 162 is shown separate and spaced apart from assembly 120 near table 132. In this case, a directional video representation of eighth attendee 69 is presented on the surface of assembly 162 that is keyed or coordinated to the other representations of attendee 69 presented by assembly 120. Consistent with the example described above with respect to FIGS. 8 and 13 where attendee 69's ST is aimed at the second attendee's representation at station 12a, the eighth attendee's representation on surface 162 shows the eighth attendee looking in the direction of second attendee 75 in space 14q.

Referring still to FIG. 8, because the assembly 162 surface is generally aligned with surface section 140d, in at least some embodiments the eighth attendee representation on assembly 162 may be substantially identical to the representation on surface section 140d. In other cases, because assembly 162 is closer to attendee 85, the representation on assembly 162 may be different at least some of the time as the perspective from attendee 85's location of the assembly 162 surface and surface section 140d would be different. Thus, for instance, any time eighth attendee 69 looks directly at a representation of the seventh attendee 85 at station 12a to make eye-to-eye contact, the directional videos on assembly 162 and surface section 140d would be slightly different to give the clear impression to seventh attendee 85 in both representations that eighth attendee 69 is looking directly at seventh attendee 85.

Referring still to FIG. 8, if surface assembly 162 is moveable (e.g., supported on a castered cart or the like) and is moved to a different location such as, for instance, to the location 162a shown in phantom between seventh attendee 85 and assembly 160, in at least some cases, server 16 is programmed to change the representation on the assembly 162 surface to show a suitable directional representation of ninth attendee 87 akin to the representation on surface section 140f. Again, here, because assembly 162a would be closer to attendee 85 that surface section 140f, the directional video on surface assembly 162a may be different to reflect the different perspective.

In many cases attendees at different workstations and in different workspaces will access and present different TOI sets. For instance, see in FIG. 11 that ninth attendee 87 has a fourth content DDD window opened at 39b while attendee 69 has not opened that content at station 12a. Where one attendee has a view of a specific TOI while that TOI is not viewable at some other station or in some other space, at times the one attendee's ST will subtend that does not exist at other stations or in other spaces and therefore there will be no way to present directional video representations of the one attendee looking at the TOI in local spaces. For instance, in FIG. 11, if ninth attendee 87's ST were to subtend content DDD 39b, because eighth attendee 69 does not have content DDD up at station 12a, there would be no way to show ninth attendee 87 in a representation at statin 12a looking in the direction of content DDD.

Where one attendee looks at a TOI at her station that is not represented at another station or in another space, in at least some embodiments server 16 may be programmed to show the one attendee at the other station in a directional video where the apparent ST of the one attendee is toward some default location like, for instance, in a default head-on view. Where a default attendee representation is presented, server 16 may indicate that the representation is a default representation in some way (e.g., highlight or otherwise visually distinguish the representation, provide a legend spatially associated with the attendee representation like, for instance, "ST not accurate" or "Default ST", or in some other fashion.

In other cases the default directional video may be dynamic and based at least in part on where TOIs are presented at the station or in the space where an attendee's representation is presented. Thus, for instance, in FIG. 11 where attendee 69 is centrally located with respect to surface 101a, if, when attendee 87 looks at content DDD, a default representation of attendee 87 were to show attendee 87 looking head-on, eighth attendee 69 would have a sense that ninth attendee 87 is looking directly at attendee 69 which would be false. Here, instead of the default being a head-on representation, once server 16 recognizes that attendee 87 is looking at data window 39b and that no similar content is presented at station 12a, server 16 may identify some dynamic blank space (e.g., 330 in FIG. 11) on surface 101a at which no TOI is currently presented and may select and present a directional video of attendee 87 looking at the blank space at station 12a.

In other cases, server 16 may present some label at the location of the default dynamic blank space 330 such as "Non-common Content" to indicate that the ninth attendee 87 is viewing content that is not common with content currently presented at station 12a. In still other cases it is contemplated that when attendee 87 looks at content DDD at station 12b that is not common to surface 101a at station 12a, if allowed, content DDD may be temporarily presented in the default blank space 330 in a temporary window where attendee representation 87a' is shown at station 12a with an ST directed at the temporary content window at space 330. Other ways of indicating that attendees at other stations and in other spaces are looking at non-common TOIs are contemplated.

Figure 16:
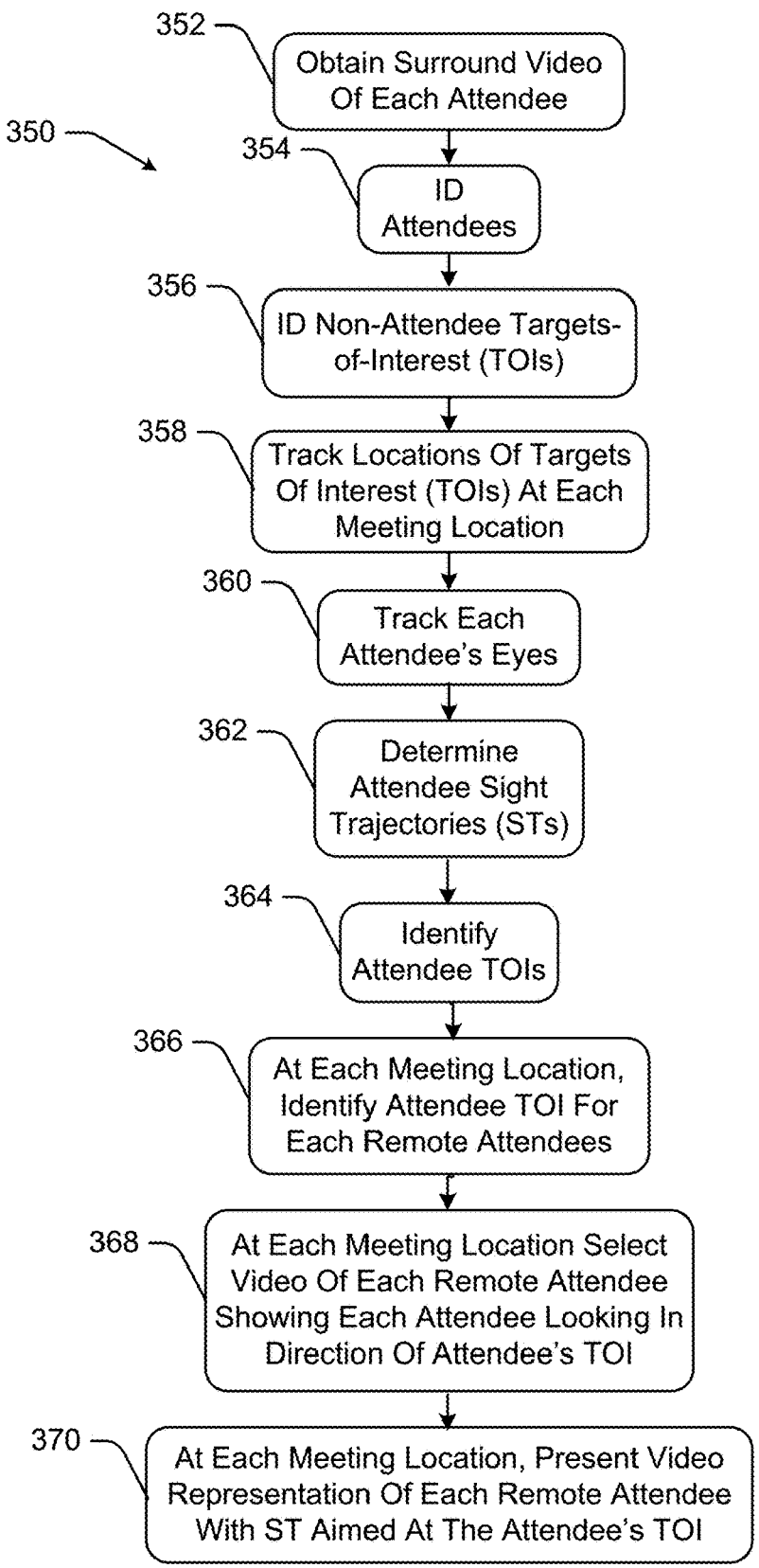
FIG. 16 is a flowchart illustrating a method that is consistent with at least some aspects of the present disclosure for identifying attendee TOIs at their locations and generating directional videos of those attendees at other stations that appear to have sight trajectories aimed at the same TOIs at the other stations.

Referring now to FIG. 16, an exemplary method 350 that may be performed by server 16 and that is consistent with the above description is illustrated. At an initial step 352, server 16 obtains surround video data for each attendee that is linked to or present for a meeting at either a workstation 12a, 12, etc., or at one of the workspaces 14q, 14r, etc. At step 354 server 16 identifies meeting attendees. At step 356, server 16 identifies any non-attendee TOIs at the stations and in the spaces linked to the meeting. At step 358, server 16 tracks the locations of any TOIS at each meeting station or in each meeting space. Consistent with the discussion above, TOIs here will include at least attendee representations, local attendees in each location and content windows presented at each station or in each space.

Referring still to FIG. 16, at step 360, server 16 tracks eye or head movements of each attendee at least location and in each space linked to the station. At step 362, server 16 determines attendee STs at each station and in each workspace. At step 364, server 16 uses attendee STs and TOIs at each station to determine a TOI subtended by each attendee's ST in the station or space occupied by the attendee. Hereinafter, unless indicated otherwise, a TOI at an attendee's station or in the attendee's space that is subtended by the attendee's ST will be referred to as the attendee's TOI.

At step 366, server 16 identifies the location of the attendee's TOI at each of the stations or spaces linked to the meeting other than the attendee's station or space. At step 368, server 16 selects a directional video of each remote attendee for each space or station linked to the meeting that shows the attendee with a sight trajectory aimed at the attendee's TOI. At step 370, server 16 presents the directional videos of attendees at stations or in spaces where each attendee is shown looking in the direction of the attendee's TOI at each of the stations. Depending on where an attendee's TOI is located at a station, the attendee may be looking in essentially any direction at that station.

While a particularly advantageous system is described above, in other embodiments, some TOI placement and hardware compromises are contemplated that should simplify processing requirements as well as, in some cases, increase various aspects of system performance. For instance, in some cases TOI locations at a workstation 12*a* may be limited to a specific number and specific placements which simplify the process of and system required to identify the TOI subtended by an attendee's instantaneous ST. One type of limitation may limit TOIs to a single row along the width of the emissive surface assembly at an attendee's workstation. To this end, see FIG. 17 where all TOIs on surface 101*a* are arranged in a single left to right row. By limiting TOIs to a single row, head tilt may be ignored in at least some cases or embodiments as there would only be one TOI on surface 101*a* that is angularly aligned in a top plan view with the attendee's ST. This should be contrasted with a case where TOIs are stacked one on top of the other as shown at 33*b* and 35*b* in FIG. 11 where, if an attendee looks along ST 380, without considering head tilt, it would be ambiguous which of content AAA 33*b* and content BBB 35*b* the attendee 87 is looking at.

In at least some cases, the single TOI limitation may only be applied to a portion of a station or workspace surface where camera or other eye sensor coverage is limited and in other surface portions where camera coverage can be more precise (e.g., eye tracking, head tilt, etc., can be discerned in detail). For instance, in FIG. 17, a fourth camera 42*p* is provided between cameras 42*b* and 43*c* along the top edge of surface 101*a*. Here, the additional camera is located above a rectangular surface portion 390 and, because of the proximity between camera 42*p* and surface portion 390, camera 42*p* should be able to, either in conjunction with adjacent cameras 42*b* and 42*c* or independently, obtain images useable to detect precise ST and/or head tilt so that vertical placement of a subtended TOI can be identified.

Figure 17:
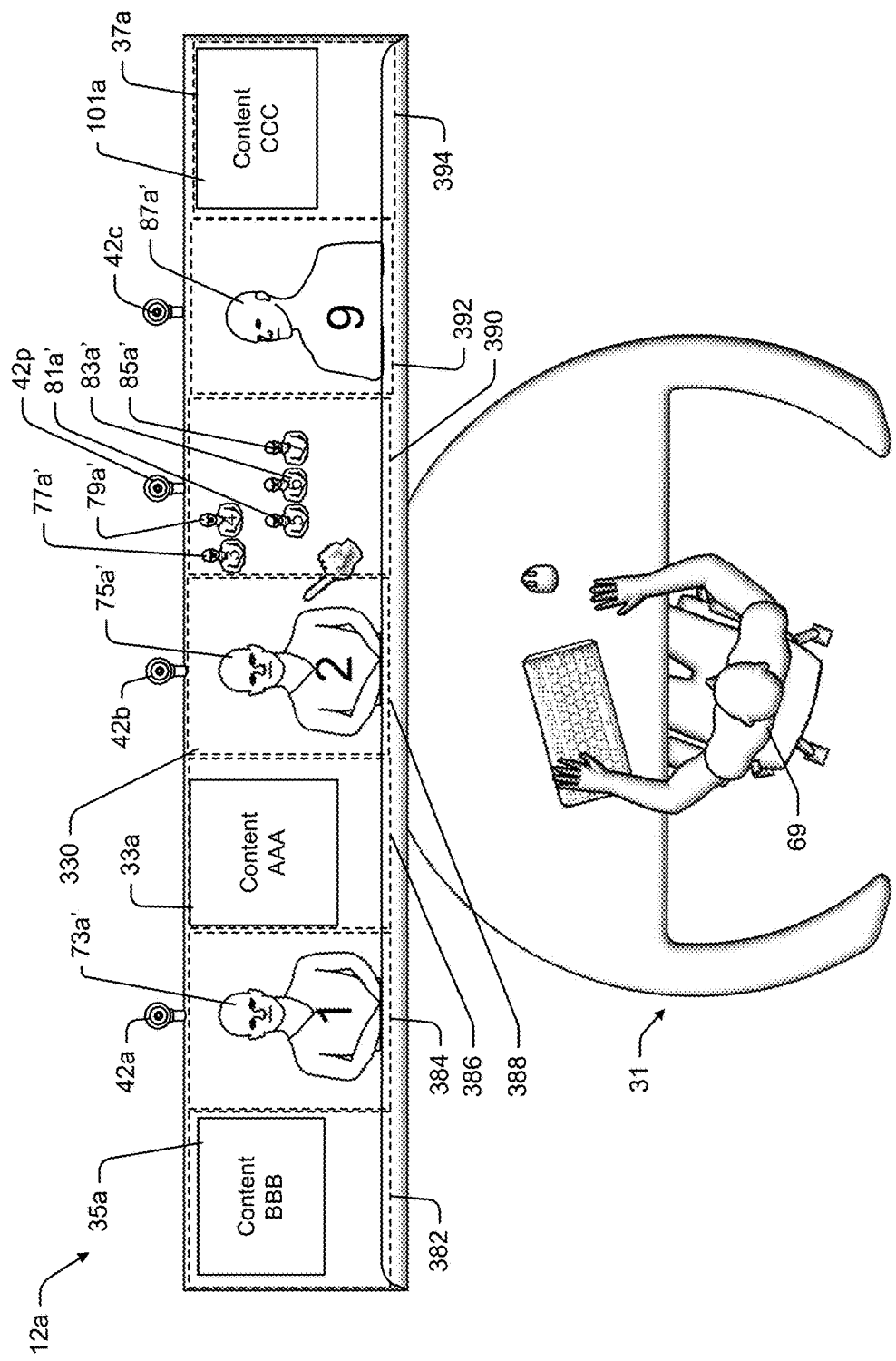
FIG. 17 is a schematic view showing yet another representation of the FIG. 2 workstation in yet another state during a meeting.

In a case where TOIs are limited to a single row, during a meeting, server 16 may simply not allow TOI stacking and may automatically help rearrange TOIs when an attendee uses selection icon 111 to move a TOI to an area already occupied by another TOI or to a location between two adjacent TOIs. Thus, for instance, in FIG. 17, if attendee 69 moves TOI 33*a* to surface areas 392 already occupied by attendee representation 87*a*', representation 87*a*' may be automatically moved left as illustrated in FIG. 17 to accommodate the new placement of TOI 33*a* in space 392. Here, as attendee representations are automatically moved to other surface areas, consistent with the above described systems, server 16 would identify a new directional video for the representation so that the ST queueing for the repositioned attendee representation could be maintained.

Second, TOI sizes may be limited to simplify the ST detection system and process. For instance, the width of a TOI may have to be a minimum of 2 feet. Referring again to FIG. 17, where a minimum TOI width is 2 feet, given any attendee ST at station 12*a*, the server 16 would only have to distinguish between two different TOIs and therefore the process of distinguishing would be substantially simplified. In addition to simplifying the process of identifying a station attendee's ST, by limiting the minimum size of TOIs, the ability to provide remote attendee representations that have STs aligned with specific and discernible TOIs at station 12*a* is also simplified. To this end, see again FIG. 17 where the TOIs on surface 101*a* are relatively large. Here, server 16 may select a directional video for each of the remote attendee representations 73*a*'. 75*a*' and 77*a*' that shows the associated attendee looking directly at the center of the attendee's TOI. Where the TOIs are relatively large, the directional queueing is substantially stronger.

Third, in at least some cases possible TOI locations may be predefined and limited. Again, referring to FIG. 17, emissive surface 101*a* is shown to include seven separate surface portions or areas 382, 384, 386, 388, 390 and 392 that effectively evenly divide surface 101*a* into a row of adjacent rectangles. Here, in at least some cases server 16 may limit TOI placement to one TOI per surface portion and the surface portions may not be changeable. By limiting TOI locations in this way, the options for attendee ST at station 12*a* are limited and therefore distinguishing attendee TOI is simplified.

Fourth, certain TOI types may be limited to certain surface areas that are better aligned with sensor devices or eye/head tracking cameras. In this regard, it has been recognized that there are several advantages to having a camera at least substantially aligned with each attendee representation at a station. For instance, by aligning a camera with an attendee representation, a better and in some cases optimal directional video of the attendee that occupies a station from the perspective of the attendee represented on the emissive surface can be generated. In addition, images from an aligned camera can be used to better identify small differences in the ST of the attendee that occupies the workstation. Consistent with this concept, see again FIG. 17 where attendee representations are shown in surface areas 384, 388 and 390, directly below and generally aligned with station cameras 42*a*, 42*b* and 42*c*, respectively. Here, while other types of TOIs may be positioned in any surface area, attendee representations may be limited to the surface areas aligned under the cameras.

While not shown in detail, similar types of TOI placement and hardware constraints may be applied to workspace 14*q* designs. For instance, referring again to FIG. 8, as described briefly above, while surface assembly 120 may include a continuous emissive surface 121, that surface may be divided into flat sections 140*a* through 140*d* and attendee representations may be limited to the flat sections. The sections may be optimally aligned with other space affordances to, in effect, force attendees in space 14*q* to have one optimal view of each remote attendee where the optimal view presents the remote attendee in a directional video that gives the local attendee a good sense of the remote attendee's ST. In addition to facilitating presentation of an optimal remote attendee directional video, the optimal viewing surface for each local attendee without additional TOIs proximate thereto allows server 16 to determine that a local attendee is looking at the remote attendee on the optimal surface without ambiguity.

Referring to FIG. 15, on large emissive surfaces like the surface provided by assembly 164, content type or attendee representation type TOIs may be limited to locations vertically aligned below system cameras 142*i*, 142*j*, etc., so that camera images can generate more accurate local attendee STs and can generate better directional videos of local attendees. Other spatial and TOI location limitations are contemplated.

Although shown in larger formats in some images, in at least some cases each remote attendee representation may be presented in a substantially life size format at other stations in at least some cases. In some embodiments the default may be to present attendee representations in life size format at least initially and, if the number of TOIs added to a surface crowds the surface, at least a subset of the attendee representations may be rendered smaller to accommodate additional attendee representations or additional content on a surface 101a.

In at least some cases it is contemplated that at least a subset of remote attendee representations may be presented in a smaller format than others in the interest of limiting clutter on emissive surfaces. To this end, see, again, FIGS. 2 and 6 where third through seventh remote attendee representations are shown in a relatively smaller format at 77', 79', 81', 83' and 85', respectively. While all shown together in one area of surface 101a, in at least some cases a local attendee may be able to arrange even the small attendee representations in any location(s) on surface 101a. In at least some embodiments each of the small representations (e.g., 77', 79', etc.) may be shown as directional real time videos to give the local attendee a sense of where each of the remote attendees is looking. In cases where the number of large attendee representations on surface 101a is limited (e.g., a maximum of 3), when one of the small attendee representations is selected, one of the other large representations may automatically be rendered small and placed along with the other small representations on surface 101a to provide a space for the new large attendee representation.

In addition to augmenting attendee representations or other content on the station and workspace emissive surfaces with names, titles and other information specifically associated with specific attendees or content, it is contemplated that other augmentation may be added to help attendees better understand real time meeting dynamics. For instance, instead of simply relying on directional videos to indicate what or whom remote attendees are looking at during a meeting, augmentation may be added to emissive surfaces to further indicate attendee TOIs. For instance, see FIG. 18 where ST arrow 450 has been added to surface 101a to indicate that the second attendee associated with representation 75a' is looking at content AAA 33a. Similarly, ST arrow 452 indicates that the attendee associated with representation 87a' is looking at the second attendee associated with representation 75a'. ST artifact 454 indicates that the fourth attendee associated with representation 79a' is looking at the local attendee 69. In some cases the ST arrows may be persistent and in other an ST arrow may only be temporarily presented when an associated represented attendee changes her ST to look at a different TOI and then may fade away (e.g., after 3 seconds).

Figure 19:
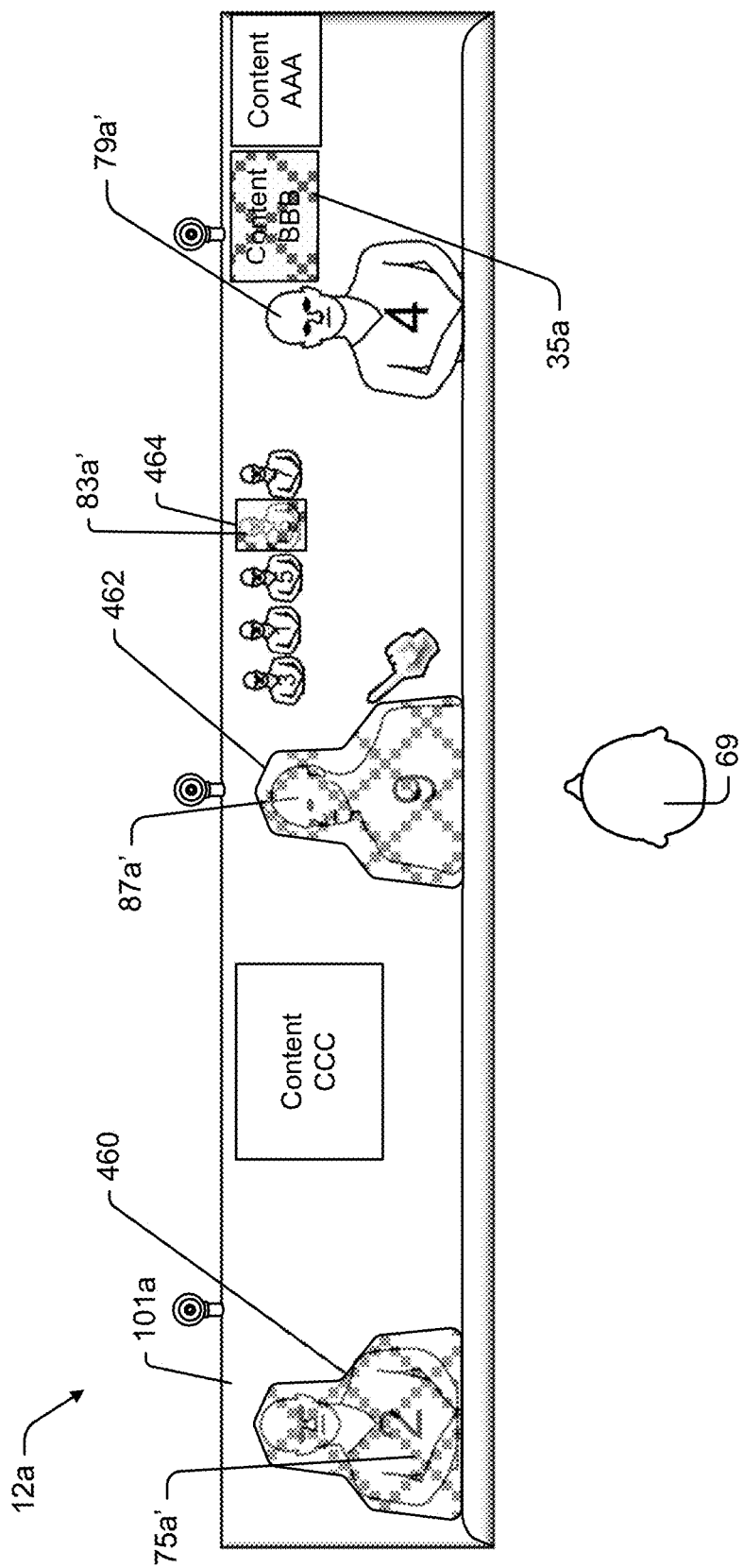
FIG. 19 is similar to the FIG. 11 view, albeit showing a different session state during an on-going session.

Another type of augmentation includes automatically changing some aspect of one or more TOIs presented to a local attendee(s) based on some sensed local or remote attendee activity. For instance, in some cases any TOI that is instantaneously viewed by any attendee at any station or in any space that is linked to a meeting may be highlighted or otherwise visually distinguished in some fashion. For instance, see in FIG. 19 tat attendee representation 75a' is highlighted at 460 to indicate that some attendee, in this case, the attendee represented at 87a', is looking at a representation of the second attendee associated with representation 75a'. Similarly, representation 87a' is shown highlighted 462 to indicate that some other attendee is looking at a representation of the ninth attendee or, in some cases where attendees are collocated, some attendee may be looking at the ninth attendee in the real world. Small attendee representation 83a' is highlighted at 464 and content 35a is highlighted to indicate that at least one attendee is looking at those TOIs.

In other cases, server 16 may be programmed to specially highlight or otherwise visually distinguish (e.g., make the TOI larger) a TOI that is instantaneously the most viewed by all attendees to a meeting. Thus, for instance, where nine attendees are linked to a meeting as in the description above, if the first and second through sixth local attendees in workspace 14q (see again FIG. 8) are instantaneously looking at the second attendee 75, representations of the second attendee at the remote stations 12a and 12b may highlight or visually distinguish the second attendee representation to indicate that the second attendee is instantaneously the most viewed TOI in the meeting.

Figure 18:
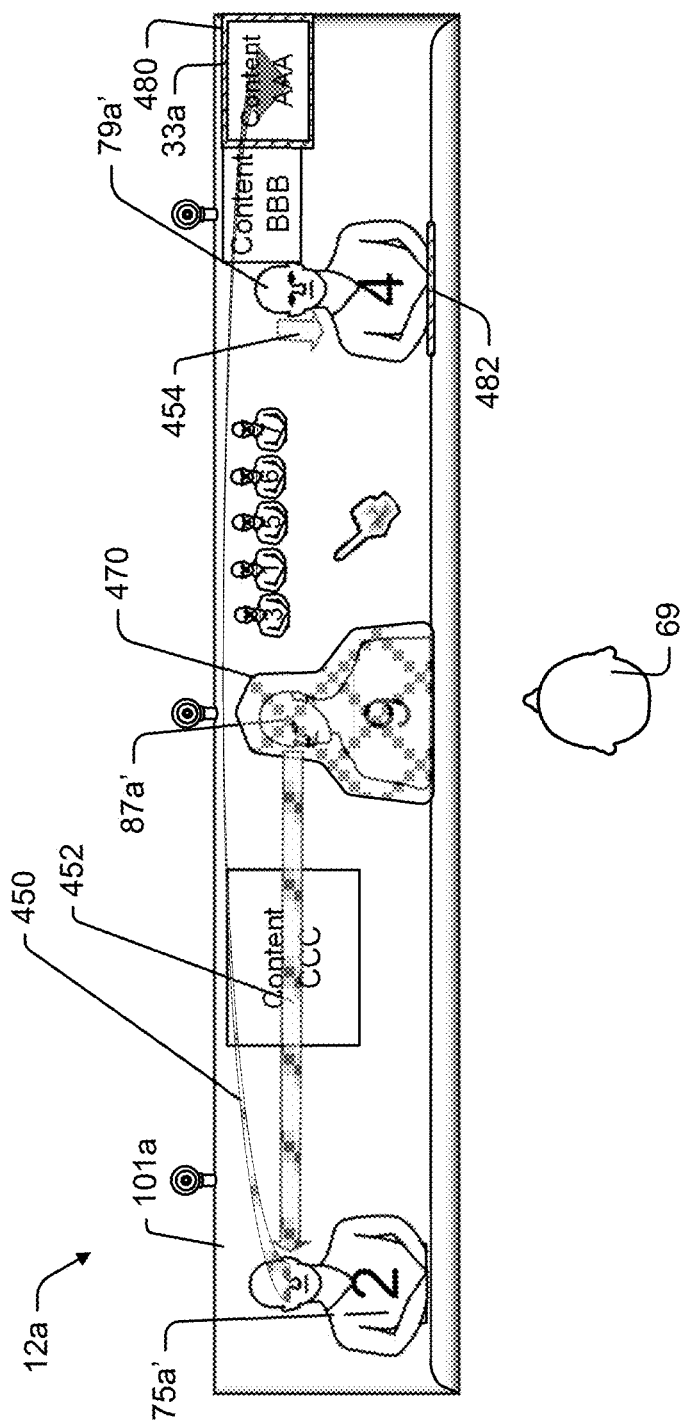
FIG. 18 is similar to the FIG. 11 view, albeit showing a different session state during an on-going session.

As another example, referring to FIG. 18, as attendee 69 at station 12a views TOIs at her station, a TOI that the attendee instantaneously views may be highlighted, enlarged somewhat (e.g., 20%) or otherwise visually distinguished. For instance, see that representation 87a' is highlighted at 470 when attendee 69's ST subtends representation 87a'.

As yet one other example, a most active instantaneous attendee linked to a meeting may be visually distinguished in some fashion. For example, where second attendee 75 in the above example is the only attendee talking at a particular instant, representations of attendee 75 at stations and spaces remote from second attendee may be highlighted, morphed into larger representations (e.g., by 20%), etc. Content and attendee representations may also be color coded in some fashion to show which attendee shared which content, most recently augmented the content or most recently referenced the content during the meeting in some fashion. For instance, content windows may be highlighted in attendee specific colors (e.g., see highlight border 480) and a color key bar 482 may be presented under each attendee representation as shown in FIG. 18.

Figure 20:
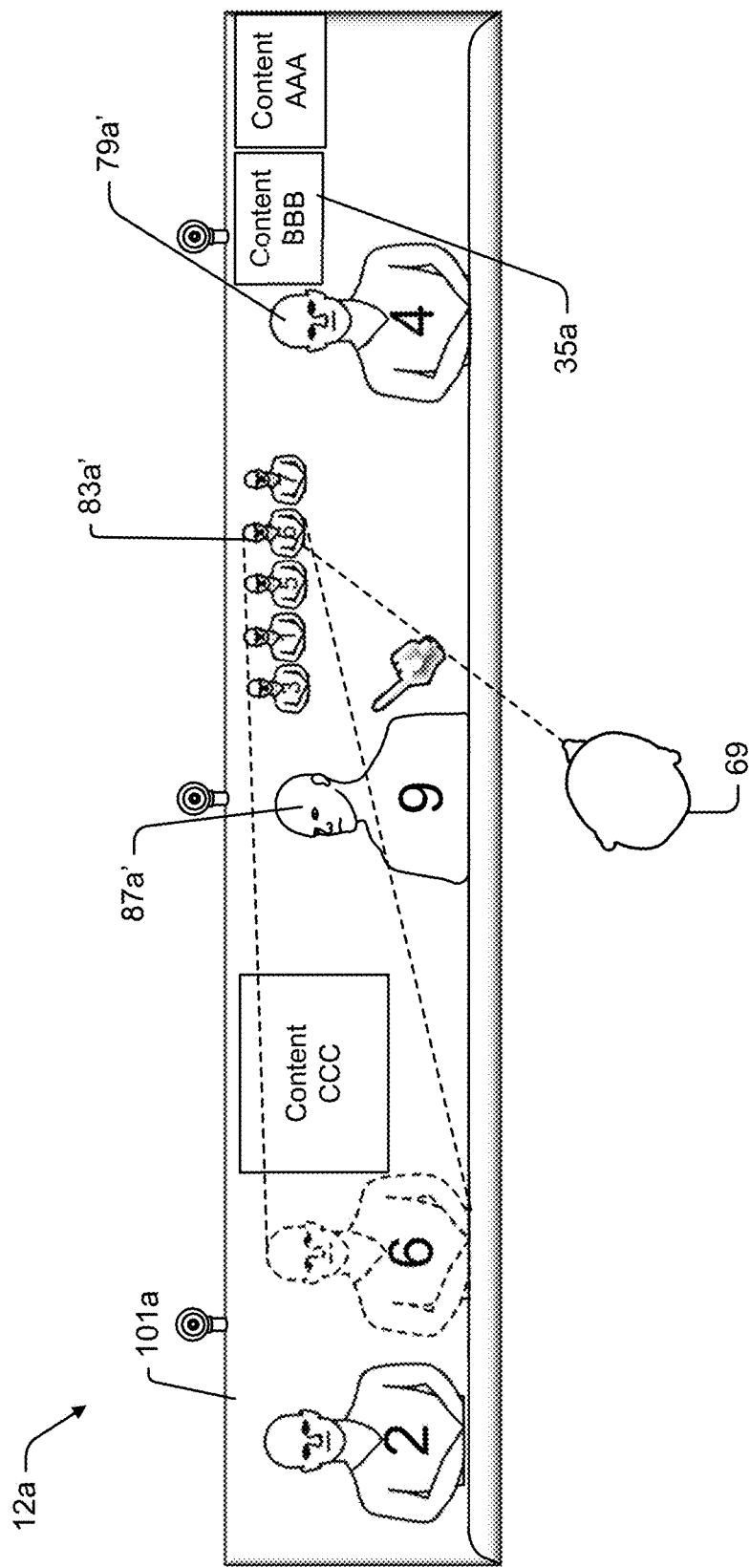
FIG. 20 is similar to the FIG. 11 view, albeit showing a different session state during an on-going session.

In some cases it is contemplated that server 16 may be programmed to automatically rearrange TOIs at a station or in a conference workspace 14q based on attendee activities. For instance, in some cases server 16 automatically moves instantaneously most interesting TOIs to main locations on emissive surfaces at stations and in workspaces. Here, the trigger for most interesting may be based on a specific attendee's activities or based on all attendee activities in a meeting or any subset of attendee activities. For instance, in FIG. 20, where attendee 69 looks toward a small representation 83a' of the sixth attendee to a meeting for some threshold period of time such as, for instance, 7 seconds, server 16 may be programmed to automatically increase the size of representation 83a' to a life size rendering as shown in phantom at 83a1'.

Figure 21:
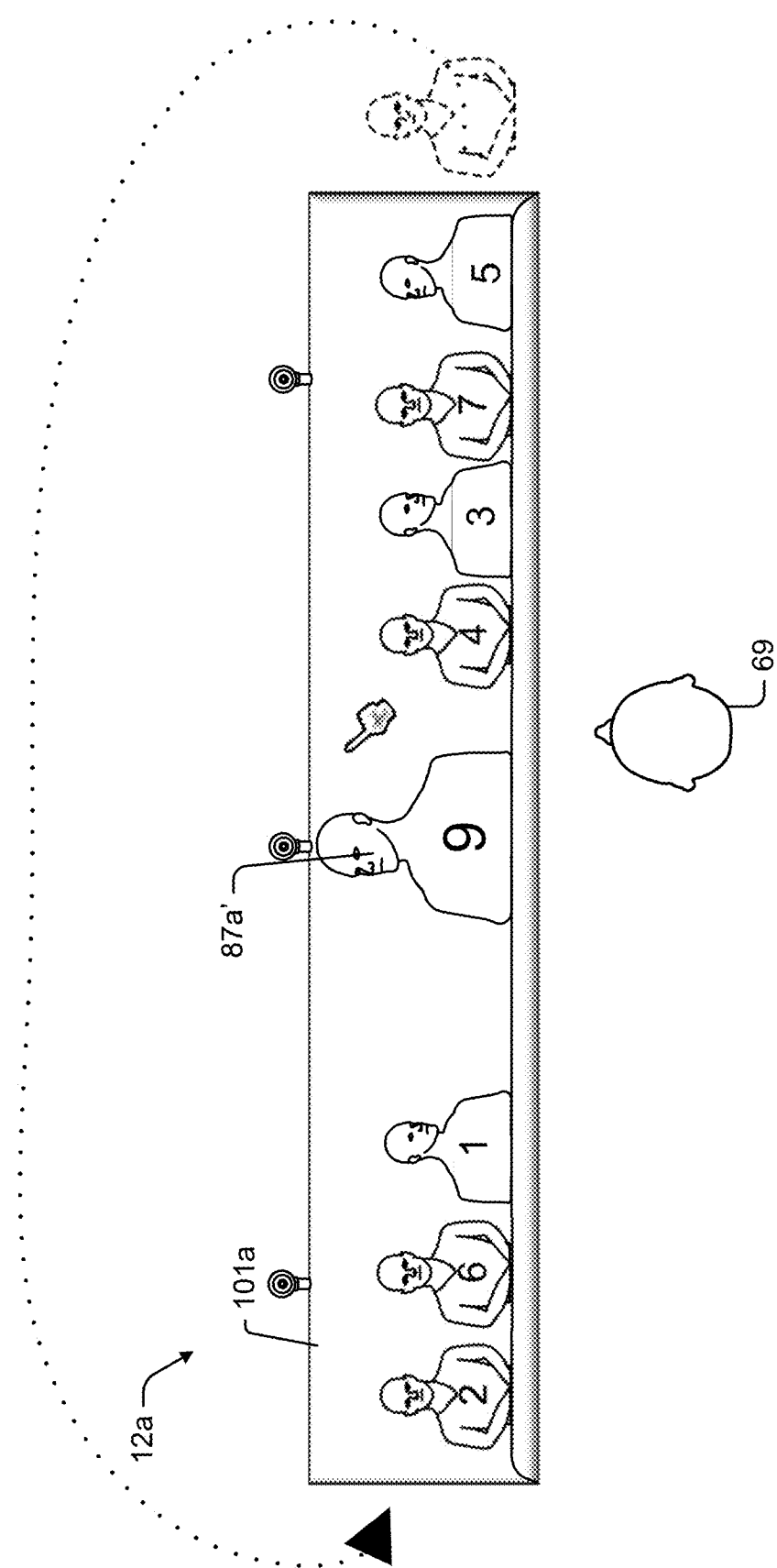
FIG. 21 is similar to the FIG. 11 view, albeit showing a different session state during an on-going session.

In another case, an automatically enlarged attendee representation may replace a different large attendee representation that is associated with a least active attendee in the meeting or the enlarged attendee representation may automatically replace the centrally located TOI at station 12a (e.g., in FIG. 20, replace representation 87a') to place the enlarged representation front and center on surface 101a. Thus, for instance, see FIG. 21 where the ninth attendee representation 87a' is enlarged and centrally located on surface 101a to show an optimized view of the ninth attendee that is currently speaking during a meeting. In FIG. 21, in at least some cases, if another attendee like the seventh attendee represented at 83a' starts to talk after the ninth attendee finishes, the representation 83a' may be automatically moved to the central location of attendee representation 87a' and made larger to give an optimized view. In some cases representation 87a' and 83a' may simply be swapped via a morphing program or the like. In other cases where a different attendee takes over a primary role from another, the attendee lineup may slide to the left or right as illustrated in FIG. 21 until the new primary attendee representation is centrally located and enlarged. Here, during the sliding action, attendee representations that are pushed off surface 101*a* may simply be added at the other lateral edge or end of the surface.

Figure 22:
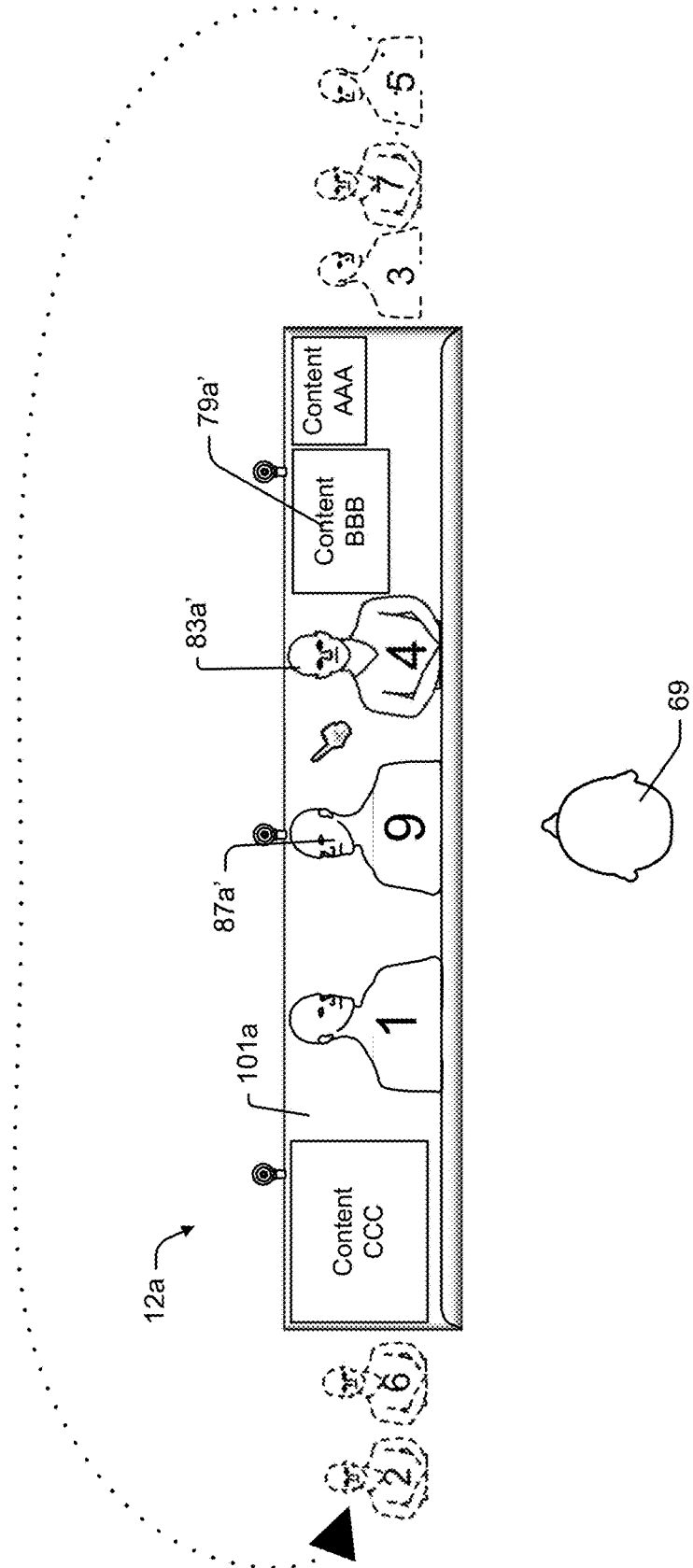
FIG. 22 is similar to the FIG. 11 view, albeit showing a different session state during an on-going session.
Figure 23:
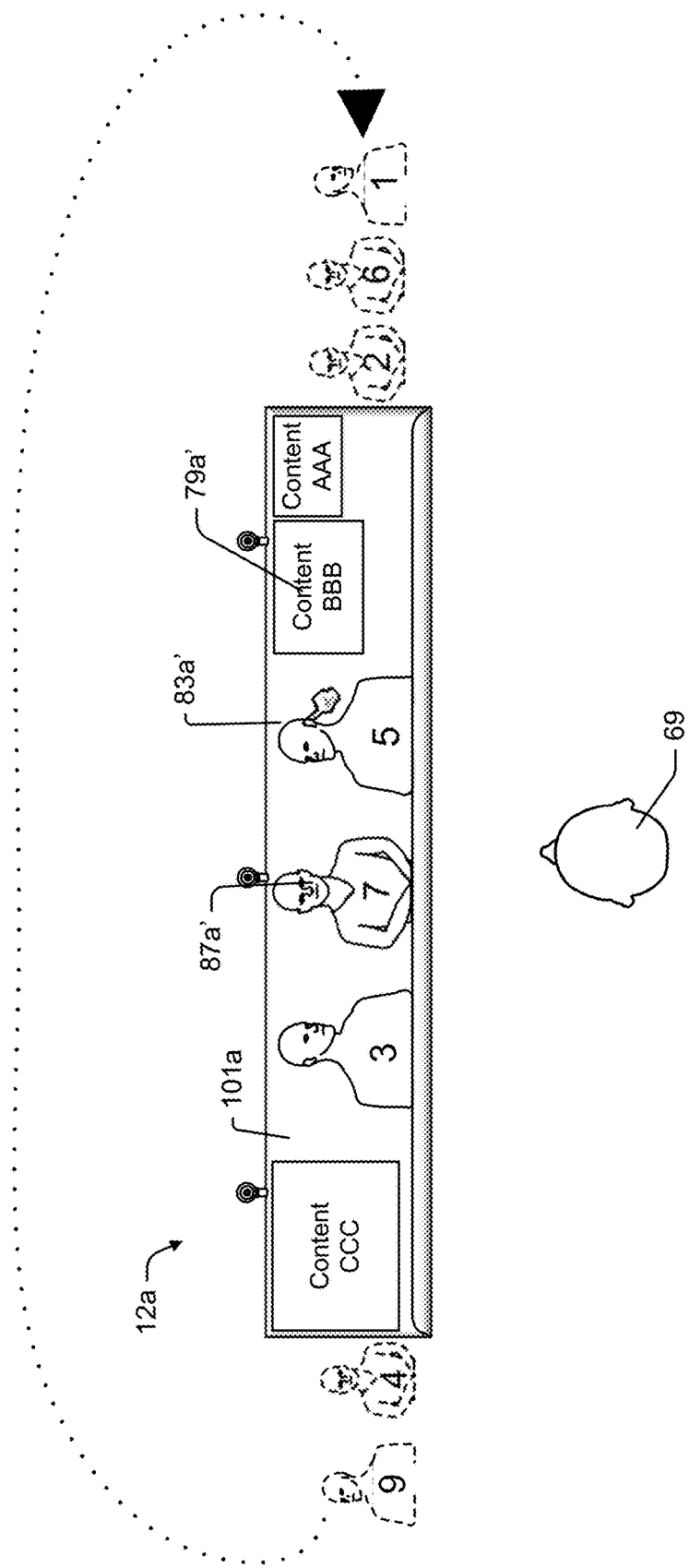
FIG. 23 is similar to the FIG. 11 view, albeit showing a different session state during an on-going session.

In still other embodiments, server 16 may be programmed to only present a small set of remote attendee representations on a station surface 101*a* and reserve other space for content windows as shown in FIG. 22. Here, in some cases where server 16 automatically changes attendee representations based on attendee activities, other attendee representations may be virtually aligned with those presented and may rotate on and off surface 101*a* based on attendee activities. Again, in FIG. 22, if the seventh attendee associated with representation 83*a*' assumes a primary role (e.g., speaks) during a meeting, the attendee representation lineup shown may rotate automatically so that attendee representation 83*a*' is centered as shown in FIG. 23.

In still other embodiments server 16 may be programmed to automatically optimize TOI presentation so that TOIs are optimally sized given available space on a station emissive surface. For instance, see FIG. 24 where first and ninth remote attendee representations are presented at 73*a*' and 87*a*', respectively, and smaller representations of other attendees are shown at 475, 477, 479, 481, 483 and 485, respectively. Representations 73*a*' and 87*a*' may be optimally presented in life size which leaves substantial emissive surface areas for the content windows. As shown, the content windows are enlarged, in some cases automatically, to substantially fill the open space on surface 101*a*.

Figure 24:
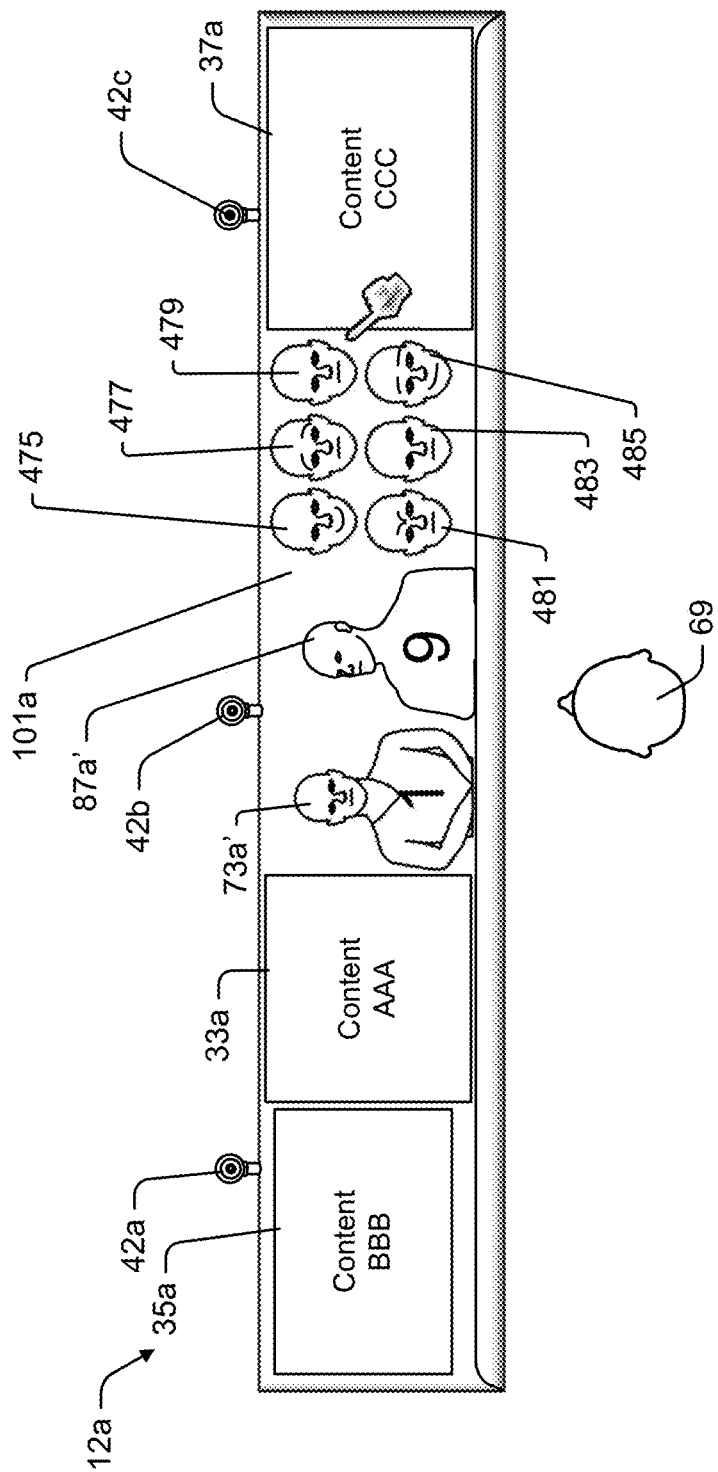
FIG. 24 is similar to the FIG. 11 view, albeit showing a different session state during an on-going session.

In some cases it is contemplated that server 16 may simply present representations of the two most recent speakers linked to a meeting centrally with content windows to the sides as shown in FIG. 24. Here, if a third linked attendee speaks, the most recent speaker represented at 73*a*' or 87*a*' may persist while the other speaker is removed and replaces with a directional representation of the most recently speaking attendee.

Referring again to FIGS. 2 and 7 and as described above, in at least some cases it is contemplated that station cameras and space cameras will be able to obtain video useable to generate directional views of each meeting attendee from virtually any direction about the attendee including a head-on portrait or mug shot view, regardless of the attendee's instantaneous ST. In some cases it is contemplated that a facial expression option may be available whereby any attendee or attendee group may have the ability to have a persistent view of each or a subset of attendee faces so that the viewing attendee can see facial expressions during a meeting. To this end, see again FIG. 24 where attendee representations 475, 477, 479, 481 and 483 are facial expression options for the second through seventh attendees to a meeting.

Figure 25:
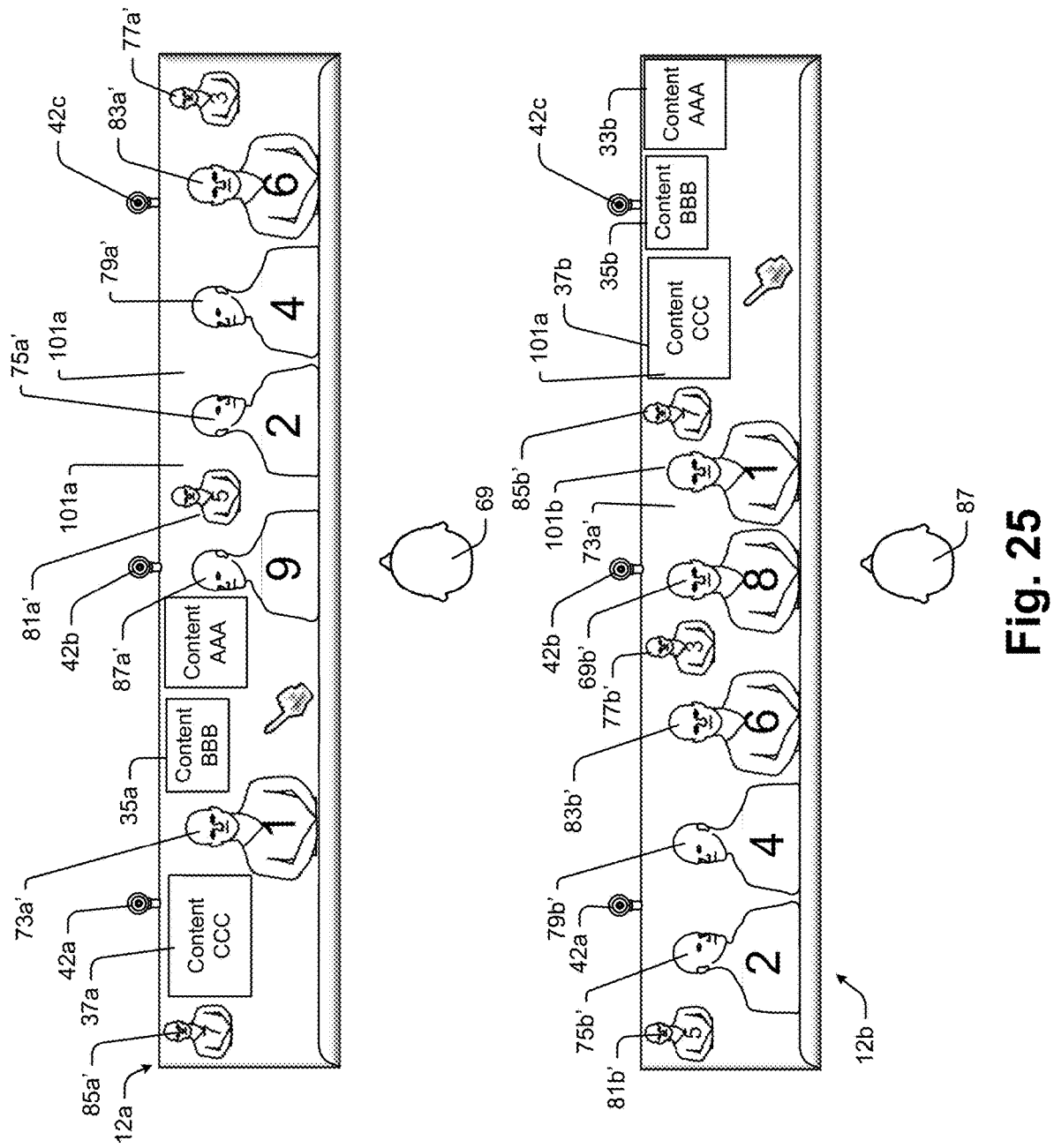
FIG. 25 is similar to the FIG. 11 view, albeit showing a different session state during an on-going session.

In at least some cases it has been recognized that arrangement of content or TOIs may be important to an understanding of what any attendee is attempting to convey to other remote attendees. For this reason, in at least some embodiments, while personalization of TOI locations at a station may be important at times, server 16 may be programmed to enable several different operating modes including a sharing mode where TOI arrangements can be shared among disparately located meeting attendees. For instance, in some cases a meeting leader may want to present TOIs in a specific arrangement to all attendees and, in that case, the leader may select a TOI sync mode to cause server 16 to arrange TOIs at all locations in a similar fashion. Thus, for instance, see FIG. 25 where all attendees and shared content windows are presented to attendee 69 at station 12*a* in an arrangement that is consistent with the arrangement of those TOIs that attendee 69 would perceive if he were at the location of surface assembly 120 that presents representations of attendee 69 in space 14*q* in FIG. 8. Thus, in FIG. 25, the TOI arrangement from left to right as illustrated includes seventh attendee representation 85*a*', content window 37*a*, first attendee representation 73*a*', content windows 35*a* and 33*a*, and ninth, fifth, second, fourth, sixth and third attendee representations 87*a*', 81*a*', 75*a*', 79*a*', 83*a*' and 777*a*', respectively. Similarly in FIG. 25, station 12*b* is shown where attendee 87 is presented TOIs arranged from the perspective of surface assembly 160 shown in FIG. 8. Notice that because of the different perspectives, the order of TOIs is different at stations 12*a* and 12*b* and that the ninth attendee representation 87*a*' representing attendee 87 at station 12*b* is centered at station 12*a* while the eighth attendee representation 12 69*b*' representing attendee 69 at station 12*a* is centered at station 12*b*.

In still other cases, a virtual representation of workspace 14*q* may be presented at station 12*a* in a way which augments the real world view through assembly 54 at that station. To this end, see FIG. 26 where surface 101*a* is shown laid flat but where an augmented tabletop 490 akin to the tabletop 130 in FIG. 8 is presented centrally on surface 101*a* and where augmented representations of attendees in space 14*q* are presented about the augmented tabletop surface 490 in the order that they would appear to attendee 69 if attendee were located at the location of surface assembly 120 that presents representations of attendee 69 in space 14*q*. More specifically, around tabletop 430, attendee representations include first, ninth, fifth, second, fourth and sixth attendee representations 73*a*', 87*a*', 81*a*', 75*a*', 79*a*' and 83*a*', respectively.

Figure 26:
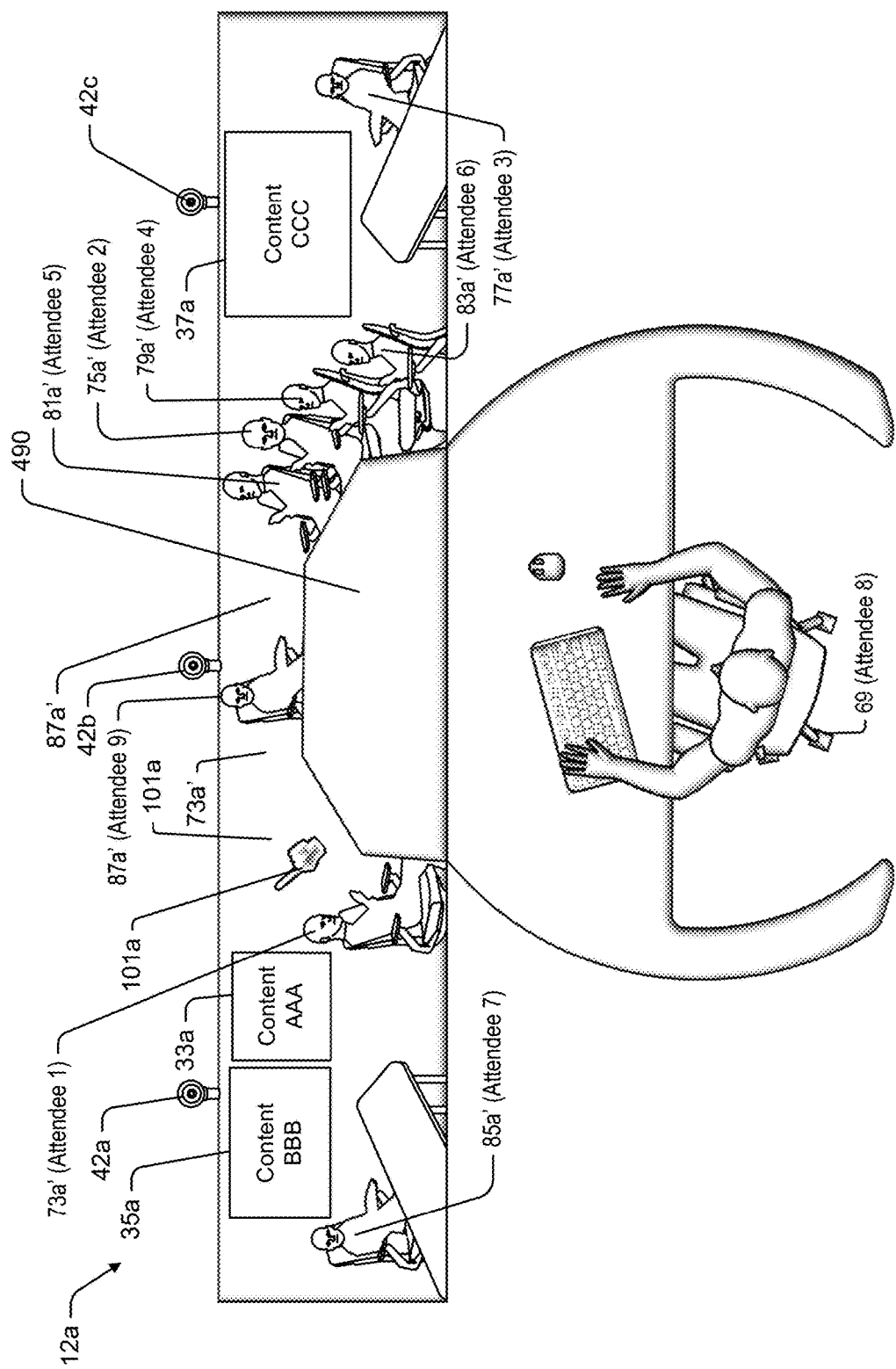
FIG. 26 is similar to the FIG. 17 view, albeit showing a different session state during an on-going session.

The augmented view in FIG. 26 is better than reality as the attendee representations can be automatically placed at locations where attendee 69 at station 12*a* can see all faces, posture queues, etc. Thus, for instance, the angled edges (see 139) along which attendees may gather in space 14*q* such that attendees may block views of each other from the location of assembly 120 in FIG. 8 can be represented differently so that all attendee representations along the edge can be seen by attendee 69. In this regard, recognize that in the real world representation shown in top plan view in FIG. 8, attendee 83 may possibly block a view of attendee 79 from the end of table 130 at which assembly 120 is located but, in the augmented representation shown in FIG. 26, all attendees may be positioned to be well viewed.

Referring still to FIG. 26, similar to the way in which attendee representations about the augmented table representation 430 can be positioned optimally for viewing, other attendees in space 14*q* may also be presented on surface 101*a* at locations that give a sense of their positions in space 14*q*. The idea here is that, in cases where disparate real world locations of collocated attendees result in a scene that cannot easily be represented on an emissive surface, the scene can be modified in the AW so that the scene retains a sense of the collocated attendee arrangement but can nevertheless be presented at the personal workstation 12*a*. Thus, in FIG. 26, seventh and third attendee representations 85*a*' ad 77*a*' that correspond to attendees 85 and 77 shown in FIG. 8 are presented on lateral sections of surface 101*a*. In FIG. 26 as in any of the other figures described herein, each of the attendee representations would optimally be presented as a directional video representation of the associated attendee giving a sense the attendee's instantaneous ST.

Referring still to FIG. 26, where a perspective view that mirrors or at least loosely reflects attendee locations in a real world multi-attendee workplace 14*q* is presented on a station surface 101*a*, after optimal placement of the attendee representations as illustrated, server 16 may automatically identify open spaces for placement of shared or other content windows 33*a*, 35*a* and 37*a* and may, when content is opened, render those windows as large as possible without interfering with the attendee representations (e.g., so that there is no overlap of content windows and attendee representations). Thus, here, if one or more attendees leaves a meeting, their representation may be removed from surface 101*a* and the sizes of the content windows may be modified accordingly to take advantage of additional emissive surface area.

In at least some embodiments, even in the case of a perspective scene as in FIG. 26, a station attendee may have the ability to rearrange attendee representation locations on surface 101*a* to accommodate personal preferences. For instance, in at least some cases, pointing icon 111 may be used to select and then drag any one of the attendee representations 73*a'*, 75*a'*, 81*a'*, etc., to some other location on surface 101*a*. For example, if attendee 69 does not like how four attendee representations are presented on the right side of augmented table top 430 while only one is presented on the left, attendee 69 may select fourth attendee representation 79*a'* and drag that representation to the opposite side of the tabletop 490. Here, once the attendee representation 79*a'* is near the other side of the tabletop 490, server 16 may rotate the attendee representation horizontally automatically and snap the representation to an optimal viewing position adjacent the edge of the tabletop 490 in at least some embodiments. In other cases, tools may be provided for attendee 69 to rotate or otherwise reorient representation 79*a'* which would result in a different perspective.

In all cases it is contemplated that as an attendee makes meeting viewing selections, the attendee will have the option to store those selections as preferences to be used in future linked meetings. Thus, for instance, where the first through ninth attendees are on a project team and routinely have meetings related to the project, the eighth attendee 69's preferences for where specific other attendee representations and shared content resides on the stations surface 101*a* may be stored and used for future meetings.

Figure 27:
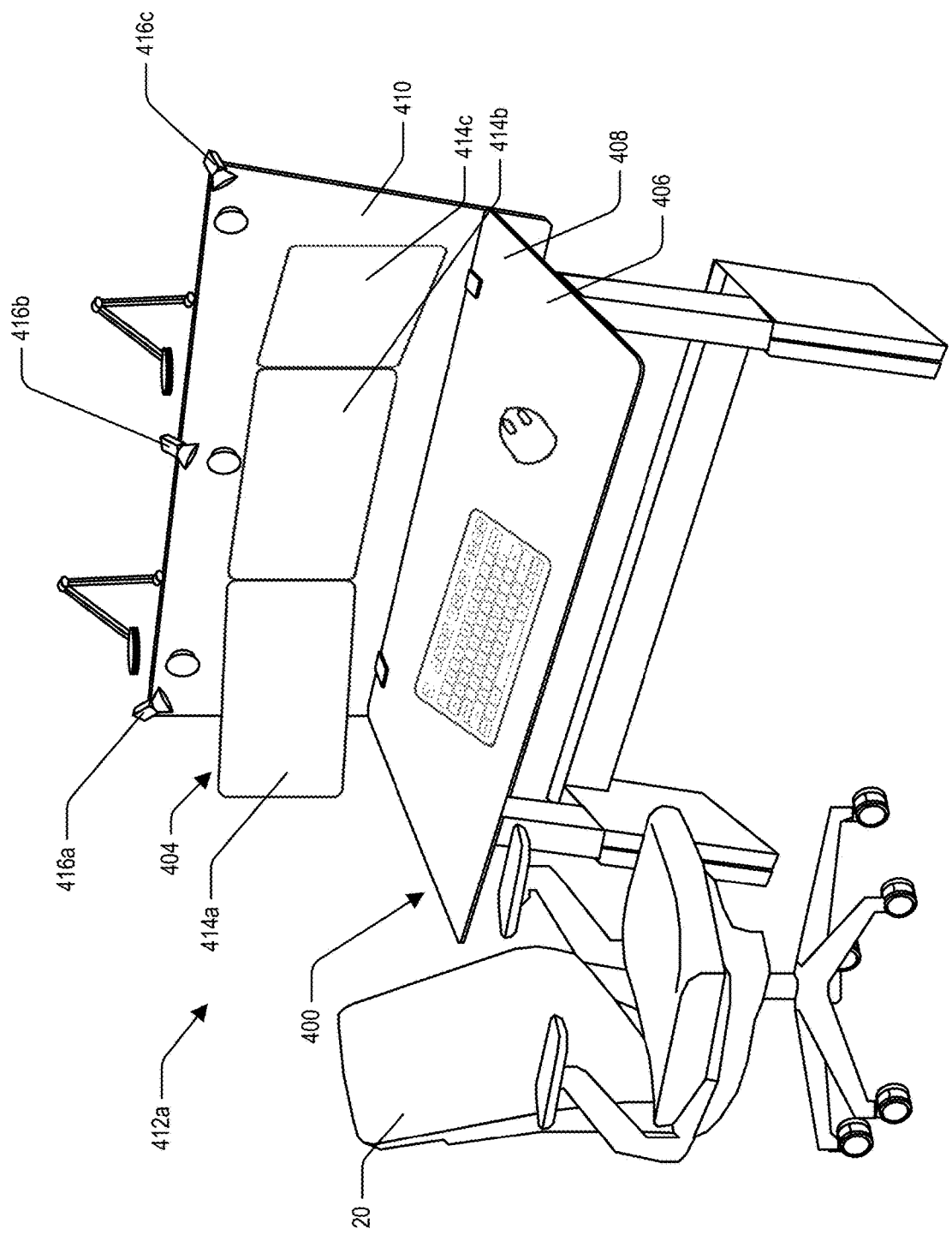
FIG. 27 is a perspective view of another personal workstation that is consistent with at least some aspects of the present disclosure.

While particularly advantageous embodiments of a personal workstation 12*a* and a multi-attendee workspace 14*q* have been described above, it should be appreciated that many other embodiments are contemplated that would take advantage of at least some aspects of the present disclosure. For instance, see FIG. 27 that shows are relatively simpler personal workstation 412*a* that includes a height adjustable table assembly 400, a task chair 20 and an emissive surface display screen assembly 404. Table assembly 400 includes a substantially flat tabletop member 406 that forms a flat top surface 408 and a privacy screen 410 that is mounted along a rear edge of the tabletop member 406. Three flat panel display screens 414*a*, 414*b* and 414*c* are mounted to a front surface of the privacy panel 410 to face an attendee residing along a front edge of the tabletop member 406. Cameras 416*a*, 416*b* and 416*c* are mounted along the top edge of screen 410 to face an attendee at the station to capture videos useable to drive the system as described above. Speakers and microphones as well as lighting devices are included in screen assembly 410. A keypad and a mouse or other input device are provided on tabletop surface 408. In FIG. 27, while station 412*a* is relatively simple, the station would operate in a fashion substantially similar to that described above with respect to station 12*a* to present TOIs on the emissive surfaces for viewing by an attendee and to obtain videos of the attendee that can be used to discern the attendee's ST as well as which TOI on the surfaces is currently viewed by the attendee based on ST and TOI alignment.

Figure 28:
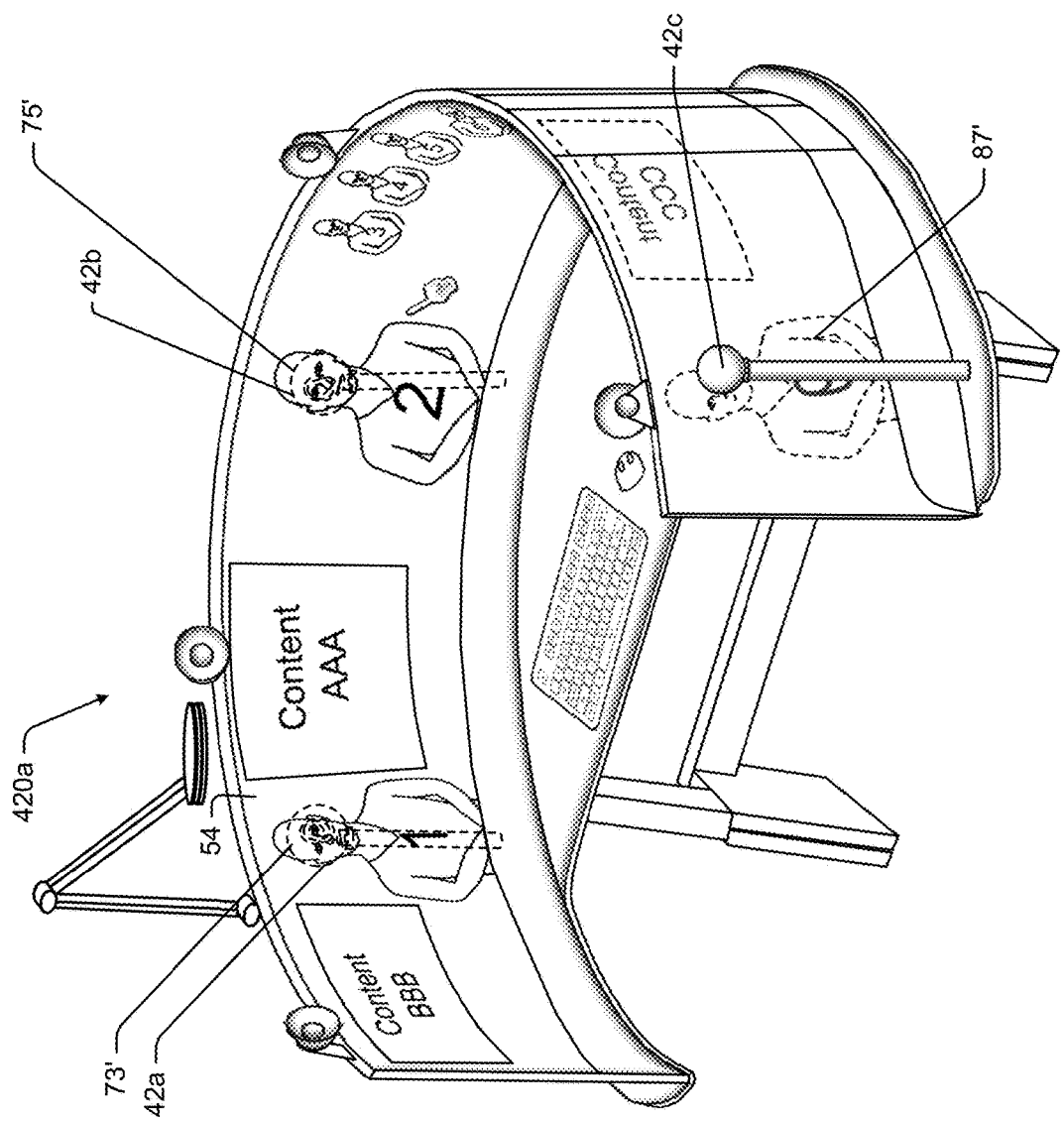
FIG. 28 is similar to FIG. 2, albeit showing another personal workstation configuration where cameras are located behind a transparent curved emissive surface assembly.

Another personal workstation configuration 420*a* is shown in FIG. 28 that is similar to the station shown in FIG. 2, albeit where the station cameras 42*a*, 42*b*, 42*c* are located behind the transparent emissive surface assembly 54 so that the cameras are at a standard eye height which corresponds to the typical height of the eyes of an attendee that uses the statin 420*a*. Here, by placing the cameras at attendee eye height, better attendee eye and head tracking results and more accurate directional videos of an attendee at station 420 can be obtained. As shown in FIG. 28, in at least some embodiments, server 16 may encourage or may force alignment of remote attendee representations 73', 75' 87', etc., with the cameras 42*a*, 42*b*, 42*c*, etc., so that the eyes on each or at least a subset of the attendee representations are aligned with the cameras. By aligning attendee representation eyes with camera lens locations, better eye to eye effects result.

Figure 29:
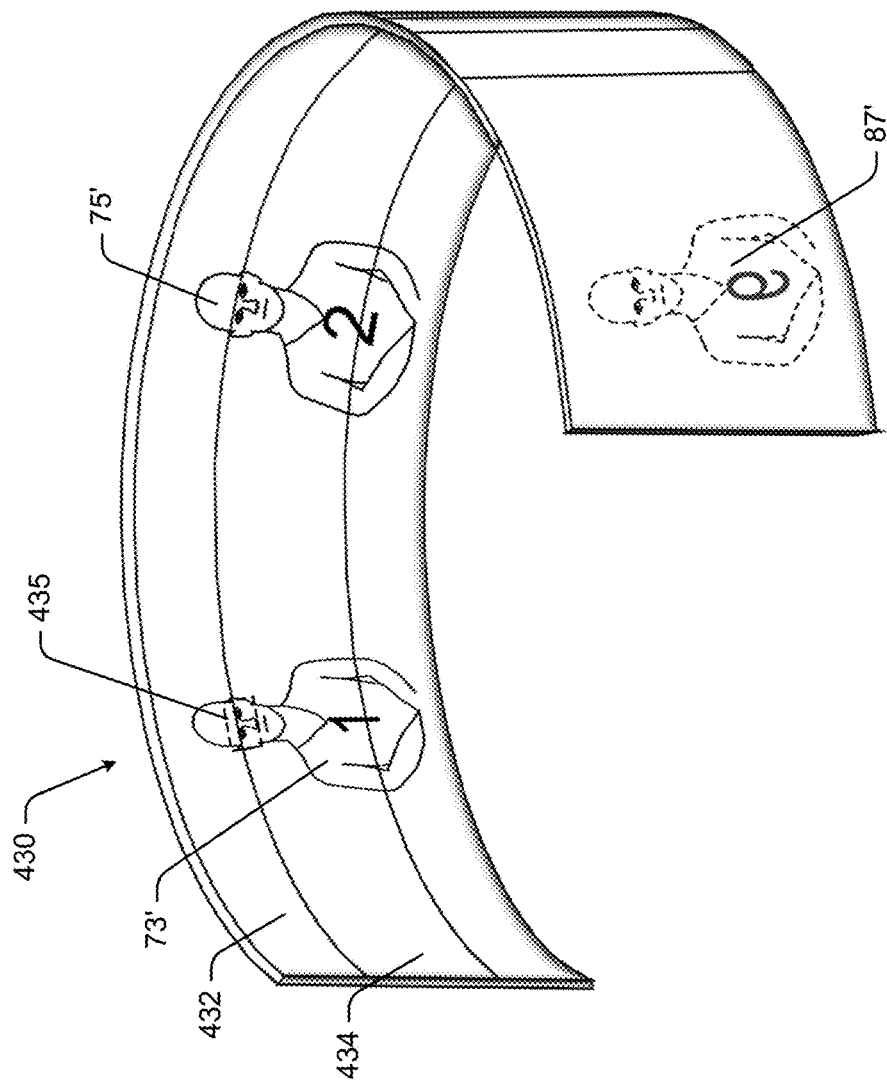
FIG. 29 shows a curved emissive surface structure for use at a personal workstation where a vertically central portion is shown to include dual purpose imaging and image capture pixels so that the emissive surface pixels themselves can be used to provide complex camera and image capture functionality.

FIG. 29 shows a different part cylindrical emissive surface assembly 430 that may be integrated into a station like station 12*a* in FIG. 2. In FIG. 29, assembly 430 includes a curved emissive surface that forms a curved emissive surface 432 that is shaped similar to the assembly 54 shown in FIG. 2 and that would be supported by the table assembly as shown in FIG. 2. Here, however, surface assembly 430 is different in that it includes an optimal emissive surface structure that includes thousands of microscopic image sensors located in-between liquid crystal display cells or other display pixel structures where each sensor captured its own small image and where sere r 16 software is programmed to stitch together the small images from any subset of the sensors to create larger images. U.S. Pat. No. 7,535,468 which is titled "Integrated Sensing Display" and issued on May 19, 2009 and which is owned by Apple describes integrated display technology that includes sensors in an emissive surface and is incorporated herein in its entirely as one example of surface structure that may be used to configure curved screen 430.

Here it should be appreciated that server 16 may select any subset of the screen light sensors to generate one or more directional images of an attendee at an associated station. Thus, for instance, where three remote attendee representations 73', 75' and 87' are presented as shown in FIG. 29, different directional representations for each of those attendees based on the local attendee's instantaneous TOI and the locations of the local attendee's representations as well as the local attendee's TOI at remote stations.

In some cases the microscopic camera sensors may be limited to a sub-space of the surface 432 area such as, for instance, a band 434 as shown in FIG. 29 that includes an eye height portion of the surface 432. In other cases the integrated camera sensors may be limited to areas at which the eyes of attendee representations are presented on surface 432 to limit costs. To this end, see, for instance, the exemplary camera box shown in phantom at 435 where attendee representation 73' is positioned so that the eyes of representation 73' are aligned with box 435. Other camera boxes may be enabled for each of the other attendee representations presented.

In some embodiments a small subset of the microscopic camera sensors may be used to determine a local attendee's ST with limited processing requirements. Then, after the attendee's ST is identified and server 16 identifies the attendee's subtended TOI and required directional videos to feed remote attendee stations and spaces, server 16 may only obtain data from the sensor set(s) needed to generate the required directional videos of the local attendee to minimize processing requirements and possible associated latency.

Referring again to FIG. 8, in at least some embodiments attendee 69 may elect to have a view of space 14q and TOIs in that space from a central location associated with assembly 120 as if the attendee is located at the left end of tabletop 130 as illustrated. Here, the view may be a wide angle view so that attendee 69 can see all attendees in space 14q as well as the surface of assembly 164 and content presented thereon. In this case, directional videos of attendee 69 may be presented on surface sections 140a through 140d of assembly 120 to give local attendees a sense of whom or what attendee 69 is looking at. In at least some cases attendee 69 may have to rely on the wide angle perspective view to assess where other attendees in space 14q are looking. In other cases, the local attendee STs may be indicated with augmented ST arrows or the like as shown in FIG. 18 or in some other way.

In at least some embodiments a remote attendee may be able to switch between several different meeting viewing modes depending on instantaneous preference. In each viewing mode, the remote attendee's ST may still be represented in linked multi-attendee workspaces 14q, 14r, 14s, etc. For instance, referring again to FIGS. 2 and 6, a view where the remote attendee 69 arranges all possible TOIs in whatever locations she wants on her station emissive surface (s) as described above will be referred to as a custom view. A second viewing mode may be a perspective viewing mode where the remote attendee can assume any vantage point from within a conference space at which one of the space cameras generates video or any other location in the space at which video images from space cameras can be combined to generate a directional video into the conference space. Thus, for instance, referring again to FIG. 8, remote attendee 69 may select a viewpoint into space 14q from the location of camera 142n or from the location of camera 142m or from the location of any other camera. Where camera 142n is a 360 degree camera, attendee 69 may have any directional view from the location of camera 142n into space 14q.

In FIG. 8, despite a remote attendee changing his vantage point within space 14q, directional videos of the remote attendee 69 may still be presented within space 14q from the central location associated with assembly 120. Thus, for instance, where attendee 69's current vantage point is tied to the location of camera 142n in FIG. 8, when attendee 69 looks at content AAA 33q on surface assembly 164, the directional representations of attendee 69 on surface sections 140a through 140d would show the attendee with an ST that subtends content window 33q in space 14q. Here, while the perspective view of attendee 69 when in the perspective viewing mode may be wide angle or at least large enough to include many TOIs (e.g., several local attendees in space 14q, several content windows on emissive surfaces in space 14q, etc.), cameras or other sensors at the remote attendee's station may still track attendee ST and identify a TOI that is subtended by the remote attendee's ST and present the remote attendee's representations on surfaces in space 14q to show the remote attendee looing in the direction of the same TOI present in the local space 14q.

In some cases a remote attendee 69 may have a mixed view of a meeting including a custom view as seen in FIGS. 2 and 6 where an additional window is opened on the emissive surface 101 to present a perspective view. Here, in at least some cases it is contemplated that any TOI may be presented simultaneously on the remote attendee's emissive surface 101 two times, once in the custom view and once in the perspective view. Where a TOI appears twice on surface 101, the remote attendee's ST may be tracked with respect to both instances of the TOI on surface 101 and whenever either TOI instance is targeted, server 16 may change the attendee representations at other stations and in other spaces to show the attendee looking in the direction of the local instance of the TOI (e.g. the TOI in the other space in which the representation is presented).

Figure 30:
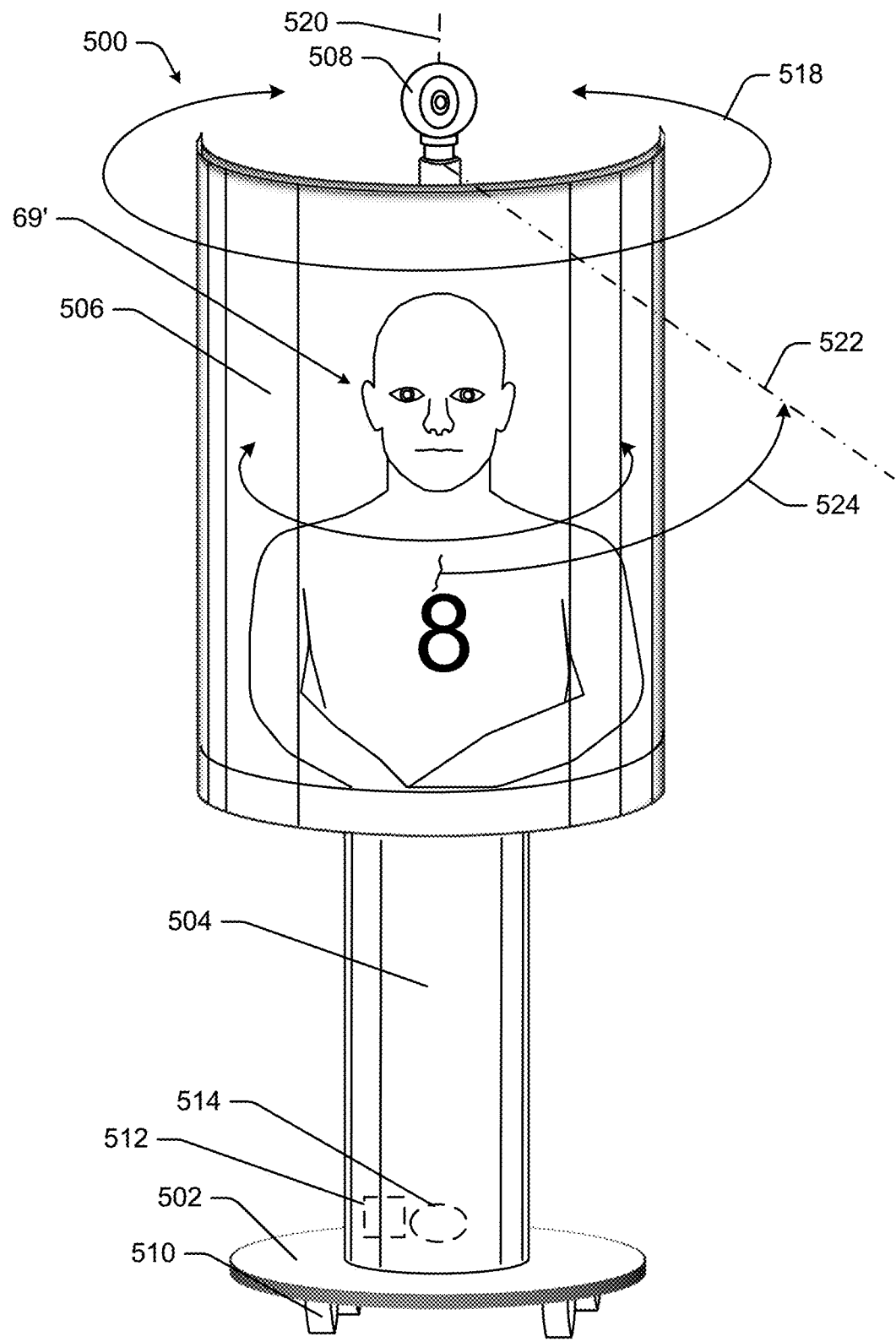
FIG. 30 shows a remote attendee totem that is consistent with other aspects of the present disclosure.
Figure 31:
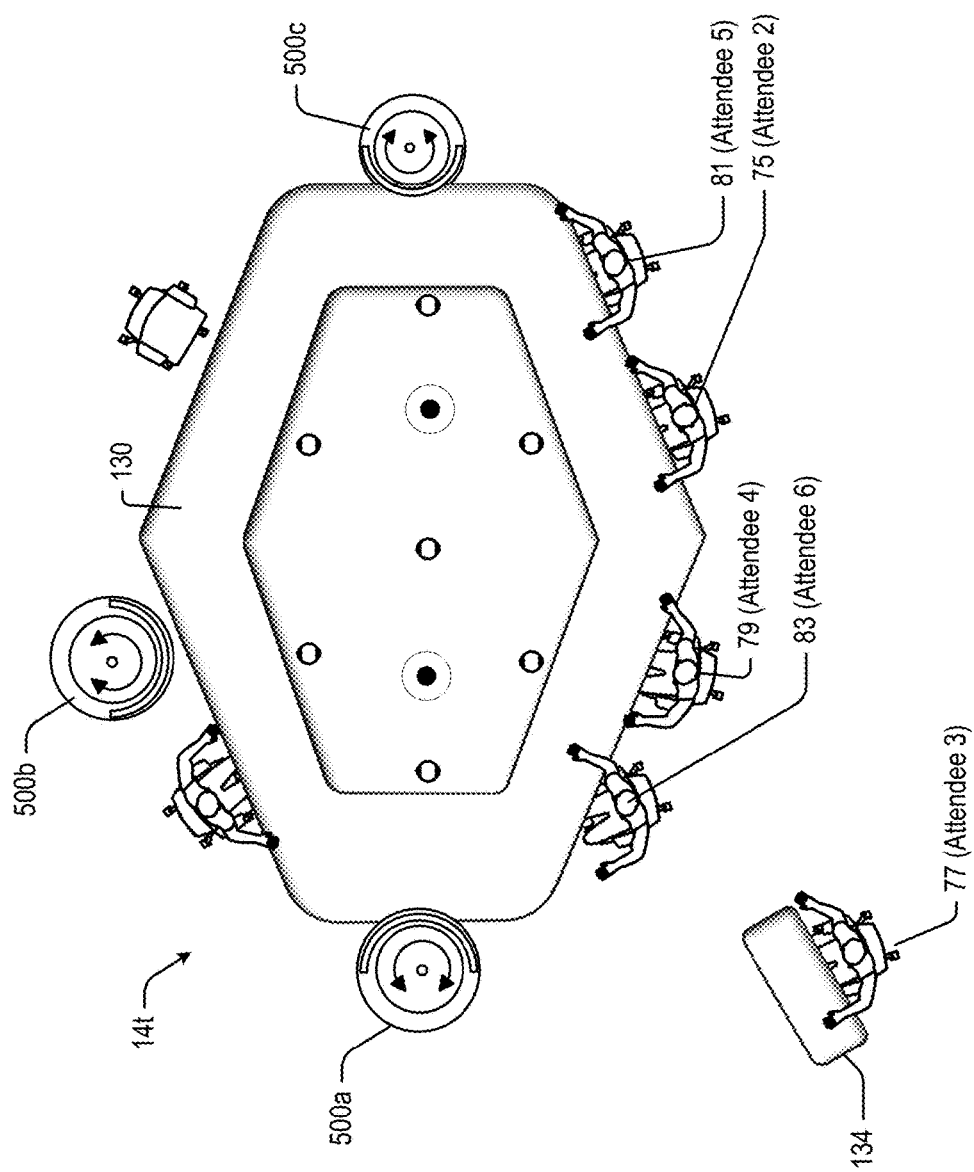
FIG. 31 is a top plan view of a conference space where several of the totems of FIG. 30 are shown arranged about a conference space.
Figure 32:
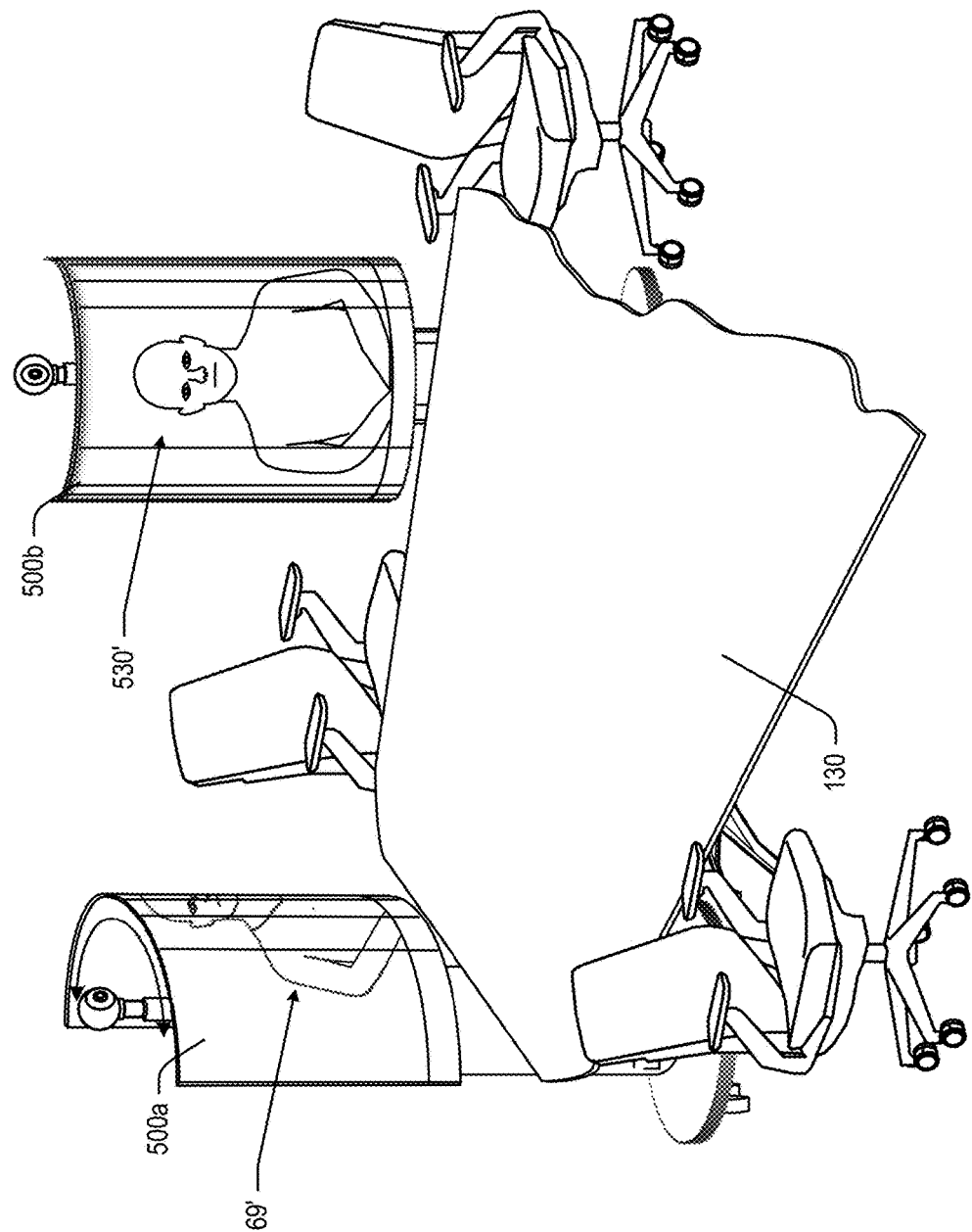
FIG. 32 is a perspective view of two FIG. 30 totems located along an edge of a conference tabletop member.

Other assemblies for presenting remote attendee representations in multi-attendee workspaces like 14q are also contemplated. To this end, another exemplary remote attendee representation assembly 500 is shown in FIGS. 30, 31 and 32 and includes a base structure 502, a trunk assembly 504, an emissive surface 506, a camera 508, casters or wheels 510, a processor 512 and, in at least some embodiments, a motor 514. Wheels 510 are mounted to the underside of base 502 and facilitate movement of assembly 500 in space. In cases where assembly 500 includes a motor 514, the motor may be linked to the wheels to move assembly 500 automatically under control of the processor 512.

Referring still to FIG. 30, trunk assembly 504 extends upward from base 502 and forms an internal cavity in which processor 512 and motor 514 and perhaps other components (e.g., a wireless transmitter) reside. At a top end of trunk assembly 504, emissive surface or screen 506 is mounted for rotation as indicated by arrow 518 about a substantially vertical rotation axis 520. Here, motor 514 may be geared to screen 506 to drive screen 506 to different angular orientations. Camera 508 is mounted at a top end of assembly 500 and, in at least some cases, will include a 360 degree camera so that any view centered at the location of the camera can be obtained.

As shown, in at least some embodiments, surface 506 is at least somewhat convexly curved forward. In the illustrated embodiment the concavity is substantially uniform across a width of screen 506 and the screen arc is between 20 degrees and 180 degrees. In particularly advantageous embodiments the screen arc is between 45 degrees and 120 degrees.

In operation, assembly 500 may be positioned anywhere within a multi-attendee conference space and operate as a proxy for an associated remote attendee to present that attendee in the conference space. In at least some cases an attendee representation 69' may always be presented centrally and looking forward or head-on on surface 506. Where the attendee representation is always head-on and centered, the remote attendee's ST is indicated by rotating the emissive surface 506 so that the representation directly faces the remote attendee's instantaneous TOI in the workspace. Thus, for instance, referring also and again to the top half of FIG. 11 where the real world eighth attendee 69 if looking at the second attendee representation 75a', if the second attendee collocated with assembly 500 is located along the trajectory indicated by axis 522 in FIG. 30, surface 506 is automatically rotated through the arc labelled 524 so that the eighth attendee representation at 69' is directly facing the collocated second attendee. Changes in the eighth attendee's instantaneous TOI would then drive rotation of surface 506 to show eighth attendee 69 looking at the same TOI in the space occupied by assembly 500.

FIG. 31 shows first, second and third representation assemblies 500a, 500b and 500c, located within a multi-attendee conference space 14t about a conference table 130. FIG. 32 shows a partial view of the scene in FIG. 31 including the first and second assemblies 500a and 500b along adjacent edges of table 130. It should be appreciated that because of the curvature of surface 506, the attendee representation on surface 506 of any of the assemblies 500*a* or others may only be partially seen based on surface 506 orientation as well as the juxtaposition of an attendee with respect to assembly 500*a* in space 14*t*. Thus, as seen in FIG. 32, only a side view of attendee 69' resented by assembly 500*a* is viewable while the full head-on view of attendee representation 530' is viewable as presented by assembly 500*b*.

Figure 33:
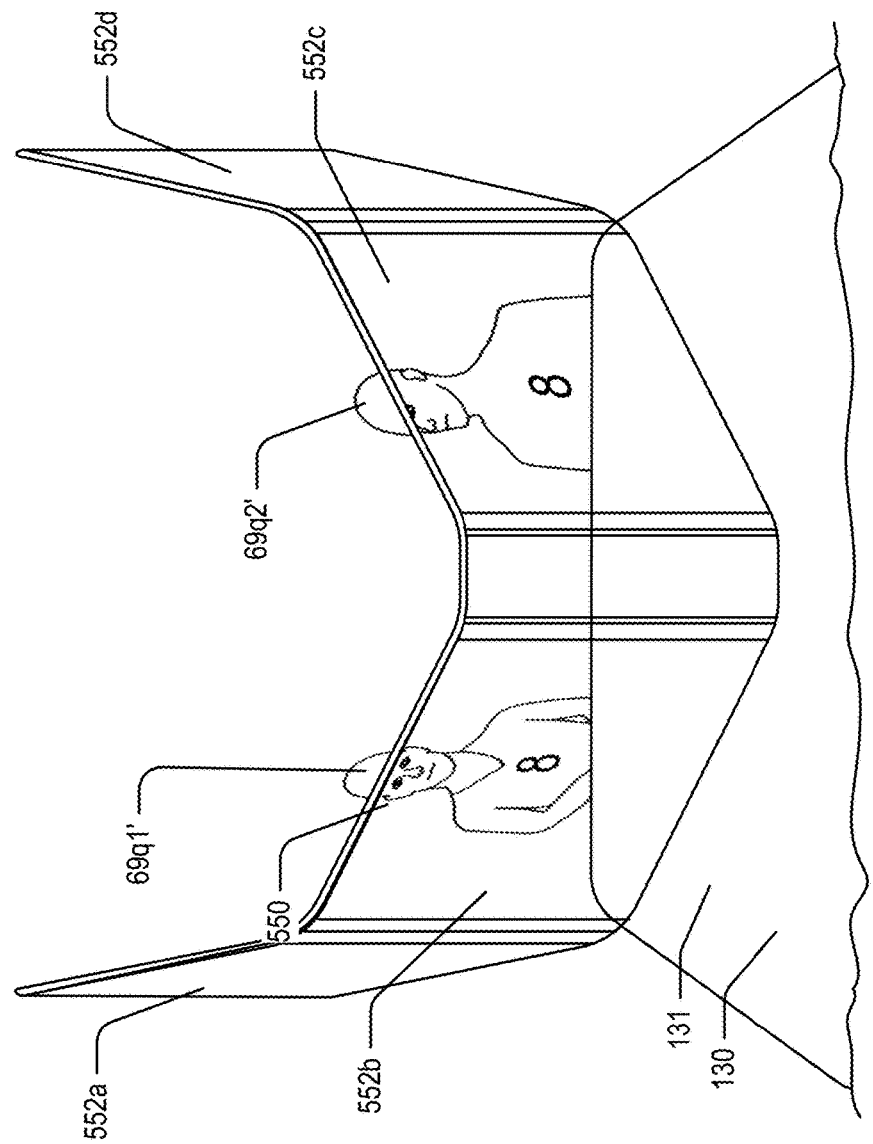
FIG. 33 is a perspective view of another remote attendee presentation system at the end of a tabletop member.

Referring again to FIG. 33, in other embodiments it is envisioned that surface 506 may not rotate with respect to the support structure there below and instead, representation 69' thereon may be moved left or right as indicated by arrow 517 to, in effect, give the appearance of looking in different directions within an occupied space. In this case, where camera 508 is a 360 degree camera, in at least some cases at least one remote attendee's view corresponding to the image on surface 506 may be redirected automatically to extend along a trajectory aligned with the ST associated with representation 69'. Thus, representation 69' may be presented to align with the location of the instance of the remote attendee's TOI in the occupied space and the camera FOV.

Referring again to FIG. 8, while assembly 120 is described as including a typical emissive surface that presents attendee representations thereon for viewing in space 14*q*, in other cases the surface 120 may be transparent and attendee representations may be presented thereon as an augmented view of affordances or structure there behind. To this end, see FIG. 33 where the end of table 130 having surface 131 is seen through transparent emissive surface structure 550 where structure 550 includes first through fourth substantially flat and differently angled surface sections 552*a* through 552*d*. Representations 69*q*1' and 69*q*2' are shown on surface sections 552*b* and 552*c* mixed with the real world end of tabletop 131 as directional videos looking in the same direction (e.g., at a TOI in the space occupied by the illustrated arrangement). Other directional videos would be presented on surface sections 552*a* and 552*d*.

It is contemplated that, in at least some cases, a single remote attendee may be represented at more than one location within a multi-attendee conference space. To this end, see again FIG. 8 that includes first and second attendee representation assemblies 120 and 160. At times, eighth attendee 69 may be presented simultaneously by both assemblies 120 and 160. Where an attendee is presented in two or more locations in space 14*q* or any other space contemplated by the present disclosure, in at least some case, each representation may show the remote attendee looking in the direction of the remote attendee's instantaneous TOI within the local space 14*q*. Thus, for instance, where eighth attendee 69 is looking at second attendee 75 at her station 12*a*, all representations on all surface sections of assemblies 120 and 160 would show attendee 69 looking in the direction of attendee 75 in space 14*q*. Here, the directional videos on assembly 120 would therefore include a different set than the directional videos on assembly 160 as each would show the remote attendee looking at attendee 75 from a different location or perspective in space 14*q*.

Figure 34:
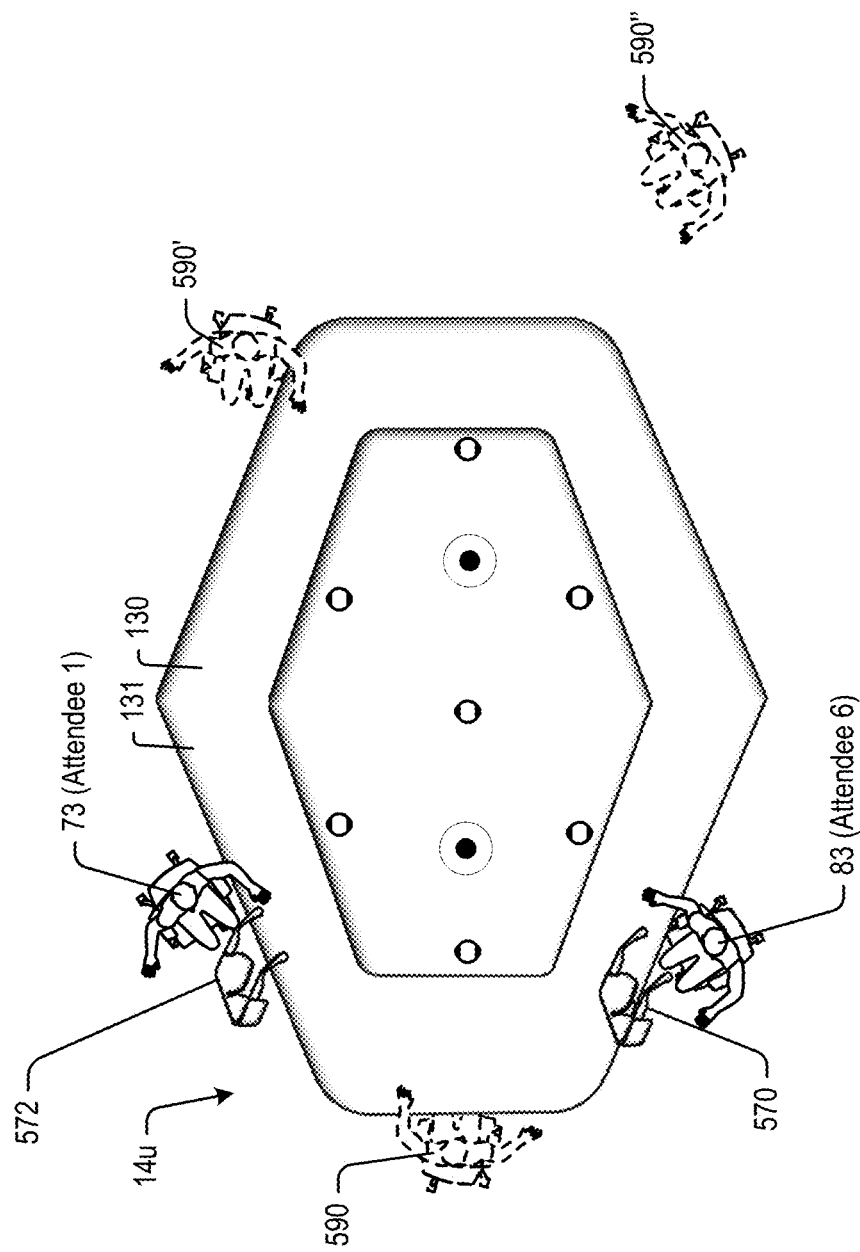
FIG. 34 is similar to FIG. 32, albeit showing an augmented system in which user's wear goggles or other headset arrangements to experience remote attendees in their local space.
Figure 35:
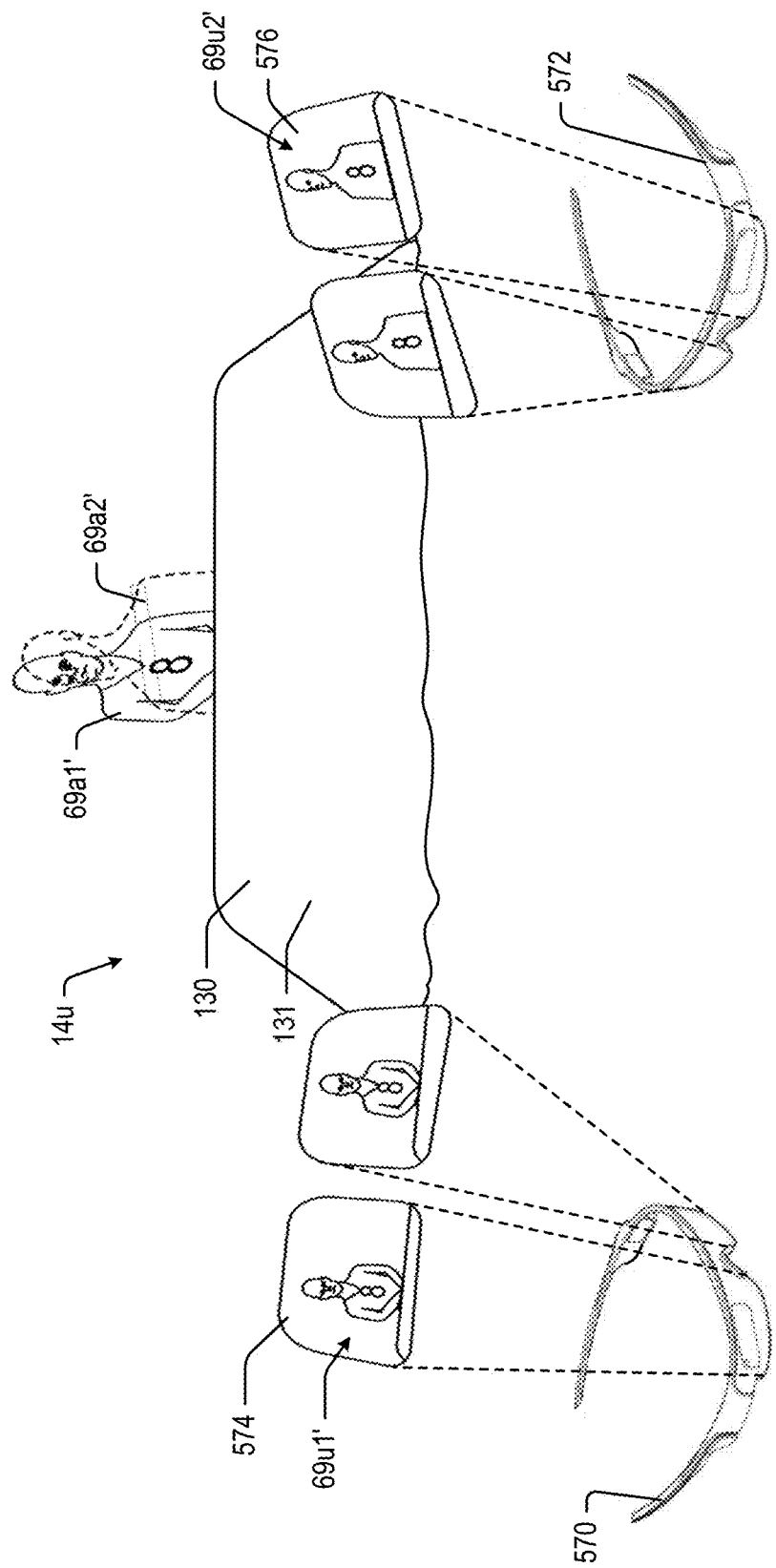
FIG. 35 is another view of the system of FIG. 34.

In at least some cases it is contemplated that the directional video concept may be implemented using eye wearable emissive surface assemblies rather than emissive surface assembly structures arranged in space. To this end, see FIGS. 34 and 35 that shows a table 130 having a tabletop 131 akin to the table assembly in FIG. 8, albeit without the representation assembly 120 at the end of the tabletop. In FIGS. 34 and 35, first and second augmentation headsets 570 and 572 are illustrated that are worn by the collocated sixth and first attendees 83 and 73 in a space 14*u* that includes table assembly 130. Each headset 570, 572 may include various accelerometers, orientation sensors, and the like in order to track the orientation, location, and other parameters of the VR headsets.

Views through headsets 570 and 572 are shown at 574 and 576 to include directional video representations 69*u*1' and 69*u*2' of the eighth remote attendee 590 and, as illustrated, each representation shows the remote attendee looking at the remote attendee's instantaneous TOI from the perspective of the location and orientation of the headset in local space 14*u*. In the illustrated example the eighth attendee would be looking at a representation of the sixth attendee 83 at the remote attendee's station and therefore is shown in representation 69*u*1' presented by headset 570 to be looking directly at the attendee wearing that headset. Representation 69*u*2' shows the remote attendee looking in a direction toward headset 570 and the attendee wearing headset 570. Other headsets (not illustrated) in space 14*u* would similarly present other directional video representations.

In FIGS. 34 and 35, it should be appreciated that as attendee's wearing headsets 570 and 572 change their STs and/or locations in space 14*u*, the directional videos of the remote attendee (e.g., shown in phantom at 590 in FIG. 34) would be modified so that it always looks like the remote attendee is looking toward her TOI in the local space. All sorts of additional augmentation may also be presented via headsets 570 and 572 to the attendees wearing those devices such as, for instance, attendee titles and names, schedule information, etc.

Referring still to FIG. 35, when the sixth attendee wearing headset 570 looks in the direction of another collocated attendee like first attendee 73, headset 570 may be automatically controlled to provide augmented information associated with the first attendee viewed. Similarly, when the attendee wearing headset 570 looks at content in a content window (e.g., see 33*q* in FIG. 8), additional augmented content related to the content in the window may be presented via headset 570 to augment the content in the content window. Many other types of augmentation are contemplated.

Referring again to FIG. 34, where collocated attendees in space 14*u* wear AR headsets 570, 572, etc., in at least some cases it is contemplated that one or more local attendees may be able to change the location(s) of one or more remote attendee representations in space 14*u*. Thus, for instance, in FIG. 34, the remote attendee representation at 590 may be moved to the locations shown in phantom at 590' or 590" or to any other location in space 14*u* and, once moved to a different location, when that attendee looks toward the new location, a directional video adjusted to account for the new remote attendee representation location as well as for the location of the local attendee's headset (e.g., 570) would be presented. Where a local attendee moves a remote attendee's representation in space 14*u* to a different location, that move may or may not affect the remote attendee's view into the meeting space 14*u*, depending on how the system is set up.

In some cases it may be that only one local attendee can control the location of a remote attendee's representation at a time or at any time. In other cases, any local attendee may be able to select and move any remote attendee representation location. In some embodiments every local attendee in a space 14*u* may always experience the same locations of remote attendees in space 14*u* so that if, for instance, the sixth attendee 83 in FIG. 34 sees the eighth attendee at the location indicated by 590, all other local attendees see the eighth attendee at the same location. In still other cases, each local attendee wearing a headset may arrange augmented attendees and content within the local space independent of other local attendees. Thus, for instance, sixth attendee 83 may place eighth attendee at the location 590 while first attendee 73 places the eighth attendee at location 590'.

Referring again to FIG. 8, in cases where a workspace includes several emissive surfaces where each is suitable to present remote attendee representation videos, one or, in some cases, any local attendee may be able to move one or more remote attendee representations from one emissive surface to any other and server 16 may automatically modify the directional videos of the remote attendee in the local space to maintain the remote attendee representation STs trained on the remote attendee's instantaneous ST at her station.

Figure 36:
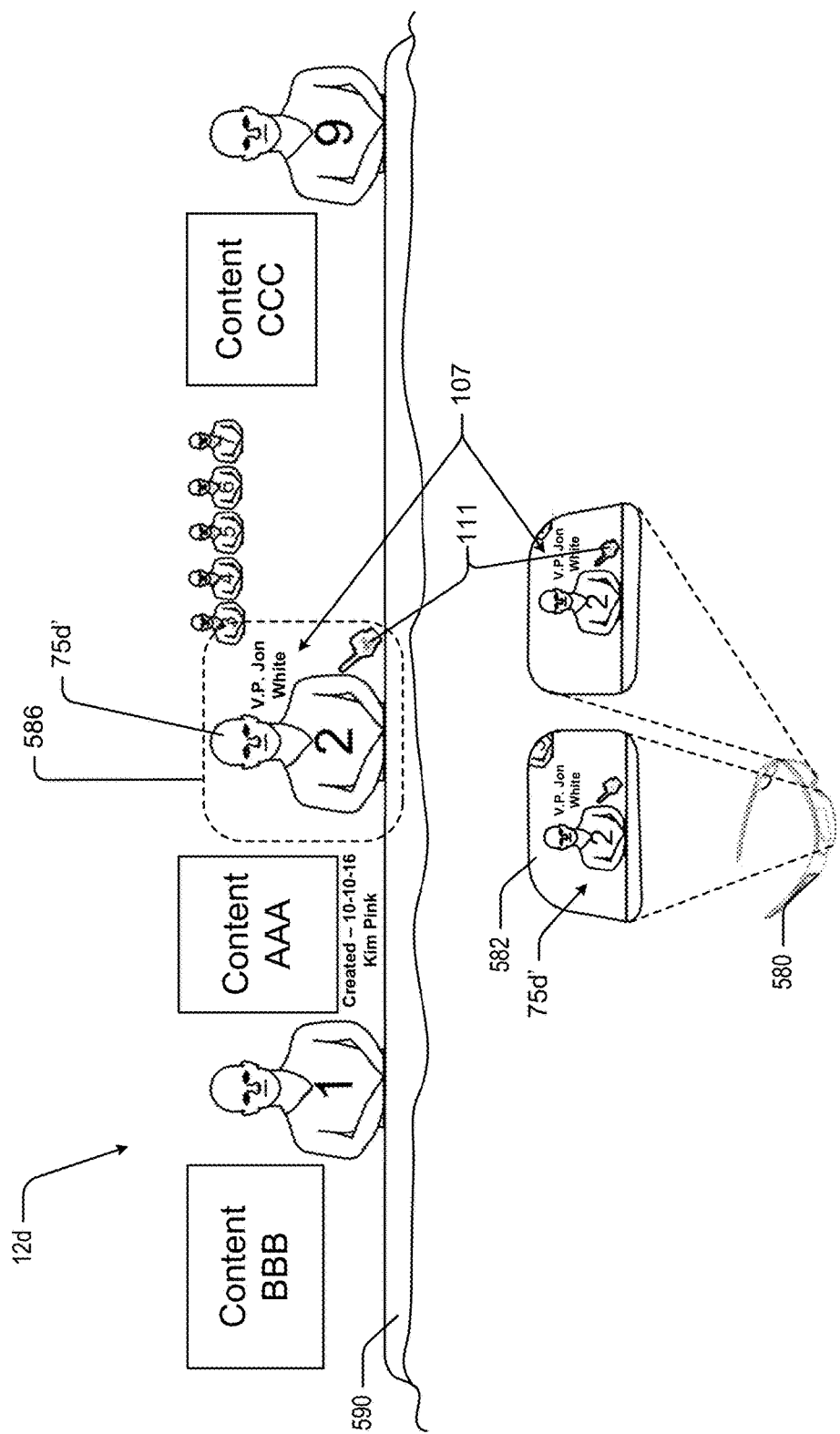
FIG. 36 is similar to FIG. 11, albeit showing conference attendees and targets of interest via goggles as opposed to on a large stationary transparent emissive surface.

FIG. 36 shows yet another personal workstation arrangement 12*d* enabling a remote attendee to participate in a meeting with other linked attendees where a headset 580 akin to the head sets 570, 572 shown in FIG. 35 is used to present augmented content in place of the partial cylindrical emissive surface 101 shown in FIGS. 2 and 6. In FIG. 36, the edge 590 of a remote attendee's workstation tabletop is illustrated where representations of meeting content akin to the content shown is FIG. 6 is again shown arranged about the edge. Here, however, the presented content is not on a surface arranged about the edge and instead is presented on the head set emissive surface 582 as shown at 584. The attendee wearing headset 580 only has a partial view of the augmented content and, as that attendee looks about in different directions at her station, she would view different portions of the augmented content arranges about the tabletop edge. In FIG. 36, the current view is represented in phantom at 586 and includes a representation of the second attendee 75*d'* and augmented title and name information 107 for the second attendee. Again, in FIG. 36, all attendee representations provided as augmented content would include directional video representations.

Referring still to FIG. 36, a pointing and selecting icon 111 is shown in the attendee's view presented by headset 580. Here, it is contemplated that the pointing icon 111 would persist regardless of location and orientation of headset 580 and would be controllable by a mouse or other mechanical control device. In this case, as icon 111 is moved via a mouse device or the like, icon 111 would remain in the attendee's FOV and would interact with any content in that view. A currently aimed at content set or attendee representation may be highlighted as described above. To select a content set or attendee representation an attendee may simply use a mouse device or the like to click thereon after which other actions may be performed. For instance, if an attendee representation 75*d'* were selected persistently, as the attendee rotates her head to the left, the selected attendee representation may be dragged by that activity to a different location and dropped there, causing other content and representations to shift or be automatically replaced by the dropped representation.

Figure 37:
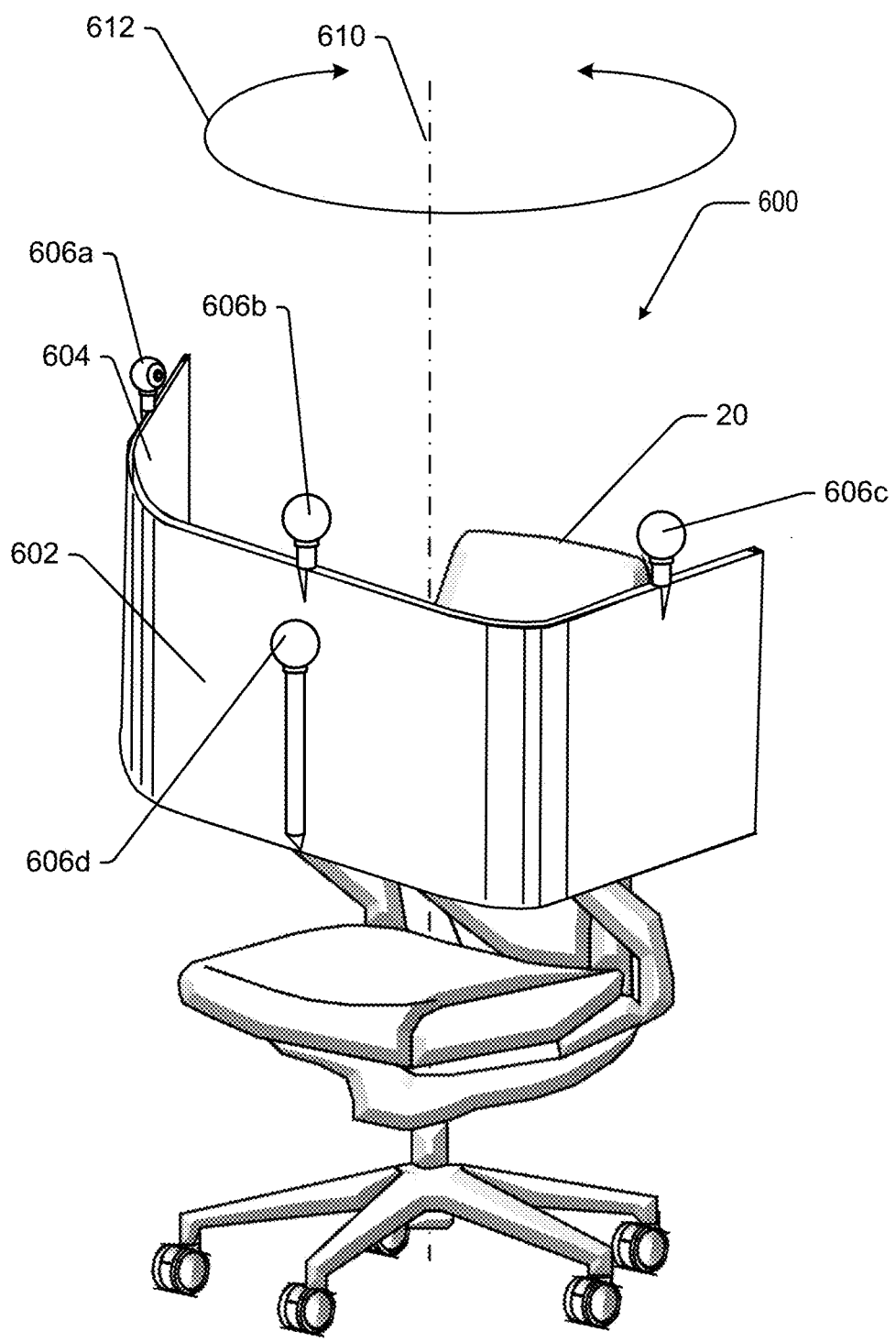
FIG. 37 is another enhanced reality personal configuration that is consistent with other aspects of the present disclosure.

Another personal workstation or lounge station 600 is illustrated in FIG. 37 that includes a curved emissive surface assembly 602 mounted to a supporting task chair 20 to face and generally surround an attendee (not illustrated) when seated in the chair. Assembly 600 also includes cameras 606*a* through 606*c* akin to the cameras described above that obtain video from different locations about the seated attendee. A fourth eye level camera is shown at 606*d* to indicate that in other embodiments where the surface assembly 602 is transparent, that one or more of the cameras may be mounted behind the surface to make better eye level video. While not shown, assembly 600 would also include speakers and one or more microphones.

In FIG. 37, screen assembly 602 forms an emissive surface 604 that faces a seated attendee to present meeting information thereto. While not shown, it is contemplated that a view similar to the FIG. 6 view may be presented to the seated attendee where the attendee can rotate her head to fix her ST on different TOIs presented on surface 604. Camera video from assembly 600 is processed to identify the attendee's ST and an instantaneous TOI which is then used to drive representations of the seated attendee at other stations and in other spaces.

While an entire meeting scene like the one shown in FIG. 6 may be presented on surface 604, in other cases only a sub-portion of the scene may be presented at any time. In this case, it is contemplated that as an attendee seated in assembly 600 rotates chair 200 and the attached screen assembly 602 about the chair axis 610 as indicated by arrow 512, the scene on surface 605 would also rotate so that a different sub-scene of the scene shown in FIG. 6 would be presented. Thus, surface 604 would operate similar to the headset 580 shown in FIG. 36 as a "window" into the augmented world defined by the orientation of surface assembly 602.

Referring again to FIGS. 2 and 6, it has been recognized that a customized meeting view like the one illustrated is not just as good as being collocated with other attendees in a multi-attendee conference workspace and, instead, in many ways, is better than the reality of collocation. To this end, the customized view enables a remote attendee to arrange other linked attendees in whatever arrangement the remote attendee chooses, may enable the remote attendee to increase and decrees the sizes of other attendee representations, may allow a remote attendee to always have facial views of one, all or any subset of other linked attendees so that all facial expressions can be viewed, etc.

Figure 38:
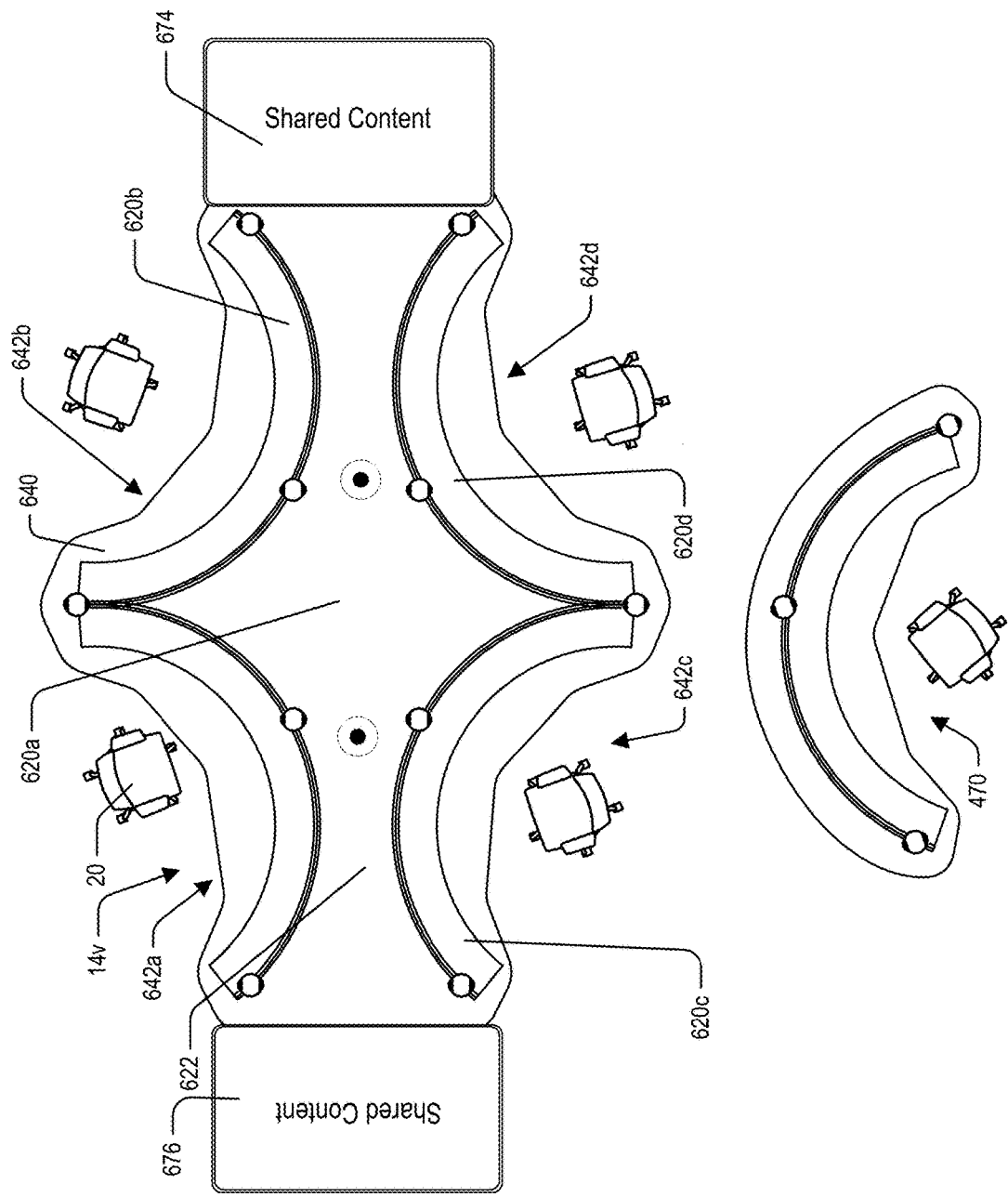
FIG. 38 is a top plan view of another multi-attendee conference space consistent with at least some aspects of the present disclosure.

In some embodiments it is contemplated that an emissive surface structure similar to the structure shown in FIGS. 2 and 6 may be presented to one or each of a set of collocated attendees in a multi-attendee conference space so that some or at least a subset of the additional features that are available to a remote attendee can be available to collocated attendees. To this end, see FIG. 38 where a workspace or workspace assembly 14*v* includes a table having a tabletop 640 that has straight edges at opposite short ends and that is undulated to form four local attendee alcoves at 642*a* through 642*d*, first and second on a top edge as illustrated and third and fourth along a bottom edge spaced across from the first and second. Shared content emissive surfaces 674 and 676 are arranged at the opposite short ends of the table assembly to be used as large format displays for commonly shared content in the space 14*v*.

Four emissive surface assemblies 620*a*, 620*b*, 620*c* and 620*d* are shown integrated into a conference table 622, one surface assembly at each of the four alcoves 642*a* through 642*d*. Each of the surface assemblies is similar and therefore, in the interest of simplifying this explanation, only assembly 620*a* will be descried in any detail unless indicated otherwise.

Figure 39:
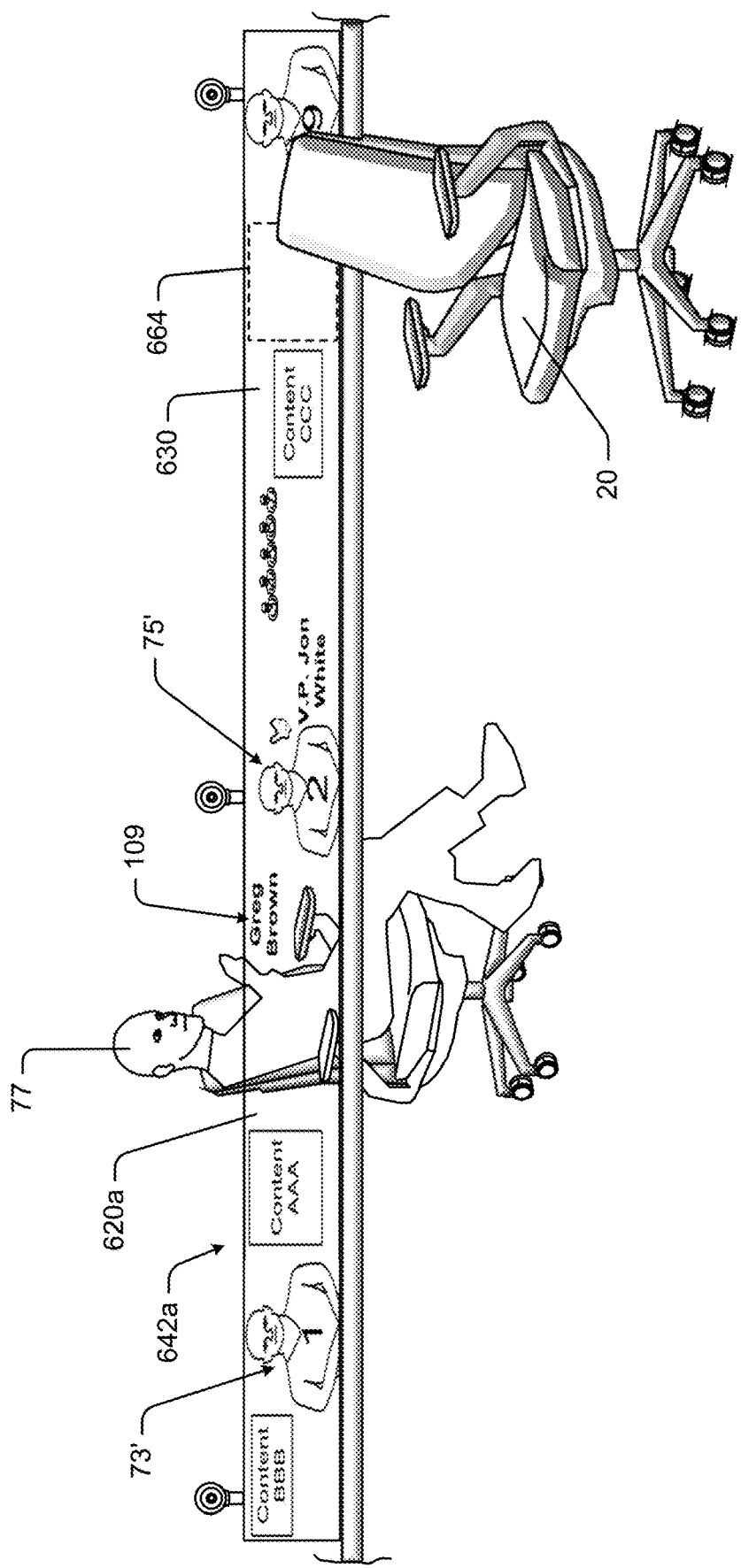
FIG. 39 is a side plan view of one of the user stations in FIG. 38.

Referring also to FIG. 39, assembly 620*a* includes a curved emissive surface 630 that is angled rearward to face somewhat upward at an attendee that assumes a position adjacent thereto and generally curves about a location that the attendee in chair 20 assumes during a meeting. Each surface 630 has a height dimension above the tabletop surface 640 that enables an attendee adjacent thereto to easily look over a top edge to see other local attendees in other alcoves about the table assembly as shown at 77 in FIG. 39. As shown, augmented content may be added to surface 630 for local attendees that share space 14v as shown at 109 where the content is spatially associated with the real world attendee on surface 630. In addition, remote attendee representations akin to those described above with respect to FIGS. 2 and 6 may be provided at other locations on surface 630 as shown at, for instance, 73' and 75' and other smaller attendee representations may be located in an attendee queue as at 652. Copies of shared content may be presented on surface 630 or, in the alternative, an attendee may open up private content that is not shared on surface 630 for previewing purposes, to search for other interesting content that the attendee may want to share, etc. In all cases, additional augmenting content may be added to surface 630 adjacent each or at least a subset of the remote attendee representations.

In embodiments where other local attendees are located in locations that are not directly viewable in the real world by an attendee at alcove 642a, the local attendee may also be represented on surface 630. For instance, in FIG. 38, a standalone local attendee station 470 is shown that includes an integrated emissive surface assembly akin to assembly 620a where an attendee at station 470 would typically be located behind the attendees at each of alcoves 642c and 642d. In this case, in order for the attendee at station 470 to have a good view of the attendees at alcoves 642c and 642d, directional video representations of those attendees may be presented at station 470 while a directional video representation of the attendee at station 470 may be presented at each of surface assemblies 620d and 620c so that attendees at those alcoves have a good view of the attendee at station 470.

In still other cases the emissive surface at each of the workspace alcoves 642a through 642d may include a transparent emissive surface akin to the surface described above with respect to FIGS. 2 and 6 so that augmenting content can be added to the surface in a heads up display. To this end, see FIG. 40 where assembly 620a is shown to have a transparent emissive surface 630 so local attendee 77 can be seen through transparent surface 630 and where augmenting content is presented again at 109 that is spatially adjacent attendee 77 when viewed through the surface 630. Other remote or local non-directly viewed attendee representations may be presented in a large life size format as shown at 73' and 75' in FIG. 40.

Again, in cases where augmenting content is to be associated with and applied to an emissive surface for a local attendee (see again 77 in FIG. 39), server 16 may limit the locations at which other content or other remote or local attendee representations will be presented on surface 630 to ensure that there is no overlap. Thus, for instance, in FIG. 39, because local attendee 77 is viewable through a surface 630 at the illustrated location, server 16 would automatically not present other content on the section of surface 630 through which attendee 77 is viewed. Here, if another one of the small attendee representations were to be enlarged, for instance, the enlarged representation may be presented in open space 664 as opposed to at a location that could impede a view of attendee 77 through surface 630.

Figure 40:
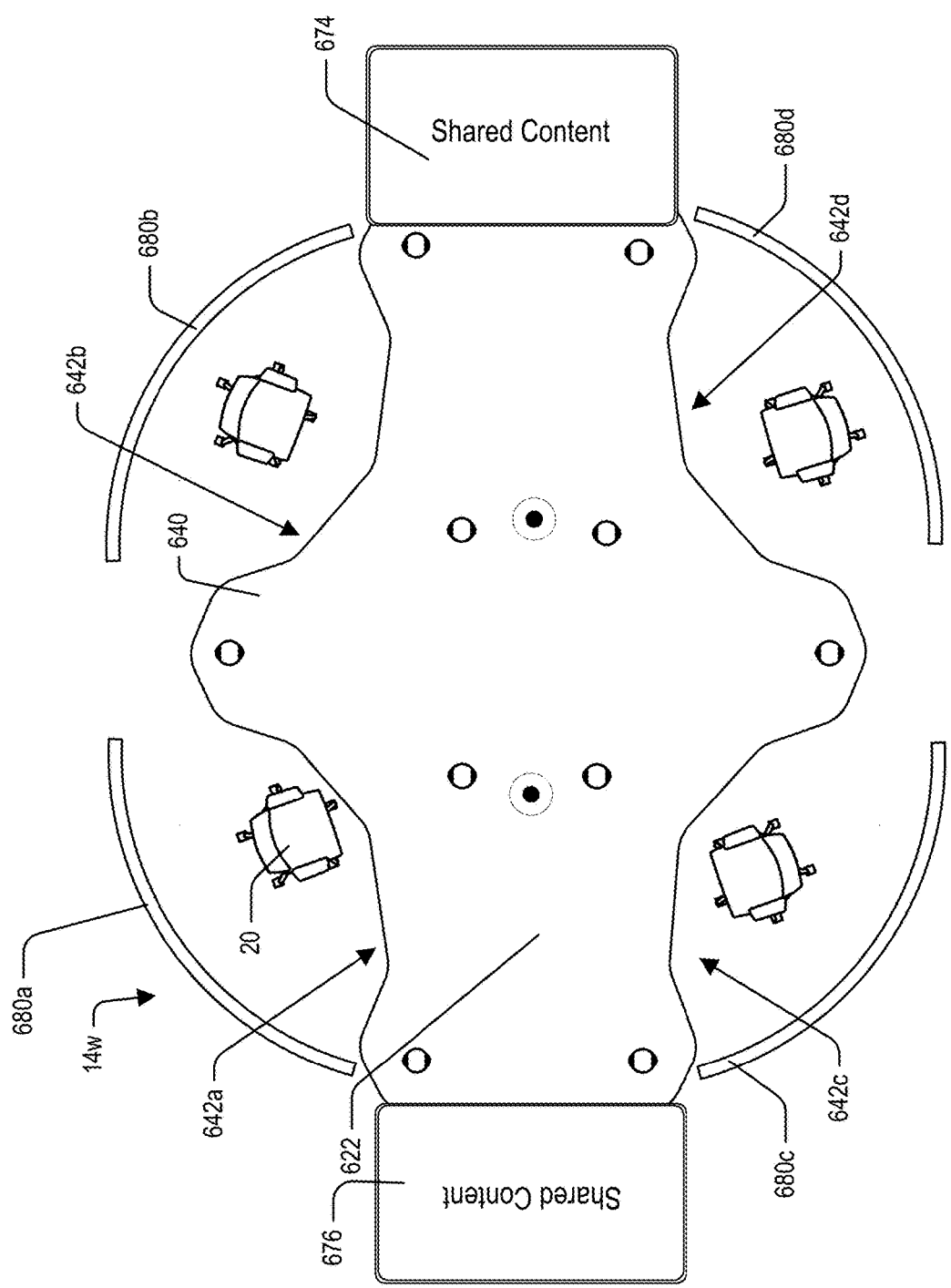
FIG. 40 is another multi-attendee conference arrangement in top plan view.

Referring to FIG. 40, yet one other workspace arrangement or workspace 14w that is consistent with at least some aspects of the present disclosure is illustrated. Workspace 14w includes a table assembly with a tabletop shaped similarly to the identically labelled tabletop in FIG. 38. Again, two common display screens 674 and 676 are mounted at opposite ends of the table assembly. Instead of including emissive surface assemblies integrated into the tabletop, space 14w includes four emissive surface assemblies 680a through 680d for presenting content and remote attendee representations as well as augmented content for viewing by the local attendees. Here, for instance, when an attendee is located in alcove 642a, content associated with that attendee may be presented on the emissive surface formed by assembly 680a. As illustrated, assembly 680a has a large concavely curved emissive surface that faces alcove 642a and may present content above or to the side of the attendee at alcove 642a. The other assemblies 680b through 680d are constructed in a fashion similar to assembly 680a and are simply arranged to the rear ends of associated alcoves 642b through 642d, respectively. In FIG. 40, as in the other systems described above, in at least some cases, directional videos of remote attendees would be placed on surfaces of assemblies 680a through 680d.

In each of the systems described above, server 16 may be programmed to automatically store data collected during a meeting to enable any attendee or even an absent attendee to revisit or experience the meeting for a first time. In some cases an attendee that attended an original meeting and that customized views during the meeting may be limited to those customized views when the meeting is subsequently revisited. Thus, for instance, referring again to FIG. 8, if the eighth attendee 69 had the customized view shown at some specific instance in time, when the eighth attendee revisits the meeting, at that same instant in the replay, the eighth attendee would only see the view shown and no other.

In other cases server 16 may store all of the raw data collected during a meeting so that any views of any attendees or content may be generated and presented. Here, in effect, as the attendee revisits the meeting, the re-visiting attendee would operate like a dormant remote observer during the original meeting, selecting and customizing views on the fly any causing different directional videos of all of the attendees to be presented, based on the revisiting attendee's point of view as well as the instantaneous TOIs of each attendee during the prior actual meeting.

As an attendee that participated in the original meeting revisits the meeting, the re-visiting attendee will have the opportunity to "see" herself during the meeting as she will be represented in the stored meeting data.

In at least some cases it is contemplated that an attendee may be able to supplement a meeting dataset in some ways. For instance, while revisiting a meeting, an attendee may be able to add a note or an audio file (e.g., a short dictation) at a specific time during the re-visited meeting or to some specific content or representation presented during the meeting. Here, as an attendee supplements meeting content, in at least some cases the supplemental content remains separate from the original meeting data so that the original data is not polluted by the supplemental content. Where an attendee supplements content, the attendee's identification may be added to the supplemental content so that anyone revisiting the meeting content thereafter knows who added the supplemental content.

In many cases project teams will use systems of the above described types during relatively long term projects (e.g., weeks, months or even years long). In cases where work product development spans several consecutive meeting sessions, the server 16 may simply set up customized and other attendee views in the exact same way that they were set up at the end of the first meeting when the second meeting commences. By setting up meeting views to mirror most recent session views, project teams can expedite the process of getting back into the flow of thinking for a project.

B. Virtual Reality Systems

The present disclosure describes systems and methods for implementing and utilizing VR in a conferencing and office space environments. Nevertheless, as in the case of the AR/MR systems described above, any of the VR concepts or aspects described herein will also be useful in other industries including hoteling, education, medical and other industries and therefore, unless specifically limited by the claims at the end of this disclosure, the present invention should not be limited by industry or space type.

Data processing/analytic aspects of VR can be executed by a VR server using techniques known to those having ordinary skill in the VR arts. It should be appreciated that aspects of the present disclosure described above with respect to AR are applicable to the aspects of the present disclosure described with respect to VR, unless the context clearly dictates otherwise. Similarly, any aspects or concepts disclosed hereafter in VR systems that are not described above in the AR and MR systems may be implemented in AR/MR systems unless there is some reason that those concepts could not be implemented in AR/MR.

Figure 41:
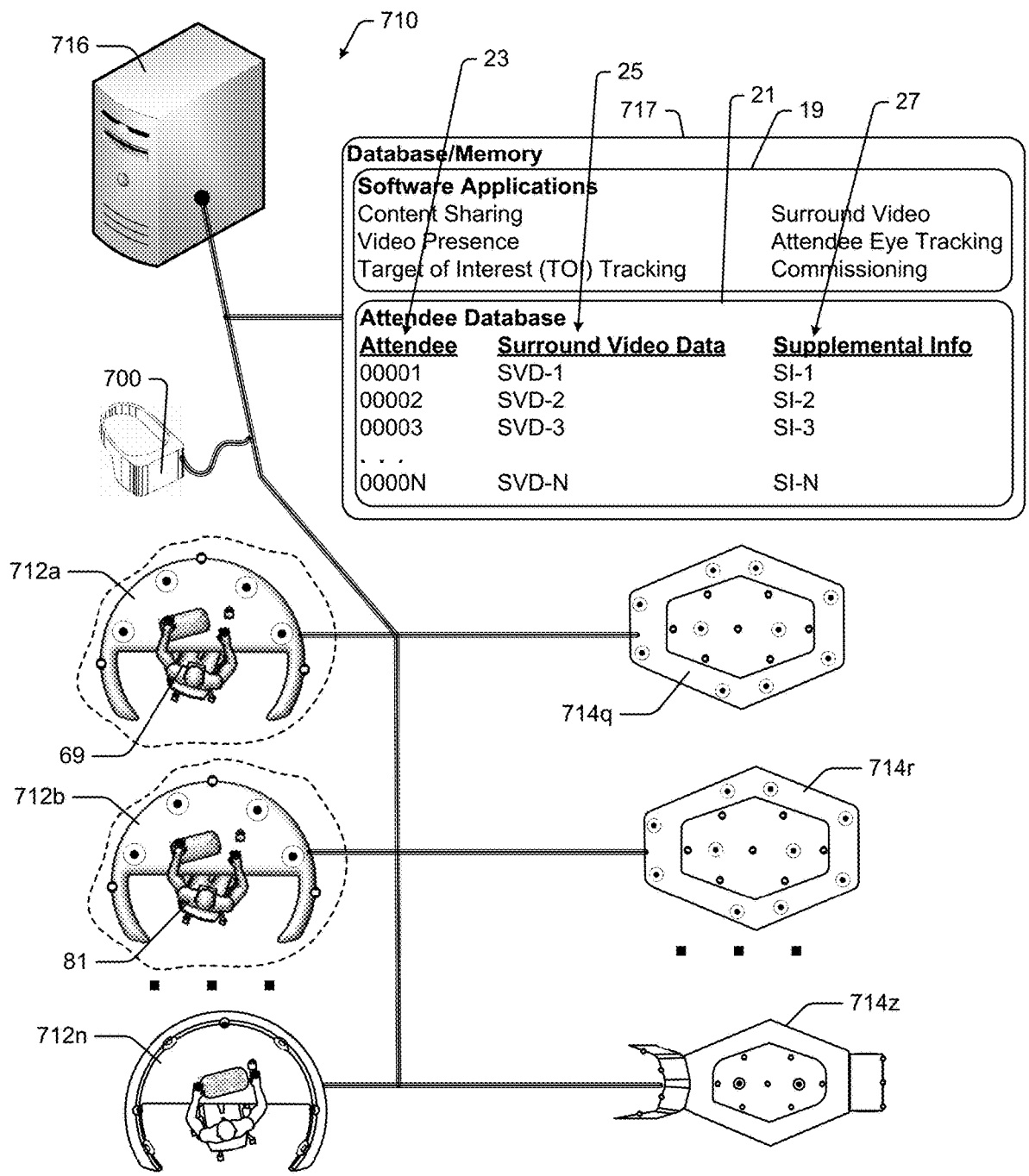
FIG. 41 is a virtual reality system akin to the system shown in FIG. 1.

Referring now to FIG. 41, an exemplary VR system 710 is similar to the AR/MR system 10 described above with respect to FIG. 1 and other figures in that it includes one or more servers or other types of processors 716 and a database 717 as well as affordances for supporting individual meeting attendees as well as attendees that collocate during a meeting. The difference in the VR system is that, in most cases, the personal workstations and multi-attendee spaces will rely more heavily on VR headsets 700, contacts, or other wearable devices to present the VW to meeting attendees. Thus, personal workstations 712a, 712b, etc., and the multi-attendee workspaces 714q, 714r, etc., will have fewer large common emissive surfaces and more headsets 700.

Nevertheless, in at least some embodiments VW experiences may be had at personal workstations and in workspaces that include large emissive surfaces that at least in part define the stations or spaces and where headsets are not employed. In fact, in some cases it is contemplated that some personal stations or multi-attendee workspaces may include common surfaces to create VR experiences while other stations and workspaces require attendees to wear headsets. Consistent with this understanding, in FIG. 41, stations 712a and 712b are shown where attendees wear headsets (see also FIG. 42) while station 712n is shown where an attendee has a station similar to the AR/MR stations 12a described above, albeit where the station emissive surfaces would not be transparent and instead would be opaque.

While not described here in detail, it should be appreciated that other systems are contemplated where some personal workstations or multi-attendee workspaces may be of the AR/MR type while others may be of the VR type, some AR/MR types may include large emissive surfaces that define workstations or spaces and others may require attendees to wear AR/MR glasses or headsets and some VR types may include large emissive surfaces that define workstations or spaces and others may require attendees to wear VR headsets.

While many different VR hardware arrangements are contemplated, unless indicated otherwise, the VR concepts will be described in the context of a VR system where all attendees wear VR headsets like headset 700 shown in FIG. 41, regardless of whether or not attendees are collocated or remotely located at a personal workstation. More specifically, referring to FIG. 42, the VR aspects of this disclosure will be described in the context of the system shown that includes one multi-attendee VR workspace 714q and first and second personal VR workstations 712a and 712b where first, second and third attendees 73, 75 and 77 are collocated at workspace 714q and fourth and fifth remote attendees 79 and 81 are located at the first and second workstations 712a and 712b, respectively.

The system is designed to present VW instances to at least a subset of meeting attendees. To this end, see, for instance, the exemplary VW instance 900 in a schematic top plan view presented to the third attendee 77 illustrated in FIG. 46 which is described in greater detail below. Hereafter, while VW instances are generally shown in top plan view in the interest of simplifying this explanation, it should be appreciated that the actual VW instances would be experienced in perspective heads up views as attendees look about in their VW instances. Thus, for example, see FIGS. 46 and 47 where a heads up perspective view in FIG. 47 corresponds to the third attendee's view in the top plan representation in FIG. 46. Similarly, in FIG. 43, fourth attendee 79 experiencing VW instance 780 would see the first through third and fifth attendees arranged about the tabletop representation 782 with content windows 33a, 35a and 37a hovering in space in the illustrated locations. Many other VW instances are contemplated and several are described in greater detail hereafter.

Each of workstations 712a and 712b are similarly constructed and operates in a similar fashion and therefore only station 712a will be described here in some detail. Station 712a includes a table assembly akin to the table assemblies described above in the AR/MR systems. To this end, table assembly 800 includes a tabletop member 730 forming a tabletop surface 732 and having a shape that guides the attendee to generally sit in a specific location along the edge of the tabletop 730 that is the focal point of cameras that are arranged about the tabletop structure. Thus, an alcove or recess formed by the edge of the tabletop restricts lateral movement of an attendee that occupies the station.

Exemplary station 712a includes an arrangement of cameras 734a through 734c about the alcove to be occupied by an attendee present at the station. Here, as in the case of the AR/MR assembly above, the cameras are designed to obtain video of the attendee at station 712a that can then be used to drive directional videos, here referred to as directional avatars, within VW instances presented to attendees at other stations and in other spaces. In addition to being directional, the avatars may be imbued with other attendee characteristics picked up in the camera videos like posture, fidgetiness, etc., so that those aspects of communication can be mirrored for other attendees to perceive. Here, where an attendee wears a non-transparent headset 700, cameras 734a through 734c cannot pick up on facial expressions in most cases and therefore that form of communication would be substantially muted at best. In other cases it is contemplated that headsets 700 may include substantially transparent glasses so that the station cameras can pick up facial expressions presented in the directional videos at other stations and in other spaces.

Exemplary station 712a also includes a plurality of speaker/microphone assemblies 740 arranged about the location to be occupied by an attendee for receiving audio from the attendee as well as for providing directional audio to other attendees at the other stations and workspaces during a meeting. As in the AR and MR systems described above, spoken voice messages from other attendees may be aligned when broadcast at station 712a with the directional video representations of those attendees in the VW instance presented at station 712a.

Station 712a further includes input devices of some type such as, for instance keyboard 742 and mouse 744 that rest on tabletop surface 732. A pointing and selection icon 111 controllable via mouse 744, keyboard 742 or some other mechanism is presented in VW instance 780 that can be moved about in the attendee 79's view to hover over, select, drag, etc., TOIs and other tools within VW instance 780. Instead of being controlled by a mechanical device, icon 111 may be controlled by attendee gestures at station 712a that are sensed by one of the station cameras or by some other sensor device at station 712a.

Figure 42:
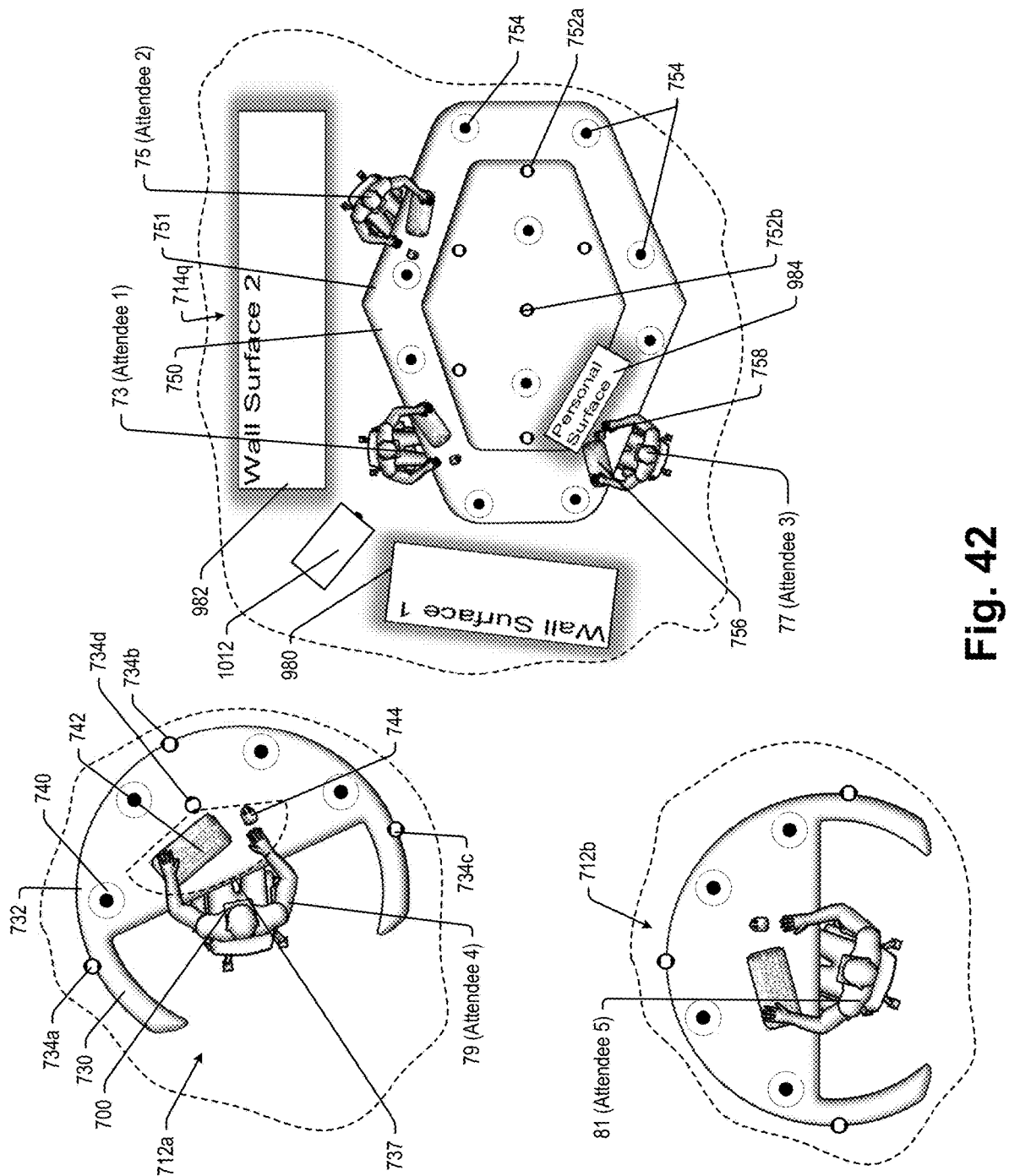
FIG. 42 is a top plan schematic view of two personal VR workstations and one multi-attendee conference space arrangement useable to link attendees together in a VR space.
Figure 43:
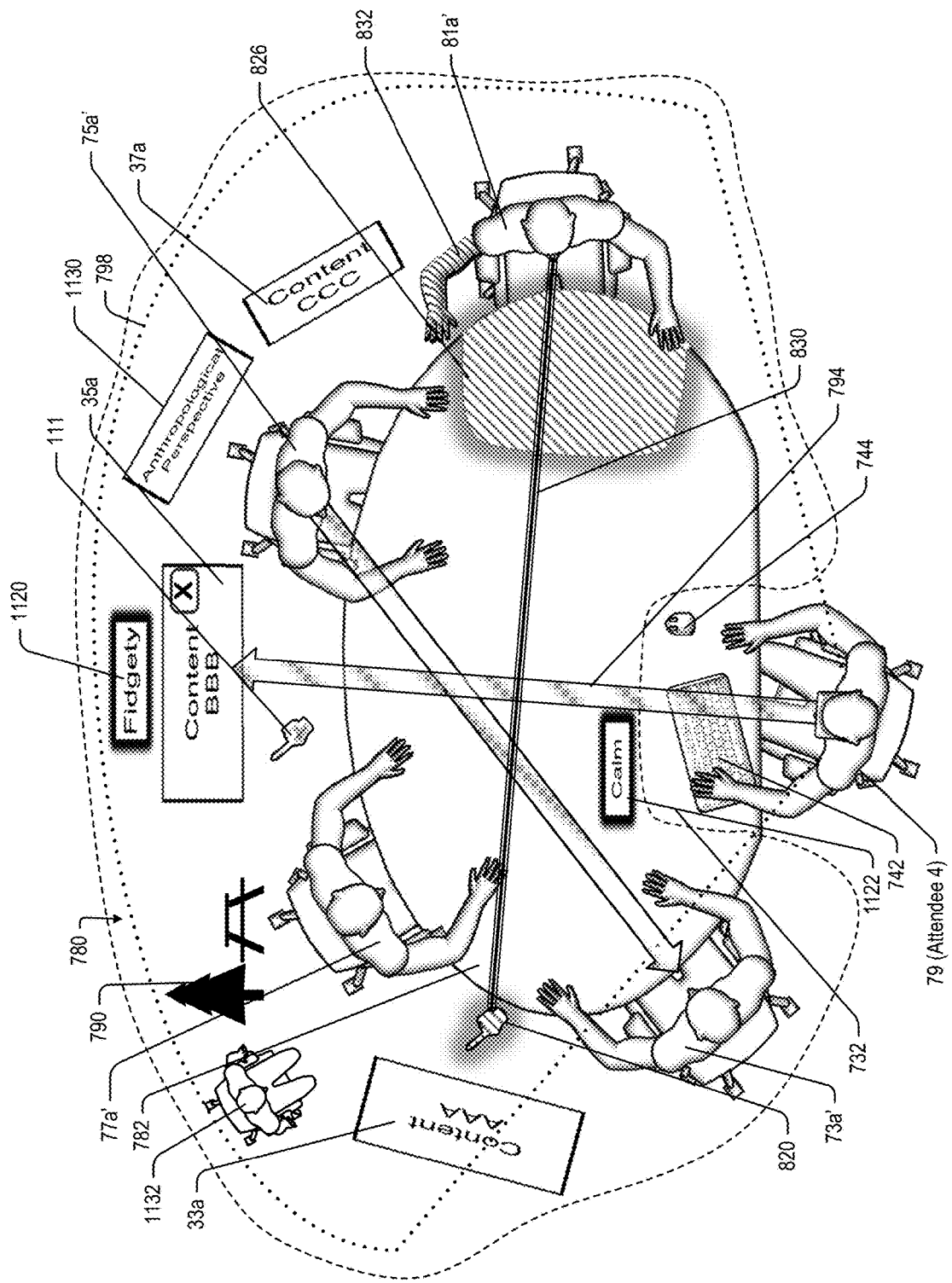
FIG. 43 is a top plan view of one VR instance experienced by one session attendee.

Again, FIG. 43 shows a top plan view of the fourth attendee's VW instance 780 that may be experienced at a specific instant in time by the fourth attendee 79 at station 712a in FIG. 42. In at least some embodiments icon 111 may remain stationary within VW instance 780 unless moved by some attendee activity, In this case, as attendee 79 turns her head left or right, icon 111 would remain at its location and eventually the attendees FOV 798 would not include icon 111. In other embodiments icon 111 may remain stationary in the attendee's FOV unless moved within that FOV by the attendee and may be restricted to always remain in the attendee's FOV. Here, as the attendee turns her head left or right or tilts her head up or down without moving icon 111, the icon 111 would remain at the same location in the attendee's FOV as the scene in the VW instance 780 changes there behind.

In at least some embodiments, at least one, a sub-set or all other attendees at other stations and in other spaces will also have pointing and selection icons within their VW instances for VW control. In some cases each attendee's selection icon will only appear in their VW instance. In other cases, two or more attendee icons may appear in each other's VW instances or within all VW instances at all stations and all workspaces. To this end, see in FIG. 43 that a second selection icon is shown at 820 that may be associated with the fifth attendee representation 81a'.

In some cases, it is contemplated that the selection icons 111, 820 may only appear if an associated attendee performs some activity that activates a change in the status of the selection icon. Thus, for instance, if attendee 79 moves mouse 744, icon 111 may appear and persist for 5 seconds prior to fading away. Similarly, if the fifth attendee 81 moves her mouse to control icon 820, icon 820 may appear for five seconds and persist while being moved or otherwise controlled and may then fade away.

In at least some cases, server 716 may provide visual activity queues within the VW instances that indicate who owns what selection icon within the instances. Thus, for example, see in FIG. 43 that a section of tabletop representation 782 at 826 is shown in cross hatch which mirrors the crosshatching on icon 820 to indicate that fifth attendee representation 81a' is associated with selection icon 820. As another example, see the "association line" 830 that links attendee representation 81a' to icon 820 in FIG. 43 that may only persist for a short time after the attendee activates (e.g., moves) icon 820.

Other visual indicators of attendee activity may cause the attendee representation to change in all VW instances. To this end, see in FIG. 43 that attendee representation 81a's arm is raised at 832 and is cross hatched with a hatching that matches icon 820 to indicate that attendee 81 is controlling icon 820. Other attendee representation modifications are contemplated for indicating icon control as well as other attendee activities such as, for instance, who is speaking, who is looking at the attendee associated with the VW instance (e.g., fourth attendee 79 in the case of instance 780 in FIG. 43), etc.

Referring again to FIG. 42, multi-attendee workspace 714q includes a large conference table assembly 750 that forms a tabletop surface 751, cameras 752a, 752b, etc., speaker/microphone devices 754 and input devices like keyboards 756 and mice 758 as well as task chairs to support several attendees in the space. In addition, the space 714q includes several VR headsets 700, one for each attendee located in space 714q. Again, input devices (e.g., keyboards, mouse controllers, etc.) rest on tabletop surface 751. In operation, station 712a and workspace 714q operate in similar fashions to support attendees in those locations during a VR meeting or session.

Consistent with the AR/MR systems described above, during operation, the cameras at station 712a operate to collect information on attendee posture and other physical traits and, perhaps facial expressions, etc. In addition, an eye tracker device or system integrated into the headset 700 tracks eye or sight trajectory (ST) of the attendee at station 712a while TOIs are presented within the VW instance shown by headset 700 to fourth attendee 79. Server 716 or another system processor identifies the TOI subtended by the fourth attendee's instantaneous ST as the fourth attendee's current TOI. The fourth attendee's current TOI is then indicated to other stations and workspace processors so that the virtual representations of fourth attendee 79 can be presented at those stations and in those spaces where the fourth attendee representations are shown as directional avatars or videos that are looking at the attendee's TOI in those VW instances.

In parallel with the above process, system server 716 receives other attendee TOIs from other headsets and uses those TOIs to drive representations of associated attendees at the other stations and in other spaces at the first workstation 712a so that fourth attendee 79 at station 712a experiences the other attendees looking at instances of the same TOIs at her station 712a.

Referring again to FIG. 43, each of the first through third and fifth attendee's is represented as indicated at 73a', 75a', 77a' and 81a', respectively, where those attendees are arranged about oval shaped VW table representation 782 about fourth attendee 79 shown in the real world. In addition, content windows are presented at 33a, 35a and 37a which may simply appear to hover in space near or slightly behind the VR attendee representations. Other visual ambiance (e.g., a jungle scene, a prairie scene, etc.), is represented simply by graphics 790 and may be presented behind the attendee representations and content windows and, where it exists, augmented content as well. It should be recognized that graphics 790 are only exemplary or symbolic and that much more complex graphical scenes would be presented in many cases.

In FIG. 43, within her VW instance 780, attendee 79's ST is directed toward content window 35a as indicated by arrow 794 even though her full FOV includes the view indicated at 798. Attendee representation 75a' shows the second attendee looking in the direction of the first attendee representation 73a' as indicated by arrow 794 to mirror that the second attendee 75a in her VW instance is looking at the first attendee representation. The other attendee representations 81a', 77a' and 73a' show those attendees with STs aimed at the TOIs for each of those attendees in their own VW instances. Here, each attendee representation may be shown talking and performing other gestures that mirror gestures made by the attendees and picked up by the cameras in their RW locations.

In FIG. 43, it is contemplated that fourth attendee 79 may select any TOI in her VW instance and move the TOI, magnify or reduce the size of the TOI, minimize the TOI, change how the TOI appears under certain circumstances (e.g., when speaking, an attendee representation type TOI may be highlighted, magnified by 15%, etc.). For instance, in FIG. 43, attendee 79 may select third attendee representation 77a' and drag that representation around to overlap the first attendee representation at 73a', causing representation 73a' to move clockwise around table representation 782 to the position previously occupied by representation 77a'. In other cases, an overlapped attendee representation may simply be removed or may be minimized within VW representation Here, other attendee representations may slide over automatically to make room for the newly positioned representation 77a' or may simply be removed if there is overlap. Similarly, attendee 79 may close out any of the illustrated content windows, open new content windows, etc.

Figure 44:
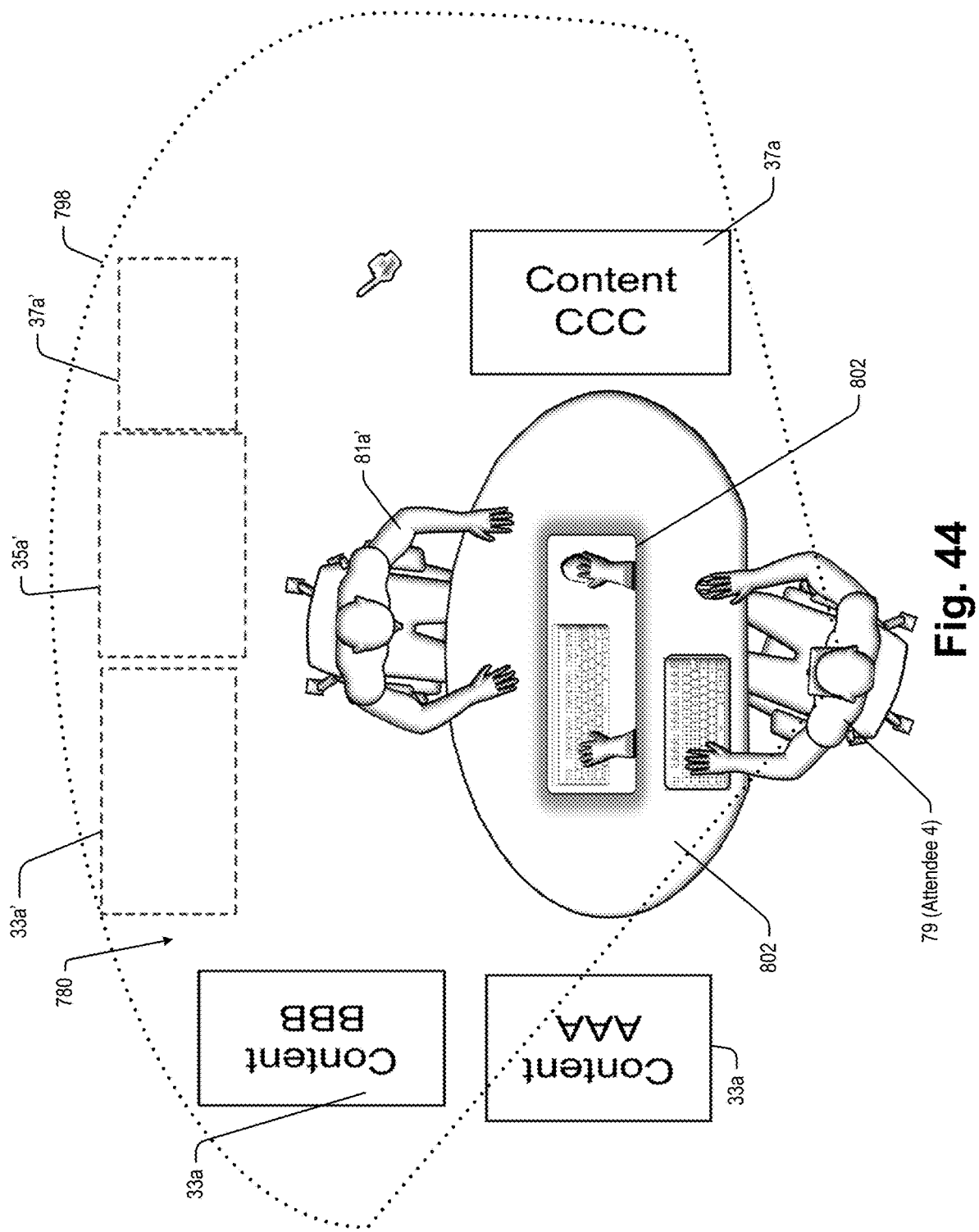
FIG. 44 is a view similar to the FIG. 43 view, albeit showing another VR instance as well as other VR system features.

In at least some cases virtual affordances may be changed as TOIs are added, eliminated, relocated or minimized within a VW instance. For example, if the first, second and third attendees were to disconnect from a meeting so that only the fifth and sixth attendees remain, the table 782 in FIG. 43 may automatically shrink down to a smaller size 802 and fifth attendee representation 81a' may slide or rotate over to a location immediately across from the fourth attendee 79 as shown in FIG. 44. In addition, referring again to FIG. 44, content windows may be automatically rearranged for better viewing by moving those windows within the VW instance to optimized locations. In some embodiments optimized locations may include locations generally within the central portion of the fourth attendee's FOV as shown in phantom at 33a', 35a' and 37a'. In other embodiments, optimized locations may include locations to the sides of the facing attendees in the VW instance as shown at 33a, 35a and 37a in FIG. 44, where the fifth attendee representation 81a's ST may be clearly associated with specific content windows when viewed. In this regard, see that in FIG. 44 content windows have been located on opposite sides of table representation 802 so that the fifth attendee's ST can be clearly identified when aimed at content CCC 37a as representation 81a' would look to that side of table 802. Content windows 33a and 33b may be presented with a minimum amount of space in the VW instance which enables attendee 79 to use the appearance of representation 81a' to determine which of those two windows the fifth attendee is viewing. As in the AR/MR systems described above, automatic visual aids may be provided to indicate where attendee 81 and other attendees represented in VW instance 780 are instantaneously looking (e.g., short term or persistent arrows), where most attendees represented in VW instance 780 are instantaneously looking or persistently looking, which content was most recently posted, etc.

In cases where attendee's do not wear headsets 700 and instead experience VW instances on large flat or curved display screens at workstations or in workspaces, the cameras at each station and in each space may pick up facial expressions used to drive directional videos or avatars in the VW instances at other locations in a fashion similar to that described above with respect to the AR/MR systems. In this case, collocated attendees would be physically present and would share one version of the VW on large common display screens in at least some embodiments.

In a case where at least one attendee wears a headset and at least some other attendees do not during a session, the attendee that wears the headset may be presented a VW instance where all other attendees, captured via cameras, are presented in the arrangement shown in FIG. 43, while the attendee wearing the headset may be presented in a fashion similar to that shown in FIG. 8 on an attendee representation assembly 120.

In at least some cases it is contemplated that an attendee's VW instance may include RW windows that allow the attendee to see into the RW when looking in some certain direction or at some RW TOI. To this end, for instance, where an attendee uses a RW keyboard and/or mouse device as an input to a VQ instance, the attendee may need to see the keyboard in order to effectively use that device (e.g., to locate specific keys). Here, in at least some cases, the VW headsets may be open below an attendee's eyes so that the attendee can look down through a real RW window in the headset to see a keyboard or other interface device while still having a heads up view in the VW instance. In other cases, the headset 700 may include a camera that captures an image of the keyboard or other device which may be presented in the VW instance below the heads up view of TOIs in the meeting. In other cases, referring again to FIG. 42, a separate camera 734d may be located at each attendee station or table position that has a FOV arranged to generate real time high definition video of the attendee's hands and mechanical interface devices like a keyboard and that video may be presented in the VW instance for the attendee to see when she tilts her head down in the direction of her hands in the RW.

In still other cases, where a camera images the attendee's hands and keyboard, the associated video may be presented as part of the heads up display at any convenient viewing position so that the attendee does not have to tilt her head or eyes down to see the keyboard and her hands. For instance, see in FIG. 44 that an interface window 888 has been opened up in the fourth attendee's VW instance where a video of the attendee's hands, the RW keyboard and the RW mouse are presented which may hover in space above the VW tabletop representation 802 but below the shoulders of the fifth attendee representation 81a' for easy viewing. As with many of the graphical features that may be presented in the VW instance 780, the interface window 888 may either be persistent or may fade away automatically when not employed for some threshold period (e.g., 10 seconds). Here, if window 888 fades away when not used for some period, window 888 may automatically reappear if the attendee touches one of the RW mouse or keyboard or selects one of the RW device buttons or keys.

In the figures that show VW instances, the phantom dashed lines that represent those instances are shown at times to not include the attendee that controls the instance as well as at least a portion of the tabletop surface and mechanical interface devices that are associated with the attendee to represent that an RW window exists at those locations for seeing into the RW in any of the fashions described above. For instance, in FIG. 43, a portion of table assembly 732 proximate fourth attendee 79 is shown to be outside the space defined by VW instance 780 to indicate a RW window.

Other RW windows are contemplated for viewing other RW TOIs through the VW instance. For example, see FIG. 46 where a third attendee's VW instance 900 includes a RW window 910 so that the third attendee can see first attendee 73 in the real world despite seeing all other attendees and TOIs in the VW instance. The FIG. 46 VW view is sort of like augmenting the VW instance with RW content and is explained in greater detail hereafter.

In at least some embodiments the system server 716 will blend RW affordances that can be seen and even touched into the VW instances so that the two worlds have a relatively seamless look and feel. For instance, see still FIG. 43 where the VW table representation 782 has an edge that is aligned with the edge of the RW tabletop 732 so that as fourth attendee 79 looks from the VW instance through a RW window, the RW affordances and VW affordances or representations are aligned. As another instance, see again FIG. 46 where the RW tabletop surface 751 is shown aligned with the VW tabletop surface representation 751d.

Referring again to FIG. 43, representation 780 is referred to herein as the fourth attendee's "VW instance" because that instance is different than the instances experienced by each of the other meeting attendees. To this end, at a minimum, VW instance 780 is different than most other VW instances experienced by other attendees to a common meeting in that no representation of attendee 79 appears in instance 780 but would appear in most other attendee's VW instances at other stations and in other workspaces (i.e., attendee 79 would not appear in her own VW instance, at least in most cases. In addition, similar to the way in which attendees in the AR/MR systems described above can have their own personalized meeting views in which attendee representations and other TOIs can be arranged according to personal preferences, in at least some VW systems contemplated, each attendee may arrange his or her own VW instance to present whatever TOIs she wants, whatever background she wants, and to present TOIs and other VW affordances in whatever arrangement she wants.

Figure 45:
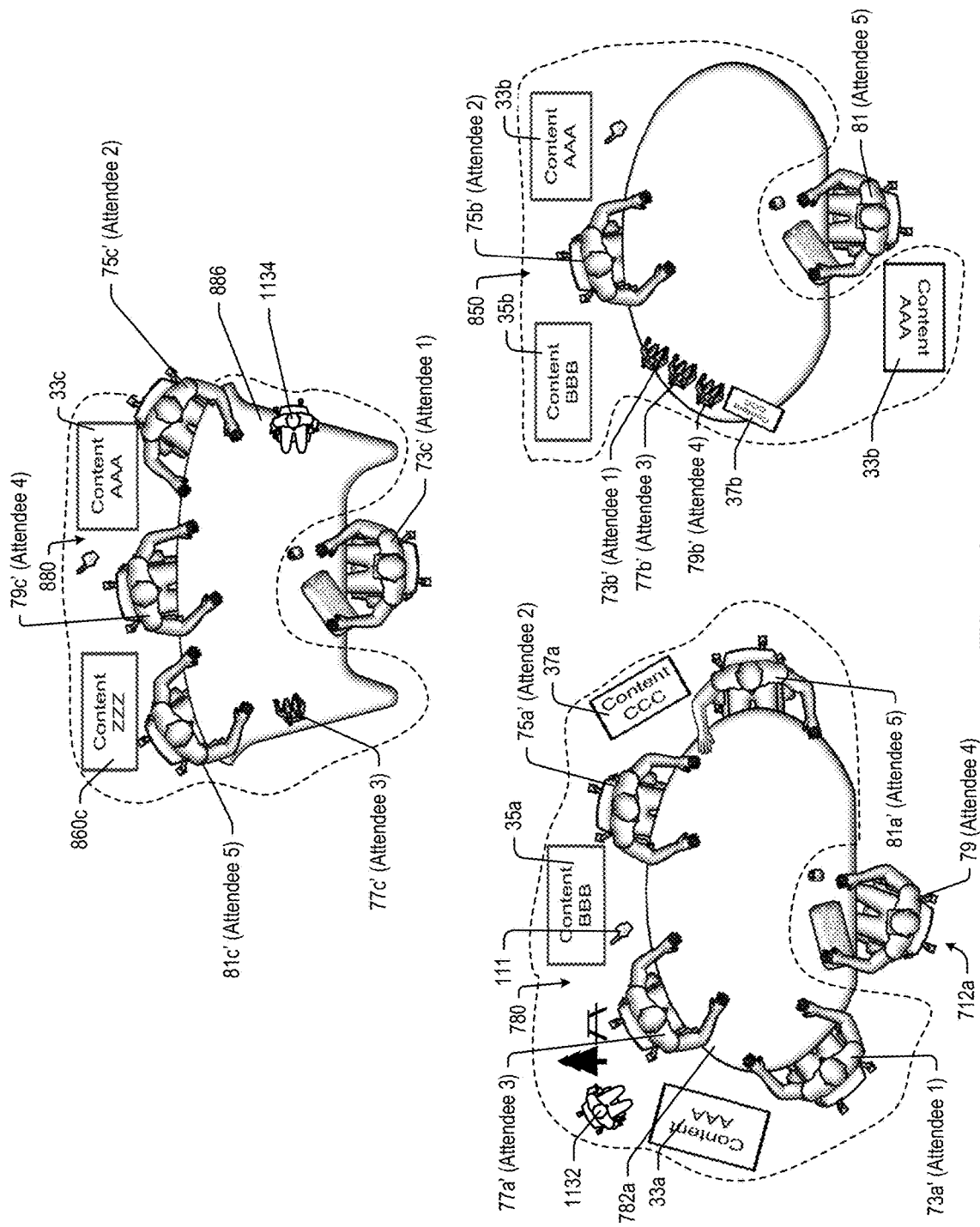
FIG. 45 shows three different VR instances that have been configured for the same on-going session by three different conference attendees.

Referring now to FIG. 45, VW instances for each of the first, fourth and fifth attendees 73, 79 and 81 are shown at 880, 780 and 850, respectively, where instance 780 replicates the same numbered instance in FIG. 43. While including a TOI set that is similar to the TOI set in VW instance 780, VW instance 850 accessed by attendee 81 shows the TOI set arranged differently as controlled by fifth attendee 81. Thus, for instance, while the fourth attendee VW instance 780 includes attendee representation 81a' in full life size across table representation 782a from a full size first attendee representation 73a' and to the right of fourth attendee 79, in the fifth attendee's VW instance 850, the first attendee representation 73b' has been minimized (e.g., made smaller) and places in a TOI queue along with minimized third and fourth attendee representations 77b' and 79b'a while the second attendee representation 75b' is presented across table representation 782b from RW fifth attendee 81. In addition, the content windows 35b and 33b in representation 850 are differently arranged than similar content windows 33a and 35b in VW instance 780. Content window 37b is shown in minimized size within the TOI queue in VW instance 850 but in a larger format at 37a in VW instance 780.

In at least some embodiments each attendee controlling his or her own VW instance will be able to select different general VW arrangements where different arrangements may be optimal for different types of activities. For instance, in some cases an attendee may want other attendees arranged about an oval VW tabletop as shown in VW instance 780 while in other cases an attendee may want all life size attendee representations arranged to directly face the attendee that controls the VW instance. In still other cases, a VW instance controlling attendee at a remote personal station 712a may want a VW instance that effectively mirrors a RW multi-attendee workspace where attendee representations in the VW instance that are present in the RW workspace are represented at their RW locations in the VW instance.

Referring again to FIG. 45, first attendee VW instance 880 shows a VW instance where the first attendee has selected a view in which other life size attendee representations are arranged generally across a VW tabletop representation 886. As shown, tabletop representation 886 has a shape that is different than the oval shapes presented in VW instances 780 and 850. Shape 886 is optimized to accommodate more attendees across representation 886 from the first attendee 73. In addition to having a shape that better accommodates the life size attendee representations across from attendee 73, the VW tabletop representation 886 includes virtual wing members 884 on either side of attendee 73. The wing members 884 in VW instance 880 are similar to the RW wing members 730 and should give first attendee 73 a sense of how she is restricted to a specific optimized location by RW structure. In other cases, the virtual wing members 884 may be provided where they have no relation to RW structure but where they help maintain attendee 73 in an optimized camera FOV at her station 712a.

Referring yet again to FIG. 45, VW instance 880 includes a minimized and hovering representation 77c' of the third attendee that is akin to the minimized representations in the TOI queue shown in representation 850, albeit where the angle of attendee representation 77c' is different. In each of the TOI queue shown in VW instance 850 and in the case of representation 77c' shown in VW instance 880, the minimized representations would, in at least some cases, be presented as directional videos giving visual queues as to what those attendees are looking at.

Referring still to FIG. 43, while VW instance 880 shows content window AAA at 33c, instance 880 does not include the BBB and CCC content windows that are shown in VW instances 780 and 850. In addition to showing content window AAA, instance 880 also includes an additional content window 860c showing content ZZZ that is not common with the other VW instances. Thus, different attendees may access different content that is not common with all or any other attendees at times during a meeting.

Figure 46:
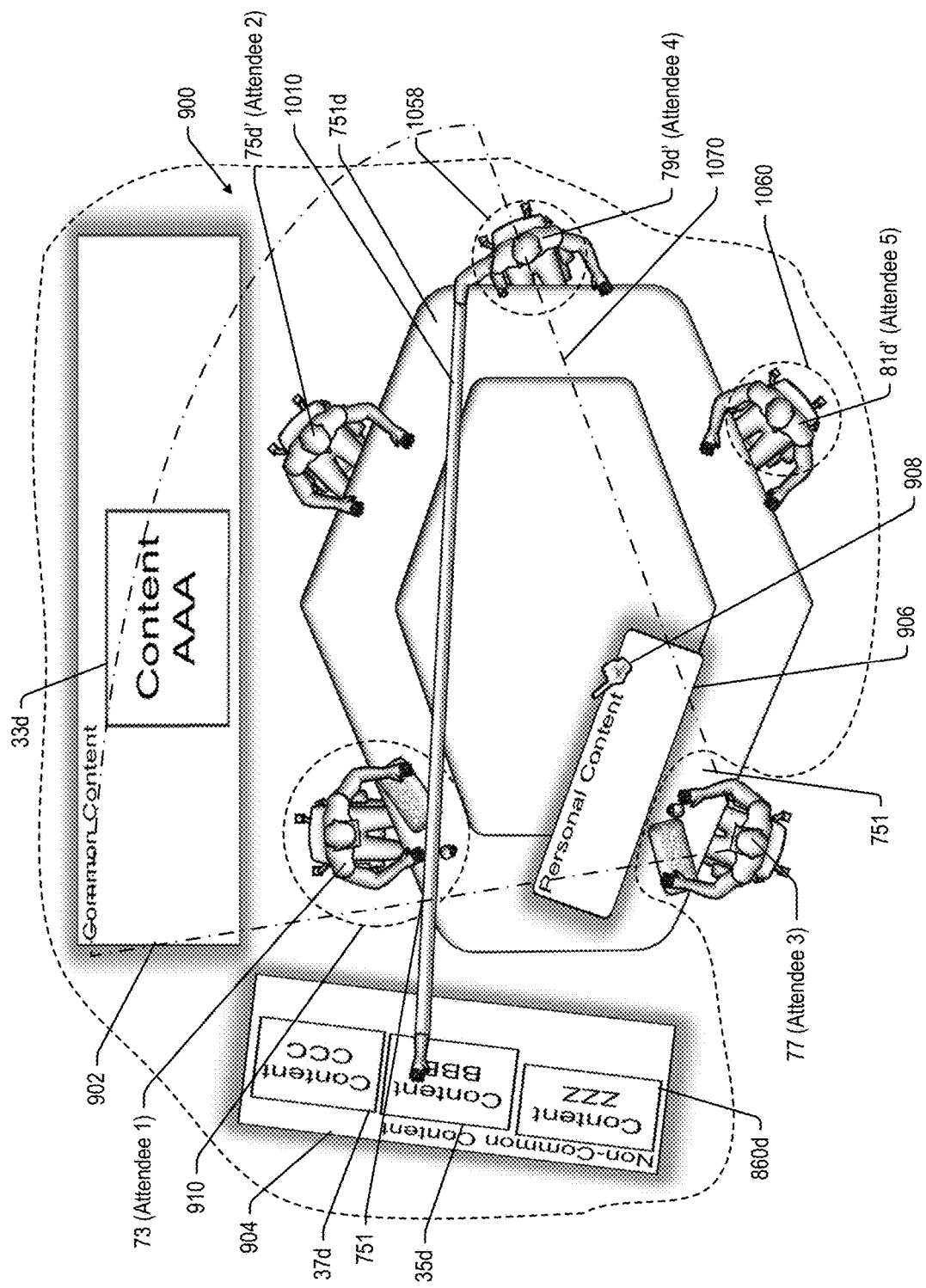
FIG. 46 is a top plan view of a VR instance presented to one session attendee.
Figure 47:
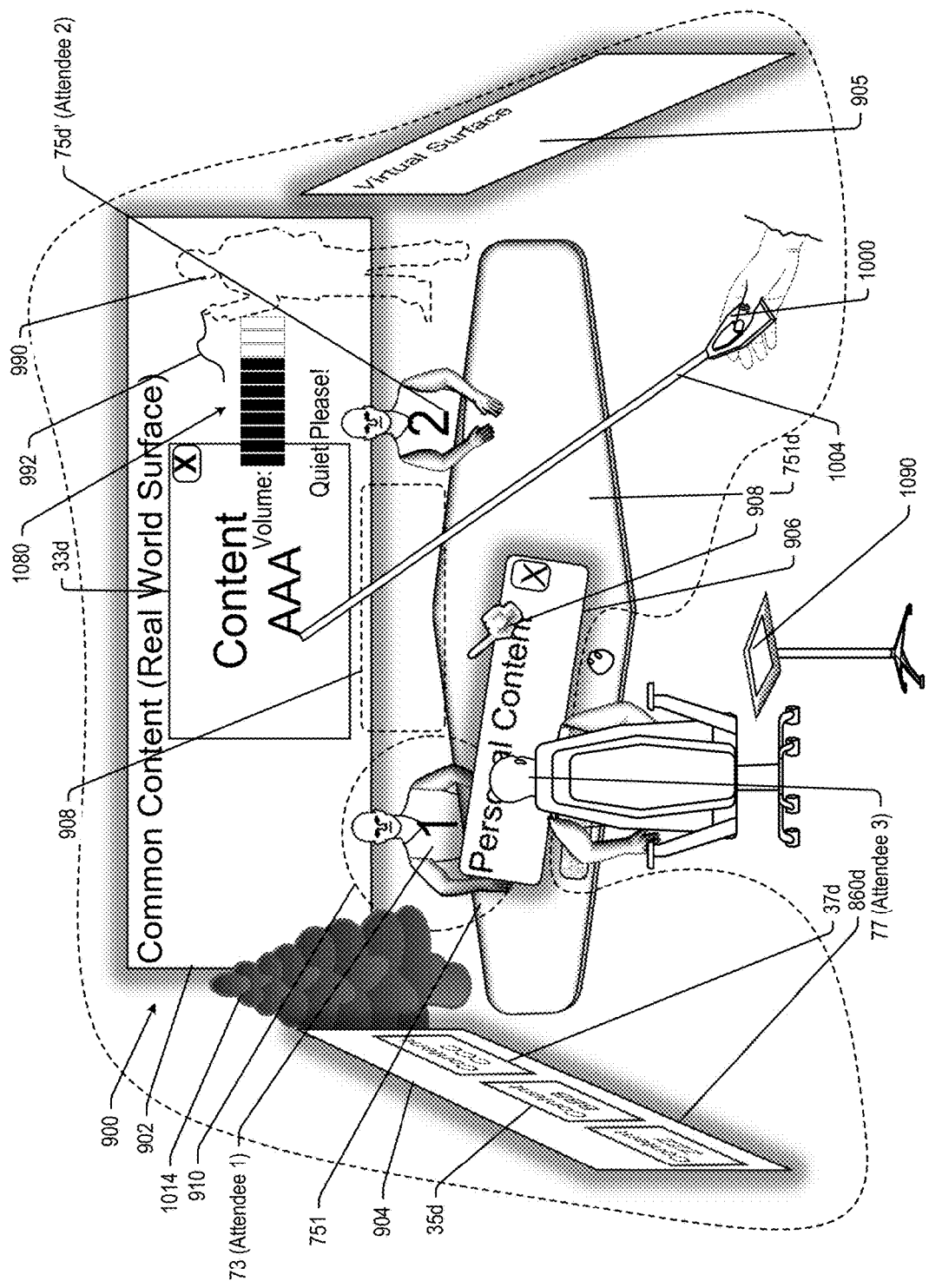
FIG. 47 is a side perspective view of a VR instance of an on-going session.

Referring now to FIGS. 46 and 47, a third attendee 77's VW instance 900 is shown in a top plan and a partial perspective (e.g., the fourth and fifth attendee representations from FIG. 46 are not shown in FIG. 47) view, respectively. Exemplary VW instance 900 is an example of a case where third attendee 77 has elected to have a VW instance that mirrors the multi-attendee workspace 714q that the third attendee occupies (see again FIG. 42) where the third attendee's perspective also mirrors the third attendee's RW location in workspace 714q. Referring again to FIG. 42, in the present example, each of the first, second and third attendees 73, 75 and 77 are collocated in workspace 714q.

In the VW instance shown in FIGS. 46 and 47, attendee 77 sees a VW representation 751d of the actual RW tabletop 751 and also sees a VW representation 75d' of the second attendee 75 at a location about VW tabletop 751d that mirrors the second attendee 75's location in workspace 714q. VW representations of the remote fourth attendee 79 and the remote fifth attendee 81 at stations 712a and 712b are shown at 79d' and 81d', respectively, in FIG. 46. Here, representations 79d' and 81d' may be automatically positioned by server 716 at unoccupied locations about tabletop representation 751d or they may have been placed there by commands received from third attendee 77.

Referring still to FIG. 46, as described above, an RW window 910 is presented in VW instance 900 where first attendee 73 can be seen in the RW which is integrated into the VW instance. Thus, in some cases a subset of collocated attendees may be seen through one or more RW windows 910 while a second subset may be presented via virtual representations (e.g., 75*d*).

Referring still to FIGS. 46 and 47, content windows 33*d*, 35*d*, 37*d* and 860*d* are also presented in VW instance 900. In the illustrated embodiment, content commonly shared with all other attendees is presented in a common content field 902 while content that at least one but not all attendees present in their VW instances is presented in a Non-Common Content field or window 904. Thus, for instance, as seen in FIGS. 46 and 47, only content AAA is common to each of the VW instances 780, 850, 880 and 900 and therefore only that content is presented in the common content field 902. Other content BBB, CCC and ZZZ is presented in non-common field 904. Separating common and non-common content gives the third attendee the ability to better understand what other attendees have immediate access to within their meeting and VW instances.

Referring again to FIGS. 46 and 47, a personal content field or window 906 is presented as a virtual hovering emissive surface within the VW instance 900 for use by the third attendee. As shown, field 906 hovers in front of the third attendee in VW instance 900, generally above the attendee's RW keyboard and mouse devices, but may be arranged lower than the faces or chests of other attendee's viewable in instance 900 so that the third attendee 77 can simply peer over field 906 to see other attendees. In other cases the personal content window 906 may be located at some other location that does not interfere or only minimally interferes with views of other attendee representations or other TOI representations such as, for instance, at the location indicated in phantom in FIG. 47 at 920.

Referring yet again to FIGS. 46 and 47, the third attendee has a pointing and selection icon 908 that hovers in her VW instance 900. As shown, icon 908 is hovering in a location that partially overlaps the virtual personal content field 906 and the tabletop representation at 751*d*. Here in at least some embodiments it is contemplated that the third attendee would be able to move icon 908 to virtually any location in her VW instance to select or otherwise interact with any TOIs or other information presented. Where icon 906 is located on a virtual surface that is closer than other TOIs in her VW instance, the icon would interact with the closest surface in the VW instance. For example, in FIG. 47, when icon 908 points at virtual personal content field 906, icon 908 would interact with content on that surface or in that field as opposed to any other content or TOIs that exist behind that surface in the VW instance 900.

In at least some cases it is contemplated that an entire computer desktop interface may be accessible in the personal content field 906 so that third attendee 77 could run any application programs and access any content therein as if field 906 were a RW computer display screen. In at least some cases the third attendee may be able to use icon 908 to move content from personal content field 906 to some other location in VW instance or vice versa. For example, if third attendee 77 has a word processor document opened in field 906, icon 908 may be used to select that document and to move the document or to copy the document to an existing or a new window in VW instance 900. In at least some cases, dragging a document from window 906 to any location in VW instance 900 that is not already occupied by some other TOI may cause the document to be opened in a new window at the document drop location. Similarly, selecting content window 33*d* via icon or any other window in VW instance 900, third attendee 77 may be able to move or copy that window content to her personal content field 906 and thereby to some type of personal data storage device like a laptop, smart phone, tablet device or into a personal database located at a remote server or the like.

Figure 48:
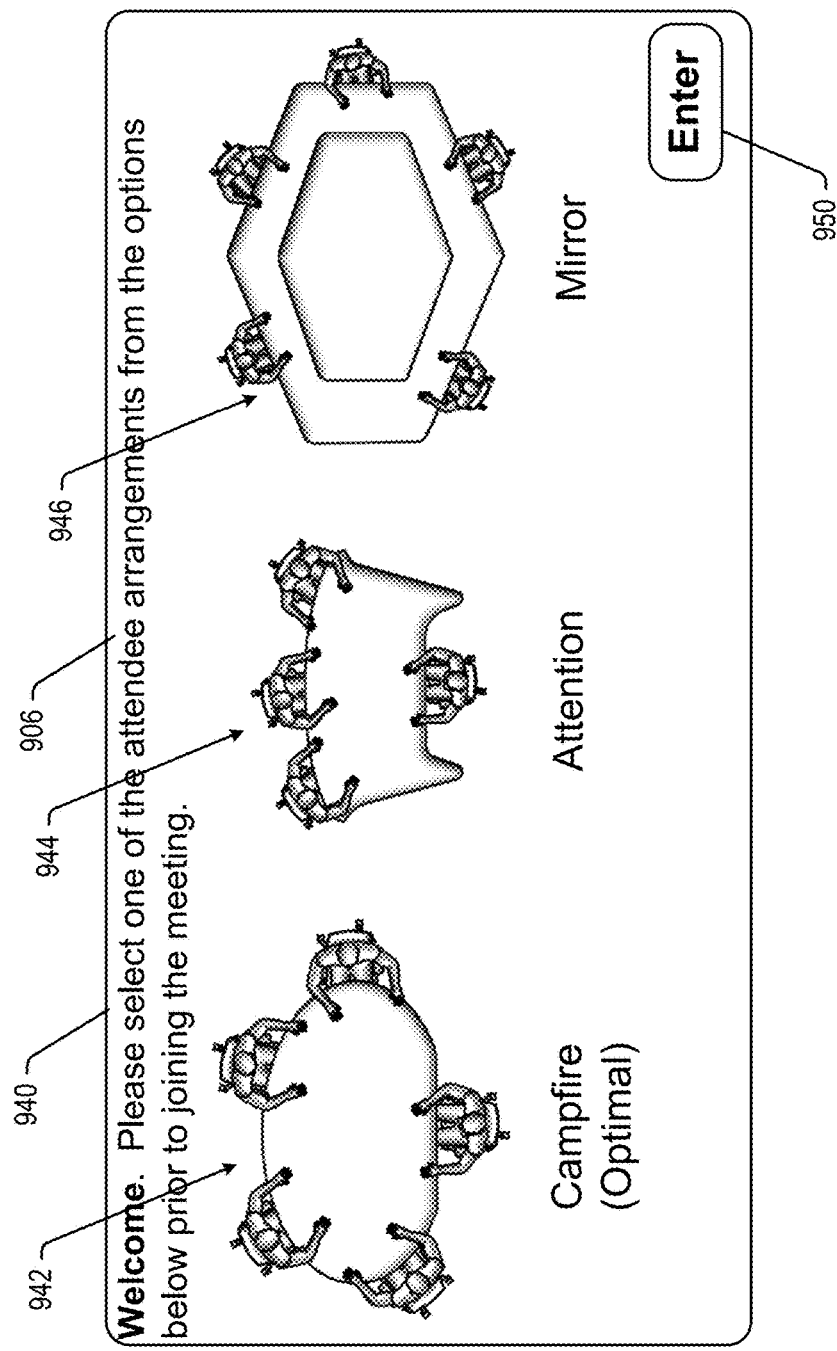
FIG. 48 is a view of a session arrangement tool that may be presented to an attendee to help the attendee select a pre-canned optimal arrangement of attendees for a session.

While attendees may arrange their VW instances in any way they like, in at least some cases a VW interface will present several pre-defined relatively optimized options for the attendee to select from, after which the attendee may be able to further customize her VW instance. For example, upon initially linking to a meeting via a VW headset or the like, the system server 716 may present the attendee an initiation interface 940 in her VW personal content field 906 (see again FIG. 47) including a list of VW instance type options as shown in FIG. 48. Exemplary options in FIG. 48 include a "Campfire" option 942, an "Attention" option 944 and a "Mirror" option 946 which correspond to the oval tabletop and arrangement shown in FIG. 43, the staple shaped tabletop and arrangement in instance 880 shown in FIG. 45 and the arrangement in FIG. 46 which mirrors the real life arrangement of workspace 714*q* shown in FIG. 42. Referring also to FIGS. 46 and 47, in some cases as an attendee hovers over one of the options 942, 944, 946, etc., server 716 may present a VW instance in real time that is consistent with the hovered over option. Here, interface 940 would remain in the personal content field 906 so that the attendee could simply toggle between the three options to get a sense of how each lays out other attendees and TOIs in general. Once a VW instance type is selected, the attendee may select an "Enter" icon 950 to link to an ongoing meeting and to instantiate her instance of the selected VW type.

While not shown in FIG. 48, it is contemplated that several initiation interface screen shots may be presented to an attendee in sequence when she initially links to a meeting to enable the attendee to set other VW parameters including how much augmented information is presented, the degree of perception augmentation presented, etc. For instance, should the system highlight speaking attendees, provide at least temporary ST lines, arrows or other indicia, highlight instantaneously most viewed TOIs, etc. Once an attendee's preferred parameters are set, those parameters may be stored for subsequent use during subsequent meetings to automatically set up the meetings per the prescribing attendee's preferences or, in the alternative, the preferences may only be applicable in cases where subsequent meetings are extensions of an existing meeting.

It is contemplated that the system server 716 may be programmed to present tool and other affordance representations in a VW instance that are associated with RW tools and other affordances. Interesting examples include VW representations of a keyboard and a mouse that are aligned with RW keyboard and mouse devices so that an attendee can view those devices in the VW while interacting with those devices via contact or touch in the RW. In the case of RW keyboard and mouse devices, while the representations are perceivable in the VW, input is received from those devices in the RW, not the VW.

In other cases it is contemplated that simple "dumb" tools and other mock type affordances may be provided in the RW where input is actually sensed in the VW instance. For example, in at least some cases a mechanical keyboard or mouse may be presented in the RW where the mechanical device generates no input signals and instead is simply provided as a haptic construct that an attendee can touch while entering commands and data in a typical fashion but where activities with those devices are sensed in the VW or by cameras or other sensors in the RW and used to drive various system applications.

As another example, see again FIG. 42 where first and second blank wall surfaces 980 and 982 exist within RW workspace 714q. See also FIG. 47 where the non-common content and common content fields 904 and 902, respectively, are presented in the VW instance 900, at locations which are aligned with the wall surfaces 980 and 982, respectively. Here, server 716 may enable local attendees to move through the RW workspace 714q (see again FIG. 42) while visually experiencing the VW instance over to either of the content fields 902 or 904 to interact with content windows therein via touch or gesture, to annotate content thereon, to run application programs, etc. When an attendee reaches out to touch one of the content fields 902 or 904 in the VW instance, the attendee feels the contact and therefore has a non-active haptic feedback that mirrors the real world sensation of touch.

As another example, see again FIG. 42 where a personal heads-up surface 984 is shown in RW workspace 714q. While shown in workspace 714q, surface 984 or other simple surfaces may also be provide at personal workstations 712a, 712b, etc. See also FIG. 47 where the personal content window or field 906 is presented in the VW instance 900 at a location that is aligned with the personal heads-up surface 984. Here, as in the case of wall surfaces 902 and 904, when an attendee reaches out in the VW to select or otherwise interact with virtual buttons and control tools or content in presented on surface 984, the attendee makes contact with surface 984 and the touch sensation mirrors the real world sensation of contact and operates as a simple haptic feedback mechanism.

Figure 49:
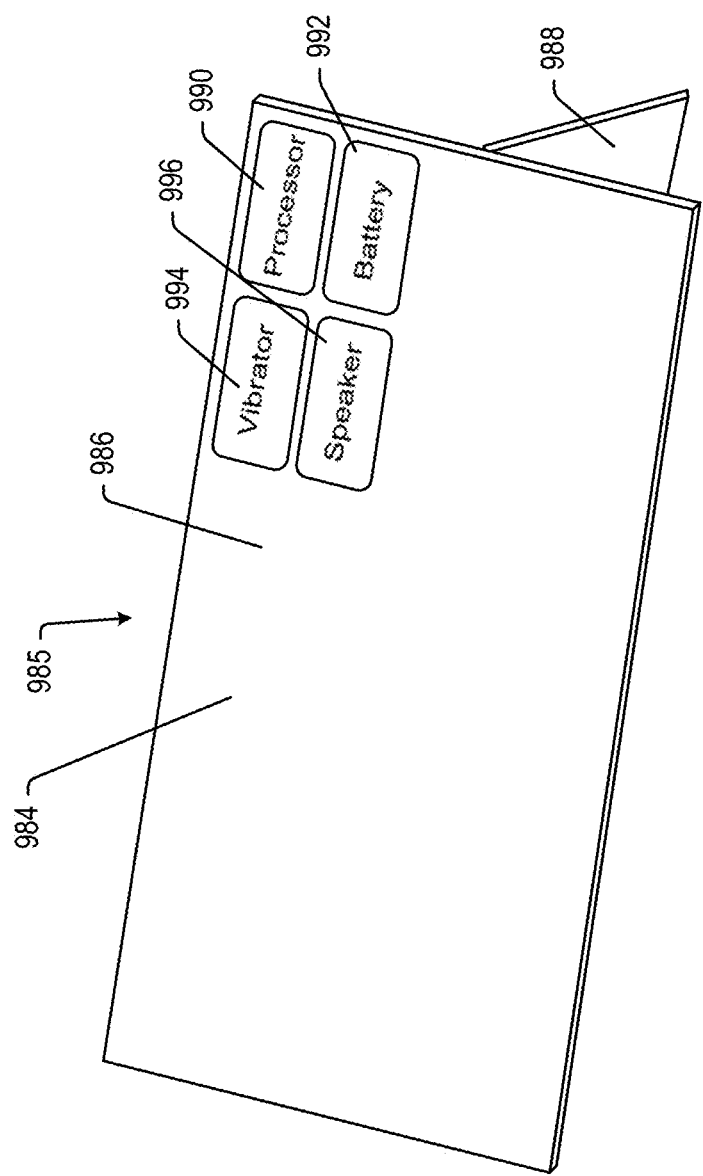
FIG. 49 is a perspective view of an interface arrangement that may be registered with content presented in a VR instance so that the arrangement can provide haptic feedback to an attendee interacting with VR tools.

Referring also to FIG. 49, an exemplary personal heads-up surface assembly 985 is shown that includes a main surface member 986 that forms heads-up surface 984 and a kickstand 988 that is hinged to a rear surface of member 986 to angle rearward and downward so that member 986 can be supported in any angular orientation within a range that is preferred by an attendee. In operation it is contemplated that cameras or other sensor devices (e.g. accelerometers, gyroscopes, etc.) built into assembly 985 or located at a workstation or in a workspace like 714q in FIG. 42 may capture images of or information related to surface 984 useable by server 716 to determine the location and orientation of surface 984 so that an attendee may move assembly 985 to any location associated with the VW instance and server 716 would move the personal content or interface 906 there along. Thus, for instance, if the attendee simply changes the angle of surface 984 in FIG. 49, the content presented thereon would be reoriented to be viewed optimally when tangent to surface 984 and would be viewed askew when surface 984 is viewed at a non-tangent angle. As another instance, if the attendee picks up assembly 985 and moves it to a different location in space 714q, server 716 would reorient the content on surface 984 or may even change the content depending on the new location of surface 984.

Referring still to FIG. 49, in at least some cases assembly 985 will include an active haptic feedback mechanism like a vibrator 994 or may include an audible feedback device like a speaker 996 or both that can provide feedback to an attendee when surface 984 is contacted or when some activity related to surface contact occurs such as moving content from surface 984 to some other location in a VW instance. To this end, assembly 985 may also include an independent processor 990 and a battery 992 to drive the haptic or audible feedback mechanism(s).

Figure 50:
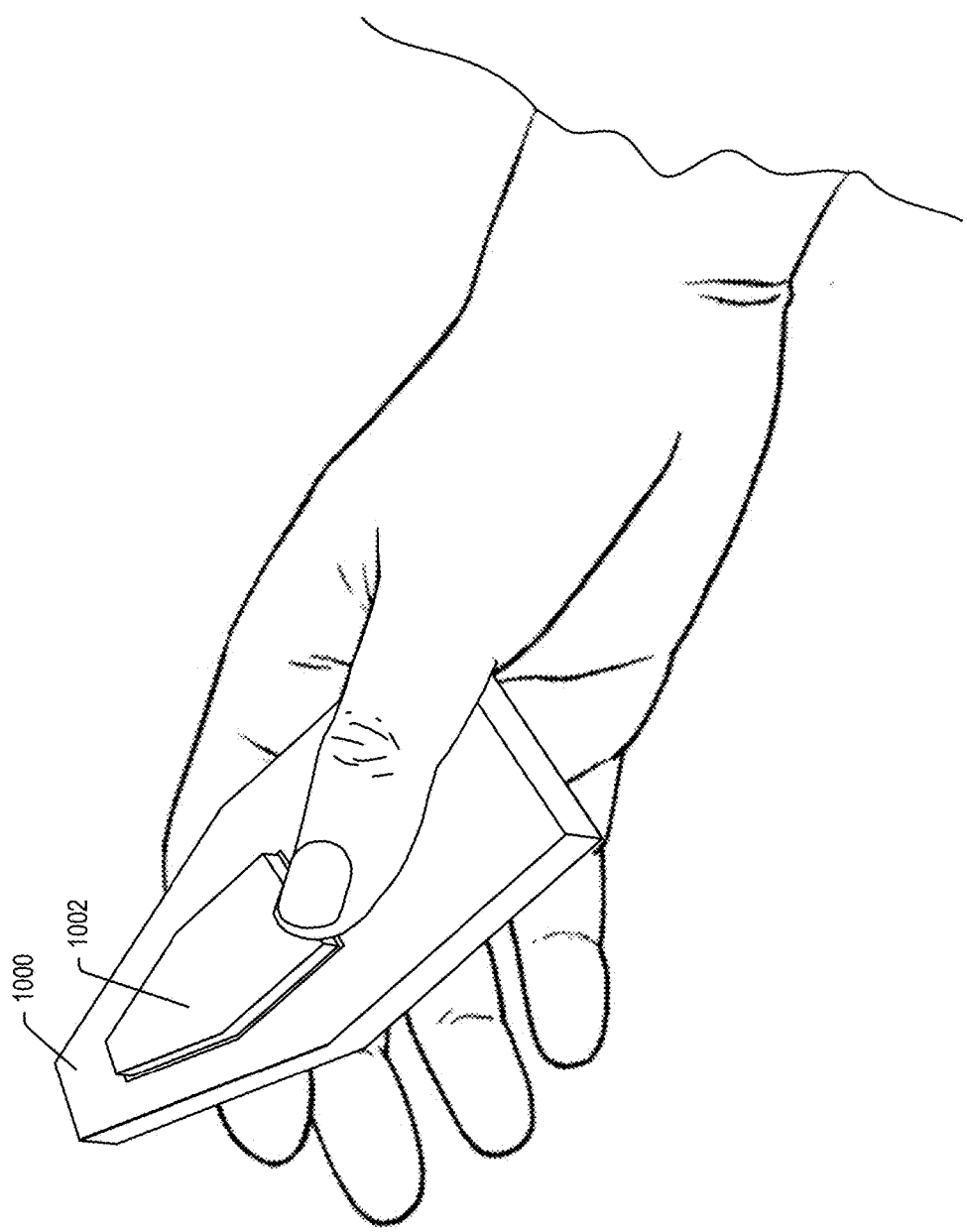
FIG. 50 is a perspective view of another mechanical tool useable as a haptic feedback device to indicate control commands within a VR instance.

Other hand held mechanical devices that provide a touchable surface and a touch sensation that mirrors or mimics the real world are also contemplated. For instance, in many RW settings, meeting attendees use a laser pointing device to point to a subset of content on a common display screen or the like. In the case of a VW instance, a small hand held mechanical pointing device may be provided where the location and orientation of the device are detectable and useable to mimic the effects of a RW laser pointer. For example, see FIG. 50 that shows a laser pointer simulation device 1000 held by an attendee that includes a selection button 1002. Here, device 1000 may include a processor, a battery, a wireless transmitter and, in at least some cases, one or more integrated sensor devices like an accelerometer, a gyroscope, etc., so that the processor can detect device 1000 orientation in the RW space. While an attendee wears a VR headset 700, device 1000 may be presented in the VW instance and, when button 1002 is selected, system server 716 may track location and orientation of device 1000 in the VW instance and place a laser type visual output on any affordance represented in the VW instance that is targeted by the front end of device 1000.

While RW laser light is typically only viewable on a subtended surface, in VR, the laser effect can be enhanced in several ways. For instance, the laser light path through a VW instance may be clearly visually distinguished as a light ray or in some other manner. To this end, see again FIG. 47 where an exemplary laser pointing device 1000 is shown and where a laser light ray 1004 is presented in the VW instance 1000. As another example, content subtended by the VR laser light may be automatically visually distinguished via highlighting, etc.

In at least some cases it is contemplated that one or more of the contactable interface devices described above or contemplated herein and/or interaction therewith may be presented differently to different meeting attendees. For instance, referring again to FIG. 47, personal content field 906 may appear in VW instance 900 to third attendee 77 that is using that interface but may not appear at all in the VW instances experienced by the first and second attendees 73 and 75 or other attendees linked to a meeting. As another instance, while third attendee 77 may use a laser pointing device 1000 and may see that device in her VW instance, other attendees to the same meeting may not see the pointing device or may see a larger, almost sword like pointing device in place of the laser device 1000 to give a better sense in the VW instance of what the third attendee 77 is pointing at.

In still other cases it is contemplated that each attendee may interact with content presented in their VW instance via intuitive gestures sensed by RW sensors/cameras where those gestures result in enhance interaction effects in one or more VW instances. For example, see FIG. 46 where the fourth attendee is represented at 79d' as including an extended "rubber arm" 1010 that reaches out to content BBB field 35d. Here, for instance, if the fourth attendee 79 is pointing her index finger at filed 35d, her VW arm may extend as shown up to a closest VW surface along the pointed trajectory. Here, if, after pointing to field 35d, the fourth attendee 79 were to make a grabbing motion with her hand, that motion may cause the VW hand at the end of arm 1010 to grasp on to field 35d so that lateral, up or down movement of the fourth attendees arm would move the content to some other location in the VW (e.g., a blank VW location may cause another VW surface to be generated to accommodate field 35d, movement to common content window 902 may cause the content BBB to be shared with all other attendees, etc.

In at least some embodiments it is contemplated that any VW instance may include a first subset of VW surfaces or other virtual affordances that are aligned with physical surfaces or affordances in the RW while a second subset of VW surfaces or other affordances that are not aligned with physical surfaces. To this end, see yet again FIGS. 42 and 47 where a third content window 905 is presented in VW instance 900 in FIG. 47 where the window 905 is not aligned with any physical wall or other RW structure in FIG. 42. Here, if an attendee were to move in VW instance 900 to surface 905 and attempt to touch that surface, the attendee would not experience a touch sensation as there would be no RW surface to contact. In at least some cases the first contactable VW surfaces may be visually distinguished from the second non-contact VW surfaces like surface 905. For example, see in FIG. 47 that the phrase "Real World Surface" is applied to fields 902 and 904 while the phrase "Virtual Surface" is applied to field 905. In other cases the first and second surface/affordance sets may be visually distinguished in some other fashion like persistent highlighting or glowing, etc.

In still other cases the first and second surface/affordance sets may only be distinguished when an attendee in a physical space that includes RW surfaces and affordances that are aligned with the surfaces and affordances in the VW instance moves within that space. Thus, for instance, in FIG. 47, while third attendee 77 remains seated, the distinguishing legends (e.g., "Real World Surface" and "Virtual Surface") may not be presented but once third attendee 77 stands and starts to move in the VW instance and therefore in the RW space 714q as well, the legends may be automatically presented.

In some cases VW surfaces and affordances may change appearance as an attendee moves toward those surfaces and affordances to more clearly indicate their complete virtual nature and that the attendee has the ability to move through those surfaces and affordances. For instance, VW surfaces may start to shimmer as an attendee moves toward them to indicate their virtual nature while VW surfaces that are aligned with physical RW surfaces would not shimmer.

In still other cases, VW surfaces and affordances may actually be automatically moved as an attendee moves in the VW instance and hence in a RW space. For example, if an attendee walks toward a VW surface 905 (see again FIG. 47), that surface may simply rotate to one side like a door if the attendee does not stop moving toward that surface to give the attendee the visual effect of the surface rotating to let the attendee through. Many other automatic effects on VW surfaces and affordances based on actual attendee movement in a workspace 714q or even within an attendee's personal workstation are contemplated.

In any VW instance where an attendee can physically get up and move, it is important that any RW surfaces or affordances be clearly represented for the attendee in some fashion while the attendee is viewing the VW instance. For example, in FIG. 42 a RW file cabinet is shown at 1012 which could injure an unsuspecting attendee if the attendee were to physically move in the RW while experiencing a VW instance 900 as in FIG. 47. In FIG. 47 a VW tree is provided in VW instance 900 at the RW location of cabinet 1012 so that the third attendee 77 has a VW visual queue to avoid moving through that space. In some cases the VW visual queues that correspond to RW affordances or structures may be persistently presented or, in the alternative, may only be presented when an attendee in a RW physical space physically gets up and starts to move in that space. By having the visual queues disappear while an attendee is stationary, the overall VW instance scene may be less distracting and therefore desirable.

In at least some embodiments other VW representations may be presented to an attendee that fill in space between TOIs with a consistent visual theme per attendee preferences. For instance, referring again to FIG. 47, while not shown, tree representations may be presented all around the third attendee 77 in locations that do not block views of meeting TOIs. In this case, the tree representations may all be similar regardless of whether or not they correspond to RW affordances or surfaces in some embodiments while in other embodiments tree representations that correspond to RW affordances or surfaces may be distinguished visually from tree representations that do not correspond to RW structure. Again, in some cases tree or other ambient representations may all have a similar appearance when an attendee is seated or generally stationary within a sub-zone of a workspace 714q and the representations that correspond to RW structure may be visually clearly distinguished only if and when an attendee gets up and moves in the physical space while viewing a VW instance.

It should be appreciated that because different meeting attendees will often arrange meeting TOIs and other VW affordances differently, VW surfaces and affordances may align differently in different VW instances with RW surfaces and affordances. Thus, for example, while third attendee 77 in FIG. 47 may have content AAA presented in VW window 33d on the RW surface 904 (see again FIG. 42), the fourth attendee 79 at station 712a in FIGS. 42 and 45 does not have a RW surface comparable to surface 904 and therefore her real and virtual legends would have to be different.

One problem with collocated attendees using VR headsets 700 is that, if they experience different VW instances, if a first attendee moves in a first VW instance and a second attendee is not presented in the first VW instance at a location that matches his location in the RW, if the second attendee moves through the RW location of the second attendee in the first VW instance, the first attendee would collide with the second. For this reason, in at least some embodiments where two or more attendees are collocated, in some cases the system will not support attendee movement out of specific attendee sub-zones. For instance, attendee sub-zones in workspace 714q in FIG. 42 may include 3 by 3 foot, non-overlapping zones for each attendee adjacent an edge of the tabletop. Here, if an attendee with a headset on moves outside her attendee sub-zone during a meeting, a safety system may automatically turn off the VW instances so that attendees know someone has moved.

In other cases, even where first and second collocated attendees share a mirrored or common VW instance that mirrors a RW space, server 716 may be programmed to only allow a single attendee at a time to physically move outside her attendee sub-zone within the VW instance to avoid collisions.

The directional video concepts described above for providing attendee representations where their STs are aligned with TOIs that associated attendees are instantaneously viewing can be applied within a single TOI. Thus, for instance, where a large VW emissive surface is presented that has left and right edges, if a first attendee is looking at content near the right edge, her representations in other attendee VW instances may likewise show her looking toward the right edge of the content.

Figure 51:
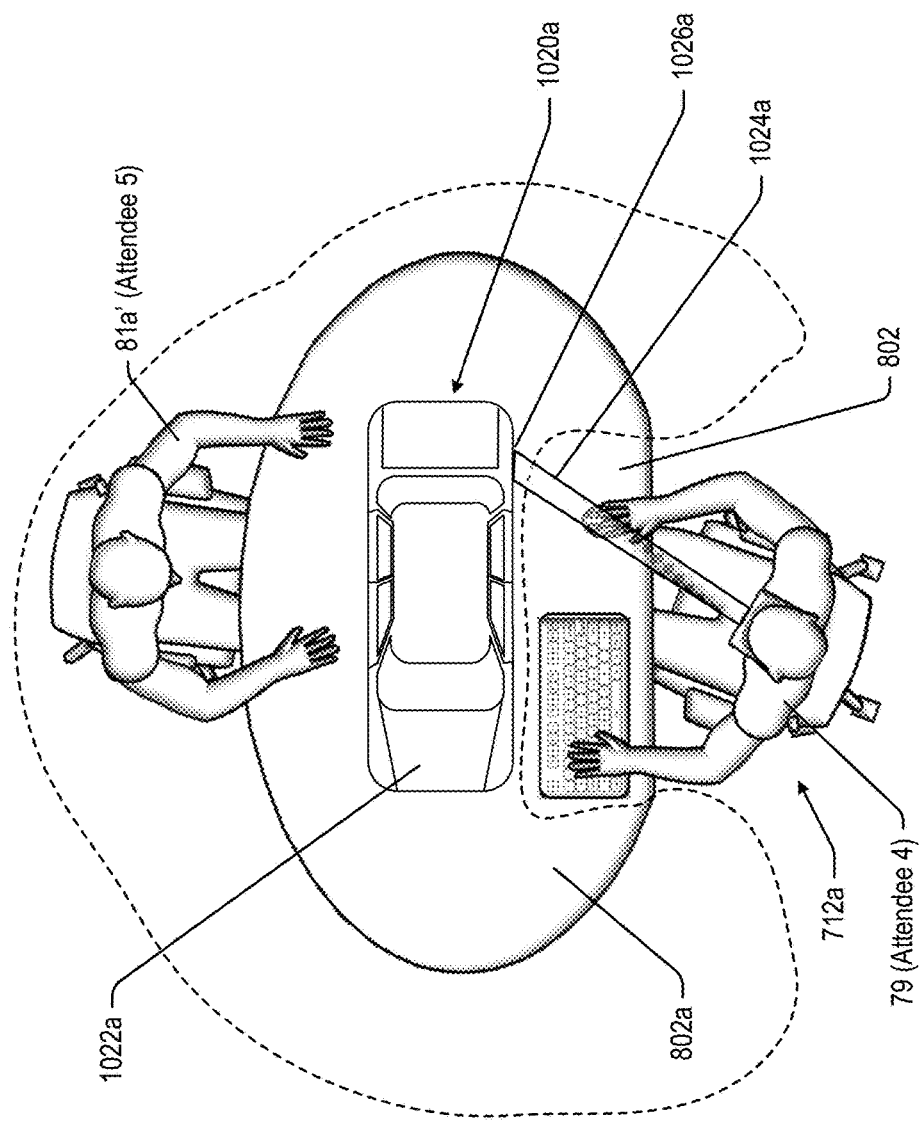
FIG. 51 is a top plan view of one attendee's VR instance where a second attendee is present.

In any of an AR, VR or MR systems, attendees may examine three dimensional holographic ("3DH") representations. Particularly interesting circumstances occur when first and second (or more) attendees look at a 3DH representation that resides between the two attendees. In this case, where the 3DH representation is different on all sides, because the attendees are on different sides, both attendees cannot see the same element or component of the 3DH representation at the same time. To this end, see FIG. 51 where a fourth attendee's VW instance 1050 is presented that includes a fifth attendee representation 81*a*' facing the fourth attendee on an opposite side of a virtual tabletop 802*a*. Here, a 3DH representation of a vehicle is presented at 1020*a* that hovers over a top surface of the virtual tabletop 802*a* where a right rear of the vehicle representation is at 1026*a*. Because the representation is a 3DH type, as the fourth and fifth attendees view the representation between themselves, only the fourth attendee 79 can view section 1026*a* as indicated at 1024*a* as that right rear section of the representation only faces attendee 79 and faces away from attendee representation 81*a*'. Thus, in the set-up shown in FIG. 51, it is difficult at best for the fourth and fifth attendees to view the same side of the representation 1020*a* at the same time.

In an alternative setup, each of the fourth and fifth attendees may be presented with an identical view of representation 1020*a* so that each can see the same features and aspects at the same time. Thus, in FIG. 51 for instance, while the fourth and fifth attendees are shown looking at the right and left sides of the 3DH representation 1020*a*, in other cases, each attendee in her own VW instance, may be presented with the same right side view so each sees the same features as the other. In this regard, see in FIG. 52 that fifth attendee 81 at second station 712*b* is presented with a view of the right side of the 3DH representation 1020*b* hovering above the second satin virtual tabletop 1030*b* and therefore can see the right rear section of representation 1020*b* as indicated at 1026*b* and the ST ray at 1024*b*. Thus, both the fourth and fifth attendees at separate stations 712*a* and 712*b* has the same right side view of representation 1020*a* or 1020*b* despite being presented in each of the VW instances on opposite sides of the same 3DH representation.

Figure 52:
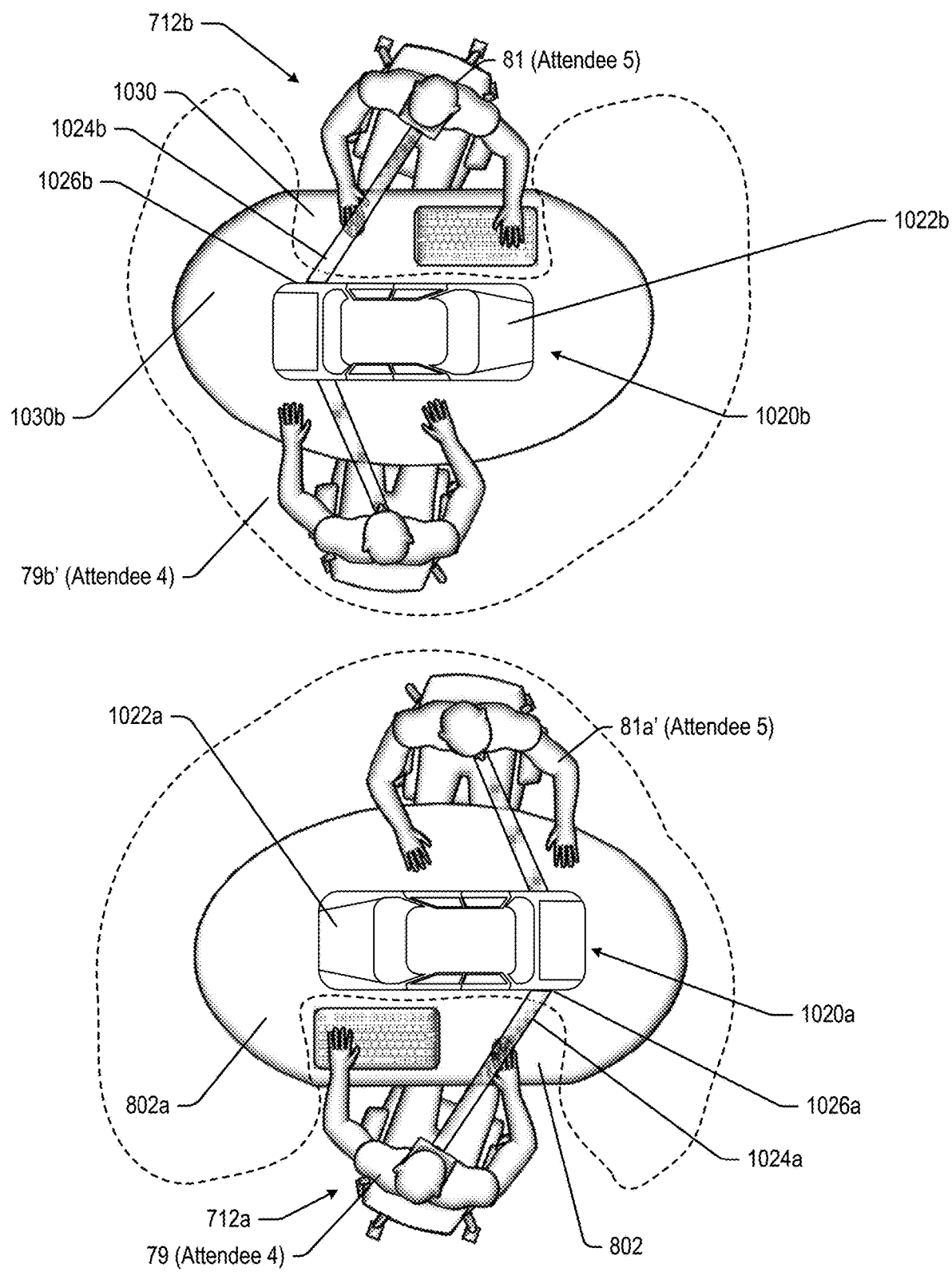
FIG. 52 shows VR instances for first and second attendees at the same time.

In FIG. 52, as in the case of other embodiments where directional videos give queues to live attendees as to where other attendees are looking and what they are paying attention to, the attendee representations in FIG. 52 are shown, in effect, horizontally flipped so that they appear to look in the same direction and at the same section of the 3DH representation as does the live attendee when both look at the same section of the representation (e.g., the rear right portion). In the disclosed cases, the directional videos of the attendee representations can be generated once the locations of target sections of the 3DH representation are known in a fashion similar to that described above with respect to the TOI targeting concepts.

In at least some embodiments, attendees viewing a 3DH representation may have the ability to select different sections of the representation causing those sections to be highlighted or otherwise visually distinguished or, in some cases, to pull portions of the representations for further viewing or manipulation. For instance, on a vehicle 3DH representation, an attendee may be able to select the rear right panel of the vehicle to highlight that panel during a discussion. Here, all rear right panels in all VW instances may similarly be highlighted or otherwise visually distinguished.

In at least some embodiments, multiple attendees may virtually assume the same vantage point or viewing position into a VW instance despite being positioned at different locations in other attendee VW instances. For example, see again FIG. 46 where the fourth and fifth attendee representation 79*d*' and 81*d*' are shown at different locations in VW instance 900 that is controlled by third attendee 77. Despite being represented at locations 1058 and 1060 as shown, both the fourth and fifth attendees could elect to view the meeting from location 1058 or from location 1060 in their own VW instances. Here, despite being "located" at the same location in instance 900 for viewing, the attendee representations would still be positioned differently per the third attendee's preferences as in shown in FIG. 46 and each would be presented via a directional video in instance 900.

C. Limiting Customized Views

One problem with allowing attendees too much control over customized meeting views is that some attendees may be distracted by possible views or meaningless content or ambient affordances that have little to do with meeting activities or goals and therefore, one or more attendees to a meeting may prefer to limit attendee AR or VR customization in some fashion or to some degree. For instance, in a case where a first attendee is a meeting leader and is presenting a speech to other attendees, the first attendee may want to control, to the extent possible, what information other attendees view and when those attendees view that information to script the presentation in a way designed to increase understanding. As another instance, a first meeting administrating attendee may want other attendees to generally pay attention to main content being presented at all times but may want the other attendees to have some ability to view other shared or personal content during a meeting independent of the main content so that the other attendees can add value to the meeting by sharing other content with all meeting attendees at times. As one other instance, in some cases one, a subset or all attendee activities may automatically be highly annotated or augmented to clearly indicate STs, pointing activities, instantaneously most interesting content (e.g., most instantaneously viewed, etc.), while in other cases those types of augmentation may be considered bothersome.

In at least some embodiments it is contemplated that, in at least certain modes of operation, an administering attendee will be able to control other attendee experiences and views during a meeting to sort of script the experiences of the other attendees. Here, in at least some cases the administering attendee may be able to script different experiences for different attendees or may be able to script a common experience for all attendees and what is scripted and related restrictions may change during an ongoing meeting as a leader or administrator may require more attention at some times than at others.

For example, referring again to FIG. 46, the third attendee 77's FOV may be restricted to 90 degrees as indicated by field 1070 and restricted to have to include surface or field 904 so that the attendee can rotate within VW instance 900 from the view indicated where field 904 is at the left lateral edge of the attendee's FOV to a different view where field 904 is at the right lateral edge of the attendee's FOV (not illustrated). In this case, it is contemplated that even if the attendee rotates her head further than in the RW than the range allowed by the restriction, the view into VW instance 900 would become "stuck" at one of the edges so that the third attendee is forced to be able to see field 904. In some cases, once stuck at an edge, if the attendee rotates her head in the opposite direction, the FOV may become unstuck regardless of the third attendee's RW orientation. In other cases the third attendee's FOV may remain stuck until the third attendee again rotates back in the RW to align with the VW instance.

Another feature that may be controlled by a system administrator is locations in which attendee's may place other attendees in their VW or AR instances. Thus, in some cases an administrator may require a certain arrangement of attendees in all VW instances. Another administrator controlled feature may be ambient effects (e.g., background scenes). Another controllable feature may include where certain content types can be placed in VW and AW instances.

Yet other controllable features that an administrator may control include how attendees are manifest in other attendee VW and AW instances. For example, an administrator in at least some embodiments may be able to limit movement of attendee representations within VW and AR instances so that particularly fidgety attendees do not become a distraction to other attendees. In cases where attendee movement or other activities are at least somewhat muted, in some cases the system server may present some less distracting summary of attendee activities like, for instance, an augmented window indicating that a specific attendee is fidgety or slouching or inattentive, etc. Here, other attendees can obtain a sense of the muted activities without a visual distraction. Other attendee voice signals may also be controlled by an administrator.

In certain cases, it may be desirable for an attendee to limit the amount of activity that the systems shows to other attendees. For instance, a remote attendee may be slouched in his chair during a meeting and only partially participating in the session and may not want to be represented in that fashion to other attendees. For this reason, in at least some embodiments it is contemplated that any attendee's representation may be set to a "dormant" operating mode in which the representation is either frozen or presented with e default set of movements. In other cases, it may be that server 16 only replicates certain attendee actions like, for instance, generating a directional video that is limited to showing an associated attendee sitting upright and looking at the attendee's instantaneous or most recent TOI without reflecting other actions like looking away from meeting content or other attendee representations.

The dormant mode can be activated by the attendee or can activate automatically in some cases when a predefined trigger set of circumstances occurs. The remote attendee can select to deactivate dormant mode and resume presentation of a live surround video of the remote attendee.

In cases where dormant mode is automatically activated and deactivated upon occurrence of a set of circumstances, one or more sensed parameters can trigger the dormant mode. For instance, where an attendee does not speak for at least 1 minute, server 16 may be programmed to automatically present the dormant mode video representation of the attendee. Here, once the dormant mode is active, if the remote attendee begins to speak again, the dormant mode may be automatically deactivated and directional video representation of the attendee may be presented in all stations and linked spaces.

In certain aspects, server 16 can be configured for use in a guided storytelling mode. In traditional media, the director of a movie makes choices for the viewer in terms of what the viewer is looking at, from which angle they are viewing the action, the audio track, and the like. In a video game context, there can be more freedom to move about a wider space, but certain aspect of the story progression require the attendee to be in a certain location within the game. In the applications of AR discussed herein (and in VR, as discussed below), it may be beneficial to limit the ability for an attendee to modify their view in order to ensure that the attendee's focus remains on the content that is being intended for consumption.

In a guided storytelling mode, the server 16 may limit the number of points of view (POVs) an attendee can adopt for viewing a remote space. For example, the server 16 can limit an attendee to selecting from 2, 3, 4, or up to n POVs. The POVs can be selected by a content provided in advance. To facilitate the selection of predetermined POVs, the content provider can access the AW via a storytelling preparation mode, where the POVs can be experienced by the content provider, along with any content that is to be presented, in order to determine of the POVs are appropriate for experiencing the content.

In a guided storytelling mode, the server 16 may allow an attendee to select any POV from any location and view the AW from any angle. In a guided storytelling mode, the server 16 may define various observation zones. If an attendee is in an observation zone that is sufficiently close to action of interest, then the server 16 can allow the attendee to adopt any POV that the attendee chooses. If an attendee is in an observation zone that is sufficiently far from the action of interest, then the server 16 can restrict the attendee's POV in order to ensure that the attendee is taking notice of the action of interest. In these cases, server 16 may restrict the field of view of the attendee's POV or may automatically switch the attendee to a POV that is closer to the action of interest.

In certain cases, server 16 can define the location of an action of interest, can determine an attendee's field of view, and can limit the rotational freedom of the attendee's field of view to ensure that the location of the action of interest remains in the field of view. For example, if an attendee has a 120° field of view and the action takes place over a 30° window within the field of view, then the server 16 can allow the attendee to rotate a maximum of 90° in one direction (thus placing the 30° window at one end of the field of view) and a maximum of 90° in the opposite direction (thus placing the 30° window at the opposite end of the field of view).

In other cases, a team leader or content producer may desire to give attendees complete freedom over POV and field of view to observe the AW from any perspective they desire, even if the action of interest is missed in the process.

In some cases, the degree of freedom given to the attendee to select POV and field of view can vary over time. For example, when an action of interest is still some time (for example 30 minutes) away from occurring, the server 16 can allow complete freedom to the attendee, but as the action of interest approaches in time, the range of options for AR viewing can be effectively narrowed. Once the time for the action of interest arrives, the server 16 can limit the attendee's viewing options to a minimal set of options that are suitable for viewing the action of interest. This concept is also applicable to supplemental visual element. When the action of interest is still some time away from occurring, the server 16 can allow complete freedom to the attendee to select whatever supplemental visual element the attendee prefers. As the action of interest approaches in time, the range of options for AR viewing can be effectively narrowed. Once the time for the action of interest arrives, the server 16 can limit the attendee's supplemental visual element options to a minimal set of options that are suitable for viewing the action of interest.

In certain cases in guided storytelling mode, the location of the action of interest is not particularly relevant to the content provider and it can be provided at any location in the AW. In these cases, the focus of a remote attendee can be determined by the server 16 and the action of interest can be provided wherever the remote attendee is focusing at a given time.

In a group meeting context, a leader can play the role of producer and utilize the tools of the guided storytelling mode to direct the focus of the meeting participants. For example, if a presentation leader wishes for all remote participants to experience the meeting from the same perspective, the server 16 can be configured to allow the presentation leader to fix the remote attendees' point of view. Additionally, the presentation leader can define the supplemental visual element that will be presented to all attendees and can define the style in which the supplemental visual element is provided. In some cases, the supplemental visual element that is provided can be a queue to an attendee to pay particular attention to a given piece of supplemental visual element (for example, a teacher might identify material that will be on an upcoming exam with a disclaimer, such as "Definitely study this: will be on exam!"). When a leader is controlling the AR experience, the content can be changed during the presentation. For example, if a leader has pre-programmed the supplemental visual element to be provided throughout the presentation, but determines that the supplemental visual element is distracting some participant, the leader can reduce the amount of supplemental visual element provided by changing a supplemental visual element setting, either individually or for the entire group. Alternatively, the server can be programmed to determine when an attendee is paying attention and adjust the supplemental visual element based on that feedback.

Thus, an administrator may control many aspects of each attendee's VW and AW instances and may control the instances in a similar fashion or in attendee specific ways. In addition, each attendee may control their own AW and VW instances and how other attendees and TOIs are presented in those instances. Moreover, each attendee may be able to control how they appear in other attendee instances.

When experiencing VR, it can be valuable to retain some awareness of the RW occupied by an attendee. For instance, if third attendee 77 is actively viewing VW instance 900 within workspace 714q in FIG. 46 and another attendee is sensed as entering the space, the VR server 716 can be configured to provide a notification (not shown) to third attendee 77 within instance 900. In some cases, the notification can be an icon known to indicate another new attendee's presence. In some cases, the notification can be a textual message identifying the newly arriving attendee. In some cases, the notification can be an icon combined with a textual message.

When using VR, due to the engrossing nature of the experience, it can be difficult for an attendee to regulate their volume when speaking. As such, a VR workspace or personal workstation can include sound-proofing material to provide sound insulation. The VR space can also include one or more microphones configured to acquire sound from the VR space. In some cases, the VR headset can include an integrated microphone or the VR attendee can be equipped with a wearable microphone.

The sound levels measured by the one or more microphones can be communicated to the attendee. For example, a graphic representation 1080 of the sound level can be provided or a textual message can notify an attendee of the volume of the sound as shown in FIG. 47. In the illustrated aspect, the volume level is at 8/11 and the textual message presented to the attendee is "Quiet Please!", which hovers within the attendee's FOV. The volume notice may be persistent or may flash on and off within the attendee's FOV until a threshold volume level is achieved.

The VR workspace can also include sound cancelation technology, including active sound cancelation technology. In some cases, the VR space 2 can include one or more speakers 24 for providing environmental sound to the VR space 218 and/or to provide the sound cancelation described above.

The VR workspace 714q can include a VR indicator for presenting information to other attendees in space 714q regarding the VR status of an attendee in that space. In some cases, it might be desirable for a second person occupying a VR workspace 714q, but who is not involved in the VR session, to communicate with an attendee in the VR session in the RW and to acquire information regarding the attendee's status in the VW. To this end, the VR space 714q may include a VR terminal 1090 (see again FIG. 47) that allows a RW attendee to interface with the third attendee 77 experiencing VW instance 900 without entering the VW. The terminal 1090 can contain various information about the third attendee's VW status, including but not limited to, the third attendee's schedule, a status of the VR meeting, and the like. In addition to providing information, the VR terminal 242 can include terminal inputs that allow the second attendee to deliver a message to the third attendee, which will appear to the third attendee in the VR instance via some type of notification.

While the systems described above are described in the context of virtual representations where attendees are generally sitting and stationary during a meeting, in other embodiments it is contemplated that employees may get up and move to other locations in a real world conference space during an ongoing meeting. For instance, in FIG. 42, the second attendee 75 may get up from the location shown and move to a different location along the edge of tabletop 750. In this case, in the first attendee's VW representation shown at 880 in FIG. 45, when the second attendee gets up and moves, the representation of the second attendee at 75c' may be eviscerated while the second attendee moves to the different location and, once seated at a different location, may again reappear as shown at 75c' in FIG. 45. In other cases the as the second attendee moves, the representation of the second attendee may simply be froze until the second attendee again assumes some location at the tabletop edge at which surround video of the second attendee can again be obtained to drive VW representations.

In some cases an attendee may be able to move between two or more affordance configurations linked to a meeting and the attendee's VW representations at other stations may simply reappear or reanimate after the attendee relocates and the attendee's identity is re-established. Thus, for instance, referring again to FIG. 42, if the second attendee 75 leaves the space illustrated on the right hand side of the image and goes to her personal workstation that is located in a different location within an employer's facility to rejoin an ongoing meeting, when second attendee 75 leaves the conference space, her VW representation 75c' in VW instance 880 in FIG. 45 may freeze or be otherwise visually distinguished prior to re-identification and, once at her station and re-identified, her VW representation 75c' may again start to track her TOI and represent her to first attendee 73.

In cases where a meeting attendee is constantly moving around, the system may automatically take those movements out the VW representation of that attendee at other stations to limit distractions therefrom. In some cases the amount of movement shown in VW representations may be different for different attendees based on some sensed parameter like, for instance, degree of instantaneous or recent participation. For example, primary instantaneous presenters or persistent talkers may be represented as more animated as their animations may be deemed more important for conveying meaning than are movements of some other attendee that is simply and passively listening and viewing content without much if any participation.

In any of the above described systems, while the systems are described as presenting flat 2D representations of attendees and other TOIs on emissive surfaces, it should be appreciated that three dimensional representations are also contemplated where the perspective and more importantly the changing perspective of an attendee viewing an AW or a VW is used to modify TOI representations to create a 3D effect. Thus, for instance, referring again to FIG. 47, if third attendee 77 moves her head left and right while looking in the direction of first attendee 73 in VW instance 900, the third attendee's eye locations and sight trajectory may be tracked and used to give the third attendee a slightly different perspective of the first attendee 73 that gives a three dimensional view to first attendee 73. This type of 3D perspective can be provided for each attendee representation in each VW instance, for virtual content displays and surfaces and for any type of tools that may be presented in each VW instance.

While the system described above assumes seated meeting attendees, other embodiments may also be capable of showing attendees in standing positions based on surround video in which the attendees are standing. To this end, in some cases, for instance, the commissioning station 12a described above may be a standing as opposed to a sitting station and an attendee may be instructed to move through a series of standing motions and actions during commissioning to generate a standing surround model for the attendee useable to drive a surround video of the attendee during normal operation. In this case, when an attendee stands during a meeting, the system server would generate a standing representation of the attendee in other attendee VWs where possible.

Figure 53:
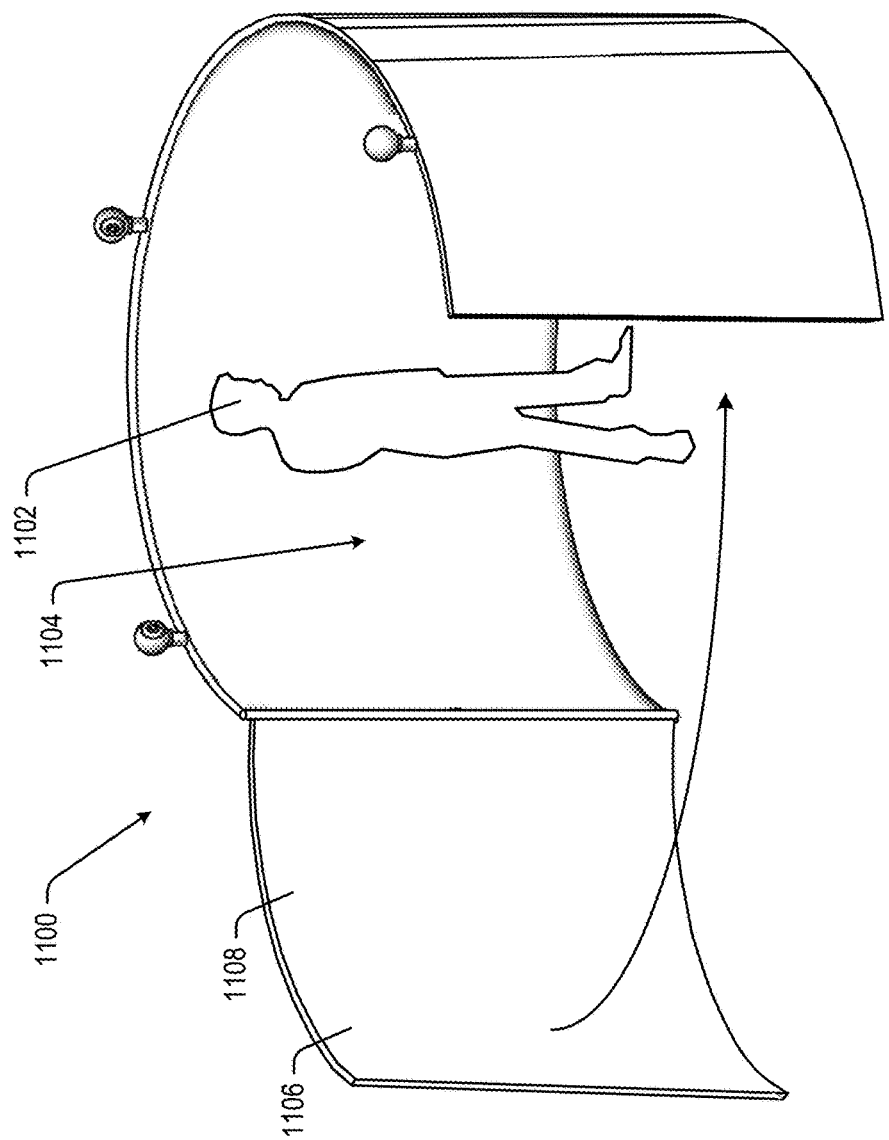
FIG. 53 is another perspective view of personal workstation arrangement.

In some cases a user station may include a standing as opposed to desktop type station. For example, see FIG. 53 that includes a standing augmented or VW station 1100 where an attendee or system user 1102 stands in a cavity 1104 formed at the station while participating in a VW or AW meeting.

In some cases a user station will include a station closing structure of some type where emissive surface may, when the closing structure is in a closed state, effectively surround a station user. To this end, in FIG. 53, a hinged door assembly 1106 that forms an emissive internal surface 1108 is shown where the door assembly 1106 moves between an open position shown and a closed position (not illustrated) to close off an egress into the station cavity 1104. In this case, once the door assembly 1106 is closed, attendee 1102 would have the sensation of being complete immersed within a VW instance presented on the emissive surfaces that comprise station 1100.

While most of the personal workstations described above include a cylindrical emissive surface assembly, in other embodiments other screen configurations are contemplated and may in fact be more optimal than the cylindrical shaped assembly. To this end, see U.S. patent application Ser. No. 14/500,091 which was filed on Sep. 29, 2014 and which is titled "Curved Display And Curved Display Support" which describes several curved emissive surface structures that may be used to provide personal workstations for individuals which is incorporated herein in its entirety by reference. In particular see FIG. 21 that includes an emissive surface structure where three flat surface generally rectangular sections are arranged at different angles about a horizontal emissive surface portion that operates as a worksurface for a station user. Here, the flat substantially vertical surface sections with spaces between can dive a user's views very intentionally so that different content or other attendee representations can be presented in a divided fashion that may make more sense to the station user.

At least some of the systems described above include some type of TOI indicators to supplement the apparent sight trajectories of the attendee directional videos in each of the AR and VR systems. For instance, in FIG. 18, ST arrows 450, 452 and 454 are applied to the AR emissive surface 101a to indicate instantaneous sight trajectories and TOIs of the second, ninth and fourth attendees, respectively. In other cases it is contemplated that the system processor or server may be programmed to examine video of conference attendees and to draw conclusions about those attendees which can then be used to drive other types of "attendee state queues" designed to increase the level of empathy or awareness of conference attendees so that those attendees can adjust activities during a conference to achieve optimal results. For instance, when a conference attendee is fidgety, the attendee's fidgeting may be a clear sign that the attendee is uncomfortable with or is having difficulty understanding a topic being discussed during a session. Here, in some cases, real time video of an attendee or data collected from other system sensor devices at an attendee's workstation or other occupied affordance configuration may be examined by the system processor and when the processor identifies at least a threshold level of fidgetiness, the processor may provide some visual queue in the AR or VR instances viewed by other session attendees. For example, a fidgeting attendee may be highlighted yellow by placing a transparent yellow overlay over the attendee's representations in other attendee views. As another example, a text attendee state queue like "Fidgety" may be presented either persistently or for a short time over the attendee's representation in other attendee views.

While a fidgety attendee state is described here, any other attendee state of interest that may be discerned by video or other sensor data is contemplated including, calm, engaged, disengaged, focused, unfocused, happy, unhappy, agitated, relaxed, etc., states, where each may be indicated on a per attendee basis. In some cases an attendee may be able to set a personal preference for which attendee states are indicated and which are not. For instance, a specific attendee may only want to see any negative attendee states (e.g., disengaged, unfocused, unhappy, fidgety, etc.) and when no states are indicated, would be able to assume that only positive states are occurring.

In at least some cases the system may have a commissioning period when initially used with a new attendee so that the system could generate an attendee state database used to customize an attendee state determining engine for each attendee. Here, a new attendee is an attendee that has not occupied a system affordance configuration (e.g., a personal workstation) in a way which previously enabled the system processor to generate a personalized attendee state database. The commissioning period may include a threshold period of meaningful occupancy such as, for instance, at least 10 hours of occupancy or occupancy during at least a threshold number of different sets of conditions (e.g., independent use, use during work activities as opposed to other activities like arrival, etc.). Here, the system processor may discern that for a specific attendee, the attendee is always fidgety regardless of conditions and, in that case, reporting that the attendee is fidgety would not make any sense and in fact may be disturbing to other attendees. Similarly, where another attendee is always calm or is always sensed as being focused, an attendee state indicator indicating those effects would not be particularly useful.

In other cases the system processor may perform some type of aggregate session state analysis to generate one or more "session state queues" indicating the general state of an ongoing session. For instance, where five attendees are linked to a session in a virtual reality system and three or more attendees are fidgety, a text session state queue may be presented automatically within an instantaneous field of view of each of the attendees or at least a subset of attendees (e.g., the field of view of a session leader if one exists, see 1120 in FIG. 43).

In at least some cases an attendee may be presented with her own attendee state indicator or indicators which characterize how the system is "perceiving" her state. For instance, in FIG. 43, a personal attendee indicator "Calm" is presented at 1122 to fourth attendee 79 for her consideration. The personal indicators may be viewed as a coaching tool to coach attendees on personal presentation in a meeting or the like. In some cases the personal indicators may not be presented as attendee state indicators to other attendees or may only be presented after some affirmative action by an associated attendee that releases the state indicators for other attendees to observe. Thus, for instance, in FIG. 43 the fourth attendee 79 may make some selection of indicator 1122 in the VW instance 780 to share that state indicator with other attendees. In still other cases the system may enable an attendee to accept or reject a personal state indicator as part of a system to help train the system processor to generate an attendee state database for the specific attendee. Here, a rejected state may be stored and affect how the attendee is perceived in the future by the system processor.

In at least some cases, the system processor may run one or more conference analytics programs to analyze meeting processes and generate at least one or a set of "session effectiveness conclusions" as well as a set of "conclusion factors" and "conclusion factor values". Here, it is contemplated that effectiveness of a meeting or conference may be affected by any of several different factors and that those factors can be identified and used to guide future meeting or conference characteristics. For instance, a very simple conclusion factor related to a team of five attendees that work routinely on a project may be how attendees and content are arranged in VW instances (e.g., is Tom next to Mary and is the instantaneously primary content automatically moved to the front and center for each attendee's FOV all the time). In this example, where a session is deemed to have been highly effective based on some sensed parameters (e.g., flow of meeting from one phase to another through the end of the session, the rate of work product development, the degree of focus of the attendees, the degree of participation by some or all of the attendees, etc.), the effectiveness may be attributed to the attendee and content arrangement conclusion factor. Thus, the factor values in this case may specify the effective arrangement associated with the session effectiveness conclusion.

In some cases, the system may use effectiveness over time to identify conclusion factors and values that can be confidently associated with effectiveness conclusions. Thus, for instance, the system may monitor 100 different possible conclusion factors and, only when a specific set of conclusion factor values is associated with a session effectiveness conclusion more than 70% of the time, may associate the conclusion factor value set with the session effectiveness conclusion.

Once one or more session effectiveness conclusions is associated with a conclusion factor value set, the system may store the associated conclusions and value set to be used to offer guidance to attendees as to how best to configure future sessions in ways that increase overall effectiveness. For instance, consistent with the above example, one suggestion may be to arrange Tom next to Mary and place instantaneously primary content automatically front and center in each attendee's FOV all the time. Many other effectiveness conclusions and associated conclusion factors and factor values as well as associated suggestions are contemplated.

In some cases where advantageous session suggestions and associated conclusion factor value sets are generated, the system may automatically offer an optimized session configuration based on advantageous session factor values. For instance, see in FIG. 48 that the option 942 is labelled "Campfire (Optimal)" indicating that that option is optimized based on session factor values derived from prior system use and results. Here, for instance, again, consistent with the above example, the system may place Tom next to Mary and instantaneous primary content in the central portion of each attendee's FOV in all attendee VW instances. Many other factors, values and optimized arrangements based on real life analytics are contemplated.

U.S. patent application Ser. No. 14/499,950 (hereinafter "the '950 application") which is titled "Conference Facilitation Method And Apparatus" and which was filed on Sep. 29, 2014 and which is incorporated herein in its entirety by reference teaches that it has been known for a long time that different people have different strengths and weaknesses when it comes to collaborating with others. For instance, some innovation experts classify conferees in groups into different categories based on strengths and perceived weaknesses. Ten exemplary categories include an anthropologist, an experimenter, a cross-pollinator, a hurdler, a collaborator, a director, an experience architect, a set designer, a storyteller and a caregiver. For instance, a person classified as an anthropologist is a person who ventures into the field to observe how people interact with products, services, and experiences in order to come up with new innovations. Often times these persons are extremely good at reframing problems in new ways and usually share such distinguishing characteristics as the wisdom to observe with an open mind, empathy, intuition; the ability to "see" things that have gone unnoticed; and a tendency to keep running lists of innovative concepts worth emulating and problems that need solving. As another instance, an experimenter celebrates the process, not the tool, testing and retesting potential scenarios to make ideas tangible. Other classifications correspond to other strengths and weaknesses. In many cases the best collaborative results occur when attendees having all types of classifications weigh in on a project or during a session.

The '950 application described a system wherein a server automatically identifies attendee classifications based on real time instantaneous collected data or based on historically collected data for session or meeting attendees and then tries to supplement a session with artificial intelligence to provide perspectives that are missing during any session. Here, the degree of supplementation of one any perspective or all missing perspectives can be dialed up or down depending on real life attendee preferences. Thus, in a case where there is no real life attendee with a strong anthropological perspective, the system server may present a strong anthropological perspective on session work product to encourage real life attendees to think outside their typical comfort zones.

In the present case, where one or more of the classified perspectives is missing from an AR or VR session, it is contemplated that the missing classified perspective may be presented in some fashion. For instance, see FIG. 43 again where, in a simple case, a virtual or augmented field 1130 may be presented in each attendee's view or world instance that provides a textual representation of one or more missing perspectives. The field 1130 may present results of an internet or other database search query based on content generated or contemplated during a session where the search results are filtered in some way to provide results associated with the missing perspective.

As another instance, in a more complex case, a missing perspective or even a combination of missing perspectives may be presented via a virtual avatar in each VW instance. To this end see the exemplary avatar 1132 in FIG. 43 that is presented in the background of VW instance 780. Here, avatar 1132 may be immobile most of the time and may only be activated when the missing perspective has something to add to an ongoing session. In some cases, in addition to becoming active when perspective is available, avatar 1132 may change appearance to indicate available perspective. For instance, avatar 1132 may increase in size slightly or change color (e.g., be shaded green) or be visually distinguished in some other fashion to indicate available perspective. In still other cases, avatar 1132 may increase in size and be moved to an open position along the edge of virtual tabletop 782. In some cases, when a missing perspective is available, the system may change avatar appearance to indicate available perspective but the avatar may remain inactive until one of the real life attendees affirmatively activates the avatar 1132 so that the avatar does not automatically break a line of thinking or a group flow state.

While not shown, in some cases it is contemplated that one or more of the real life attendees in a session may select one or more classified perspectives from a list of perspectives to be represented by avatar 1132 or the perspective field 1130 or in some other fashion in the VW instances. In at least some cases it is contemplated that each real life session attendee may be able to configure or activate their own avatar 1132 or perspective field 1130 to obtain a customized perspective that is independent of any group shared avatar. Thus, for instance, while avatar 1132 may be presented in FIG. 45 to fourth attendee 79, the first attendee 73c' may have her own customized avatar 1134 in VW instance 880.

Figure 54:
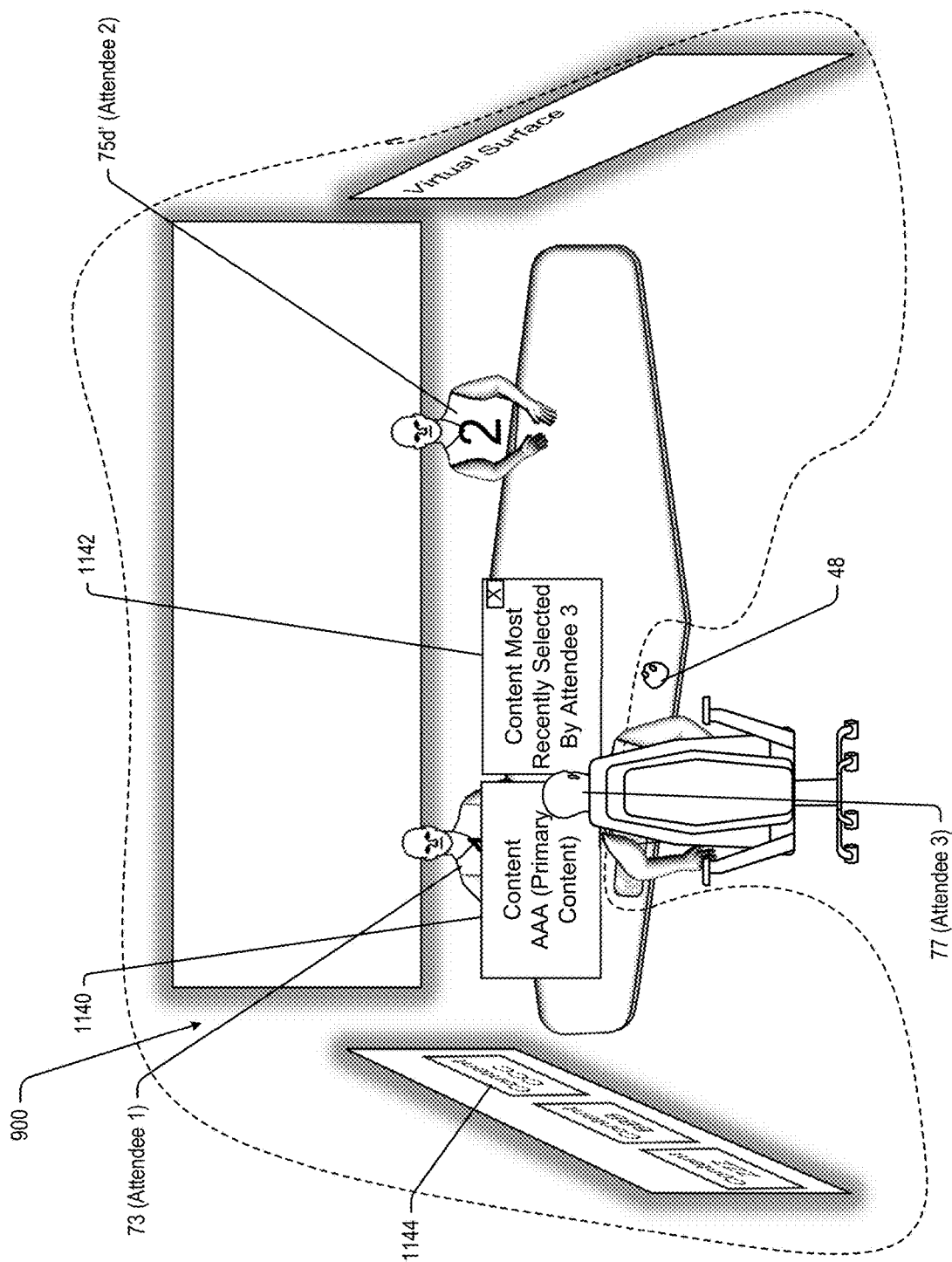
FIG. 54 shows a perspective view of a VR instance where content fields are provided for one attendee that is controlling the VR instance.

As described above, in at least some cases it is contemplated that the system processor may automatically move primary content or instantaneously referenced content to a central location in each attendee's FOV and, where that primary content changes during a session, the newly primary content may be swapped in for prior primary content. Other automatic content presentation processes and methods are also contemplated. For instance, in at least some cases it is contemplated that a split field option may be presented to an attendee including a first field presenting instantaneous primary content and a second field presenting an attendee's most recently selected other content. For instance, see FIG. 54 where instantaneous primary content is presented at 1140 and where the content most recently selected by attendee 77 is presented in the split field 1142. Here, attendee 48 may select different content in VW instance 900 by staring at that content and simultaneously selecting a selection button on mouse device 48. Thus, to replace the most recent selected content in field 1142 with other content 1144 in VW instance 900, attendee 77 would fix her sight trajectory on field 1144 and then activate the mouse selection button causing the system processor to replace content in field 1142 with content from field 1144. In this case, the content that is removed from field 1142 may be placed at its original location in VW instance 900. In some cases, when an attendee fixes her sight trajectory on a content field in VW instance 900, that field may be visually distinguished to confirm that the field has been sighted for selection or other action.

Figure 55:
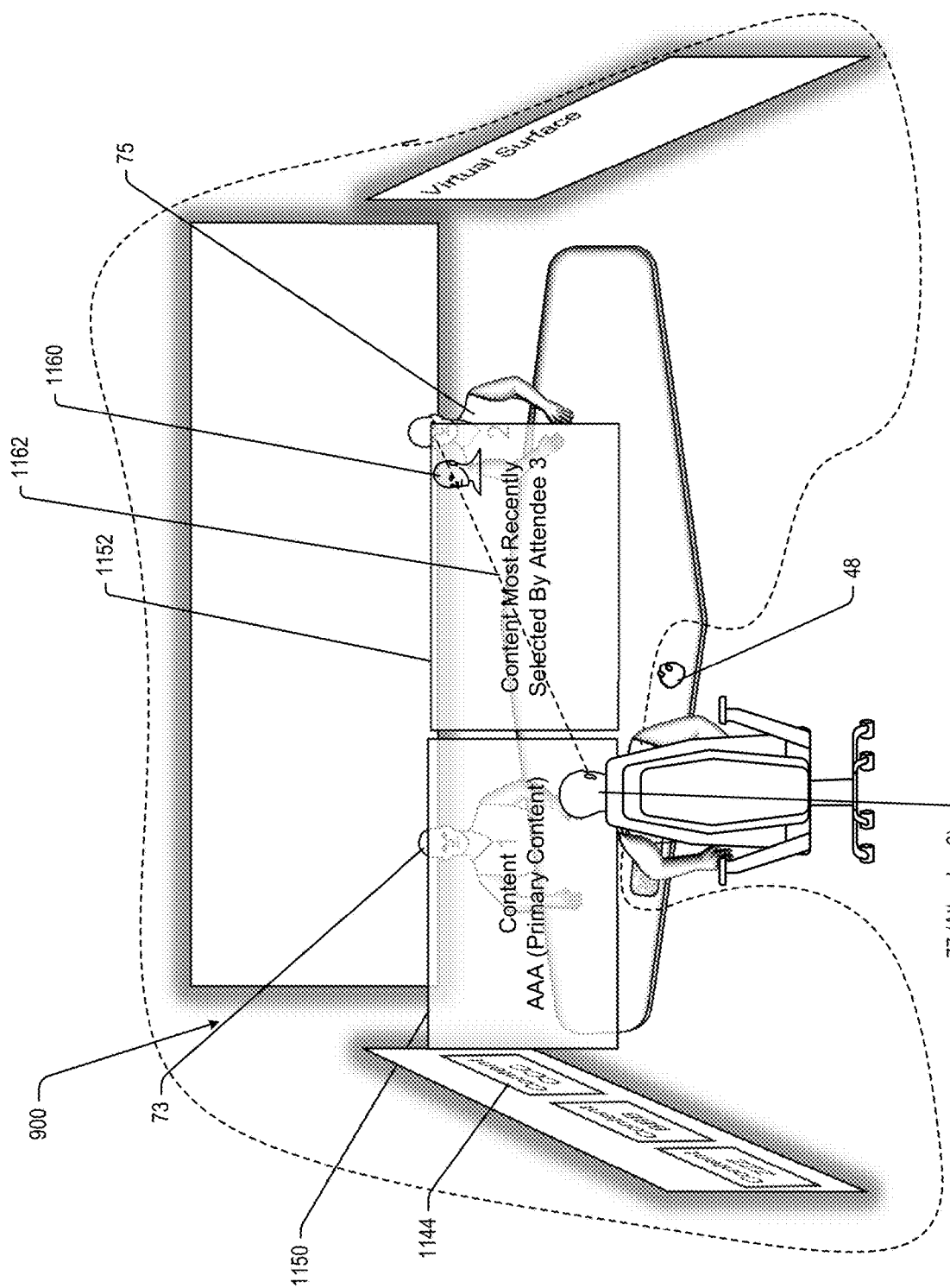
FIG. 55 is similar to FIG. 54, albeit showing the controlling attendee looking through a content field to an attendee there behind.
Figure 56:
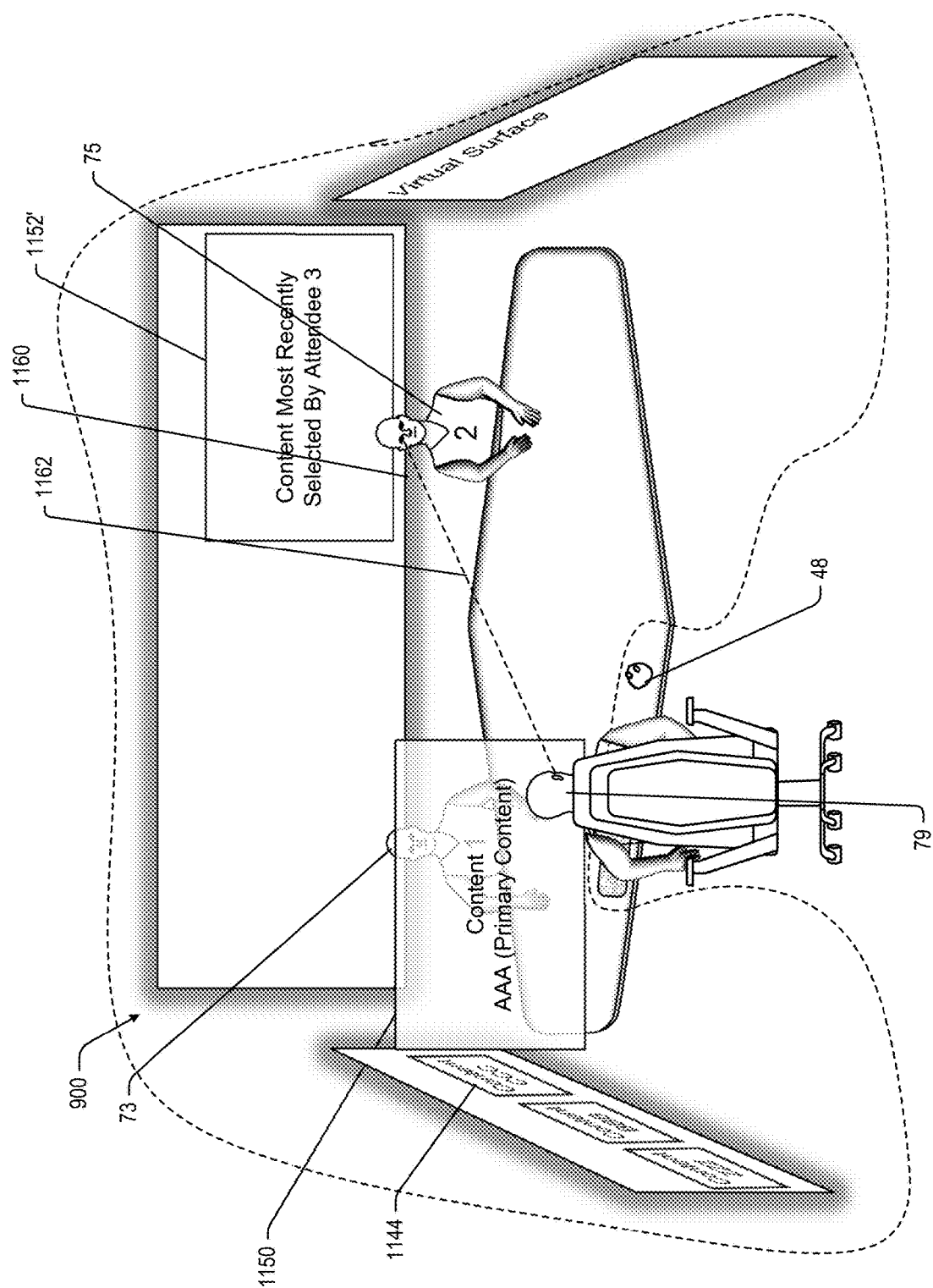
FIG. 56 is similar to FIG. 55, albeit where the content field looked through has been repositioned behind the viewed attendee in the VR instance automatically

In still other cases it is contemplated that TOIs may be stacked up one behind the other in an attendee's VW instance and that a target icon for each of the stacked TOIs behind a front TOI may be provided for selecting the associated TOI to reposition the TOIs and bring a selected TOI to a front position in the stack. To this end, see, for instance, FIG. 55 where two semi-transparent content fields are presented at 1150 and 1152 so that first and second attendees 73 and 75 can be seen therethrough. Here, when fourth attendee 79 looks through field 1152 fixing her sight trajectory on the second attendee representation at 75 as indicated by phantom line 1160, some indication that the second attendee may be selected and a target associated therewith may be presented such as, for instance, shading the second attendee representation 75 green or presenting a still representation of the attendee as shown at 1162. Where an attendee target is presented as at 1162, when fourth attendee 79 stairs directly at that target 1162, the target may be visually distinguished (e.g., highlighted, shaded green, etc.) to indicate that it has been targeted and then, if fourth attendee 79 activates a mouse selection button or otherwise performs some selection action (e.g., a hand gesture sensed by a gesture sensing device or a camera, etc.), second content window 1152 may be repositioned as shown in FIG. 56 at 1152'. A similar reshuffling may occur if fourth attendee 79 stairs at first attendee 73 and then at a target representation associated with first attendee 73 and then selects the target representation. In FIG. 56, if fourth attendee stairs at content field 1152', in some cases that field may light up or otherwise be visually distinguished and moveable back to a front position if selected by fourth attendee via mouse 48 activation or some other affirmative selection activity.

Referring again to FIG. 7, while only two speaker and microphone assemblies are shown at 122/124, it should be appreciated that many more such assemblies may be provided in any AR, MR or VR conference space described in this specification so that true directional audio can be obtained and generated in any conference space. Similarly, any of the personal stations (e.g., see 12a in FIG. 2) may be equipped with a large number of speaker and microphone assemblies for obtaining and generating true directional audio.

Figure 57:
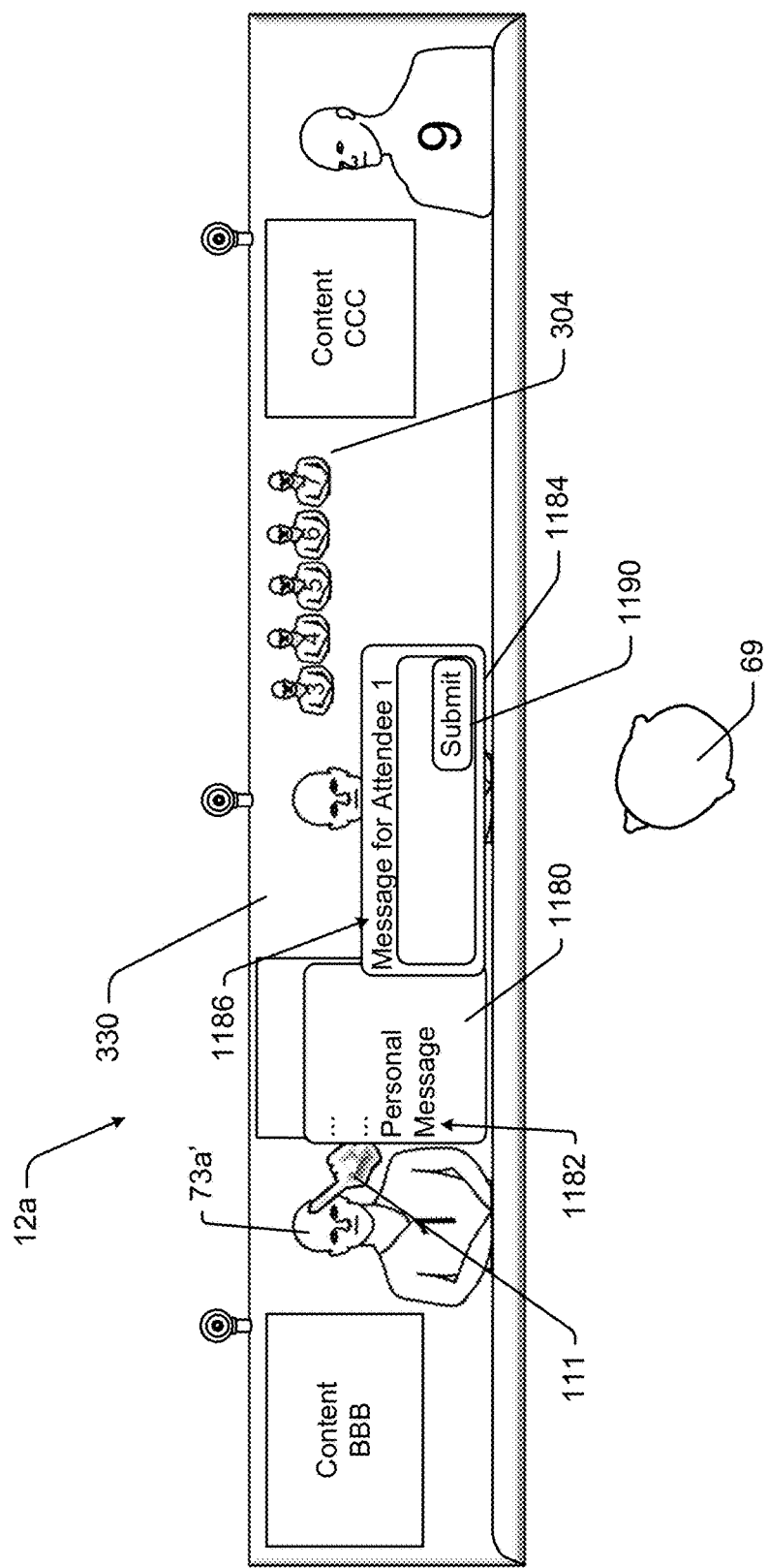
FIG. 57 is a view similar to FIG. 11, albeit showing tools for generating personal messages during an on-going session.

In at least some embodiments it is contemplated that the system server or processor may provide tools for personal or sub-group messaging during a meeting or session among attendees. For example, in a multi-attendee session, one attendee may want to send a personal message to another session attendee without broadcasting that message to all other session attendees. To this end, see, for instance, FIGS. 57 and 58 where an eight attendee 69 at a personal workstation 12a in a nine attendee session wants to send a personal message to a first attendee represented at 73a' and located as shown at 73 in FIG. 58. In the exemplary embodiment shown, eighth attendee 69 uses pointing icon 111 to hover over first attendee representation 73a' and then uses a mouse device or other interface device to select that representation causing a tool menu 1180 to open adjacent thereto on emissive surface 330 where one option 1182 is labelled "Personal Message". After selecting the message option 1182 a message field is opened at shown at 1184 which indicates a target attendee for the message at 1186. Eighth attendee 69 can speak a message into a station microphone 1188 or may type a message via a keyboard or the like at station 12*a*. In a case where attendee 69 voices a message while any message field 1184 is open, in at least some embodiments that voice message is not broadcast to other attendees generally and instead the voice message is automatically fed to voice to text transcription software at station 12*a* or elsewhere on a network to generate text for field 1184. Similarly, in some cases when an attendee voices a message while a personal message field is open, representations of the attendee at other attendee stations may either freeze or default to a state of slight movement without presenting the attendee speaking so that other non-target attendees have no way of knowing that the speaking attendee is generating a voice message. Once a message is composed eighth attendee 69 selects submit icon 1190 to send the message.

Figure 58:
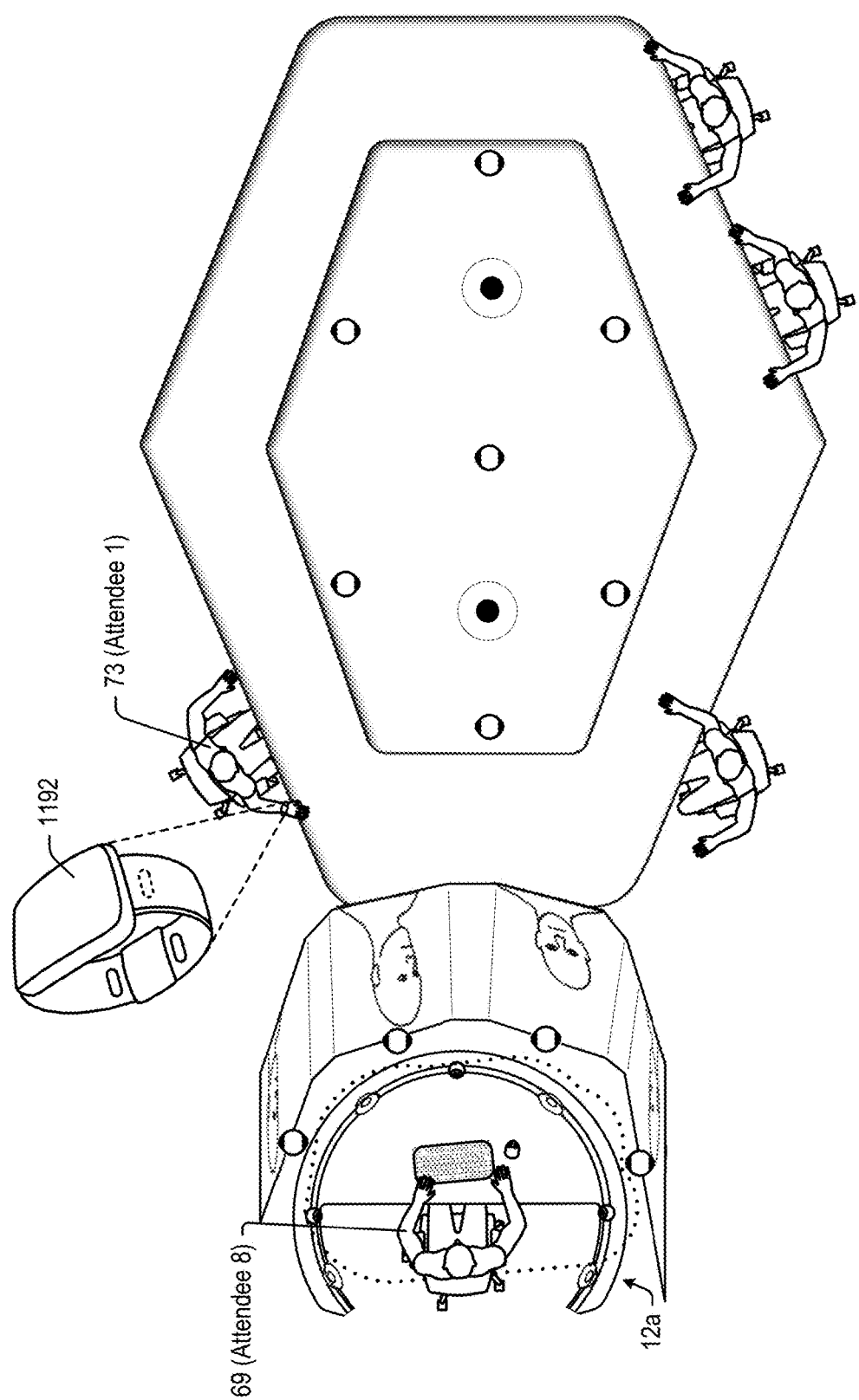
FIG. 58 shows a top plan view of a conferencing space where an attendee wears a wrist messaging device for receiving personal messages during a session.

Upon receiving a personal message, the system server identifies the targeted first attendee 73 in the present case and also identifies any personal affordances that the first attendee has at her disposal and that are currently activated which can be used to confidentially deliver the eighth attendee's message. In this regard, in at least some cases it is contemplated that each system user may register any electronic devices that the user uses or may grant access to some other database that indicates user interface or communication devices and that tracks activation states of those devices. In FIG. 58, first attendee 73 is shown wearing a watch or wrist type smart communication device 1192 and the eighth attendee message may be presented on an emissive surface associated with device 1192.

In other cases a system may include at least one emissive surface section that is only viewable by a specific attendee and private messages may be presented on that surface section for that attendee. For example, in the case of an attendee that occupies a station as shown in FIG. 2, a personal message may be presented at any location on the emissive surface 101 at the station, preferably at a location along an occupying attendee's instantaneous sight trajectory when presented. As another example, in the case of a conference space that includes at least semi-private emissive surface at each user station about a tabletop, personal messages may be presented at any location on the semi-private emissive surface section(s) viewable by a target attendee. In the case of a personal VR instance or view, a personal message may be presented at any location in the VR instance.

In at least some embodiments it is contemplated that personal messages may be audibly presented to attendees. In the case of an attendee at a personal station, a personal message may be broadcast via voice at the station. Here, the system may be able to echo cancel a broadcast voice so that the broadcast signal is not again picked up and retransmitted to other attendee stations or conference spaces.

In at least some embodiments at least some of the speakers included in a personal workstation or within a multi-user conference space (see again FIG. 7) may be directional speakers that are able to direct sound along narrow paths toward persons in the space so that audio messages can be provided to specific persons in the space as opposed to generally broadcast. To this end, several companies have developed ultrasonic directional speakers capable of transmitting sound to specific locations within space. For instance, once such speaker is the Sennheiser Audiobeam from Sennheiser Electronic GmbH & Co. Instead of generating ordinary audible sound waves with a single moving electromagnetic coil and cone, ultrasonic directional speakers generate ultrasound (high-frequency sound waves) that is too high pitched for our ears to hear using an array of electrical devices called piezoelectric transducers. The transducers are simply crystals, such as quartz, that vibrate back and forth tens of thousands of times a second when you feed electric currents through them, producing very high frequencies of sound. Ultrasound is used because its higher-frequency waves have a correspondingly shorter wavelength and diffract (spread out) less as they travel, which means they stay together in a beam for longer than ordinary sound waves. Also, having an array of many, small transducers makes sound diffract less than it would do from a single, large transducer. The ultrasound travels out from a directional speaker in a narrowly focused column, like a flashlight beam. When the ultrasound waves hit something, they turn back into ordinary sound you can hear.

In the contemplated system, cameras or other sensing devices in a space detect locations of persons in that space and the system server determines the identities of those space occupants. In a case where directional speakers can direct beams of sound along narrow paths, once the location of a specific attendee is identified in a multi-attendee conference space and after a personal voice message is generated for the located attendee (e.g., as indicated by selection of that attendee by another attendee via a mouse device as described above or in some other fashion), the system server may narrow cast a low volume personal voice message to a target attendee.

In VR systems where user's wear headsets or VW goggles as in, for instance, FIG. 42, in at least some cases speakers may be built into each headset for broadcasting personal voice messages to specific target attendees.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims.

To apprise the public of the scope of this invention, the following claims are made:

What is claimed is:

1. A conferencing system for conferencing between at least first and second local conferees within a first conference space and a remote conferee located remotely from the first conference space, the conferencing system comprising:

an emissive surface located within the first conference space for generating at least first and second video representations of the remote conferee;

at least a first processor for driving the emissive surface to simultaneously present at least the first and second video representations of the remote conferee on the emissive surface, wherein the first video representation shows the remote conferee from a first perspective and the second video representation shows the remote conferee from a second perspective that is different than the first perspective; and wherein, the first video representation is observable from within a first viewing zone and not within a second viewing zone within the conference space and the second video representation is observable from within the second viewing zone and not within the first viewing zone within the conference space.

2. The conferencing system of claim 1 wherein each of the first and second video representations appears to show the remote conferee looking in substantially the same direction within the first conference space.

3. The conferencing system of claim 1 wherein the first video representation is collimated so that the first video representation is only observable from within the first viewing zone and a second video representation is collimated so that the second video representation is only observable from within the second viewing zone.

4. The conferencing system of claim 1 further including a conferencing table and wherein the first viewing zone and the second viewing zone are on opposite sides of the conferencing table.

5. The conferencing system of claim 4 wherein the emissive surface is located adjacent an edge of the conferencing table.

6. The conferencing system of claim 5 further including at least one camera mounted adjacent the emissive surface for obtaining a first local video representation of at least the first viewing zone.

7. The conferencing system of claim 6 further including a second camera mounted adjacent the emissive surface for obtaining a second local video representation of at least the second viewing zone.

8. The conferencing system of claim 7 wherein the first and second cameras are mounted adjacent a top edge of the emissive surface.

9. The conferencing system of claim 1 wherein the second video representation is presented horizontally adjacent the first video representation so that the first and second video representations do not overlap on the emissive surface.

10. The conferencing system of claim 1 wherein the first and second video representations are presented on first and second different portions of the emissive surface wherein the first and second portions do not overlap.

11. The conferencing system of claim 1 wherein there is a third zone between the first and second zones in which neither the first video representation nor the second video representation is observable.

12. The conferencing system of claim 1 wherein the emissive surface includes a surface portions that are non-parallel.

13. The conferencing system of claim 1 wherein the processor is further programed to drive the emissive surface to simultaneously present, in addition to the first and second video representations, third and fourth video representations of the remote conferee on the emissive surface wherein the third video representation shows the remote conferee from a third perspective and the fourth representation shows the remote conferee from a fourth perspective, wherein the first, second, third and fourth perspectives are different, and, wherein, the third representation is viewable from within a third viewing zone, the fourth video representation is observable from within a fourth viewing zone, the first video representation is not observable from within the third or fourth viewing zones, the second video representation is not observable from within the third and fourth viewing zones, the third video is not observable from within the first, second or fourth viewing zones and the fourth video representation is viewable from within the first, second or third viewing zones.

14. The conferencing system of claim 13 wherein each of the first, second, third and fourth video representations is collimated so that the first, second, third and fourth video representations are only viewable from within the first, second, third and fourth viewing zones, respectively.

15. The conferencing system of claim 14 further including a conferencing table wherein the emissive surface is adjacent one edge of the conferencing table, the first viewing zone includes a first edge of the conferencing table, the second viewing zone includes a second edge of the conferencing table opposite the first edge, the third viewing zone includes an area spaced from the first edge of the conferencing table and the fourth zone includes an area spaced from the second edge of the conferencing table.

16. The conferencing system of claim 1 wherein the emissive surface is a first emissive surface, the system further including a remote conferee's workstation including a remote emissive surface and at least first and second remote cameras for generating the first and second video representations of the remote conferee, the first video representation from a first perspective and the second video representation from a second perspective with respect to the remote conferee.

17. The conferencing system of claim 16 further including at least a first local camera adjacent the first emissive surface, the at least a first local camera generating first local conferee and second local conferee video representations from the perspective of the first emissive surface and into the first and second viewing zones, respectively, the at least a first processor driving the remote emissive surface to present representations of the first and second local conferees on first and second portions of the remote emissive surface aligned with the first and second remote cameras, respectively.

18. The conferencing system of claim 17 wherein the at least a first processor receives images of the remote conferee, determines when the remote conferee is looking in the direction of the representation of the first local conferee on the remote emissive surface and then presents the first and second video representations on the first emissive surface so that the remote conferee appears to be looking at the first local conferee in the conference space.

19. The conferencing system of claim 1 wherein the emissive surface is a single contiguous emissive surface having at least first and second portions facing in different directions, the first and second video representations presented via the first and second portions, respectively.

20. The conferencing system of claim 1 wherein the emissive surface includes first and second separate emissive surfaces and the first and second video representations are presented via the first and second emissive surfaces, respectively.

21. The conferencing system of claim 20 wherein each of the first and second emissive surfaces is substantially flat.

22. The conferencing system of claim 21 wherein the first emissive surface forms an angle with the second emissive surface.

23. The conferencing system of claim 20 wherein the first and second emissive surfaces are spaced apart within the first conference space.

24. The conferencing system of claim 1 wherein the processor is further programmed to, in addition to presenting the first and second video representations, presenting at least a third video representation of the remote conferee on an emissive surface within the first conference space wherein the third video representation shows the remote conferee from a third perspective, wherein the first, second and third perspectives are different, and, wherein, the third representation is viewable from at least a portion of the first viewing zone as well as from at least some locations outside the first viewing zone.

25. The conferencing system of claim 1 wherein at least a portion of the emissive surface is curved about a vertical axis.

26. The conferencing system of claim 25 wherein the first and second emissive surfaces are spaced apart at different locations within the first conference space and face in different directions.

27. The conferencing system of claim 25 wherein the first and second emissive surfaces face in different directions within the first conference space.

28. A conferencing system for conferencing between at least first and second local conferees within a first conference space and a remote conferee located remotely from the first conference space, the conferencing system comprising:
   at least a first emissive surface located within the first conference space for generating at least first and second video representations of the remote conferee;
   at least a first processor for driving the emissive surface to simultaneously present at least the first and second video representations of the remote conferee on the emissive surface, wherein the first video representation shows the remote conferee from a front perspective and the second video representation shows the remote conferee from a side perspective; and
   wherein, the remote conferee appears to be looking in a first direction within the conference space in the first video representation and the remote conferee appears to be looking in the first direction in the second video representation.

29. A conferencing system for conferencing between local conferees located within a first conferencing space and a remote conferee located remotely from the first conference space, the conferencing system comprising:
   an emissive surface located within the first conference space and configured to simultaneously generate first and second video representations of the remote conferee wherein the first video representation is observable from within a first zone within the conference space and not within a second zone within the conference space and the second video representation is observable from within the second zone within the conference space and not within the first zone and, wherein, each of the first and second video representations appears to show the remote user looking in the same direction within the conference space.

30. The conferencing system of claim 29 wherein the emissive surface includes separate first and second emissive surfaces and wherein the first and second video representations are presented on the first and second emissive surfaces, respectively.

* * * * *